United States Patent
Kwon et al.

(10) Patent No.: US 10,728,590 B2
(45) Date of Patent: Jul. 28, 2020

(54) APPARATUS AND METHOD FOR TRANSMITTING AND RECEIVING BROADCAST SIGNAL

(71) Applicant: LG ELECTRONICS INC., Seoul (KR)

(72) Inventors: Woosuk Kwon, Seoul (KR); Minsung Kwak, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/557,461

(22) PCT Filed: Mar. 10, 2016

(86) PCT No.: PCT/KR2016/002411
§ 371 (c)(1),
(2) Date: Sep. 11, 2017

(87) PCT Pub. No.: WO2016/144118
PCT Pub. Date: Sep. 15, 2016

(65) Prior Publication Data
US 2018/0070111 A1    Mar. 8, 2018

Related U.S. Application Data

(60) Provisional application No. 62/131,818, filed on Mar. 11, 2015, provisional application No. 62/135,696, filed on Mar. 19, 2015.

(51) Int. Cl.
*H04N 21/235* (2011.01)
*H04N 21/236* (2011.01)
(Continued)

(52) U.S. Cl.
CPC ........... *H04N 21/235* (2013.01); *H04L 12/18* (2013.01); *H04L 12/184* (2013.01); *H04L 69/04* (2013.01);
(Continued)

(58) Field of Classification Search
CPC ........... H04N 21/64322; H04N 21/611; H04N 21/2381; H04N 21/236; H04N 21/2353;
(Continued)

(56) References Cited

U.S. PATENT DOCUMENTS 8,250,619 B2    8/2012 Song et al.
2004/0264433 A1    12/2004 Melpignano
(Continued)

FOREIGN PATENT DOCUMENTS

CN    101442521    5/2009
KR    1020130120422    11/2013
(Continued)

OTHER PUBLICATIONS

PCT International Application No. PCT/KR2016/002024, International Search Report dated Jun. 15, 2016, 3 pages.
(Continued)

*Primary Examiner* — Asad M Nawaz
*Assistant Examiner* — Kai Chang
(74) *Attorney, Agent, or Firm* — Lee Hong Degerman Kang Waimey

(57) ABSTRACT

Disclosed is a method of transmitting a broadcast signal. The method includes encoding broadcast data based on a delivery protocol, line-layer processing the broadcast data, and physical-layer processing the broadcast data. Line-layer processing the broadcast data may include compressing the header of at least one IP packet when the broadcast data comprises the IP packet and encapsulating the IP packet into link layer packets.

18 Claims, 103 Drawing Sheets

(51) Int. Cl.
*H04N 21/2381* (2011.01)
*H04L 29/06* (2006.01)
*H04N 21/61* (2011.01)
*H04L 12/18* (2006.01)
*H04L 29/08* (2006.01)
*H04N 21/643* (2011.01)
*H04L 12/741* (2013.01)

(52) U.S. Cl.
CPC ............ *H04L 69/22* (2013.01); *H04L 69/324* (2013.01); *H04N 21/236* (2013.01); *H04N 21/2353* (2013.01); *H04N 21/2381* (2013.01); *H04N 21/6112* (2013.01); *H04N 21/64322* (2013.01); *H04L 45/74* (2013.01)

(58) Field of Classification Search
CPC ..... H04N 21/235; H04L 69/324; H04L 69/22; H04L 69/04; H04L 45/74; H04L 12/184; H04L 12/18
See application file for complete search history.

(56) References Cited

U.S. PATENT DOCUMENTS

| | | |
|---|---|---|
| 2008/0025312 A1 | 1/2008 | Kuppuswamy et al. |
| 2009/0013356 A1 | 1/2009 | Doerr et al. |
| 2009/0082048 A1 | 3/2009 | Song et al. |
| 2012/0113993 A1 | 5/2012 | Sridhar et al. |
| 2012/0307842 A1* | 12/2012 | Petrov .............. H04N 21/23608 370/474 |
| 2012/0324513 A1* | 12/2012 | Hwang ................. H04H 20/65 725/54 |
| 2012/0327955 A1* | 12/2012 | Herrmann ............ H04N 21/235 370/476 |
| 2013/0219431 A1 | 8/2013 | Hong et al. |
| 2013/0279380 A1* | 10/2013 | Hong ..................... H04H 20/72 370/310 |
| 2013/0286895 A1 | 10/2013 | Mittapalli et al. |
| 2014/0314103 A1* | 10/2014 | Michael .............. H04N 21/643 370/472 |
| 2014/0380135 A1 | 12/2014 | Hong et al. |
| 2015/0230129 A1* | 8/2015 | Abdulla ................. H04L 69/04 370/235 |
| 2018/0367502 A1* | 12/2018 | Kwon .................... H04L 69/22 |

FOREIGN PATENT DOCUMENTS

| | | |
|---|---|---|
| KR | 1020130127990 | 11/2013 |
| KR | 20140005227 | 1/2014 |
| WO | 2014209057 | 12/2014 |
| WO | 2015005715 | 1/2015 |

OTHER PUBLICATIONS

U.S. Appl. No. 15/554,192, Office Action dated Sep. 7, 2018, 12 pages.
PCT International Application No. PCT/KR2016/002411, Written Opinion of the International Searching Authority dated Jul. 11, 2016, 11 pages.
U.S. Appl. No. 15/554,192, Office Action dated Jun. 14, 2019, 15 pages.
U.S. Appl. No. 15/554,192, Final Office Action dated Feb. 8, 2019, 15 pages.
U.S. Appl. No. 15/554,192, Final Office Action dated Nov. 29, 2019, 14 pages.

* cited by examiner

【Figure 1】
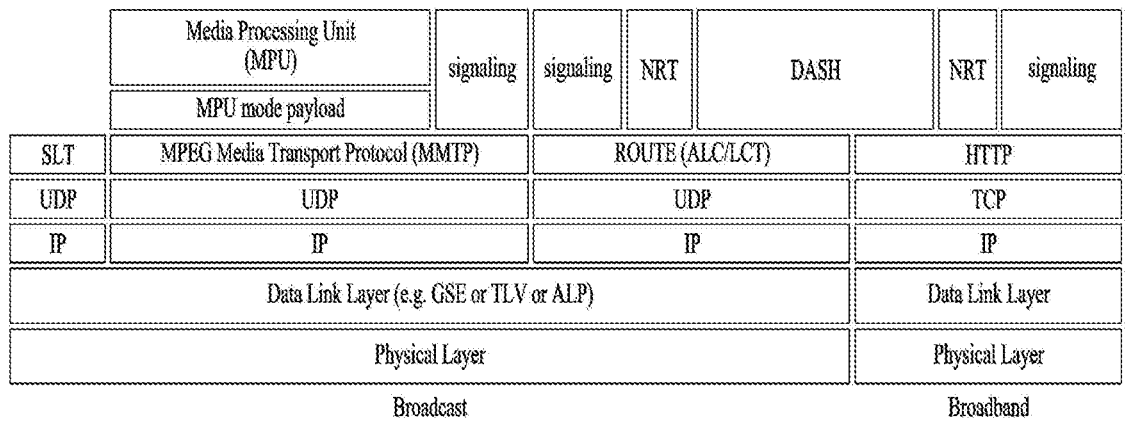
【Figure 2】
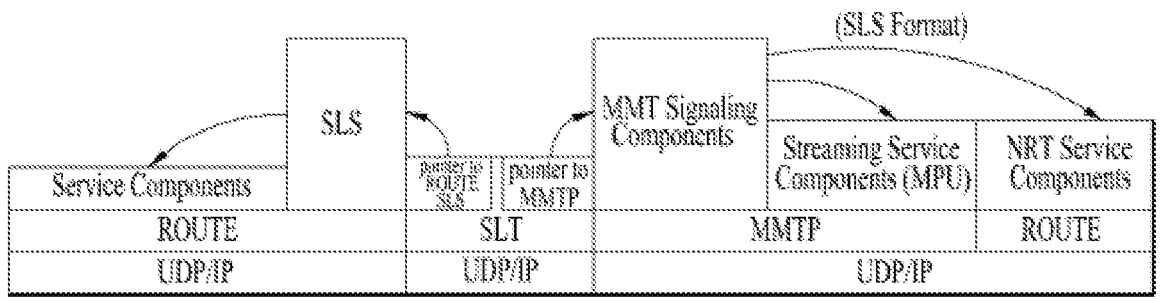

[Figure 3]

| Element or Attribute Name | Use |
|---|---|
| SLT | |
|    @bsid | 1 |
|    @sltSectionVersion | 1 |
|    @sltSectionNumber | 0..1 |
|    @totalSltSectionNumbers | 0..1 |
|    @language | 0..1 |
|    @capabilities | 0..1 |
|    InetSigLoc | 0..1 |
|    Service | 1..N |
|       @serviceId | 1 |
|       @SLT serviceSeqNumber | 1 |
|       @protected | 0..1 |
|       @majorChannelNo | 1 |
|       @minorChannelNo | 1 |
|       @serviceCategory | 1 |
|       @shortServiceName | 1 |
|       @hidden | 0..1 |
|       @slsProtocolType | 1 |
|       BroadcastSignaling | 0..1 |
|       @slsPlpId | 0..1 |
|       @slsDestinationIpAddress | 0..1 |
|       @slsDestinationUdpPort | 0..1 |
|       @slsSourceIpAddress | 0..1 |
|       @slsMajorProtocolVersion | 0..1 |
|       @SlsMinorProtocolVersion | 0..1 |
|       @serviceLanguage | 0..1 |
|       @broadbandAccessRequired | 0..1 |
|       @capabilities | 0..1 |
|       InetSigLoc | 0..1 |

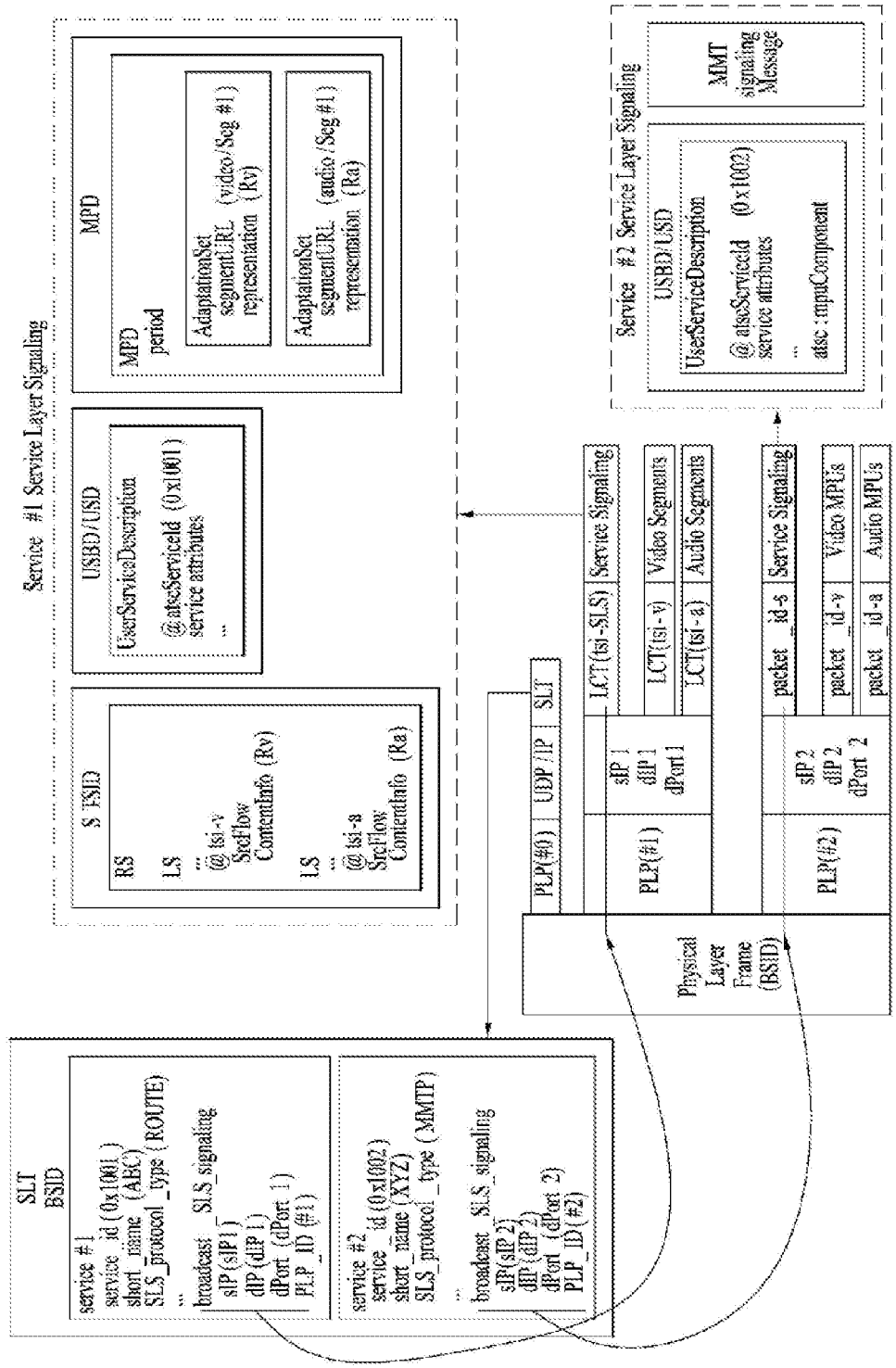
[Figure 4]

【Figure 5】

| Element or Attribute Name | | | Use |
|---|---|---|---|
| bundleDescription | | | |
| | userServiceDescription | | |
| | | @serviceId | M |
| | | @atsc: serviceId | M |
| | | @atsc: serviceStatus | OD |
| | | @atsc: fullMPDUri | M |
| | | @atsc: sTSIDUri | M |
| | | name | 0..N |
| | | lang | CM |
| | serviceLanguage | | 0..N |
| | atsc: capabilityCode | | 0..1 |
| | deliveryMethod | | 1..N |
| | | r12: broadcastAppService | 1..N |
| | | basePattern | 1..N |
| | | r12: unicastAppService | 0..N |
| | | basePattern | 1..N |

[Figure 6]

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

[Figure 7]

| Element or Attribute Name | Use |
|---|---|
| bundleDescription | |
|   userServiceDescription | |
|     @serviceId | M |
|     @atsc:serviceId | M |
|     Name | 0..N |
|       Lang | CM |
|     serviceLanguage | 0..N |
|     atsc:capabilityCode | 0..1 |
|     atsc:Channel | 1 |
|       @atsc:majorChannelNo | M |
|       @atsc:minorChannelNo | M |
|       @atsc:serviceLang | O |
|       @atsc:serviceGenre | O |
|       @atsc:serviceIcon | M |
|       atsc:ServiceDescription | 0..N |
|         @atsc:serviceDescrText | M |
|         @atsc:serviceDescrLang | O |
|     atsc:mpuComponent | 0..1 |
|       @atsc:mmtPackageId | M |
|       @atsc:next_MmtPackageId | O |
|     atsc:routeComponent | 0..1 |
|       @atsc:sTSIDUri | M |
|       @slsPlpId | OD |
|       @slsDestinationIpAddress | OD |
|       @slsDestinationUdpPort | M |
|       @slsSourceIpAddress | M |
|       @slsMajorProtocolVersion | OD |
|       @SlsMinorProtocolVersion | OD |
|     atsc:broadbandComponent | 0..1 |
|       @atsc:fullMPDUri | M |
|     atsc:ComponentInfo | 1..N |
|       @atsc:component_Type | M |
|       @atsc:component_Role | M |
|       @atsc:component_ProtectedFlag | OD |
|       @atsc:component_Id | M |
|       @atsc:component_Name | O |

【Figure 8】
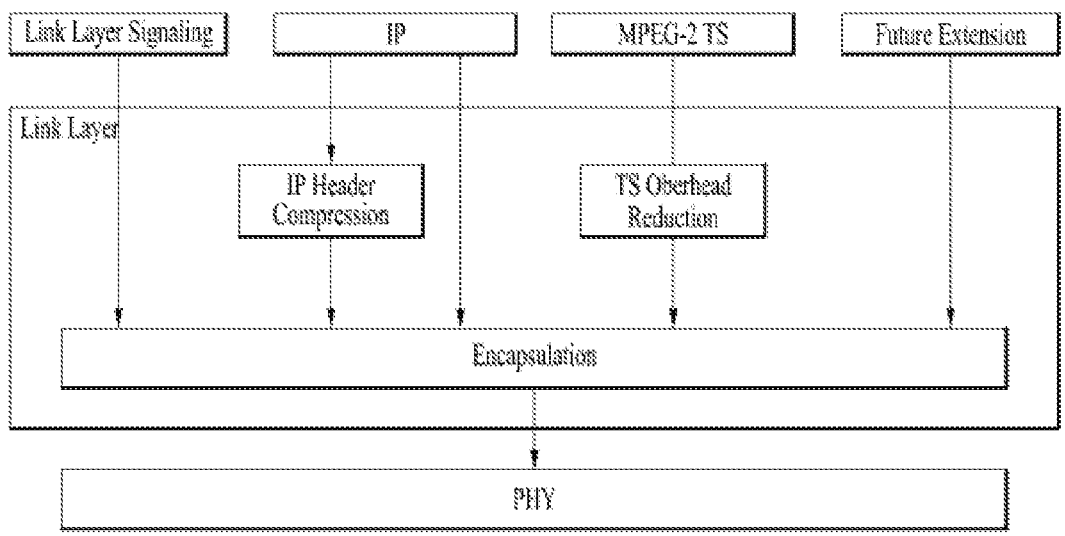
【Figure 9】
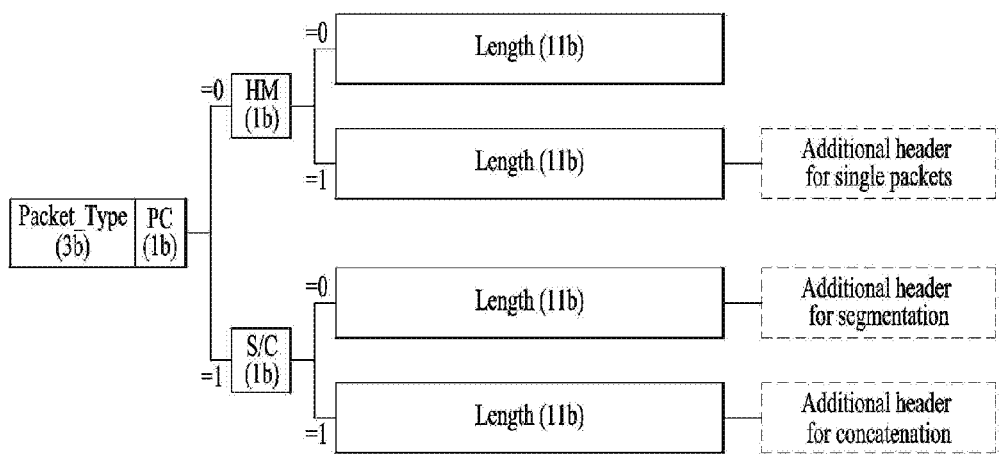

[Figure 10]
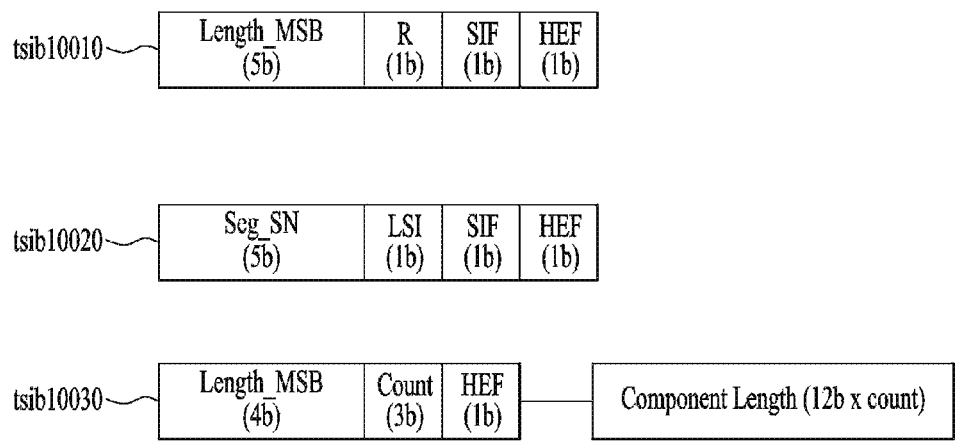

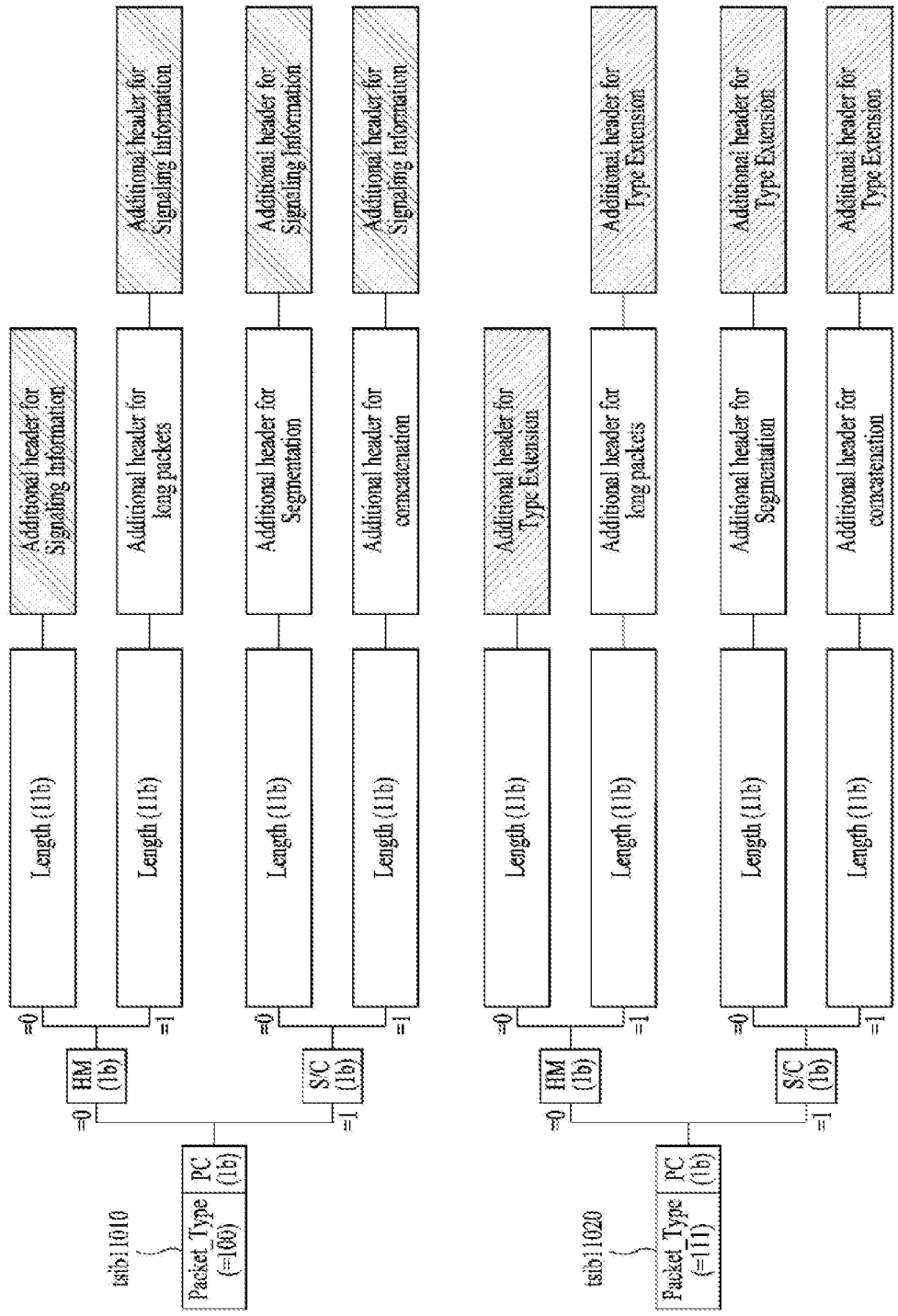
[Figure 11]

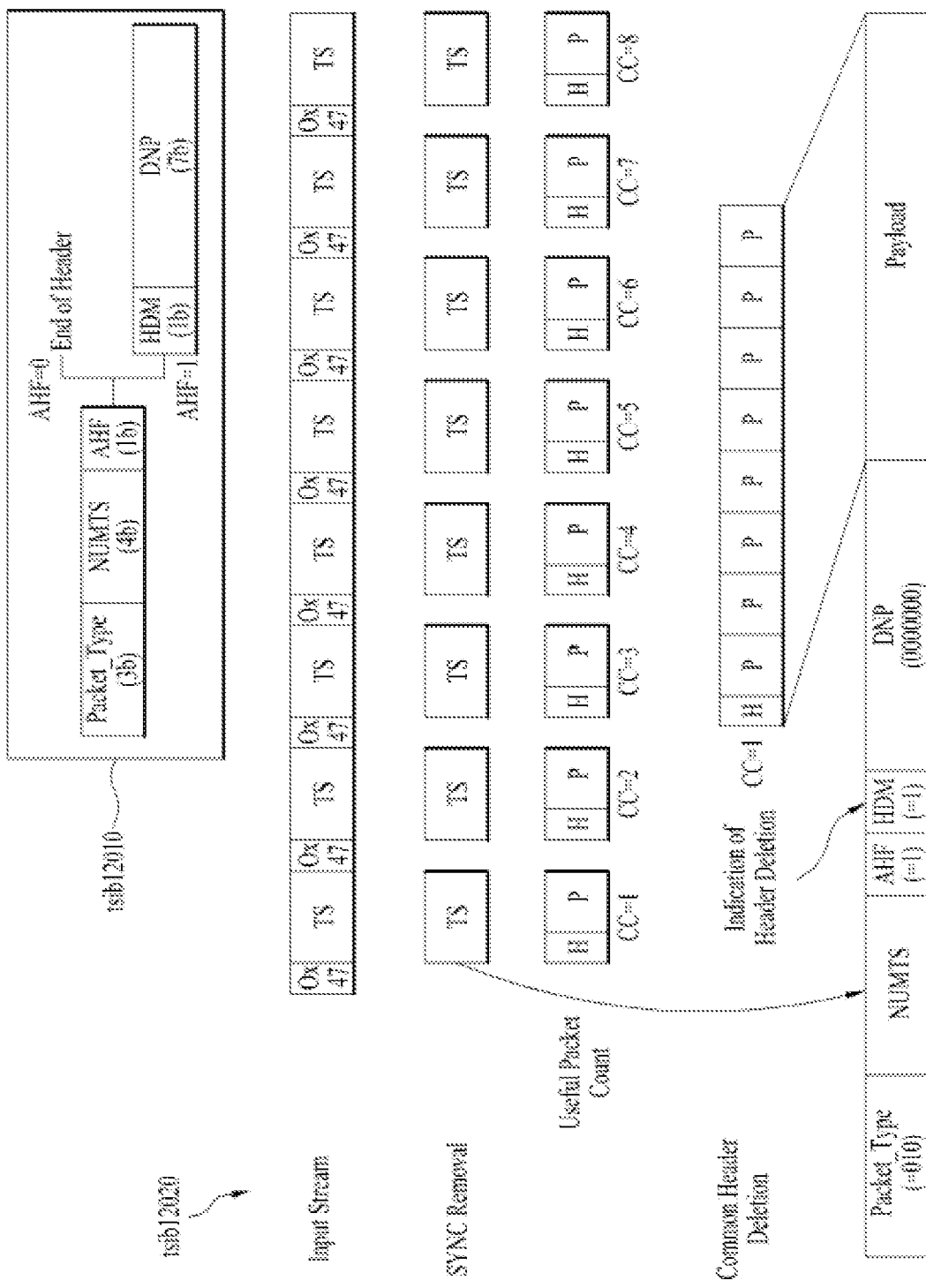
[Figure 12]

【Figure 13】
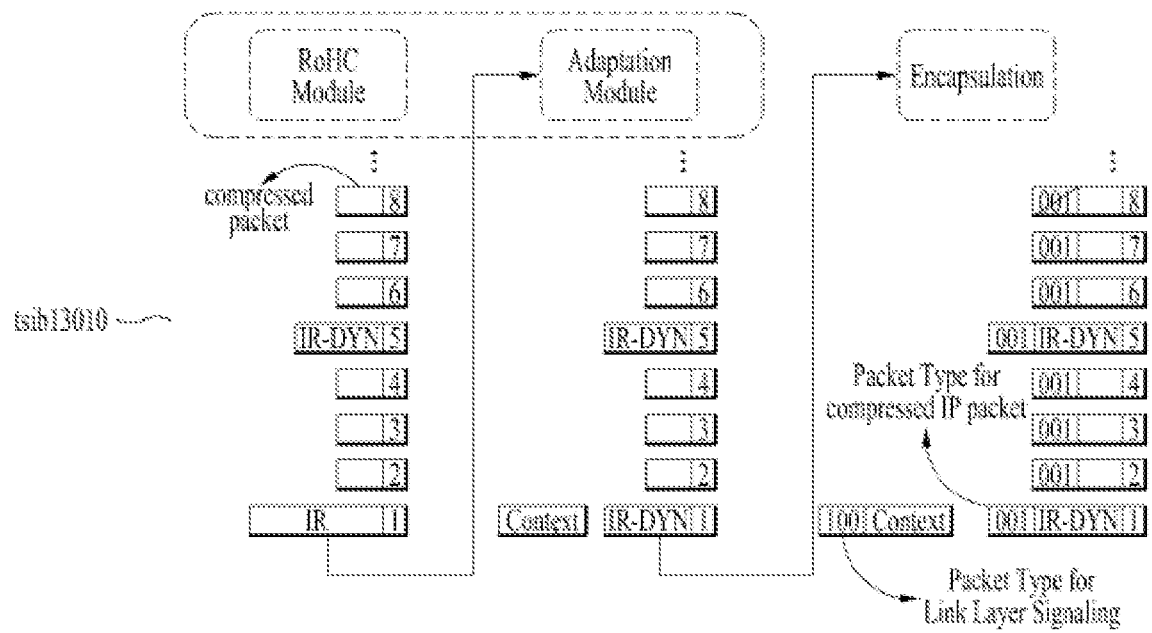
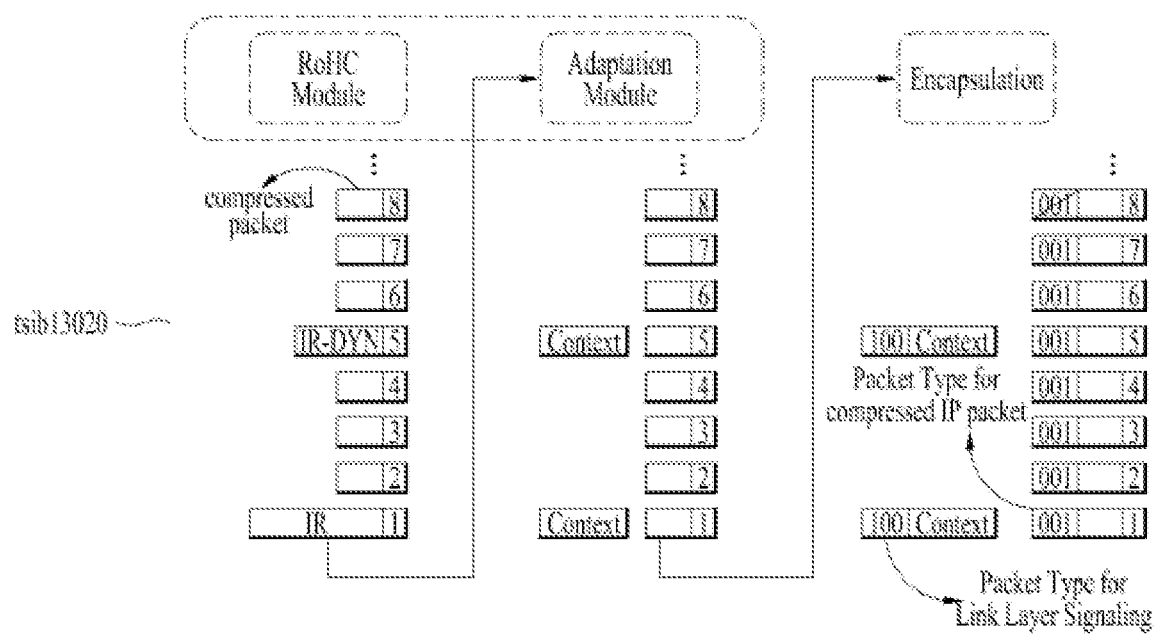

[Figure 14]

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(j=0; j<num_session; j++) { | | |
| src_IP_add | 32 | uimsbf |
| des_IP_add | 32 | uimsbf |
| src_UDP_port | 16 | uimsbf |
| des_UDP_port | 16 | uimsbf |
| SID_flag | 1 | bslbf |
| compressed_flag | 1 | bslbf |
| reserved | 6 | tbd |
| if (SID_flag == '1') { | | |
| SID | 8 | uimsbf |
| } | | |
| if (compressed_flag == '1') { | | |
| context_id | 8 | uimsbf |
| } | | |
| } | | |
| } | | |

| Syntax | Number of bits | Mnemonic |
|---|---|---|
| ROHC_U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0x02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | | tab14010 / tab14020

【Figure 15】
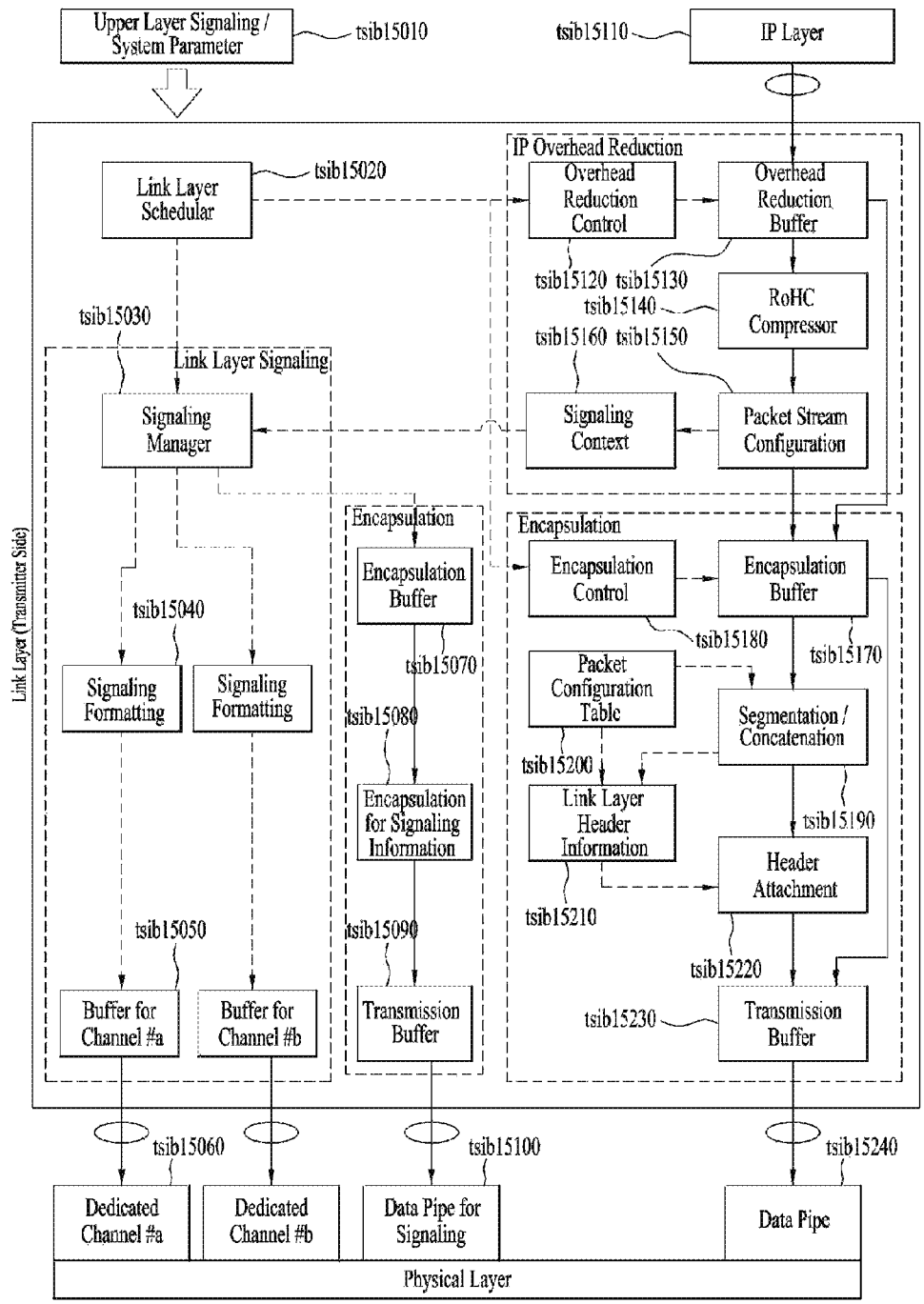

[Figure 16]
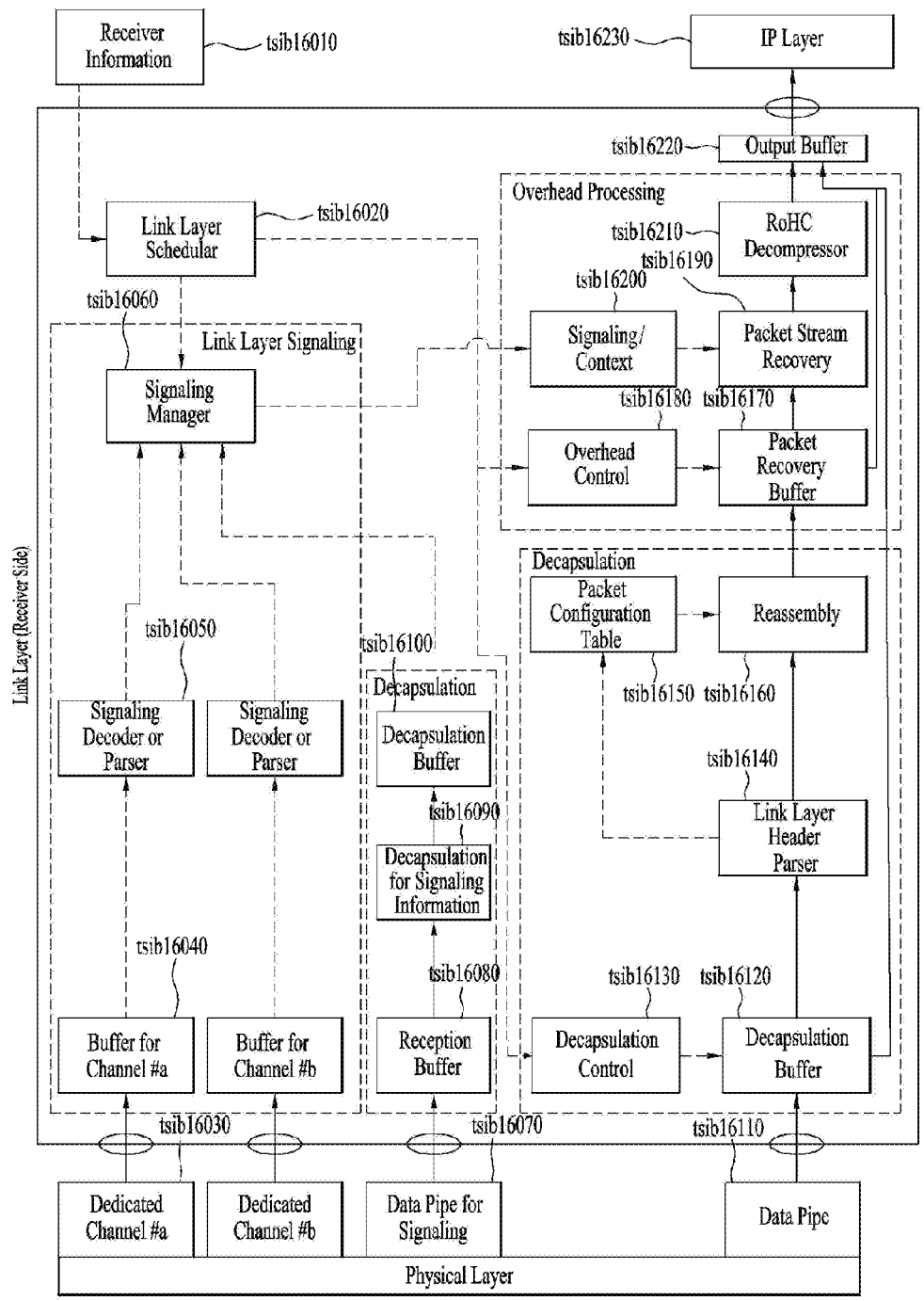

【Figure 17】
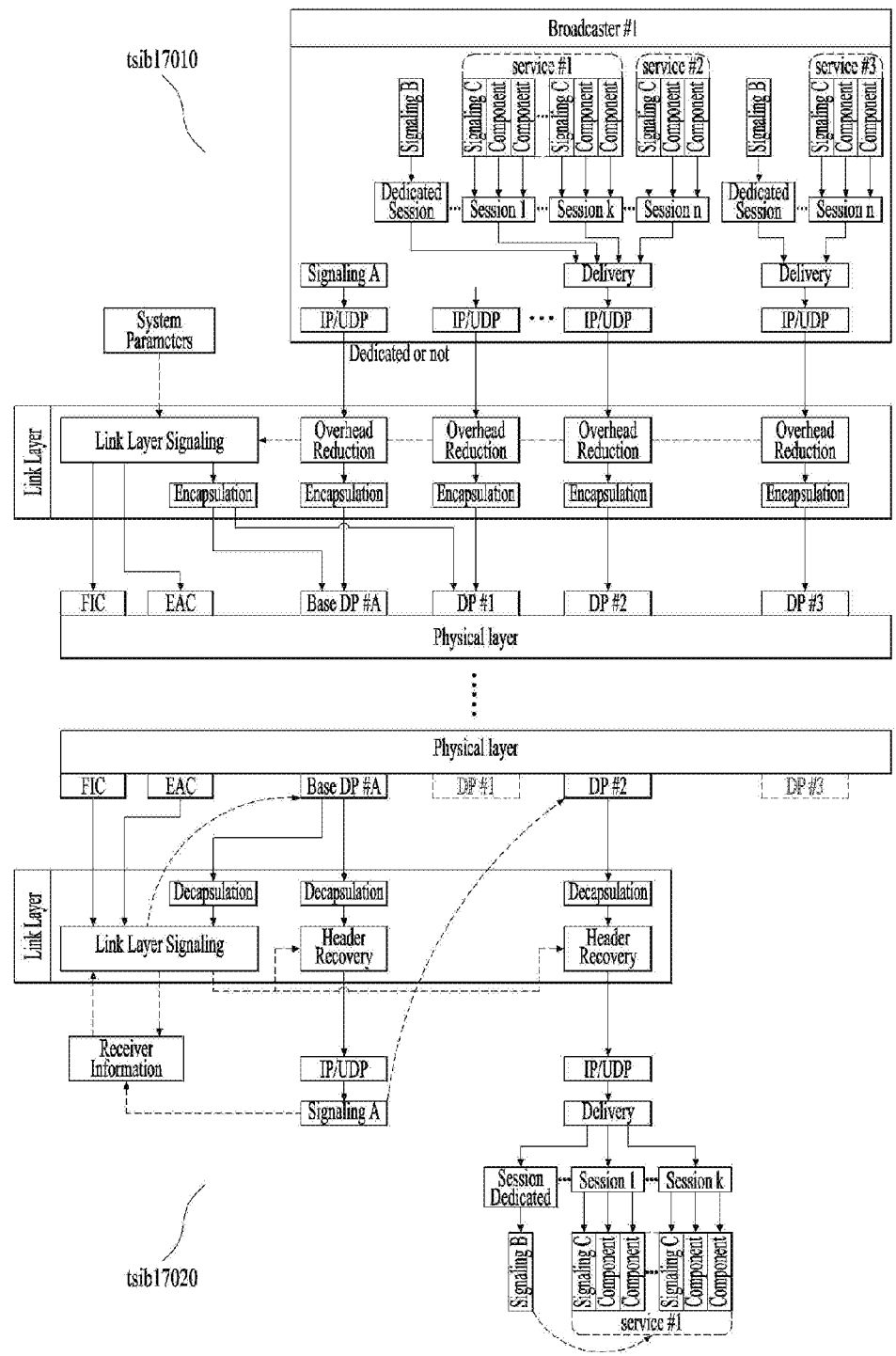

【Figure 18】
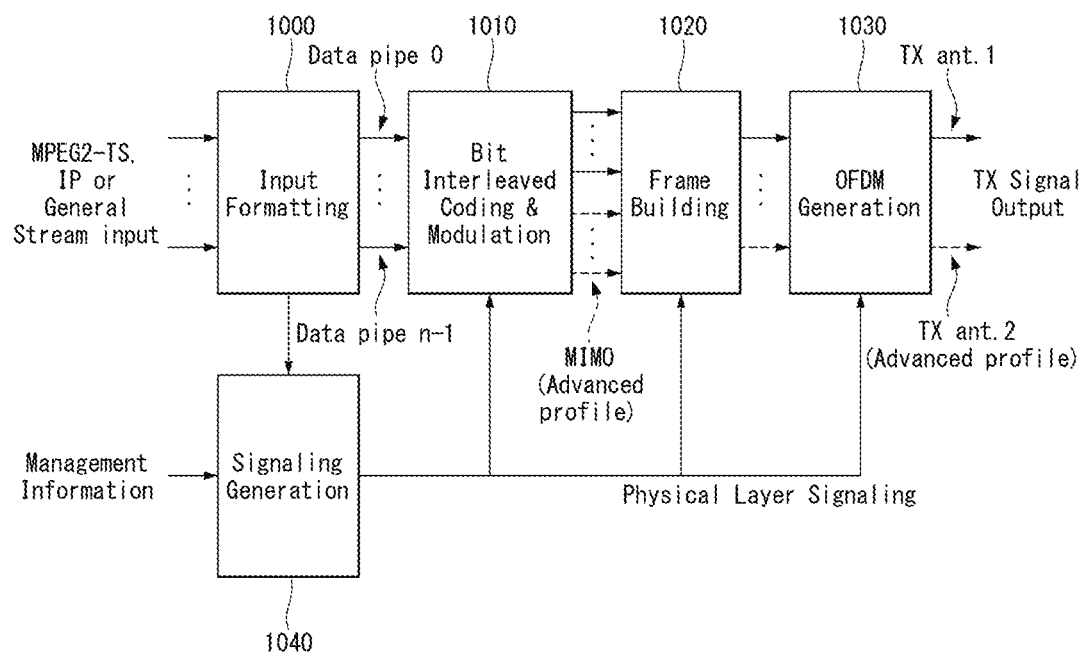

[Figure 19]
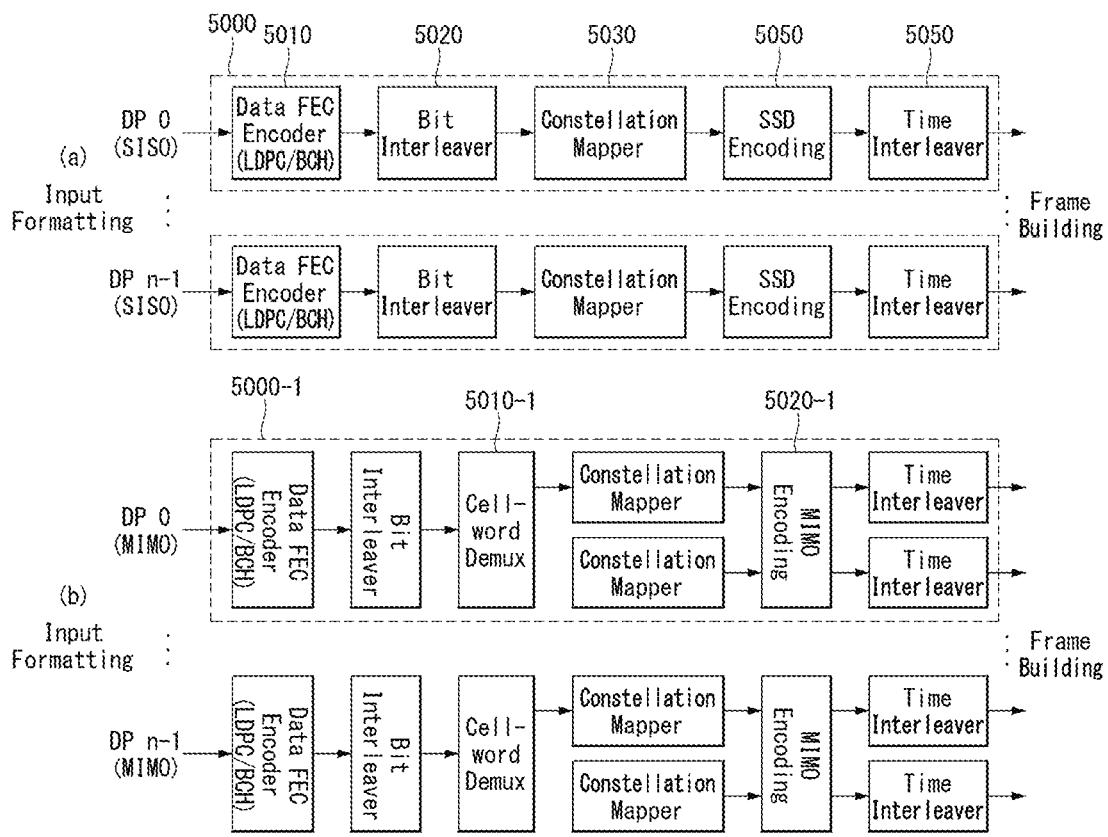

【Figure 20】
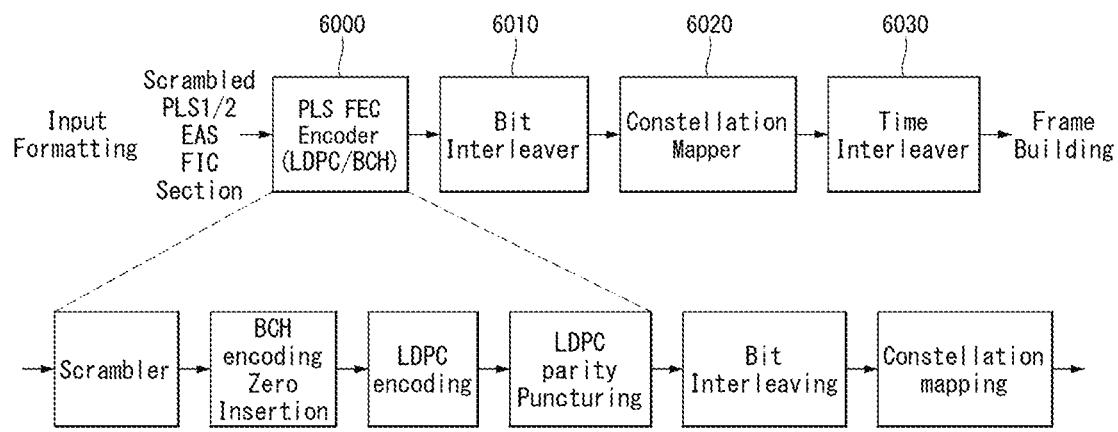
【Figure 21】
(a)
$$S_{demux\_in}(i) = \{b_i(0), b_i(1), b_i(2), ..., b_i(\eta_{MOD} -1)\},$$
$$S_{demux\_out}(i) = \{c_i(0), c_i(1), c_i(2), ..., c_i(\eta_{MOD} -1)\},$$
$$c_i(1) = b_i(i\%\eta_{MOD}), c_i(2) = b_i((i+1)\%\eta_{MOD}), ..., c_i(\eta_{MOD}-1) = b_i((i+1)\%\eta_{MOD})$$
(b)
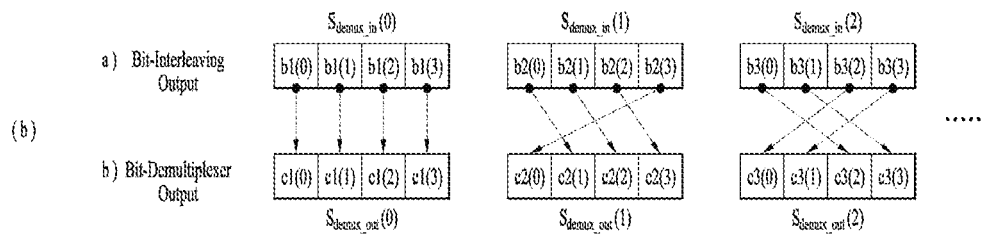

[Figure 22]
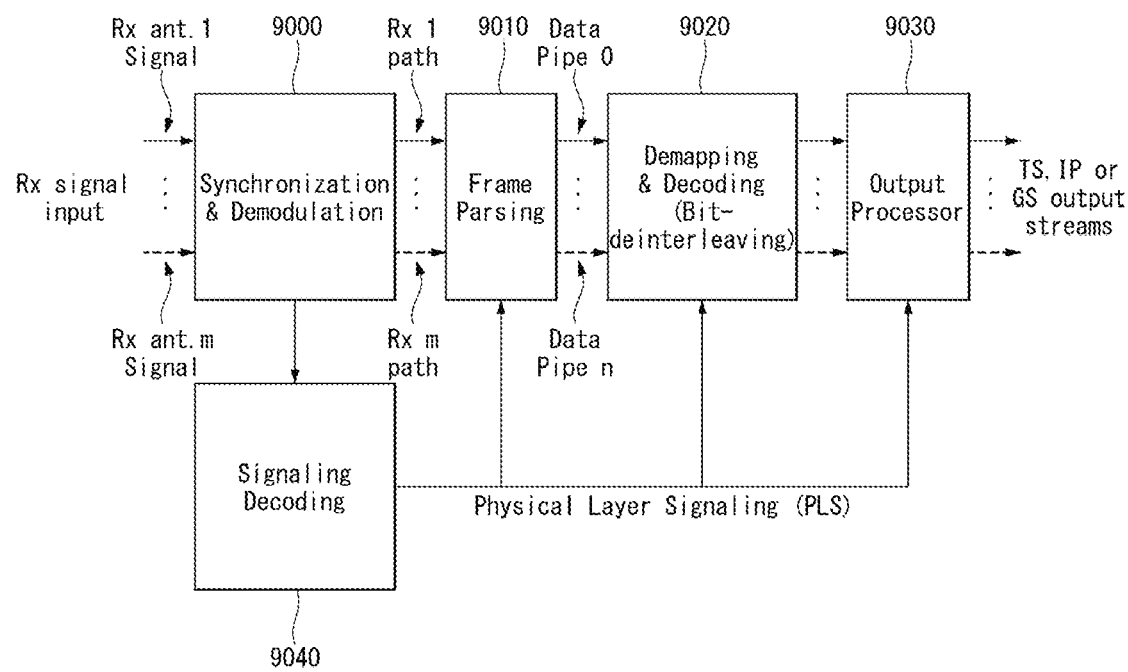

【Figure 23】
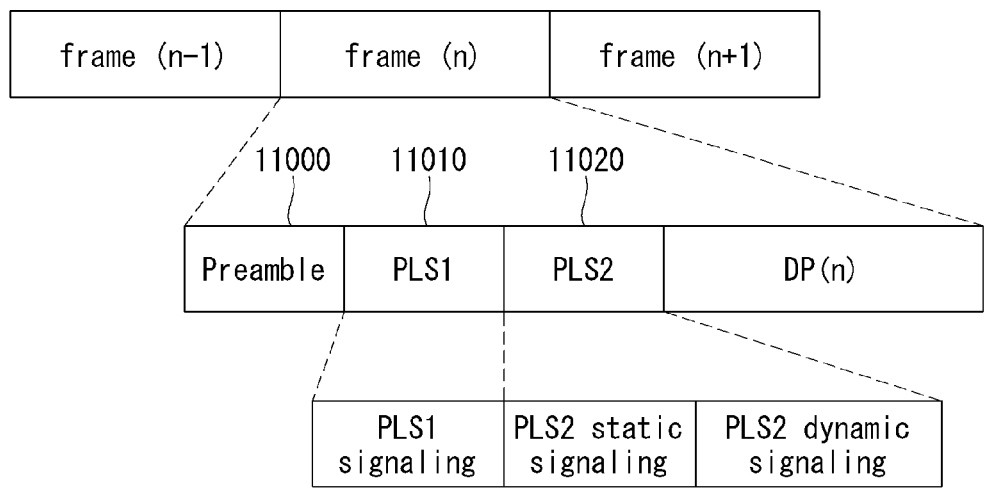

[Figure 24]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3      FRU_PHY_PROFILE      FRU_FRAME_LENGTH      FRU_GI_FRACTION      RESERVED end | 3 2 3 4 |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

【Figure 25】

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Figure 26]

| Content | | | Bit |
|---|---|---|---|
| FRAME_INDEX | | | 5 |
| PLS_CHANGE_COUNTER | | | 4 |
| FIC_CHANGE_COUNTER | | | 4 |
| RESERVED | | | 16 |
| for i = 1: NUM_DP | | | |
| | | DP_ID | 6 |
| | | DP_START | 15 (or13) |
| | | DP_NUM_BLOCK | 10 |
| end | | RESERVED | 8 |
| EAC_FLAG | | | 1 |
| EAS_WAKE_UP_VERSION_NUM | | | 8 |
| if EAC_FLAG == 1 | | | |
| | | EAC_LENGTH_BYTE | 12 |
| else | | | |
| | | EAC_COUNTER | 12 |
| end | | | |
| for i=1:NUM_AUX | | | |
| | | AUX_PRIVATE_DYN | 48 |
| end | | | |
| CRC 32 | | | 32 |

【Figure 27】
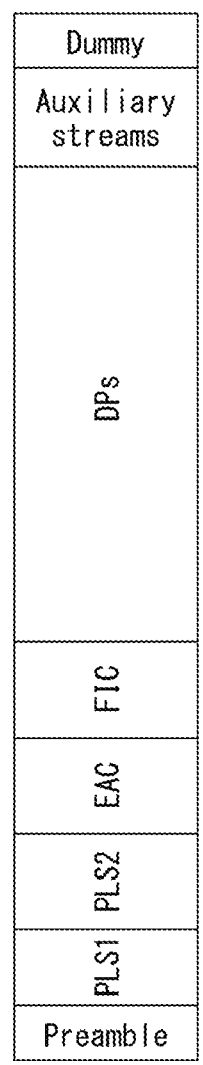

[Figure 28]
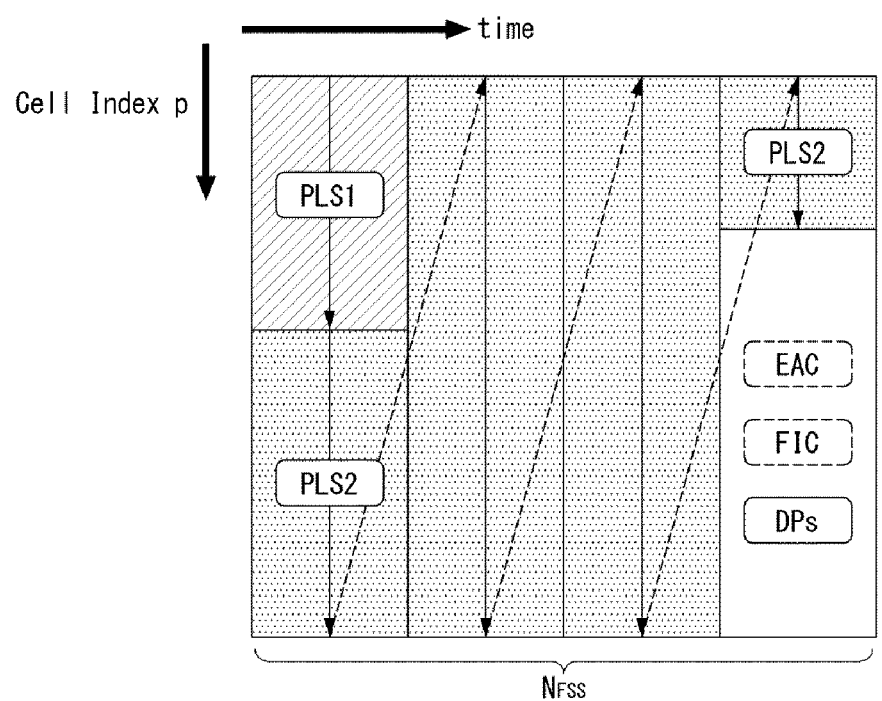

[Figure 29]
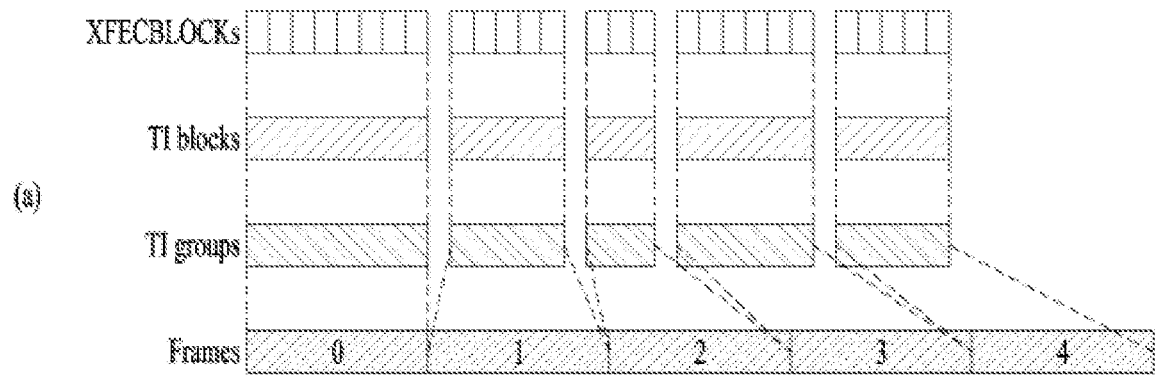
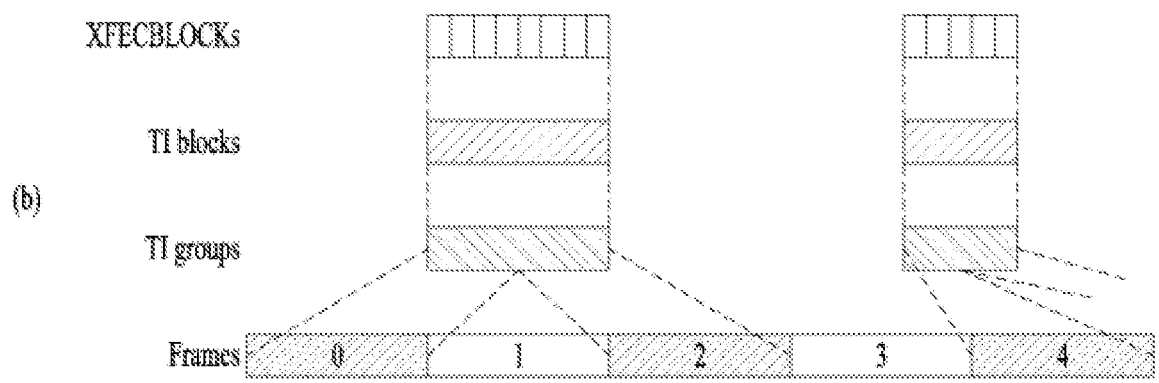
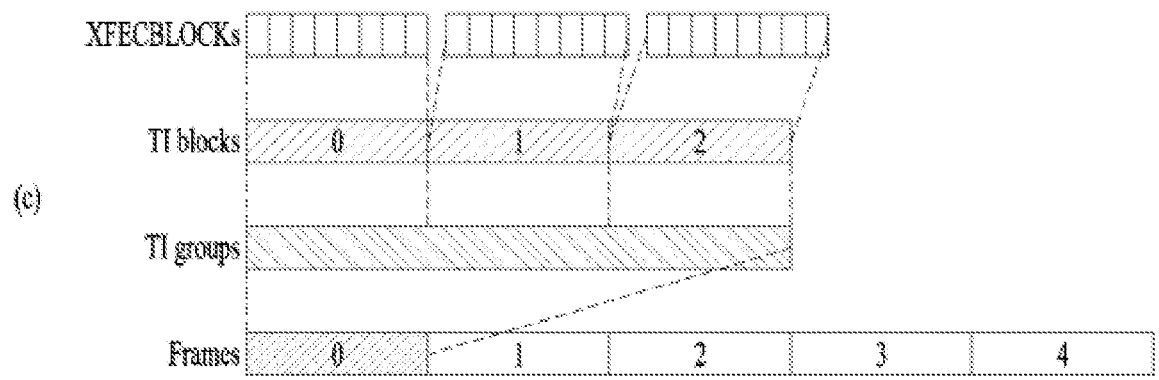

[Figure 30]
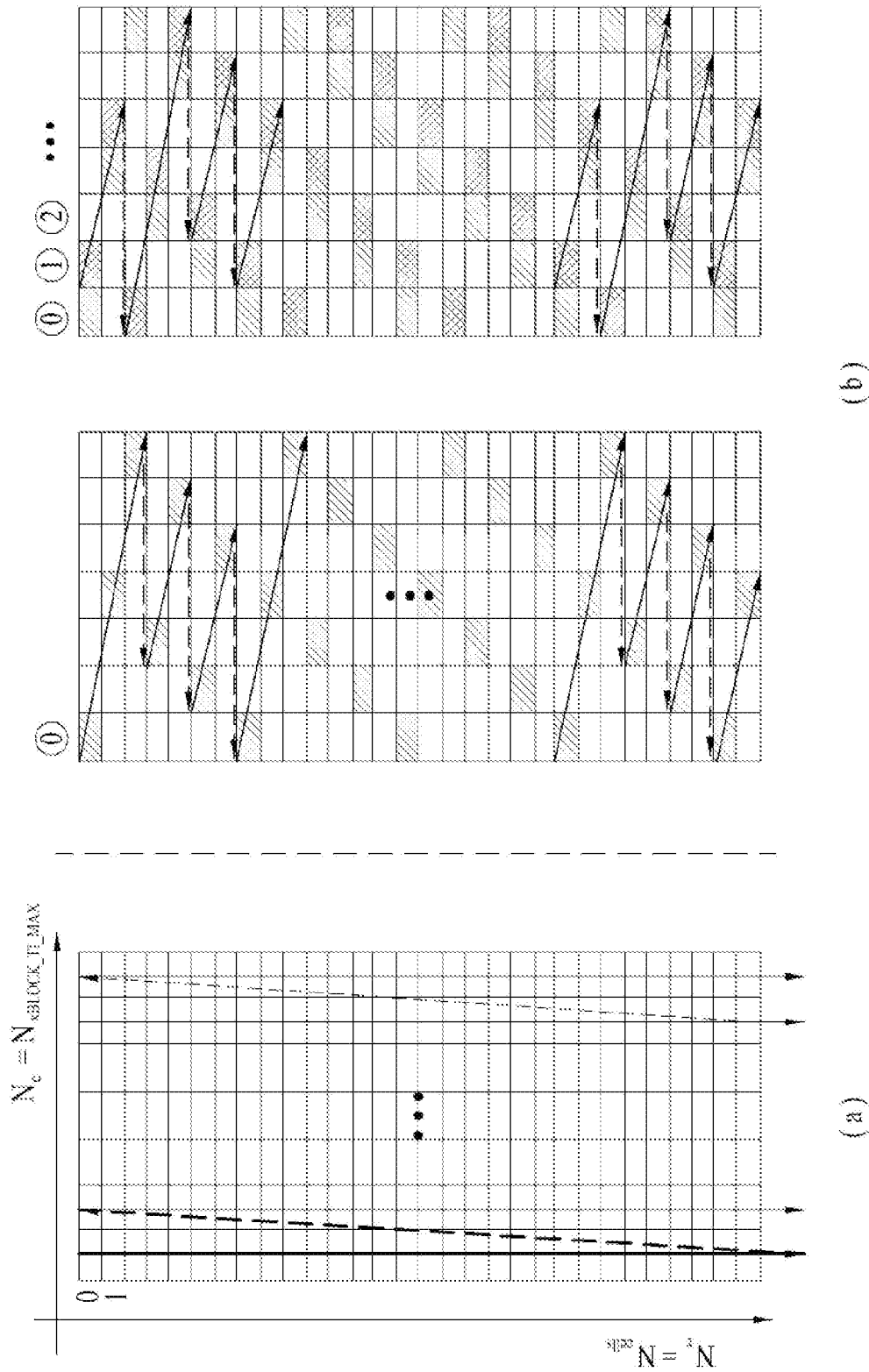

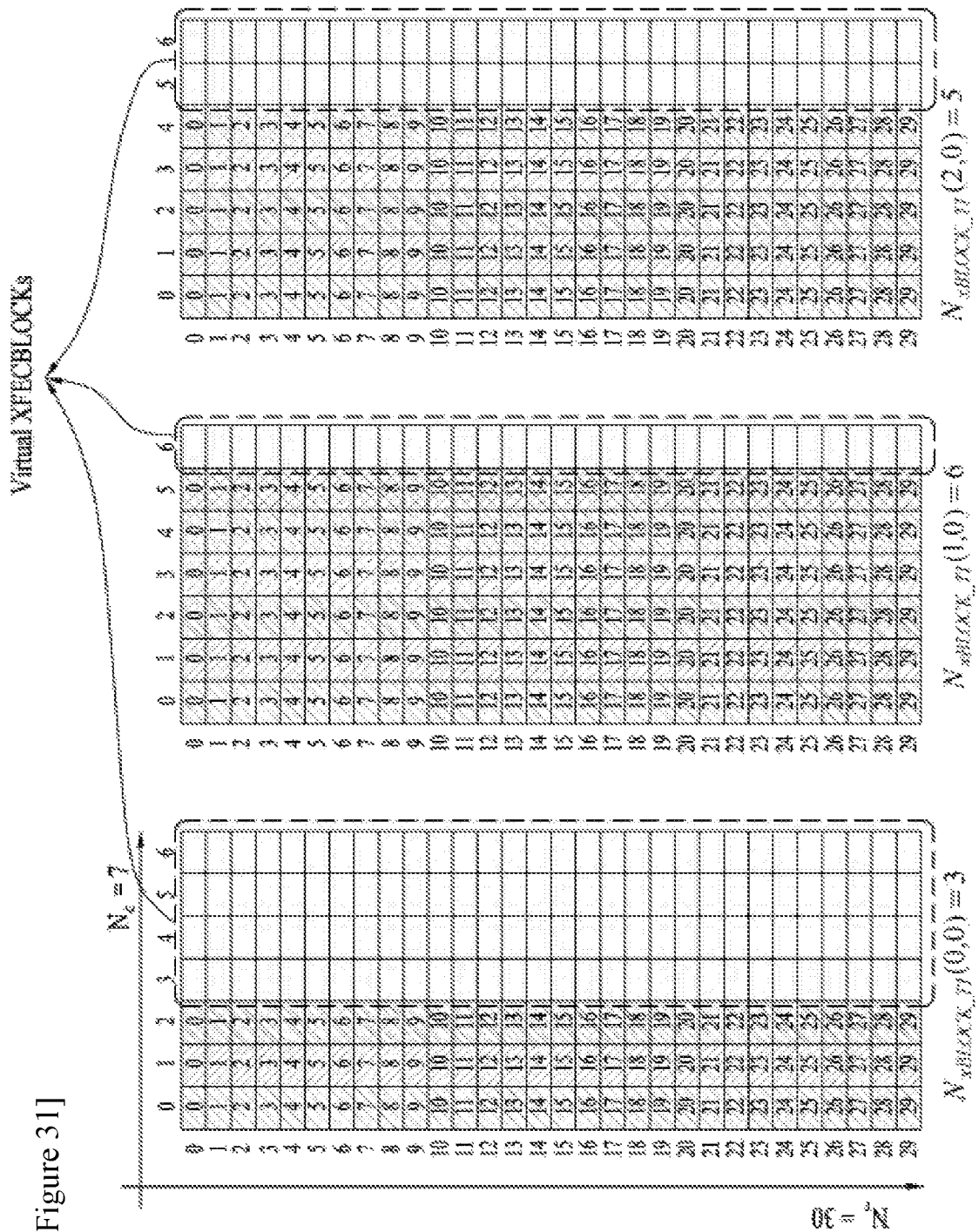
[Figure 31]

[Figure 32]
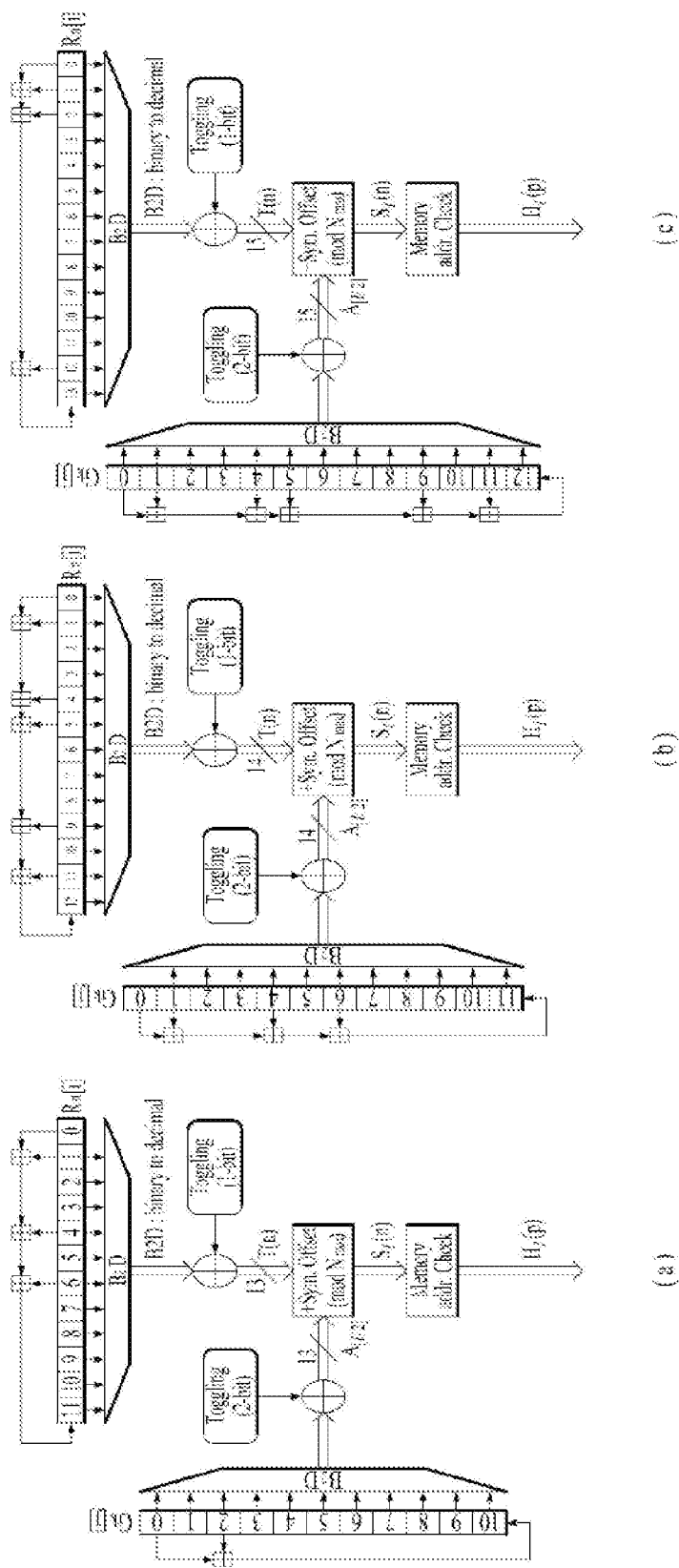

【Figure 33】

The main-PRBS generator is defined based on the $(N_a-1)$-bit binary word sequence $R_a$ with $N_a = \log_2 N_{max}$ $0 \leq n < 2$
$\quad R_3[N_a-2, N_a-3, \ldots, 1, 0] = 0, 0, \ldots, 0, 0$
$n = 2$
$\quad R_3[N_a-2, N_a-3, \ldots, 1, 0] = 0, 0, \ldots, 0, 1$
$2 < n < N_{max}$
$\quad R_3[N_a-3, N_a-4, \ldots, 1, 0] = R_3[N_a-2, N_a-3, \ldots, 2, 1]$
where
$R_3[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|----------|------|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \leq k < 4$
$\quad G_k[N_b-2, N_b-3, \ldots, 1, 0] = 0, 0, \ldots, 0, 0$
$k = 4$
$\quad G_k[N_b-2, N_b-3, \ldots, 1, 0] = 1, 1, \ldots, 1, 1$
$4 < k < N_{max}$
$\quad G_k[N_b-3, N_b-4, \ldots, 1, 0] = G_{k-1}[N_b-2, N_b-3, \ldots, 2, 1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0$;
$for \ (n = 0; n < N_{max}; n = n+1)$
$\quad \{ T(n) = (n \bmod 2) \cdot 2^{N_b-1} + \sum_{i=0}^{N_b-2}(2^i \, R_n[i]);$
$\quad S_l(n) = (T(n) + A_{\lfloor l/2 \rfloor}) \bmod N_{max};$
$\quad if \ S_l(n) < N_{data}$
$\quad \quad \{ H_l(p) = S_l(n);$
$\quad \quad \ p = p+1; \}$
$\quad \}$ $(n \bmod 2) \cdot 2^{N_b-1}$ denotes 1-bit toggling, i.e., $R_n[N_b-1] = 0, 1, 0, 1, \ldots$ and
the cyclic-shifting value $A_{\lfloor l/2 \rfloor}$ is calculated for every OFDM symbol pair (b)

| PLP_NUM | 1 | >1 |
|---|---|---|
| Interleaving type | CI | CI+BI |

【Figure 37】
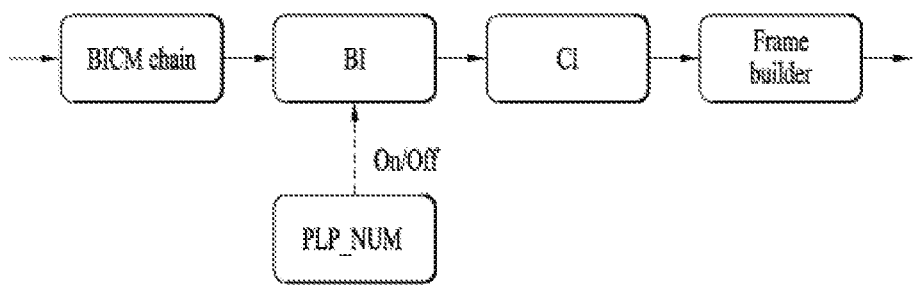
<Hybrid TI structure: example-1>
【Figure 38】
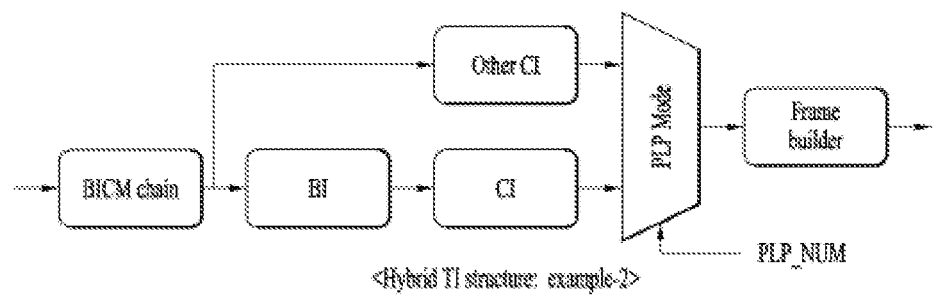
<Hybrid TI structure: example-2>
【Figure 39】
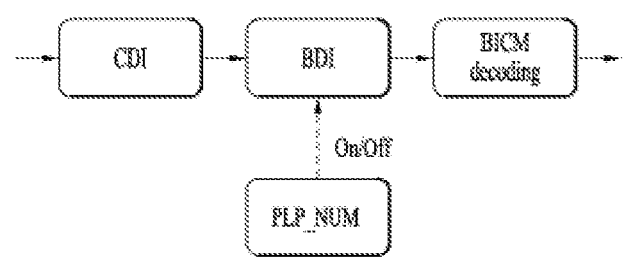
<Hybrid TI structure: example-1>

【Figure 40】
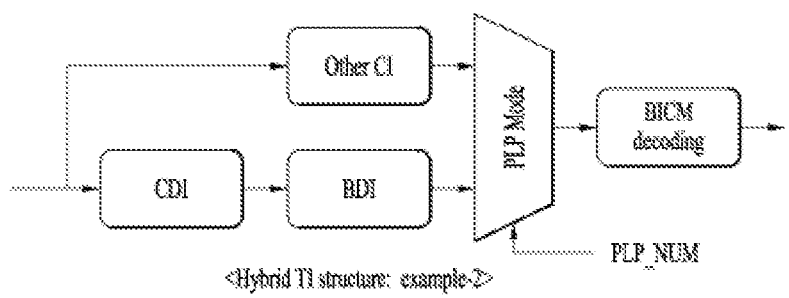
【Figure 41】
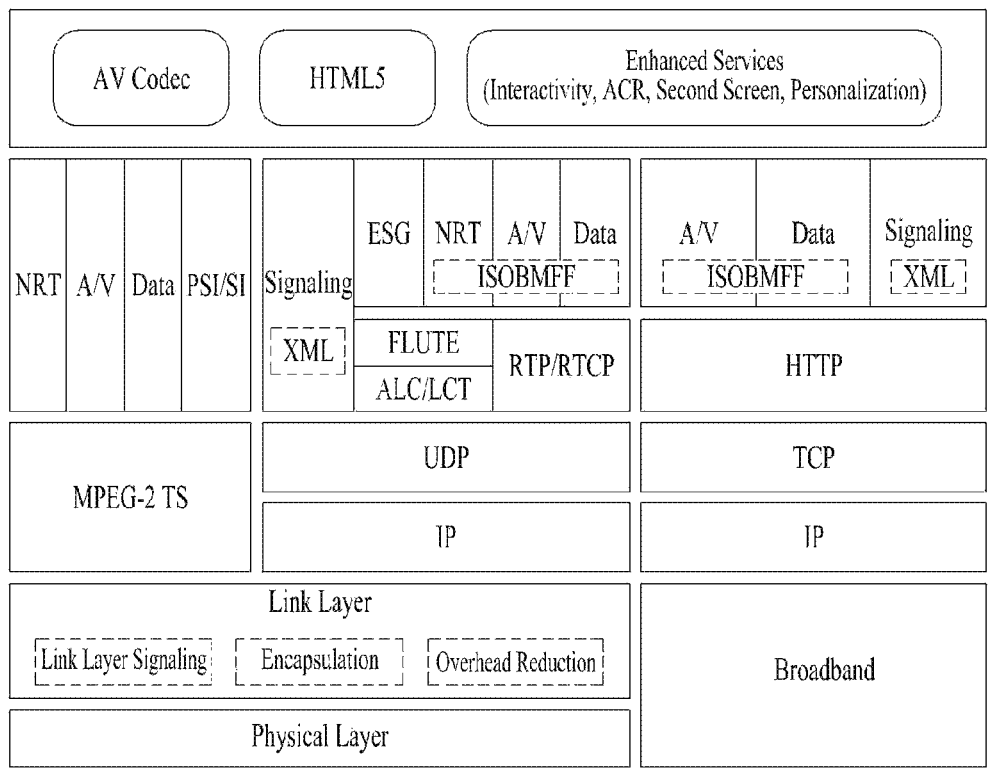

[Figure 42]
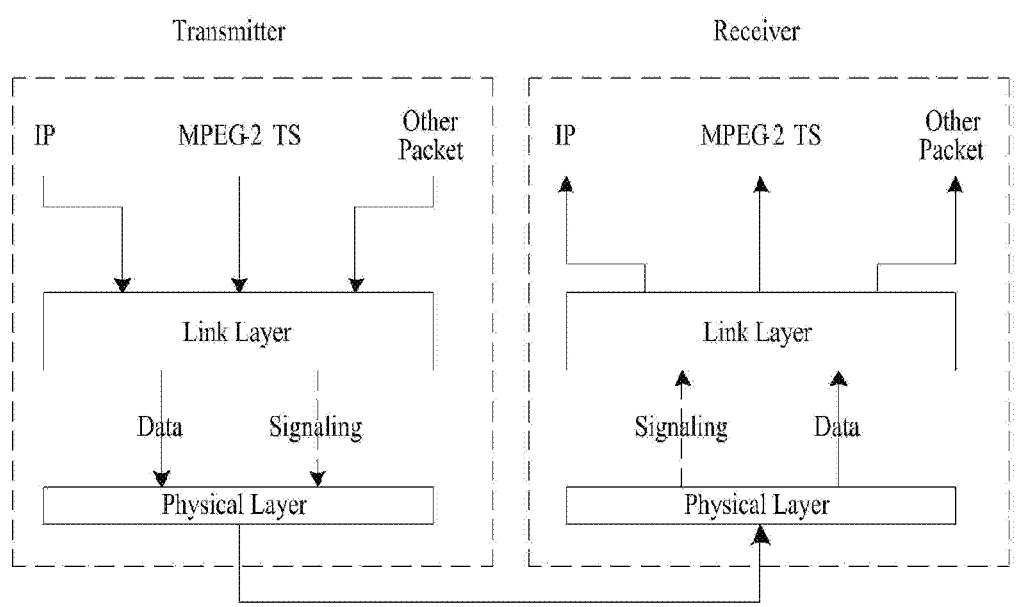

【Figure 43】
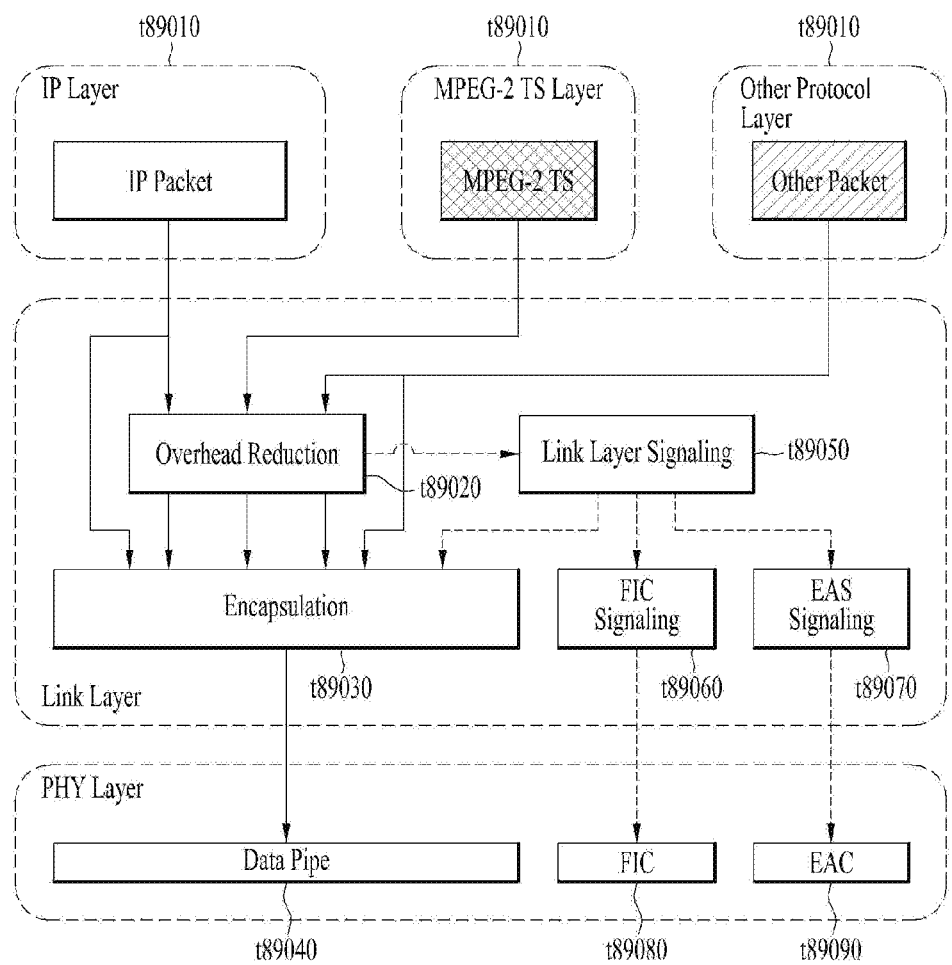

[Figure 44]
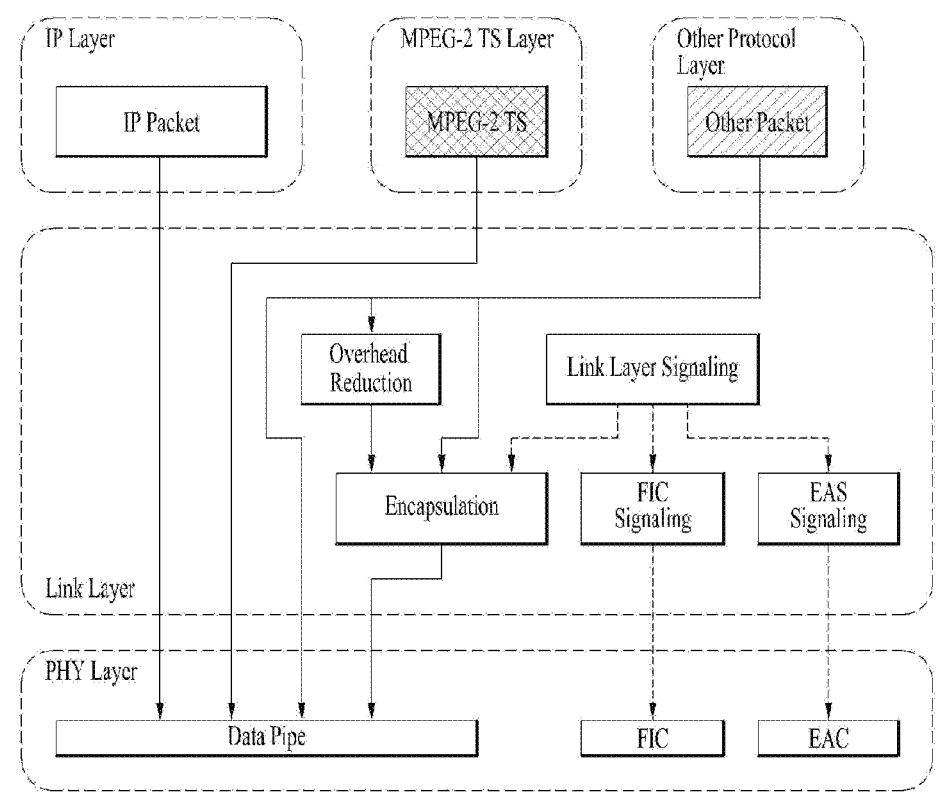

【Figure 45】
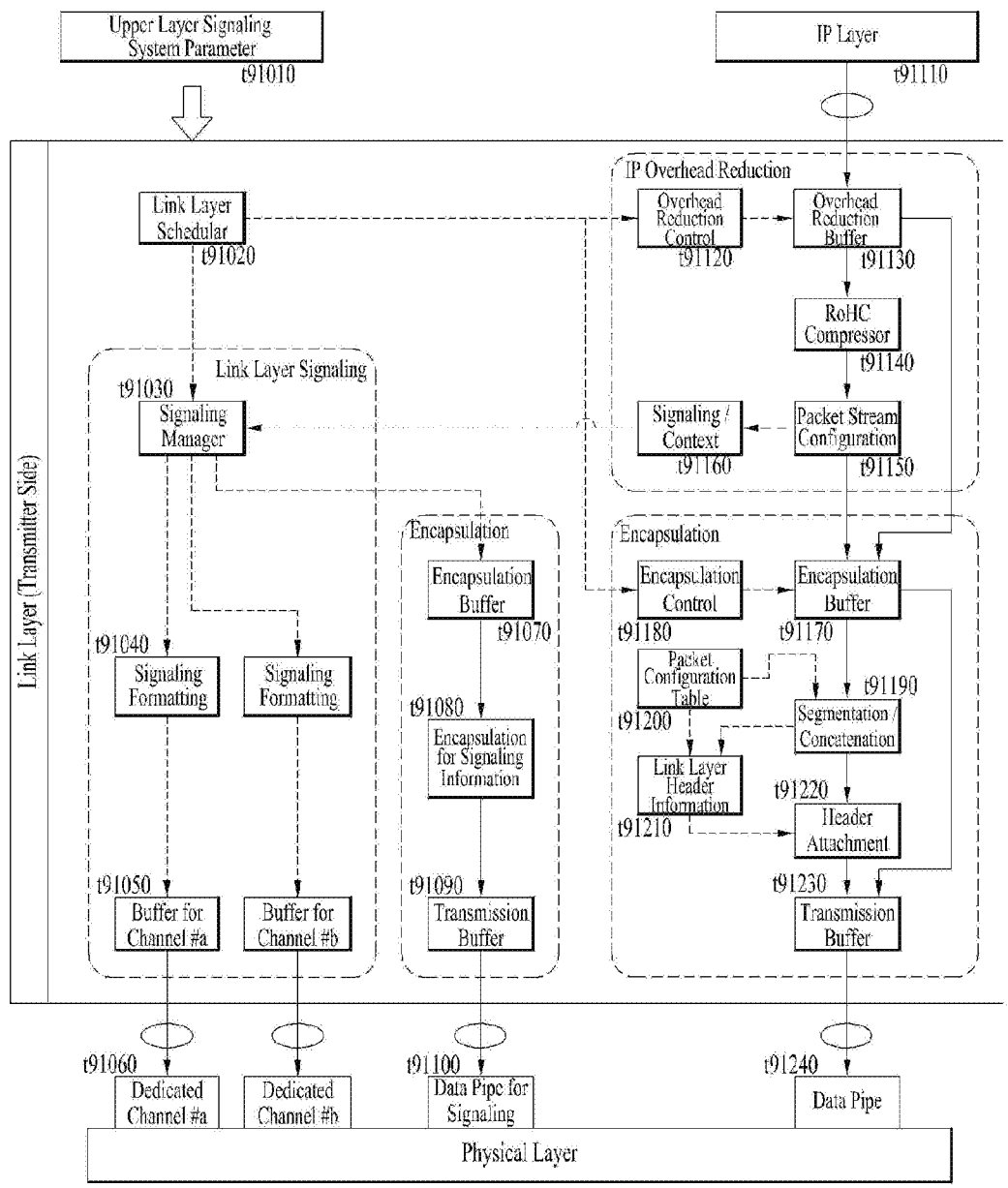

【Figure 46】
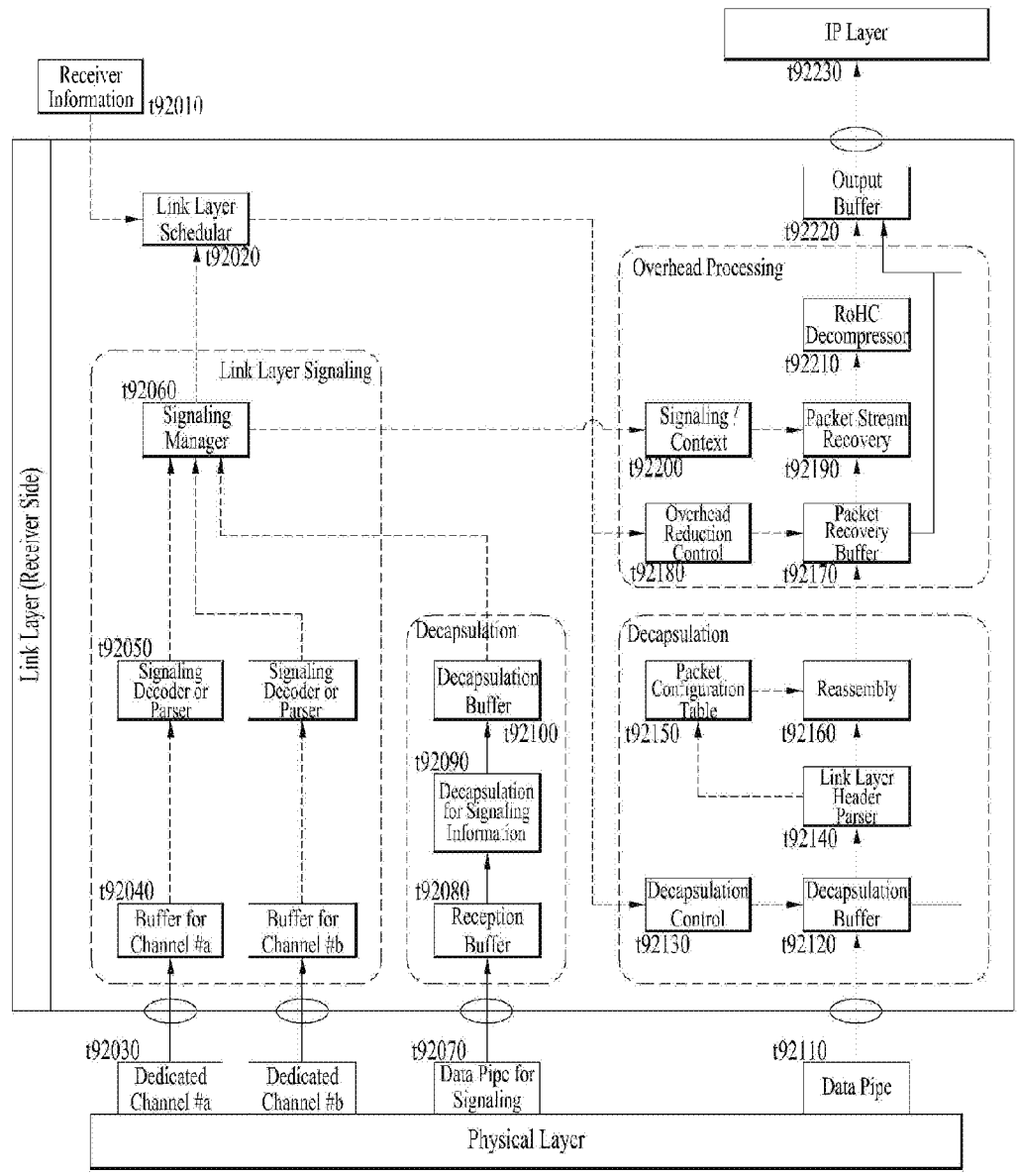

[Figure 47]

| Link Layer Organization Type | Logical Data Path | | |
|---|---|---|---|
| | Normal Data Path | Base Data Pipe | Dedicated Channel |
| Organization Type 1 | O | X | X |
| Organization Type 2 | O | O | X |
| Organization Type 3 | O | X | O |
| Organization Type 4 | O | O | O |

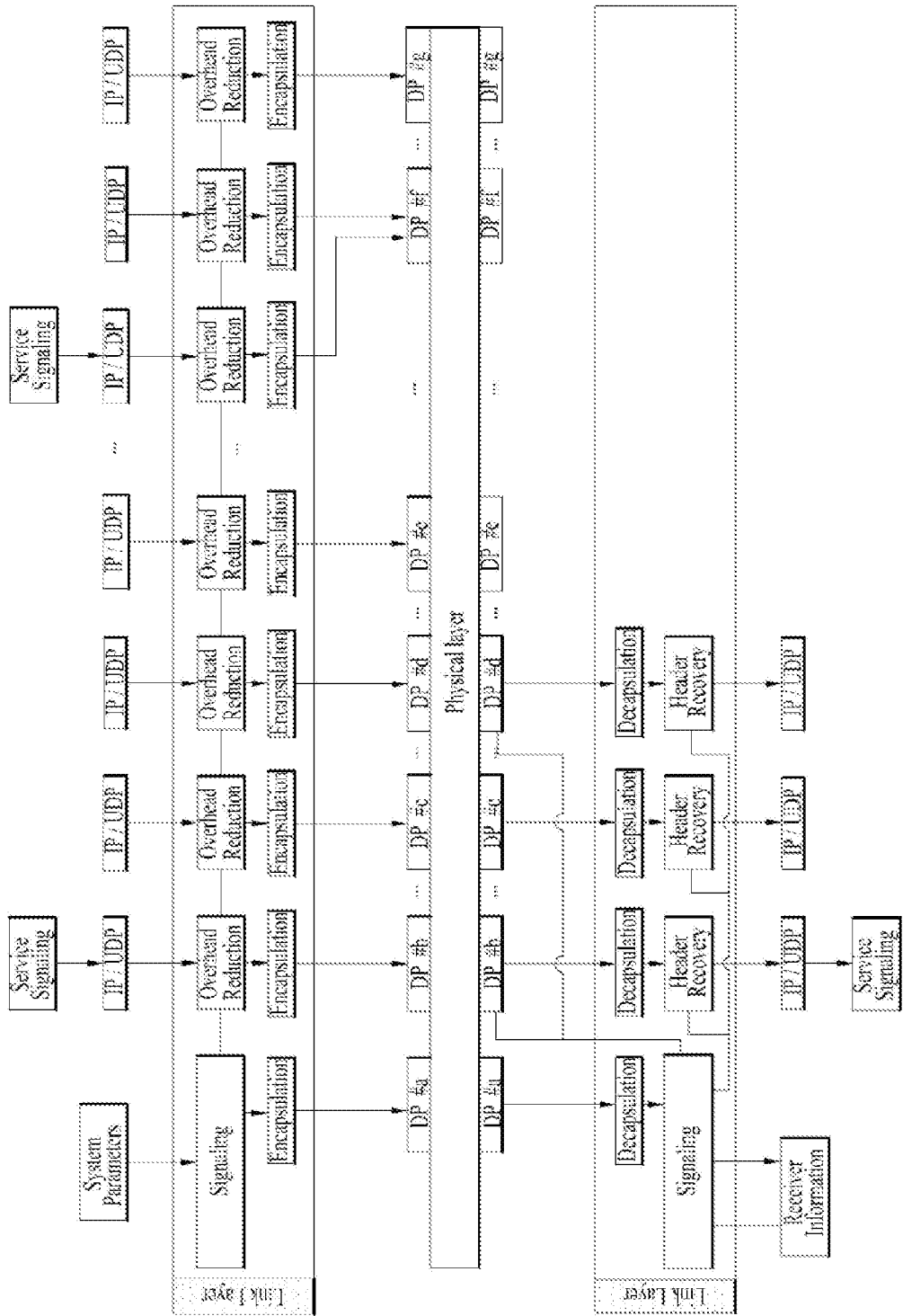
[Figure 48]

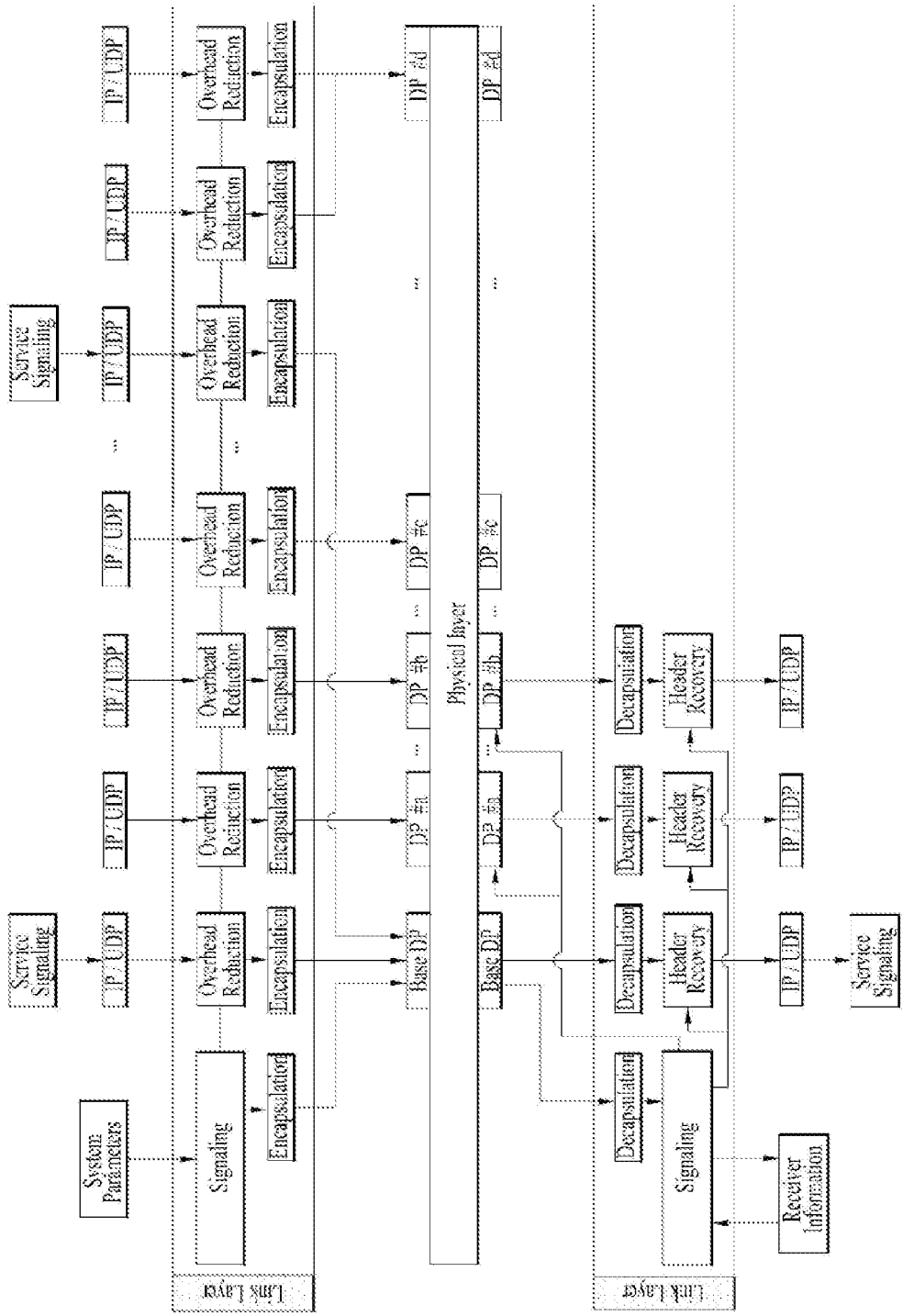
[Figure 49]

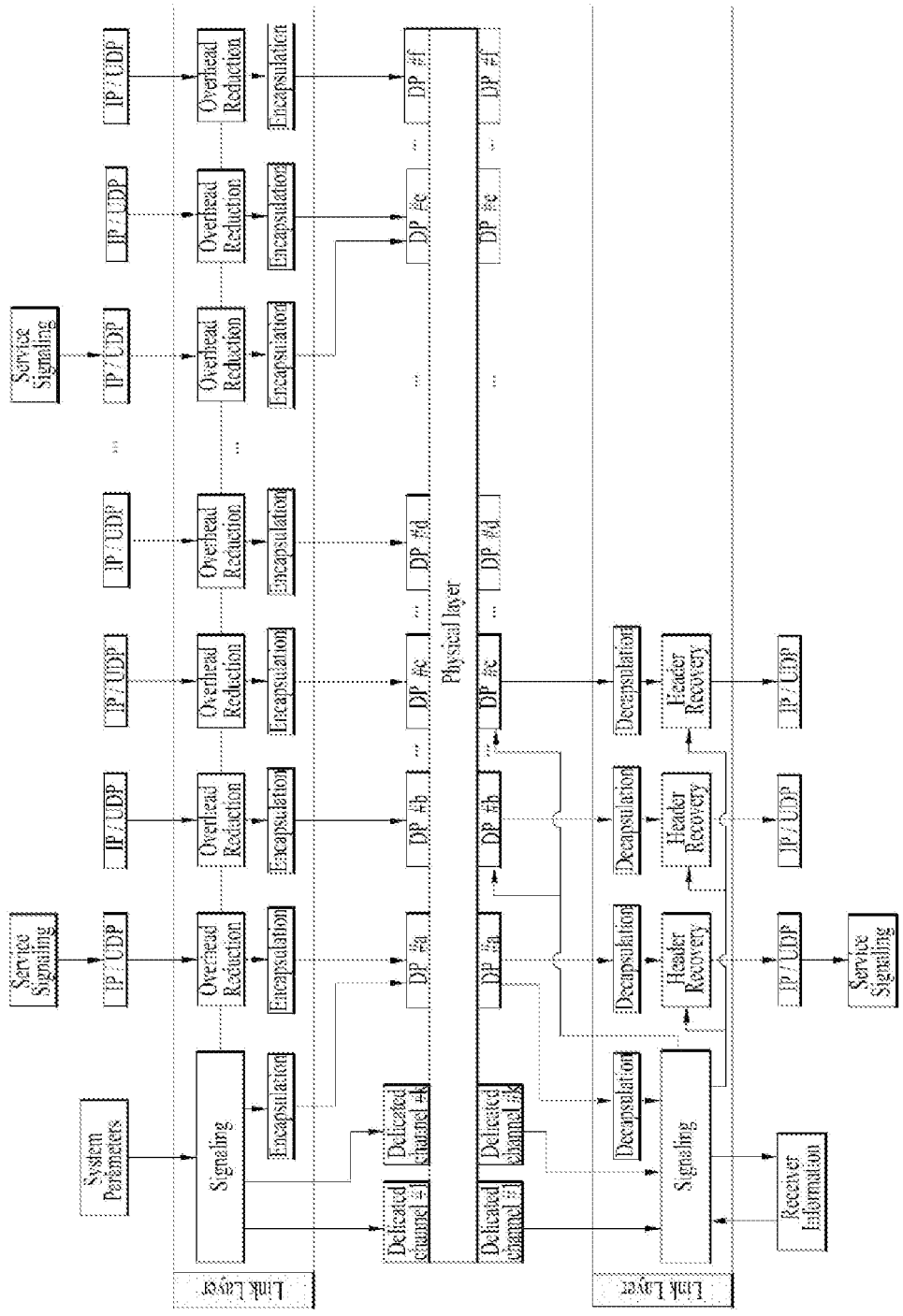
[Figure 50]

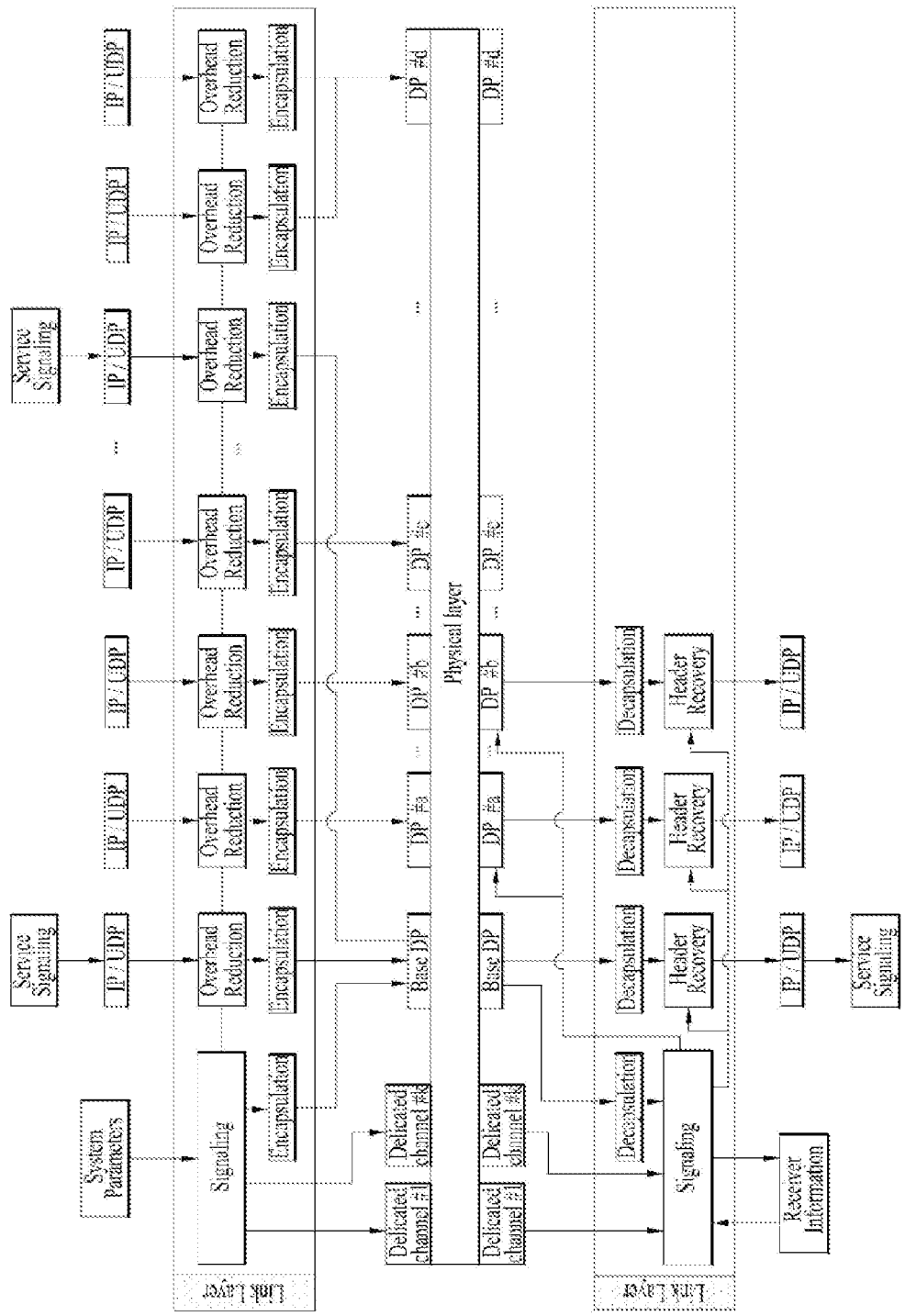
[Figure 51]

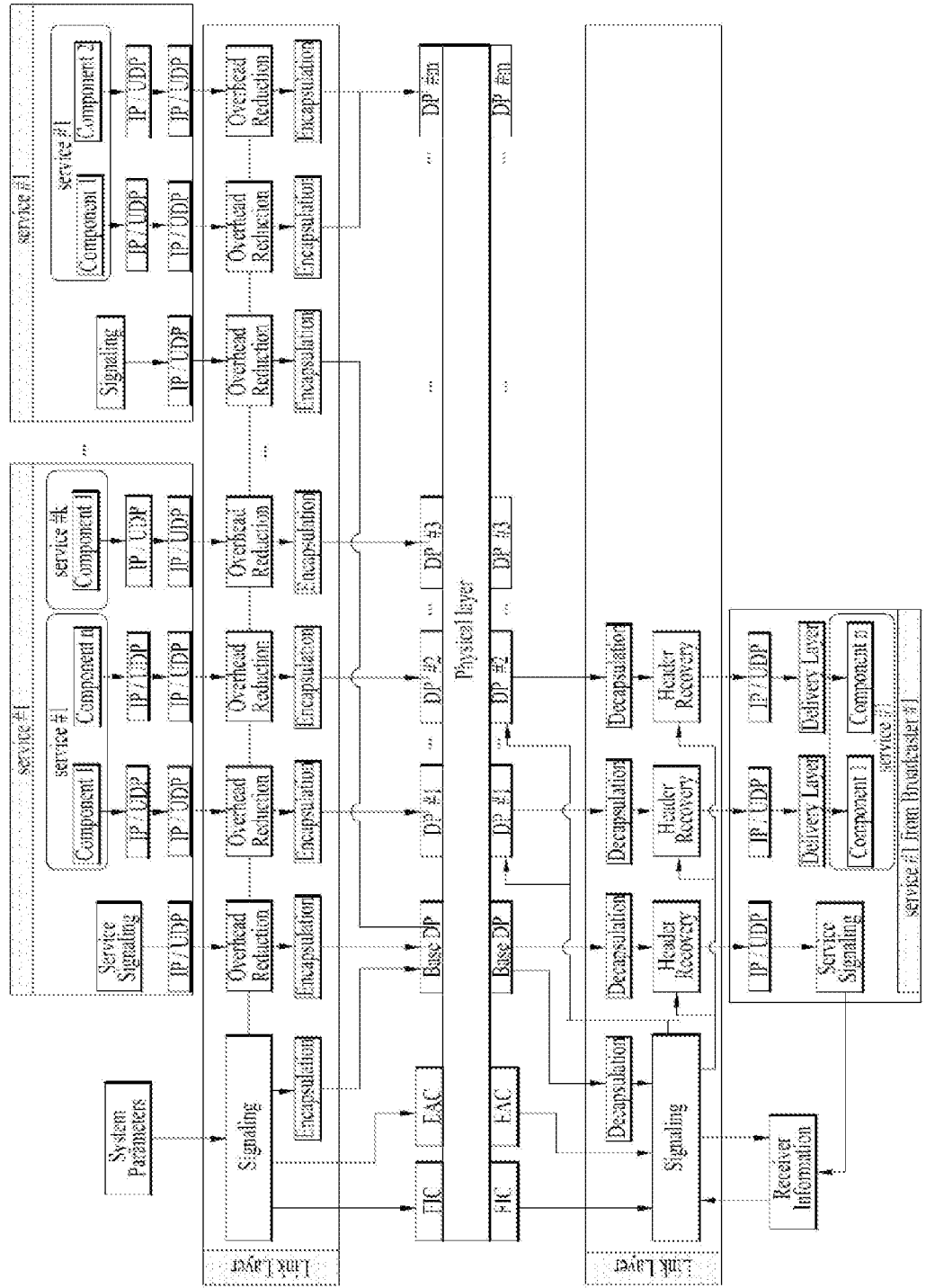
[Figure 52]

【Figure 53】

| Synrax | No. Bits | Format |
|---|---|---|
| Fast_Information_Table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     number_broadcast | 8 | uimsbf |
|     for(i=0;i<num_brdadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(i=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor(){ | | |
|                     context_id | 8 or 16 | |
|                     context_profile | 8 | uimsbf |
|                     max_cid | 8 | uimsbf |
|                     large_cid | 8 | bslbf |
|                 } | | |
|             } | | |
|         } | | |
|     } | | |
| } | | |

【Figure 54】

| Synrax | No. Bits | Format |
|---|---|---|
| Emergency_Alert_Table (){ | | |
|    table_id | 8 | uimsbf |
|    section_synax-indicator | 1 | '0' |
|    private_indicator | 1 | '1' |
|    reserved | 2 | '11' |
|    secion_length | 12 | uimsbf |
|    table_id_extension { | | |
|       EAT_protocol_version | 8 | 0X0 |
|       reserved | 8 | uimsbf |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    automatic_thing_flag | 1 | bslbf |
|    num_EAS_messages | 7 | uimsbf |
|    IF(automatic_tuning_flag==0X01) { | | |
|       automatic_tuning_channel_number | 8 | uimsbf |
|       automatic_tuning_DP_id | 8 | uimsbf |
|       automatic_tuning_service_id | 16 | uimsbf |
|    } | | |
|    for (m=0; m<num_EAS_messages; m++) { | | |
|       EAS_message_id | 32 | uimsbf |
|       EAS_IP_version_flag | 1 | bslbf |
|       EAS_message_transfer_type | 3 | uimsbf |
|       EAS_message_encoding_type | 3 | uimsbf |
|       EAS_NRT_flag | 1 | bslbf |
|       if(EAS_message_transfer_type==0X02) { | | |
|          reserved | 4 | '1111' |
|          EAS_message_length/*N*/ | 12 | uimsbf |
|          EAS_message_bytes() | 8*N | var |
|       } | | |
|       else if (EAS_message_transfer_type==0X003) { | | |
|          IP_address | 32 or 128 | uimsbf |
|          UDP_port_num | 16 | uimsbf |
|          DP_id | 8 | uimsbf |
|       } | | |
|       if(EAS_NRT_flag==0X01){ | | |
|          EAS_NRT_service_id | 16 | uimsbf |
|       } | | |
|    } | | |
| } | | |

【Figure 55】
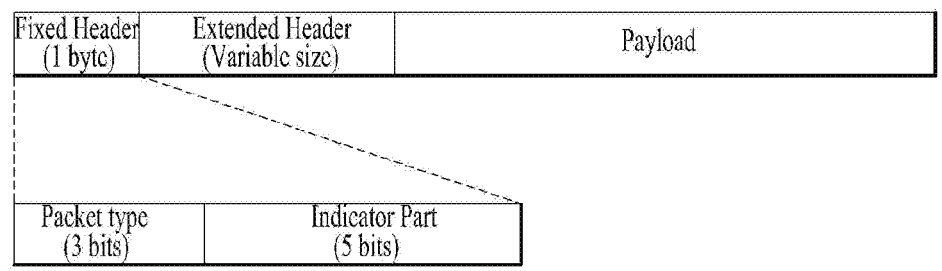

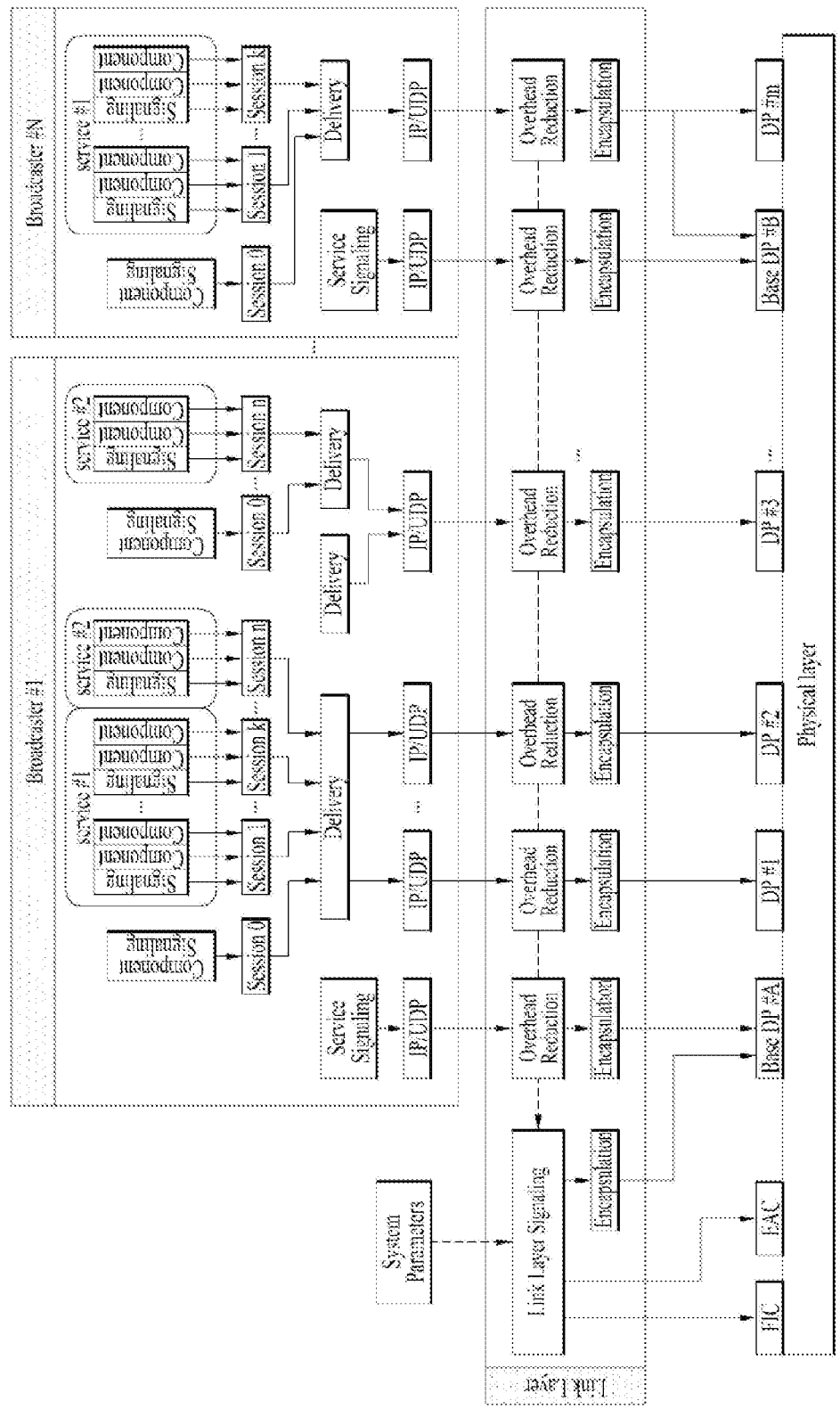
[Figure 56]

[Figure 57]
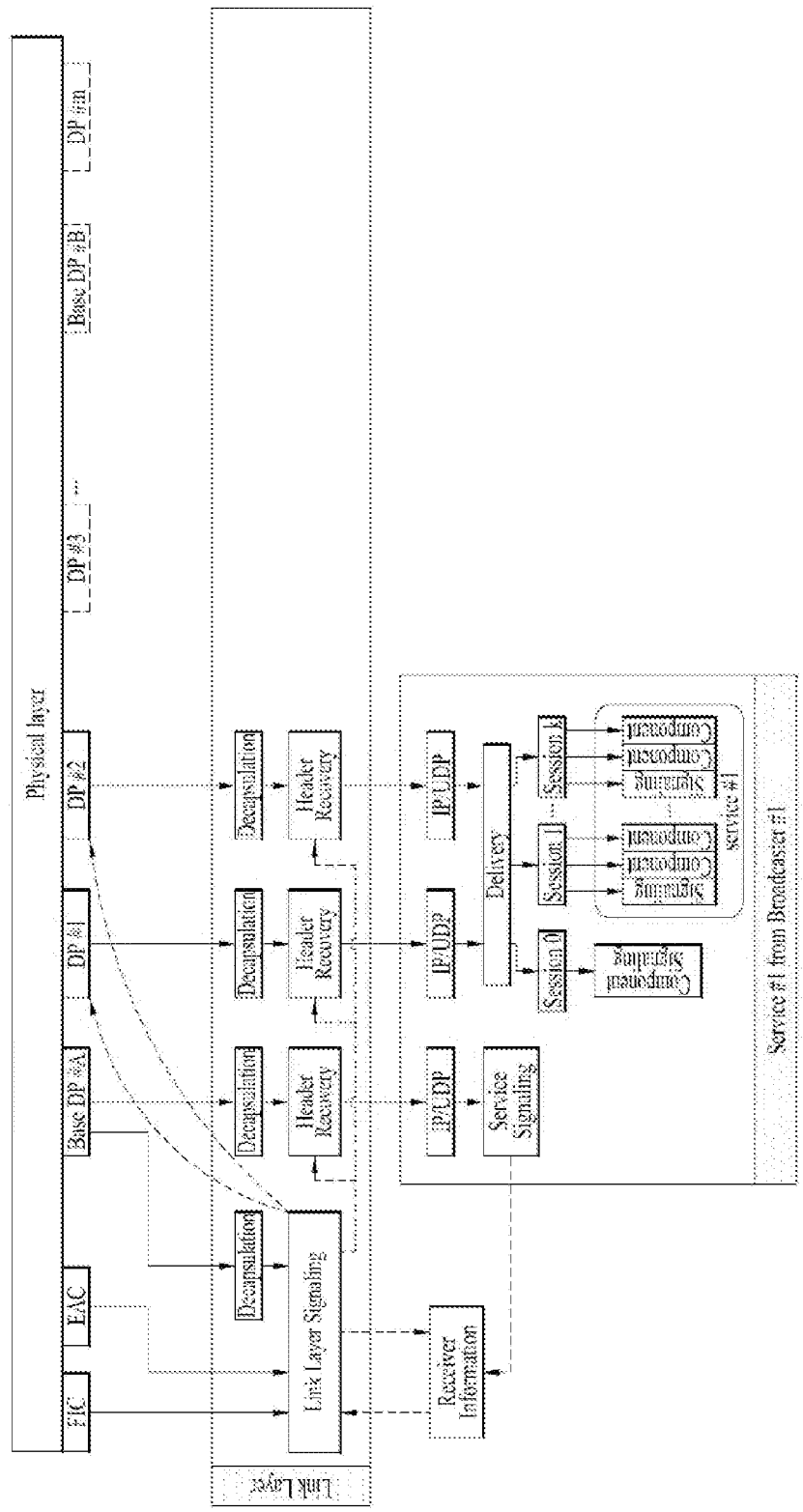

【Figure 58】

| Syntax | Bits | Format |
|---|---|---|
| FIC_payload( ){ | | |
|     FIC_protocol_version | 8 | |
|     transport_stream_id | 16 | |
|     num_partitions | 8 | |
|     for (i= 0 ; i<num_partitions ; i++) { | | |
|         partition_id | 8 | uimsbf |
|         partition_protocol_version | 8 | uimsbf |
|         num_services | 8 | uimsbf |
|         for (j= 0 ; j<num_services ;j++) { | | |
|             service_id | 8 | uimsbf |
|             service_data_version | 8 | uimsbf |
|             service_channel_number | 8 | uimsbf |
|             service_category | 8 | uimsbf |
|             service_status | 3 | uimsbf |
|             service_distribution | 2 | uimsbf |
|             sp_indicator | 1 | bslbf |
|             IP_version_flag | 1 | bslbf |
|             SSC_source_IP_address_flag | 1 | bslbf |
|             if( SSC_source_IP_address_flag) | | |
|                 SSC_source_IP_address | 32 or 128 | uimsbf |
|             SSC_destination_IP_address | 32 or 128 | uimsbf |
|             SSC_destination_UDP_port | 16 | uimsbf |
|             SSC_TSI | 16 | uimsbf |
|             SSC_DP_ID | 8 | uimsbf |
|         } | | |
|         num_partition_level_descriptors | 8 | uimsbf |
|         for (k= 0 ; k< num_partition_level_descriptors ; k++ | | |
|             partition_level_descriptor( ) | var | |
|     } | | |
|     num_FIC_level_descriptors | 8 | uimsbf |
|     for (n= 0 ; n<num_FIC_level_descriptors ; n++) | | |
|         FIC_level_descriptor() | var | |
| } | | |

【Figure 59】
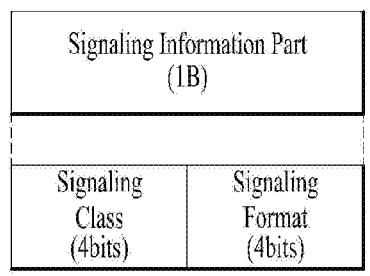
(a)
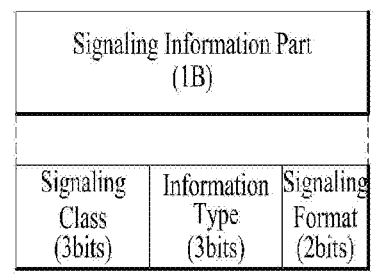
(b)

[Figure 60]
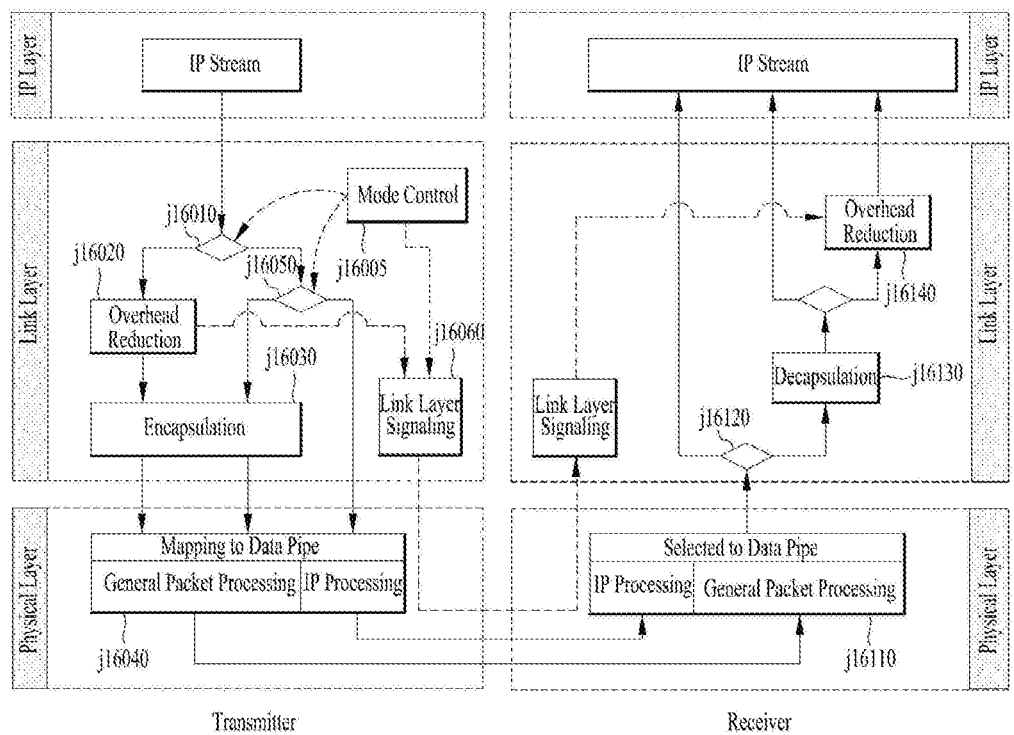

【Figure 61】

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

【Figure 62】

| Syntax | No. Bits | Format |
|---|---|---|
| Link_Layer_mode_control_descriptor() { | | |
|     descriptor_tag | 8 | uimsbf |
|     descriptor_length | 8 | uimsbf |
|     num_DP | 8 | uimsbf |
|     for(i=0;i<num_dp;i++) { | | |
|         DP_id | 8 | uimsbf |
|         HCF | 1 | bslbf |
|         EF | 1 | bslbf |
|         reserved | 6 | uimsbf |
|     } | | |
| } | | |

[Figure 63]
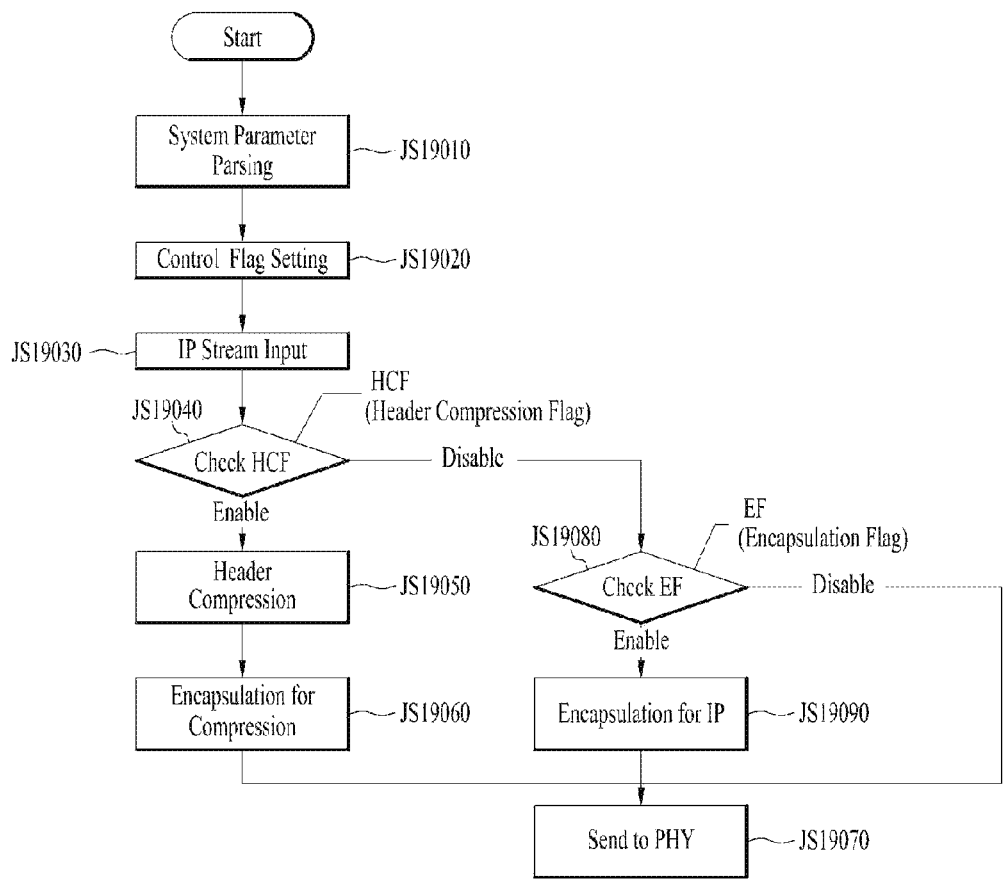

【Figure 64】
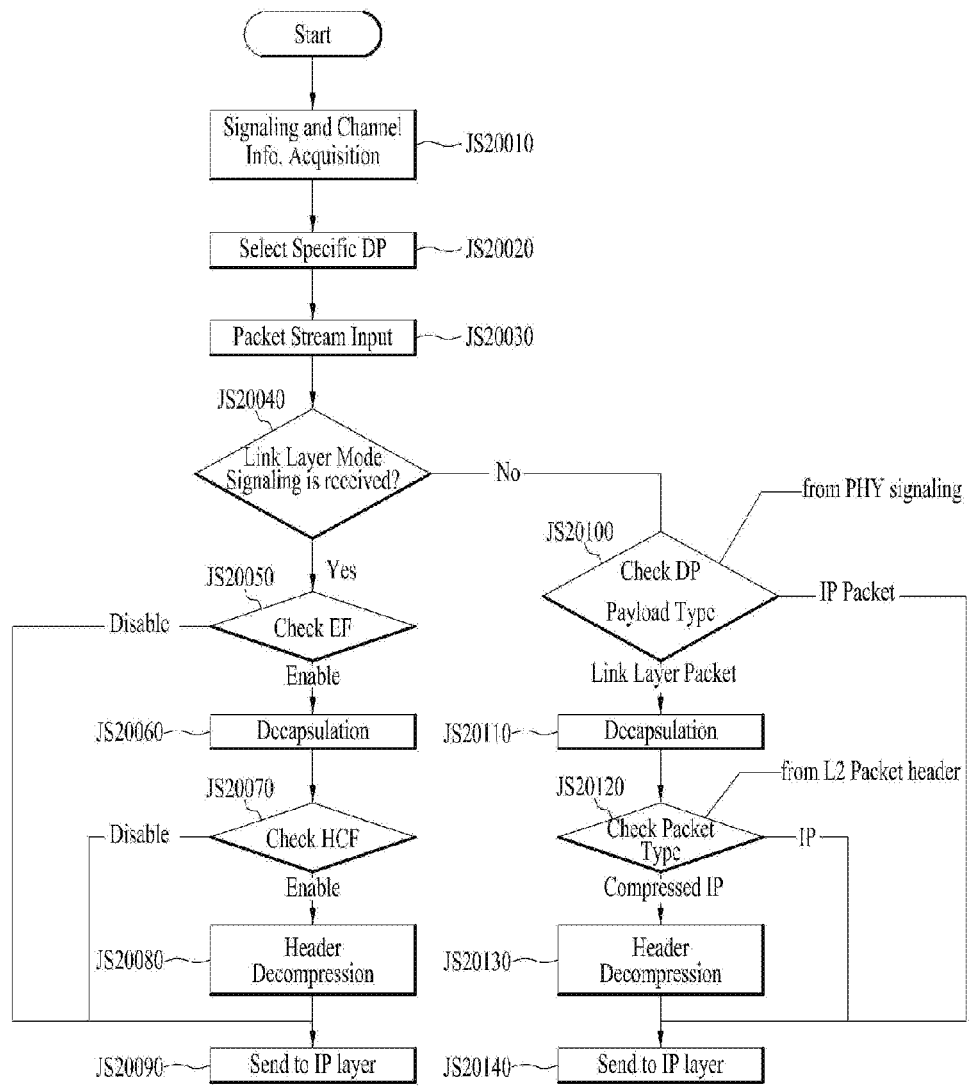
【Figure 65】
| Index | Field value | Encapsulation Mode |
|---|---|---|
| 0 | 00 | None (Bypass) |
| 1 | 01 | Encapsulation 1 (Default) |
| 2 | 10 | Encapsulation 2 |
| 3 | 11 | Encapsulation 3 |

【Figure 66】

| Index | Field value | Header Compression Mode |
|---|---|---|
| 0 | 000 | None (No Compression) |
| 1 | 001 | RoHC (default) |
| 2 | 010 | Header Compression 2 |
| 3 | 011 | Header Compression 3 |
| 4 | 100 | Reserved |
| 5 | 101 | Reserved |
| 6 | 110 | Reserved |
| 7 | 111 | Reserved |

【Figure 67】

| Index | Field value | Packet Reconfiguration Mode |
|---|---|---|
| 0 | 00 | None (No Reconfiguration) |
| 1 | 01 | Reconfiguration 1 (default) |
| 2 | 10 | Reconfiguration 2 |
| 3 | 11 | Reconfiguration 3 |

【Figure 68】

| Index | Field value | Context Transmission Mode |
|---|---|---|
| 0 | 000 | Transmission Mode 1 |
| 1 | 001 | Transmission Mode 2 |
| 2 | 010 | Transmission Mode 3 |
| 3 | 011 | Transmission Mode 4 |
| 4 | 100 | Transmission Mode 5 |
| 5 | 101 | Reserved |
| 6 | 110 | Reserved |
| 7 | 111 | Reserved |

【Figure 69】

| Syntax | No. Bits | Format |
|---|---|---|
| RoHC_Initialization_in_link( ){ | | |
|     link_id | 8 | uimsbf |
|     max_cid | 16 | uimbf |
|     large_cids | 1 | bslbf |
|     reserved | 3 | 111 |
|     num_profiles | 4 | uimsbf |
|     for(j= 0;j<num_profiles ; j++) { | | |
|         profiles( ) | 8 | uimsbf |
|     } | | |
|     num_IP_stream | 8 | uimsbf |
|     for(k= 0;k<num_IP_stream ; k++) | | |
|     { | | |
|         IP_address() | 32 | uimsbf |
|     } | | |
| } | | |

【Figure 70】

| Index | Field value | Signaling path | Priority |
|---|---|---|---|
| 0 | 000 | None (No signaling path) | - |
| 1 | 001 | Dedicated Data Pipe | 1 |
| 2 | 010 | Specific signaling channel (FIC) | 2 |
| 3 | 011 | Specific signaling channel (EAC) | 3 |
| 4 | 100 | Reserved | 4 |
| 5 | 101 | Reserved | 5 |
| 6 | 110 | Reserved | 6 |
| 7 | 111 | Reserved | 7 |

【Figure 71】

| Bit position | Field value | Signaling path mapping |
|---|---|---|
| b0 (MSB) | | Dedicated Data Pipe |
| b1 | 0 : disable | Specific signaling channel (FIC) |
| b2 | 1 : enable | Specific signaling channel (EAC) |
| b3(LSB) | | Specific signaling channel (other) |

【Figure 72】
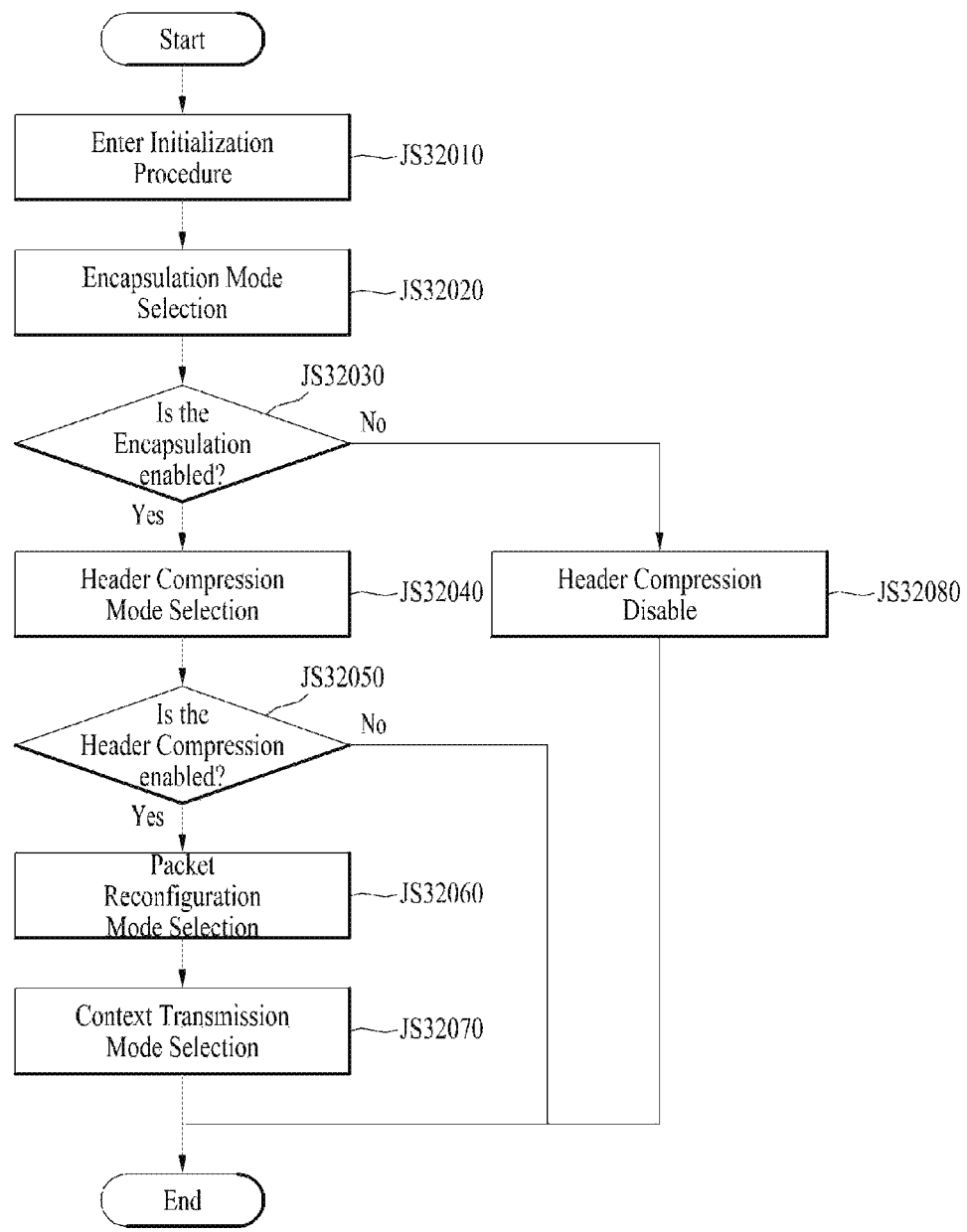

【Figure 73】
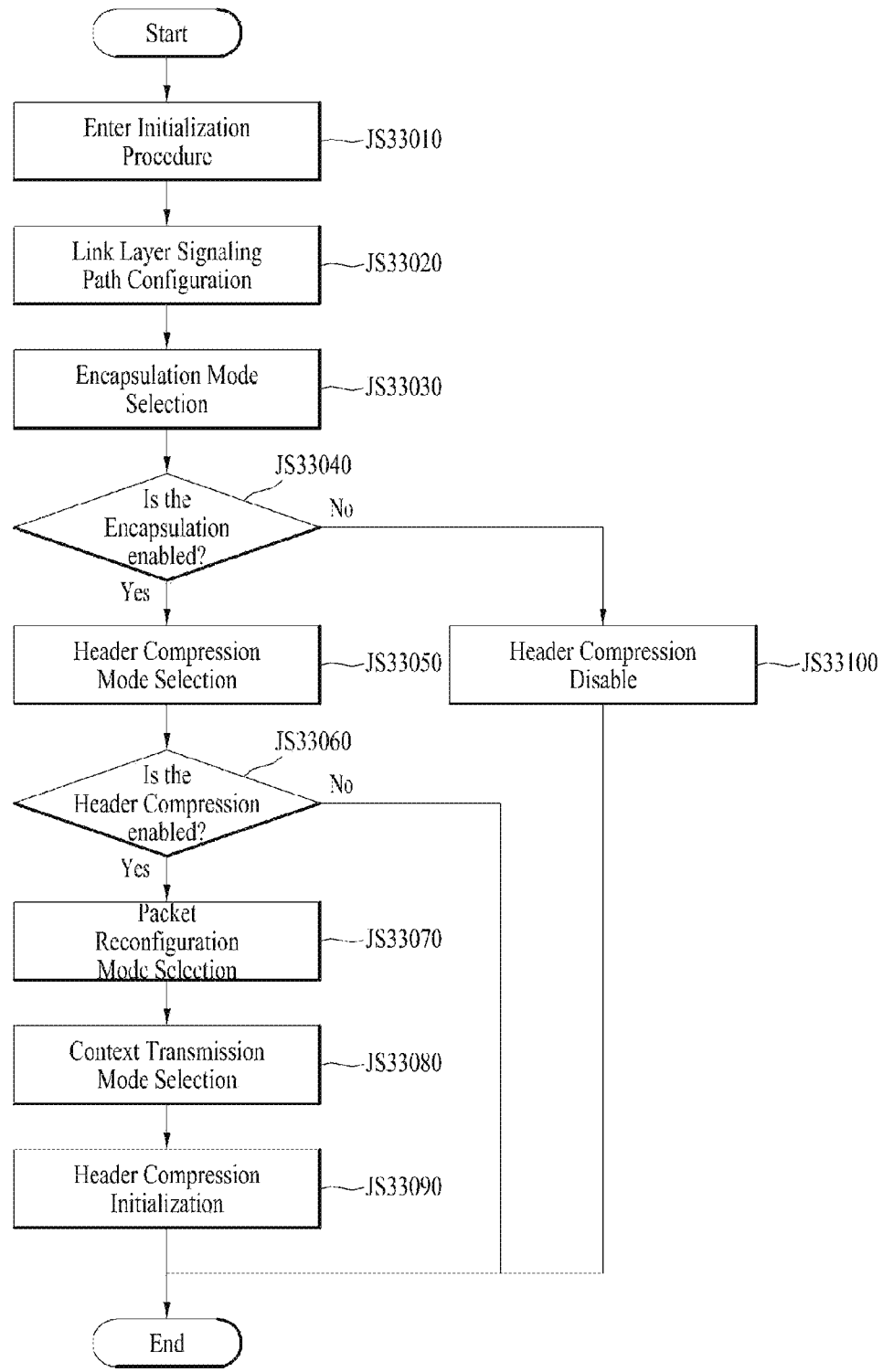

【Figure 74】

| Syntax | No. Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i= 0 ; i<num_link ; i++) { | | |
|         link_id | 8 | uimsbf |
|         encapsulation_mode | 2 | bslbf |
|         if (encapsulation_mode==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | |
|                 context_transmission_mode | 3 | bslbf |
|                 reserved | 1 | bslbf |
|                 max_cid | 16 | uimbf |
|                 large_cids | 1 | bslbf |
|                 num_profiles | 4 | uimsbf |
|                 for(j= 0 ; j<num_profiles ; j++) { | | |
|                     profiles( ) | | |
|                 } | 8 | uimsbf |
|             } | | |
|         } | | |
|     } | | |
| } | | |

【Figure 75】

| Syntax | No. Bits | Format |
|---|---|---|
| Link_Layer_Initialization_descriptor() { | | |
|     descriptor_tag | 8 | uimsbf |
|     descriptor_length | 8 | uimsbf |
|     num_link | 8 | uimsbf |
|     for(i=0;i<num_link;i—){ | | |
|         link_id | 8 | uimsbf |
|         encapsulation_mode | 2 | bslbf |
|         if(encapsulation_mode ==0) { | | |
|             reserved | 6 | bslbf |
|         } | | |
|         else { | | |
|             header_compression_mode | 3 | bslbf |
|             if(header_compression_mode ==0) { | | |
|                 reserved | 3 | bslbf |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

【Figure 76】

| Syntax | No. Bits | Format |
|---|---|---|
| Link_Layer_Initialization_descriptor() { | | |
|     descriptor_tag | 8 | uimsbf |
|     descriptor_length | 8 | uimsbf |
|     num_link | 8 | uimsbf |
|     signaling_path_configuration | 4 | bslbf |
|     reserved | 4 | bslbf |
|     if (signaling_path_configuration >='1000') { | | |
|         dedicated_DP_id | 8 | uimsbf |
|     } | | |
|     for(i=0;i<num_link;i++){ | | |
|         link_id | 8 | uimsbf |
|         encapsulation_mode | 2 | bslbf |
|         if (encapsulation_mode ==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

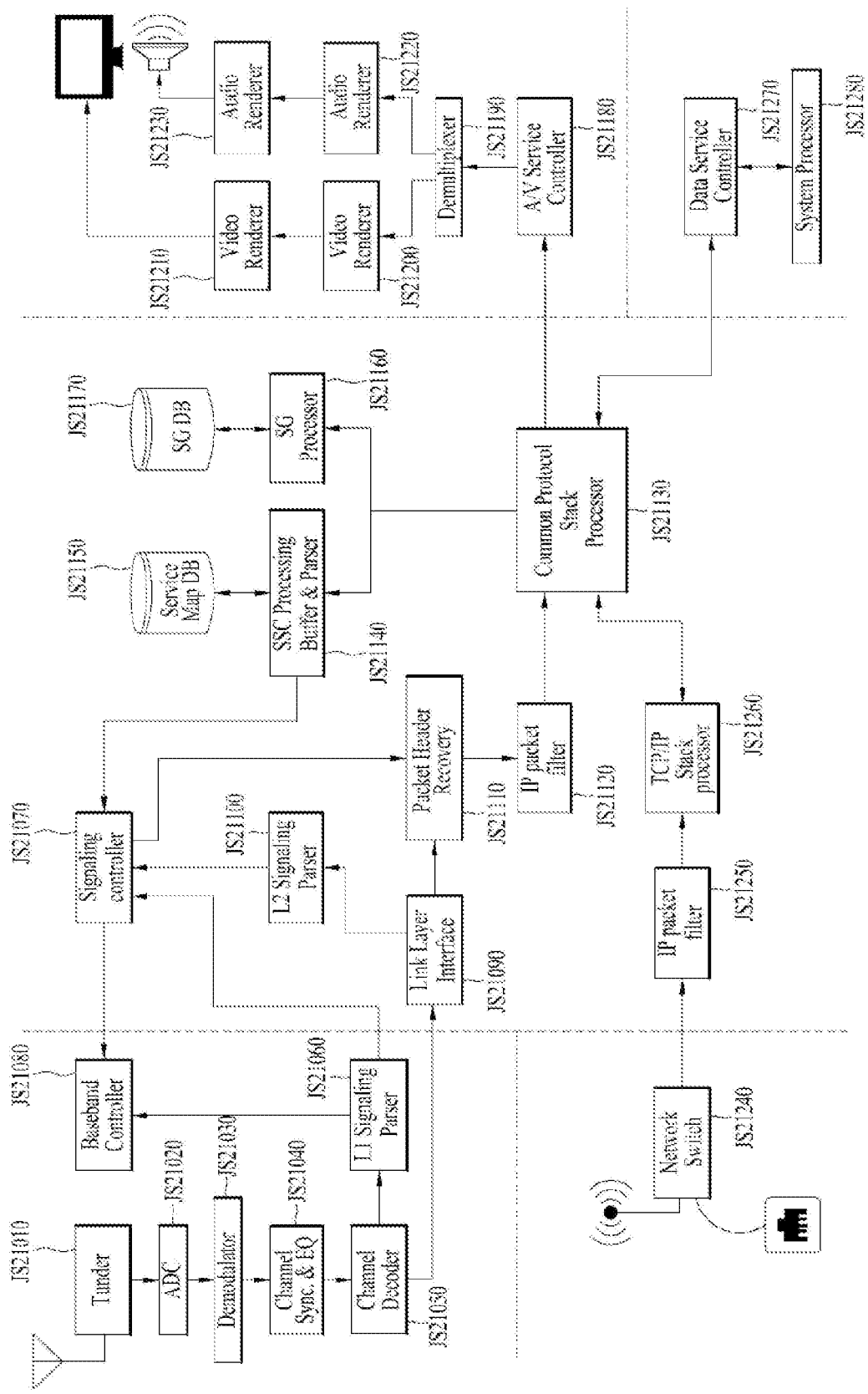
[Figure 77]

【Figure 78】
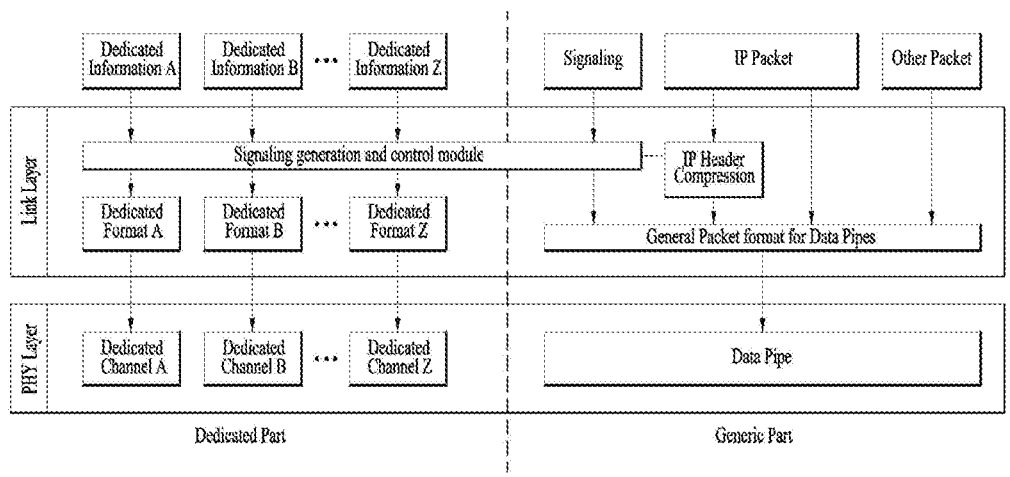

【Figure 79】
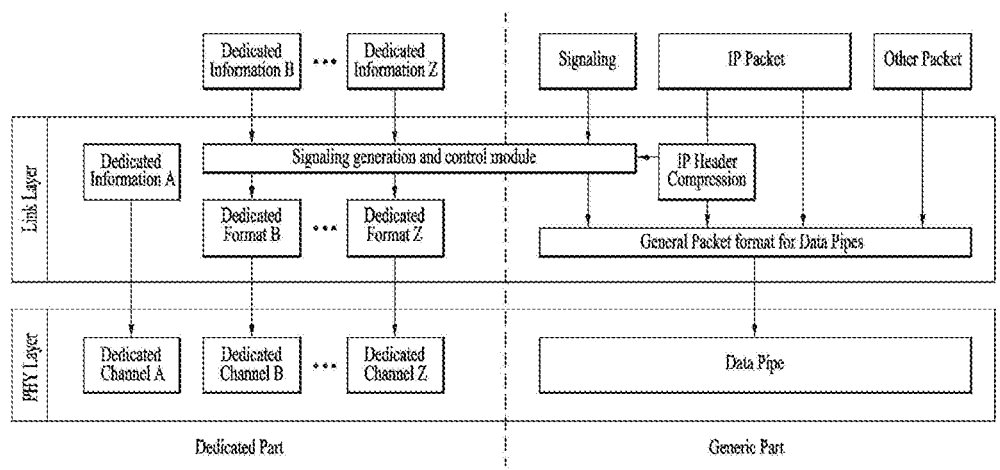

[Figure 80]
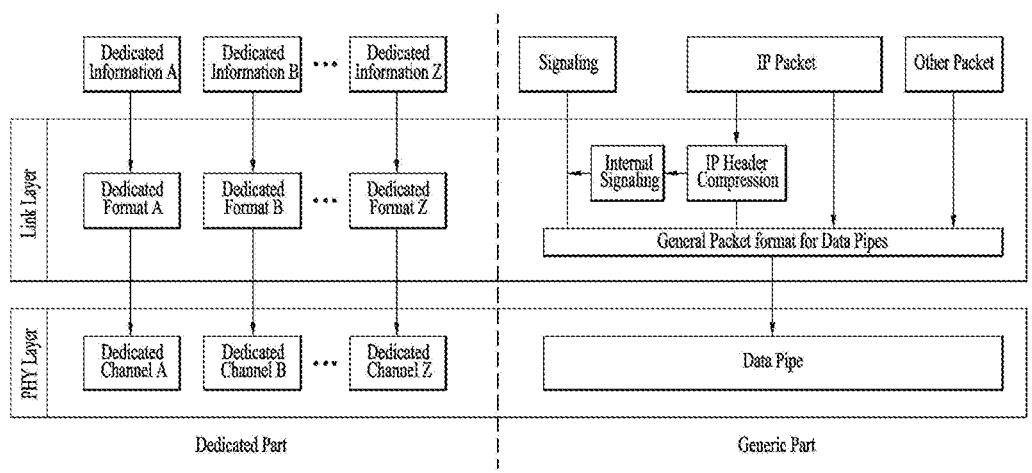

【Figure 81】
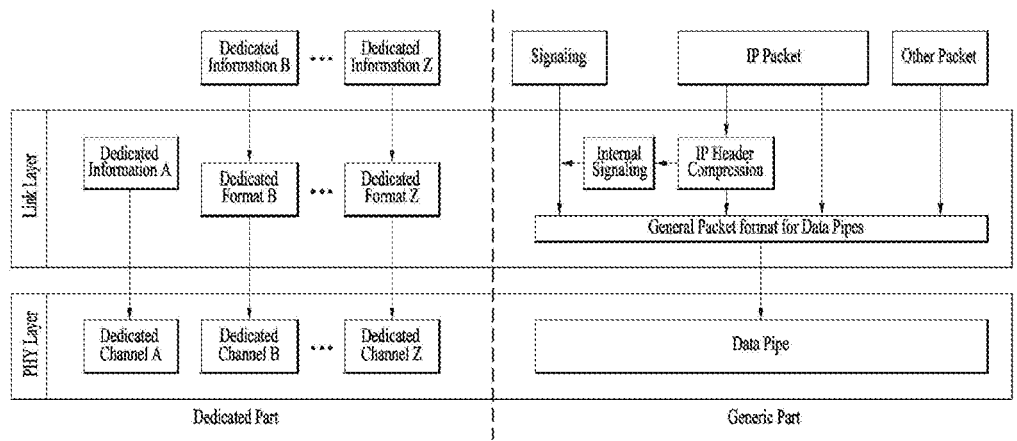

[Figure 82]
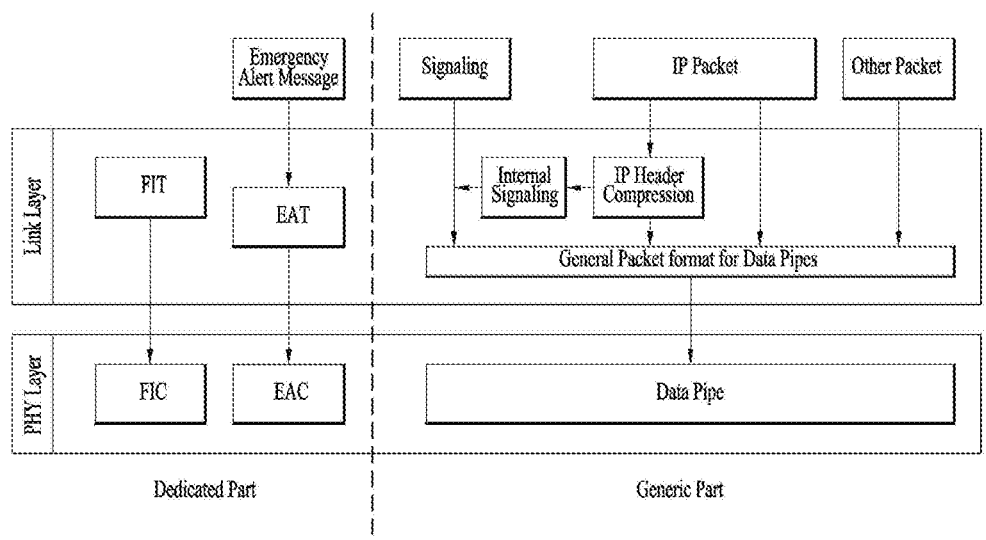

【Figure 83】

| Syntax | No.Bits | Format |
|---|---|---|
| Packet_Structure_for_Dedicated_Channel() { | | |
| length | 16 | uimsbf |
| data_version | 8 | uimsbf |
| payload_format | 4 | bslbf |
| stuffing_flag | 1 | bslbf |
| Reserved | 3 | bslbf |
| CRC | 32 | rpchof |
| payload_data_bytes() | var | |
| if (stuffing_flag == 1) { | | |
| stuffing_length | 8 | uimsbf |
| stuffing_bytes | var | '0' |
| } | | |
| } | | |

【Figure 84】

| Syntax | No.Bits | Format |
|---|---|---|
| Dedicated_Channel_Configuration() { | | |
| num_dedicated_channel | 4 | uimsbf |
| reserved | 4 | bslbf |
| for(i= 0 ;i< num_dedicated_channel;i++){ | | |
| dedicated_channel_id | 4 | bslbf |
| operation_mode | 4 | bslbf |
| } | | |
| } | | |

[Figure 85]
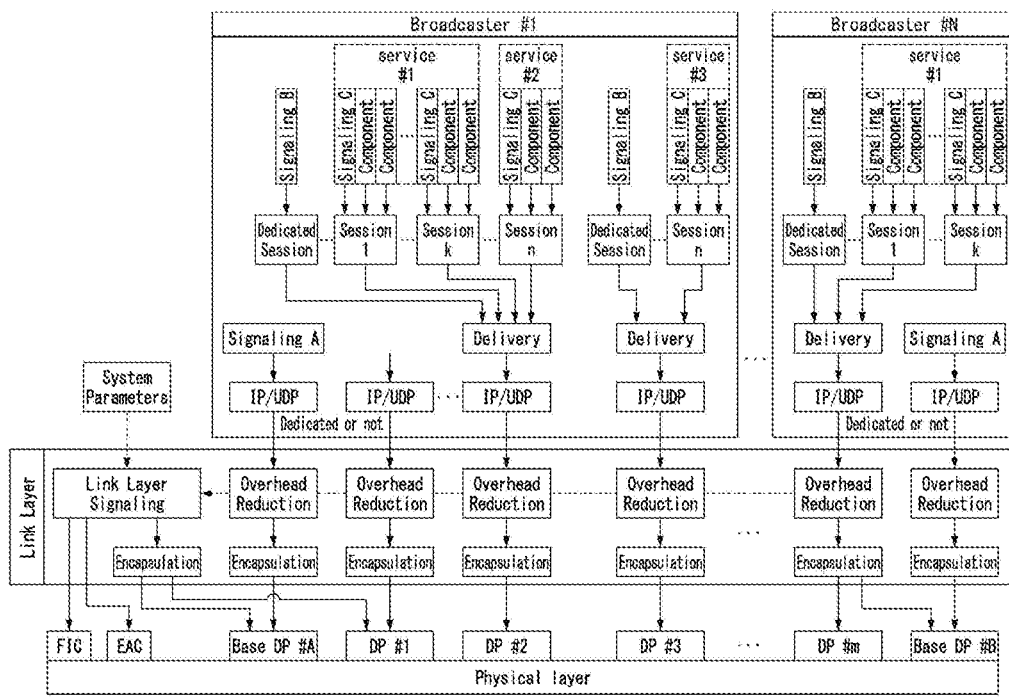

【Figure 86】
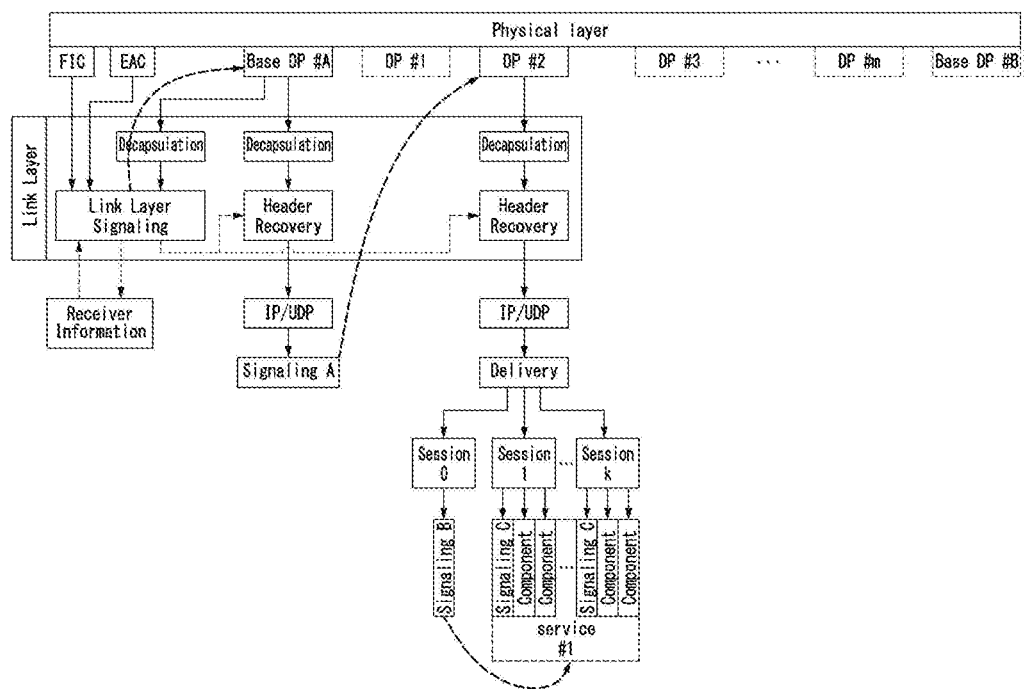

【Figure 87】
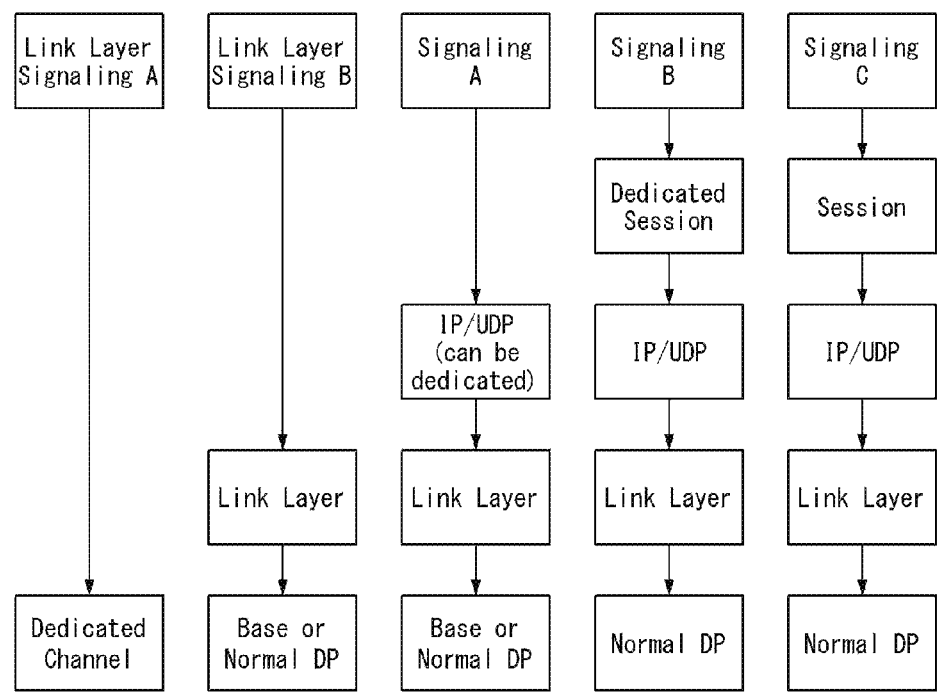

【Figure 88】
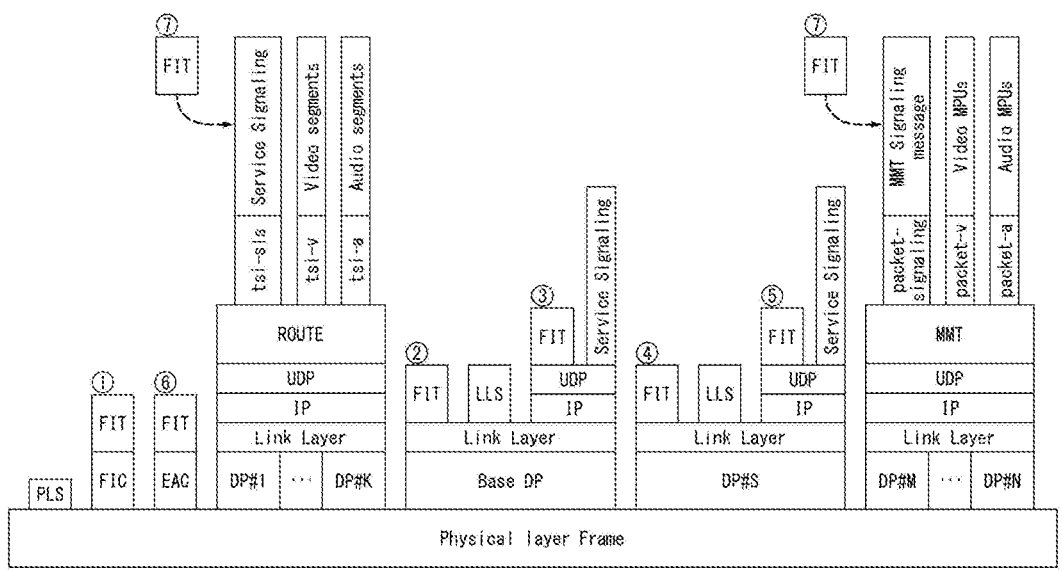

【Figure 89】
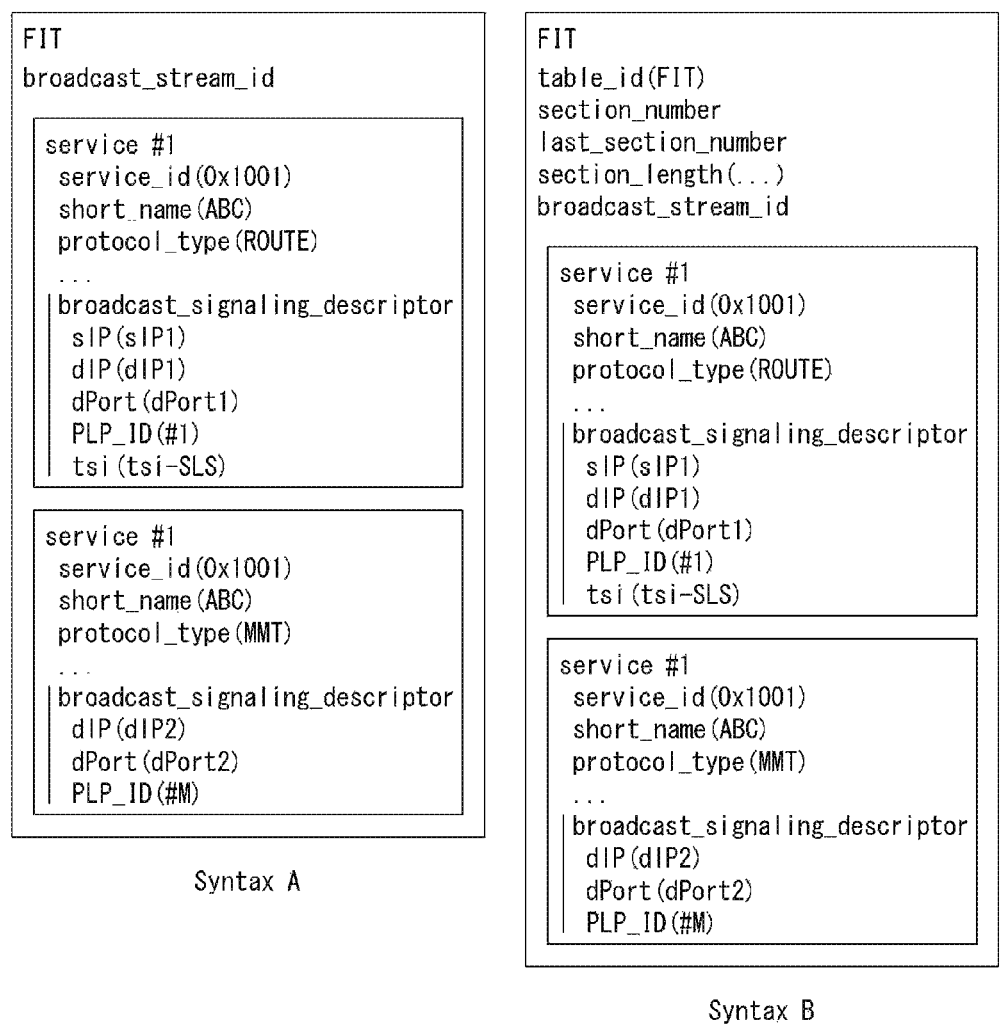

【Figure 90】

| Syntax | No. Bits | Format |
|---|---|---|
| fast_information_table() { | | |
|     FIT_protocol_version | 8 | uimsbf |
|     broadcast_stream_id | 16 | uimsbf |
|     FIT_section_number | 4 | |
|     total_FIT_section_number | 4 | |
|     FIT_section_version | 4 | |
|     FIT_section_length | 12 | |
|     num_services | 8 | uimsbf |
|     for (i=0; i<num_services;i++) { | | |
|         service_id | 16 | uimsbf |
|         SLS_data_version | 8 | uimsbf |
|         service_category | 5 | uimsbf |
|         short_service_name_length | 3 | uimsbf |
|         for (j=0; j<short_name_length; j++) { | | |
|             short_service_name_byte_pair() | 16*m | bslbf |
|         } | | |
|         provider_id | 8 | uimsbf |
|         service_status | 3 | uimsbf |
|         sp_indicator | 1 | bslbf |
|         num_service_level_descriptors | 4 | uimsbf |
|         for (j=0;j<num_service_level_descriptors;j++) { | | |
|             service_level_descriptor() | var | |
|         } | | |
|     } | | |
|     reserved | 4 | '1111' |
|     num_FIT_level_descriptors | 4 | uimsbf |
|     for (n=0; n<num_FIT_level_descriptors; n++) { | | |
|         FIT_level_descriptor() | var | |
|     } | | |
| } | | |

【Figure 91】

| service_category | Meaning |
|---|---|
| 0x00 | The service category is not specified by the service_category field. |
| 0x01 | A/V service |
| 0x02 | Audio service |
| 0x03 | App Based service |
| 0x04~0x07 | Reserved for future use |
| 0x08 | Service Guide - Service Guide (Announcement) |
| 0x09~0x1F | Reserved for future use |

【Figure 92】

| Syntax | No. Bits | Format |
|---|---|---|
| broadcast_signaling_location _descriptor() { | | |
|     descriptor_tag | 8 | TBD |
|     descriptor_length | 8 | |
|     reserved | 6 | '111111' |
|     IP_version_flag | 1 | bslbf |
|     SLS_source_IP_address_flag | 1 | bslbf |
|     if (SLS_source_IP_address_flag) { | | |
|         SLS_source_IP_address | 32 or 128 | uimsbf |
|     } | | |
|     SLS_destination_IP_address | 32 or 128 | uimsbf |
|     SLS_destination_UDP_port | 16 | uimsbf |
|     SLS_TSI | 16 | uimsbf |
|     SLS_PLP_ID | 8 | uimsbf |
| } | | |

【Figure 93】
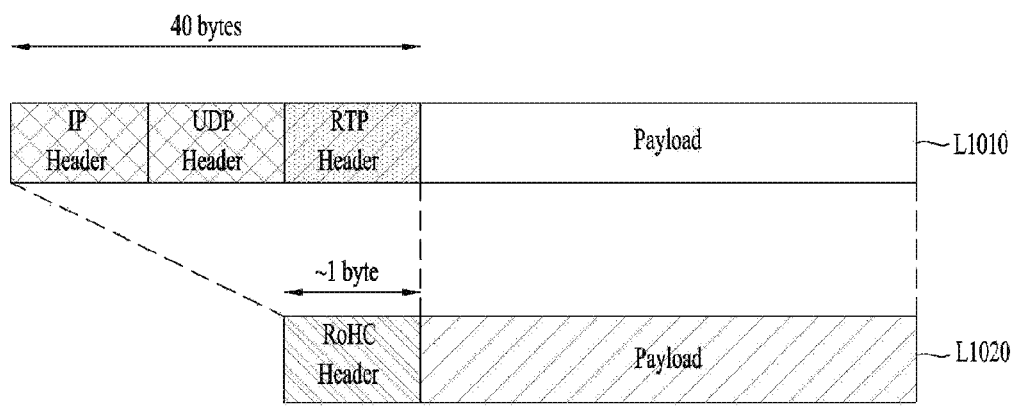
【Figure 94】
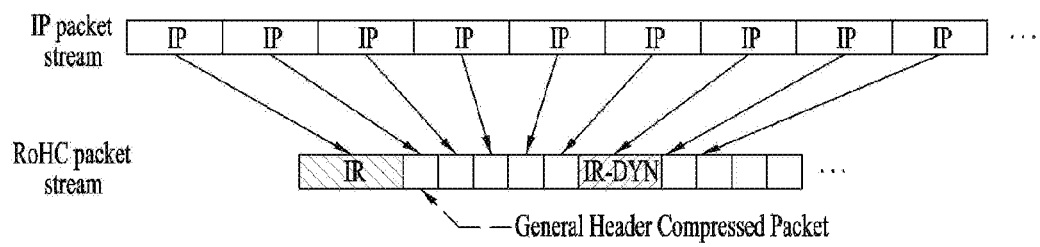
【Figure 95】
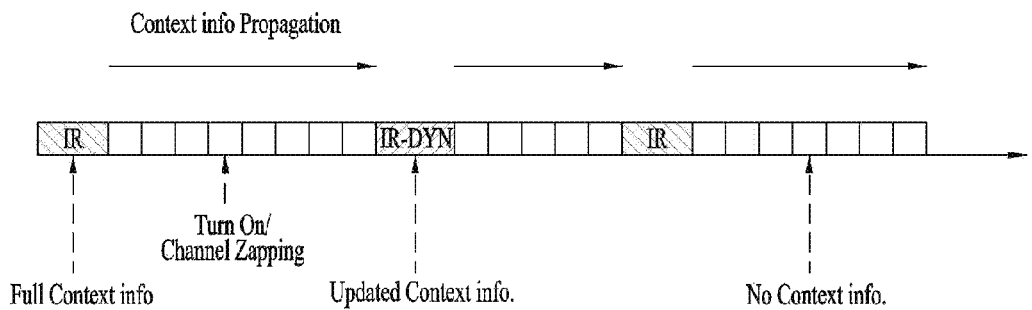

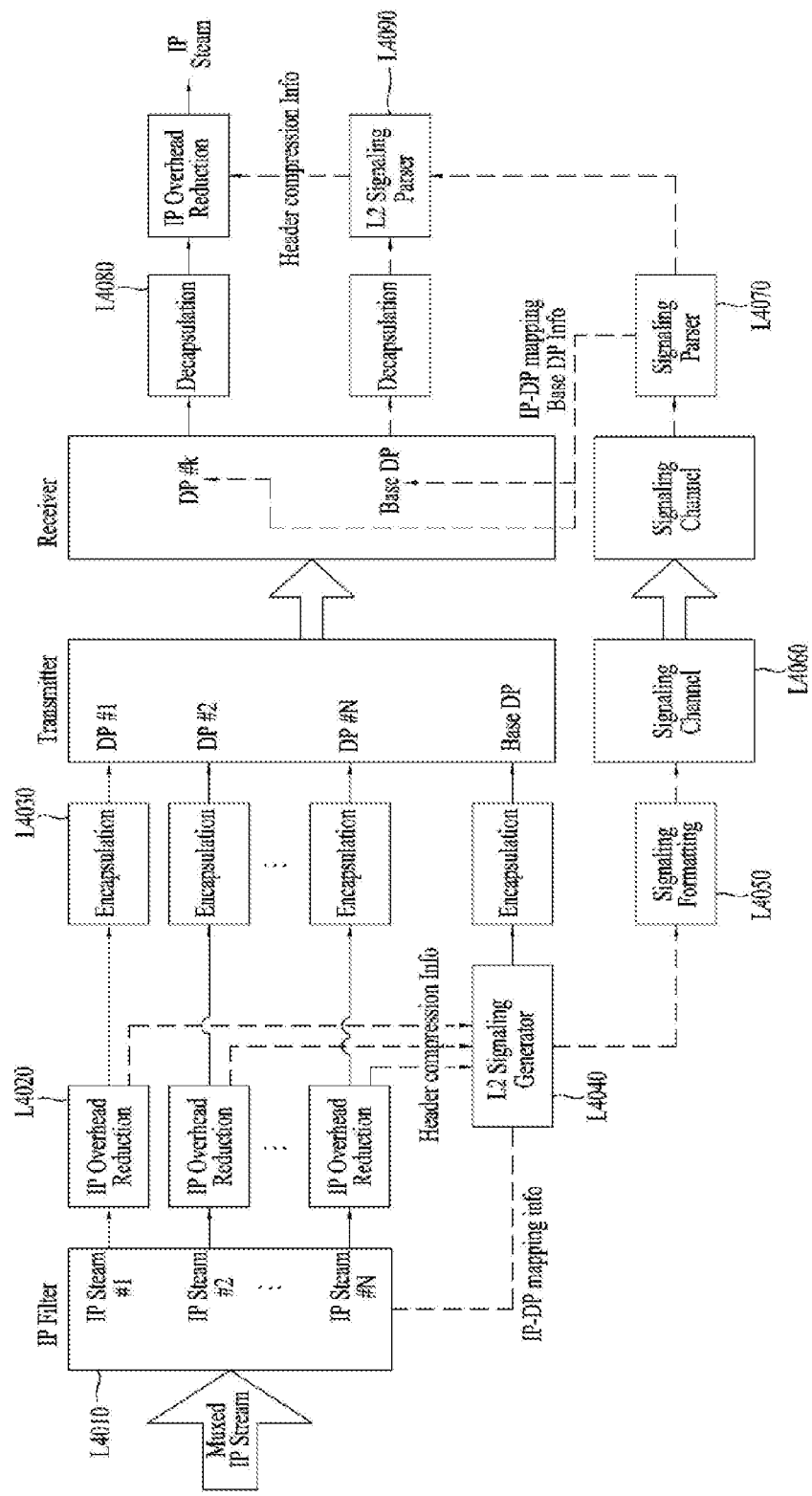
[Figure 96]

[Figure 97]
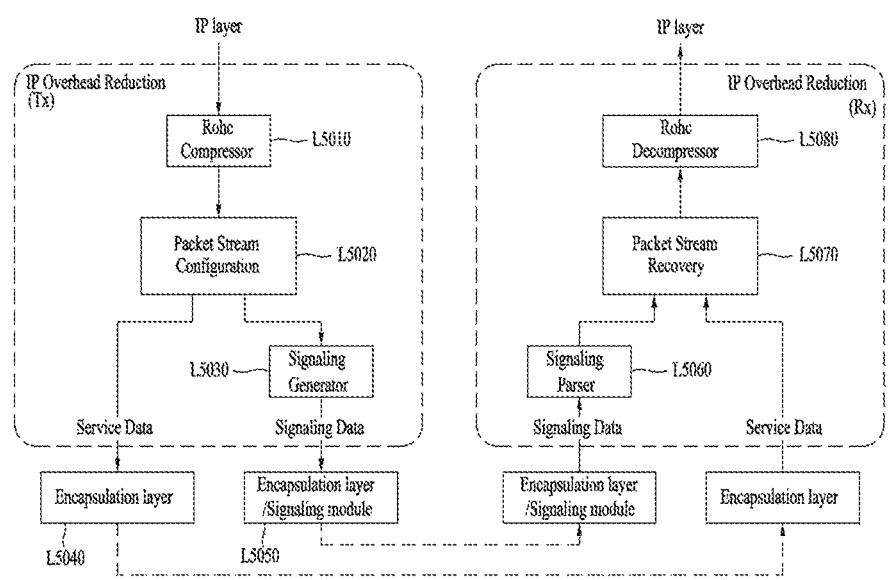

【Figure 98】
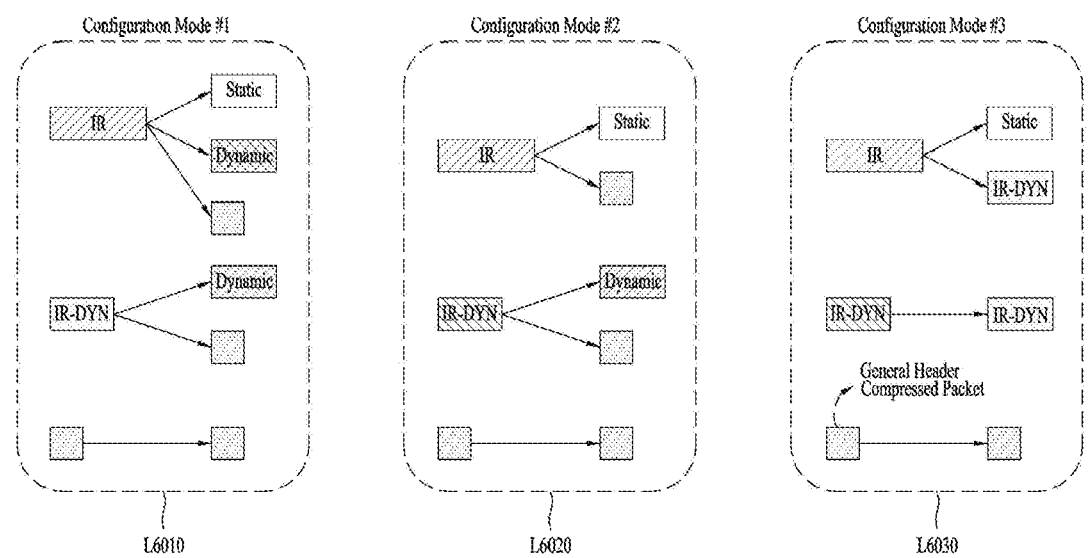

【Figure 99】
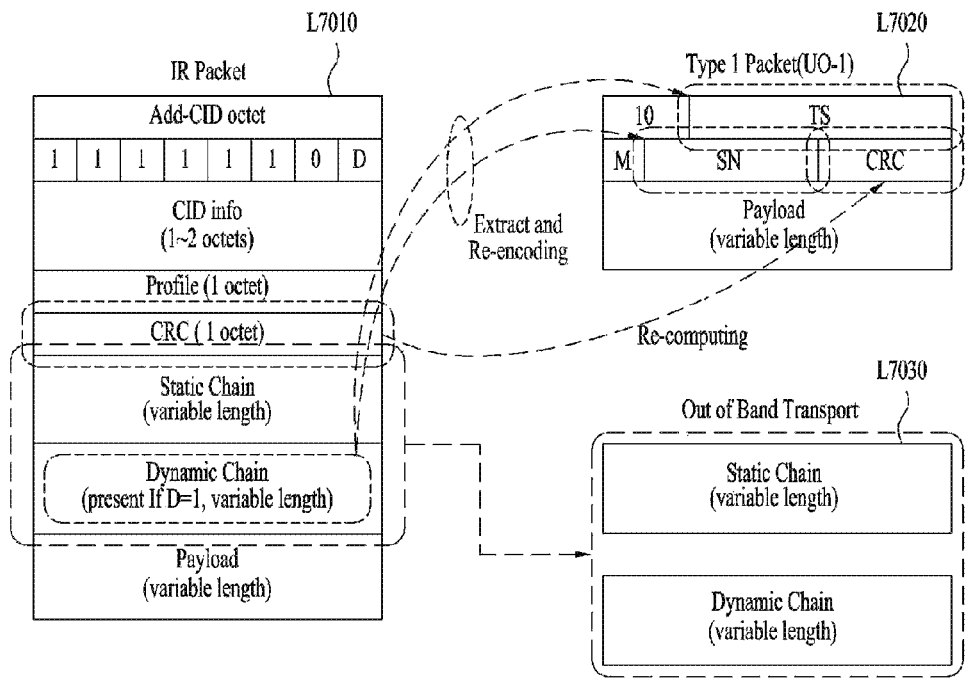
【Figure 100】
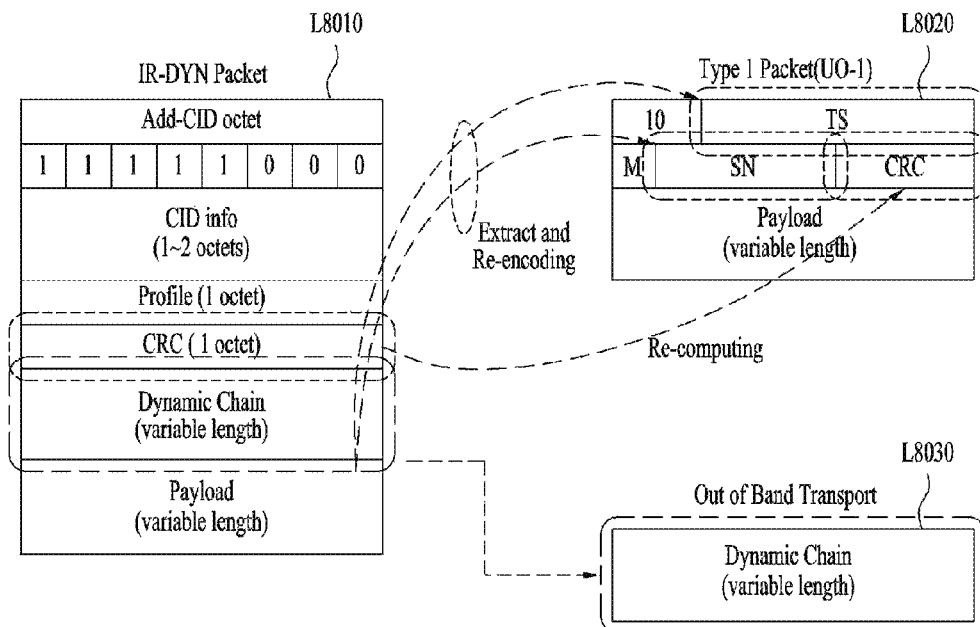

【Figure 101】
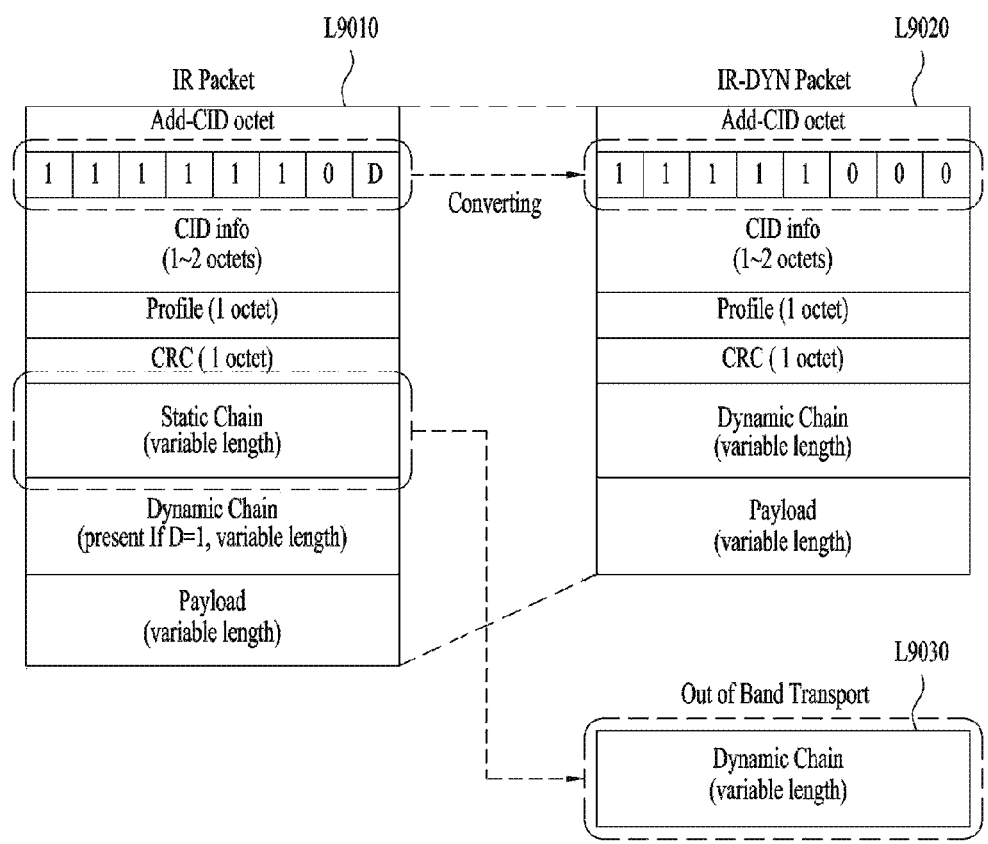

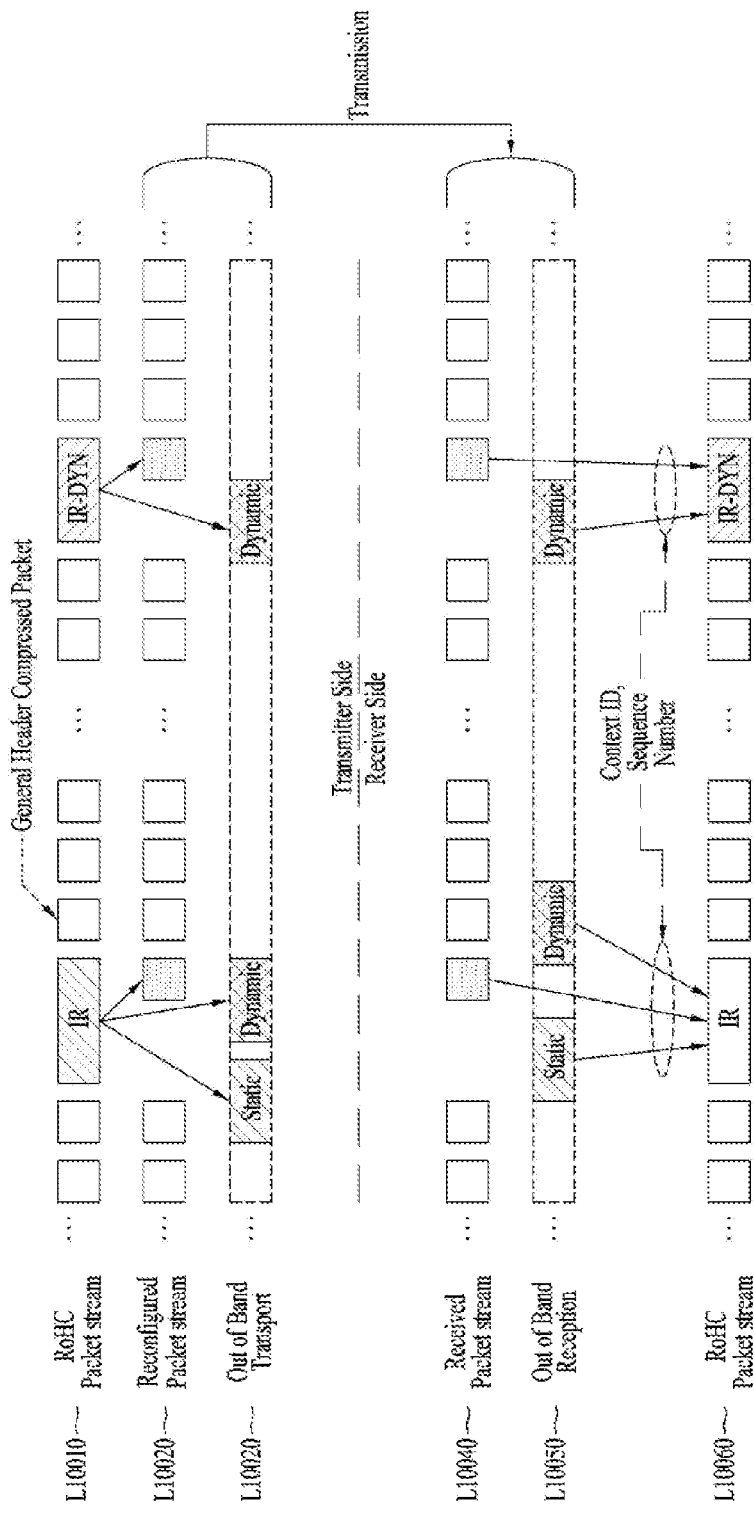
[Figure 102]

[Figure 103]
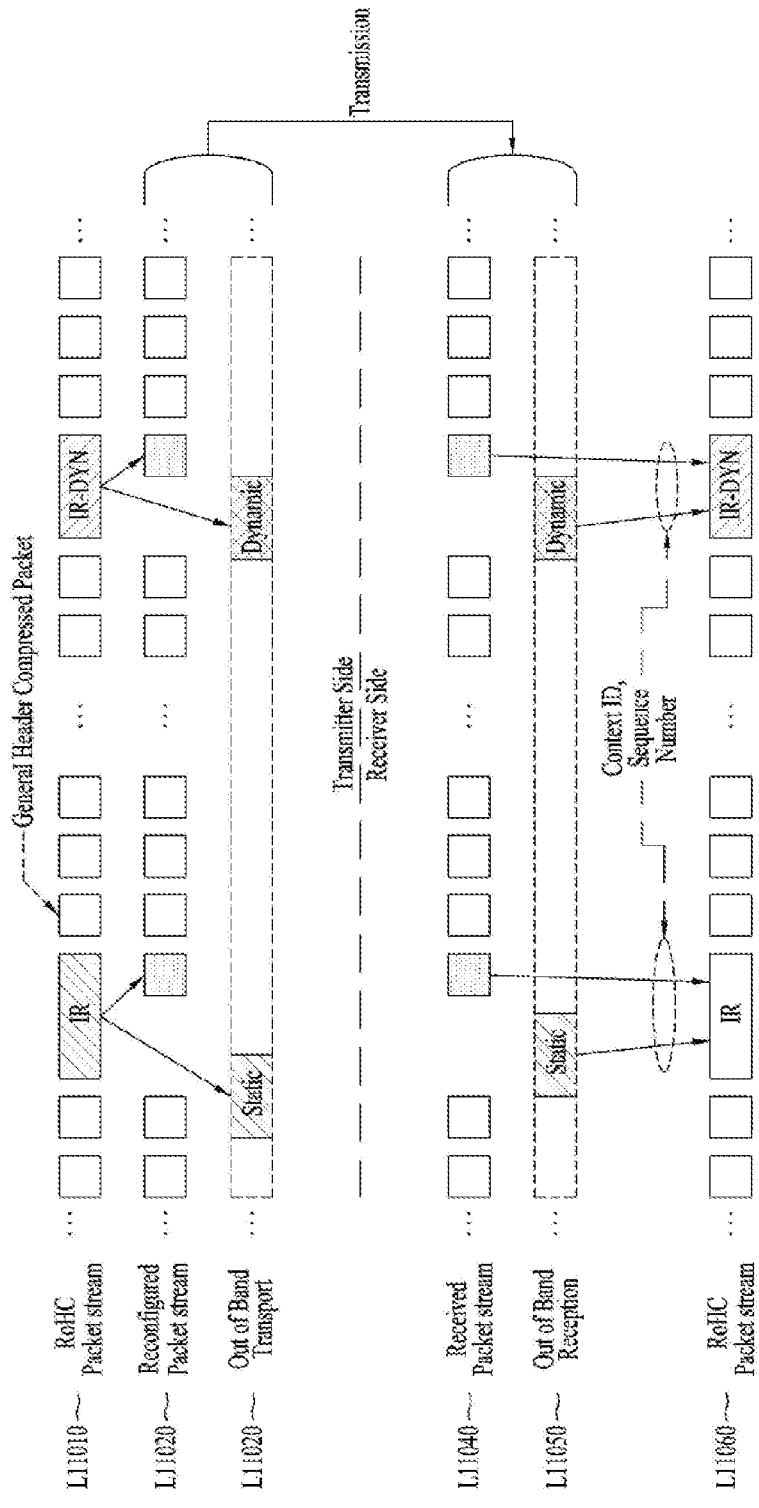

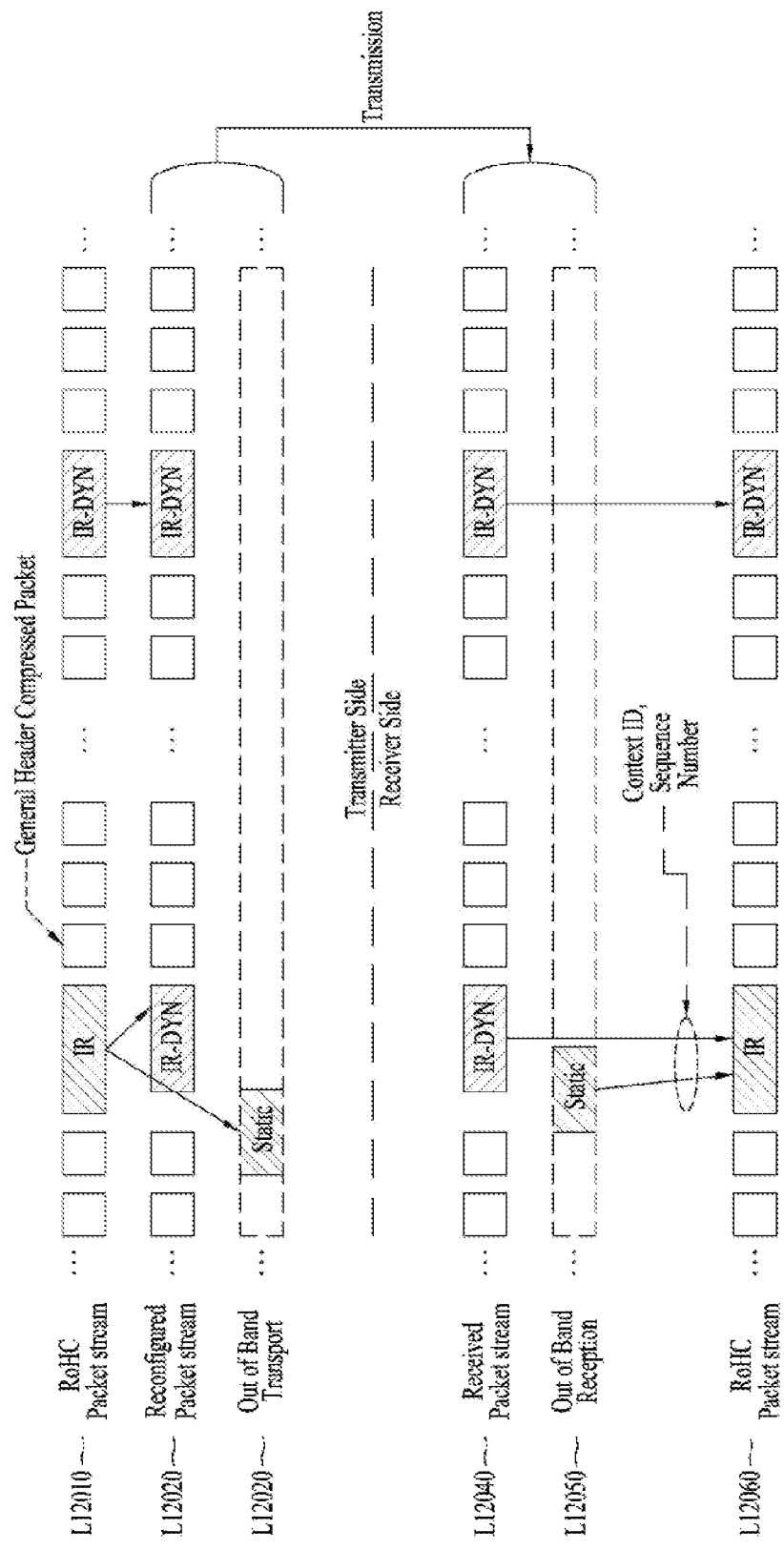
[Figure 104]

[Figure 105]

| Transport Mode | Static Chain | Dynamic Chain | General Header Compressed Packet | Associated Configuration Mode |
|---|---|---|---|---|
| Mode 1 | Signaling | Signaling | Normal Data Pipe | Mode 1, Mode 2 |
| Mode 2 | Signaling | Base Data Pipe | | |
| Mode 3 | Base Data Pipe | Base Data Pipe | | |
| Mode 4 | Signaling | Normal Data Pipe (IR-DYN packet) | | Mode 3 |
| Mode 5 | Base Data Pipe | | | |

【Figure 106】

| Syntax | No. of Bits | Format |
|---|---|---|
| ROHC_static_descriptor( ) { | | |
|    descriptor_tag | 8 | uimsbf |
|    descriptor_length | 8 | uimsbf |
|    context_id | 8 or 16 | |
|    context_profile | 8 | uimsbf |
|    static_chain_length | 8 | uimsbf |
|    static_chain ( ) | var | bslbf |
| } | | |

【Figure 107】

| Syntax | No. of Bits | Format |
|---|---|---|
| ROHC_dynamic_descriptor( ) { | | |
|    descriptor_tag | 8 | uimsbf |
|    descriptor_length | 8 | uimsbf |
|    context_id | 8 or 16 | |
|    context_profile | 8 | uimsbf |
|    dynamic_chain_length | 8 | uimsbf |
|    dynamic_chain ( ) | var | bslbf |
| } | | |

【Figure 108】

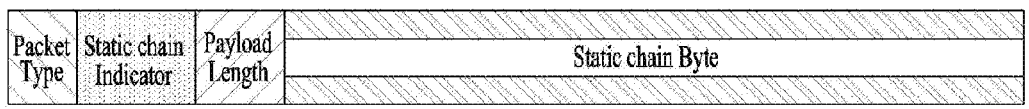

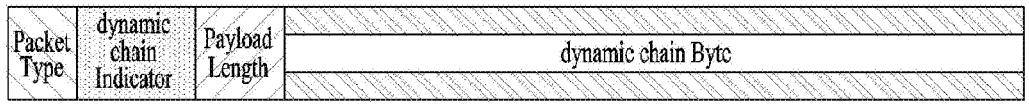

【Figure 109】

| Syntax | No. of Bits | Format |
|---|---|---|
| ROHC_init_descriptor( ) { | | |
| descriptor_tag | 8 | uimsbf |
| descriptor_length | 8 | uimsbf |
| context_id | 8 or 16 | |
| context_profile | 8 | uimsbf |
| max_cid | 8 | uimsbf |
| large_cid | 8 | bslbf |
| } | | |

【Figure 110】

| Syntax | No. of bits | Format |
|---|---|---|
| Fast_Information_Chunk ( ){ | | |
|   FIT_data_version | 8 | uimsbf |
|   num_broadcast | 8 | uimsbf |
|   for( i=0 ; i<num_broadcast ; i++ ){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for( j=0 ; j< num_service ; j++ ){ | | |
|       service_id | 16 | uimsbf |
|       service_category | 6 | uimsbf |
|       service_hidden_flag | 1 | bslbf |
|       SP_indicator | 1 | bslbf |
|       RoHC_init_descriptor( ) | var | |
|     } | | |
|   } | | |
| } | | |

[Figure 111]

| Syntax | No. of bits | Format |
|---|---|---|
| Fast_Information_Chunk( ){ | | |
|     FIT_data_version | 8 | uimsbf |
|     num_broadcast | 8 | uimsbf |
|     for( i=0 ; i<num_broadcast ; i++ ){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++ ){ | | |
|             service_id | 16 | uimsbf |
|             service_category | 6 | uimsbf |
|             service_hidden_flag | 1 | bslbf |
|             SP_indicator | 1 | bslbf |
|             context_id | 8 or 16 | |
|             context_profile | 8 | uimsbf |
|             max_cid | 8 | uimsbf |
|             large_cid | 8 | bslbf |
|         } | | |
|     } | | |
| } | | |

[Figure 112]

| Syntax | No. of bits | Format |
|---|---|---|
| Fast_Information_Chunk ( ){ | | |
|     FIT_data_version | 8 | uimsbf |
|     num_broadcast | 8 | uimsbf |
|     for( i=0 ; i<num_broadcast ; i++ ){ | | |
|       broadcast_id | 16 | uimsbf |
|       delivery_system_id | 16 | uimsbf |
|       base_PLP_id | 8 | uimsbf |
|       base_PLP_version | 5 | uimsbf |
|       reserved | 3 | '111' |
|       num_service | 8 | uimsbf |
|       for( j=0 ; j< num_service ; j++ ){ | | |
|         service_id | 16 | uimsbf |
|         service_category | 6 | uimsbf |
|         service_hidden_flag | 1 | bslbf |
|         SP_indicator | 1 | bslbf |
|         num_component | 8 | uimsbf |
|         for( k=0 ; k<num_component ; k++ ){ | | |
|           component_id | 8 | bslbf |
|           PLP_id | 8 | bslbf |
|           RoHC_init_descriptor( ) | var | |
|         } | | |
|       } | | |
|     } | | |
| } | | |

【Figure 113】

| Syntax | No. of bits | Format |
|---|---|---|
| Fast_Information_Chunk( ){ | | |
|     FIT_data_version | 8 | uimsbf |
|     num_broadcast | 8 | uimsbf |
|     for( i=0 ; i<num_broadcast ; i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for( k=0 ; k<num_component ; k++){ | | |
|                 component_id | 8 | bslbf |
|                 PLP_id | 8 | bslbf |
|                 context_id | 8 or 16 | |
|                 context_profile | 8 | uimsbf |
|                 max_cid | 8 | uimsbf |
|                 large_cid | 8 | bslbf |
|             } | | |
|         } | | |
|     } | | |
| } | | |

【Figure 114】
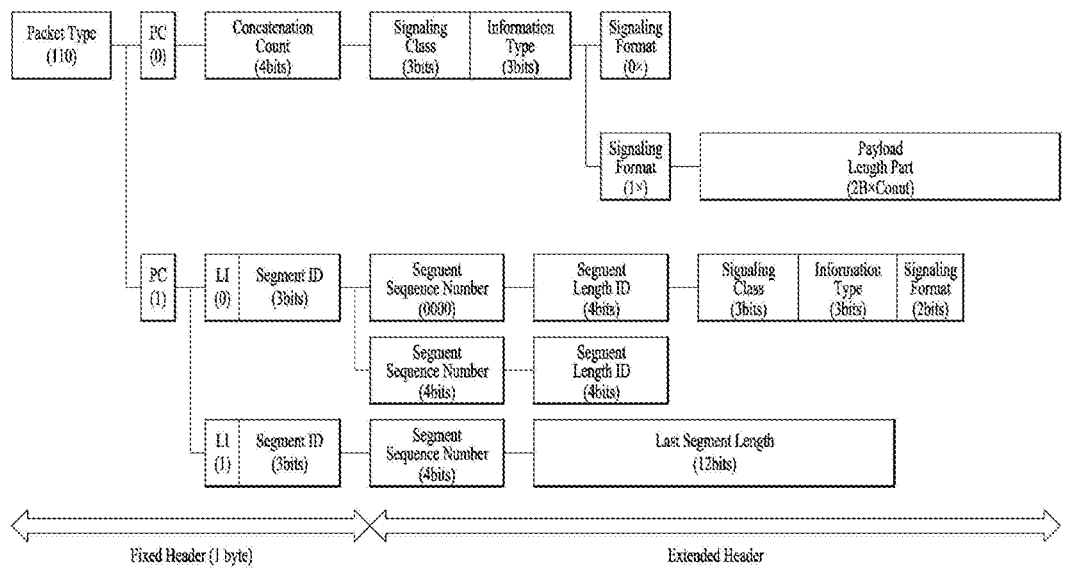
【Figure 115】
| Signaling Class | Description |
|---|---|
| 000 | Signaling for Channel Scan and Service Acquisition |
| 001 | Signaling for Emergency Alert |
| 010 | Signaling for Header Compression |
| 011 | Reserved |
| 100 | Reserved |
| 101 | Reserved |
| 110 | Reserved |
| 111 | Various |

[Figure 116]

| Information Type for Header Compression | Description |
|---|---|
| 000 | Initialization Information |
| 001 | Configuration Parameters |
| 010 | Static Chain |
| 011 | Dynamic Chain |
| 100 | Reserved |
| 101 | Reserved |
| 110 | Reserved |
| 111 | Reserved |

【Figure 117】

| Syntax | No. Bits | Format |
|---|---|---|
| Payload_for_Initialization() { | | |
|     num_RoHC_channels | 8 | uimsbf |
|     for(i=0;i<num_DP;i++) { | | |
|         RoHC_channel_id | 8 | uimsbf |
|         max_cid | 16 | uimbf |
|         large_cids | 1 | bslbf |
|         reserved | 3 | '111' |
|         num_profiles | 4 | uimsbf |
|         for(j=0;j<num_profiles;j++) { | | |
|             profiles() | var | uimsbf |
|         } | | |
|         num_IP_stream | 8 | uimsbf |
|         for(k=for(k=0;k<num_IP_stream;k++) { | | |
|             IP_address() | var | uimsbf |
|         } | | |
|     } | | |
| } | | |

【Figure 118】

| Syntax | No. Bits | Format |
|---|---|---|
| Payload_for_ROHC_configuration() { | | |
|     RoHC_channel_id | 8 | uimsbf |
|     num_context | 8 | uimsbf |
|     for(i=0;i<num_DP;i++) { | | |
|         context_id | 8 or 16 | uimsbf |
|         context_profile | 8 | uimsbf |
|         packet_configuration_mode | 4 | uimsbf |
|         context_transmission_mode | 4 | uimsbf |
|     } | | |
| } | | |

【Figure 119】

| Syntax | No. Bits | Format |
|---|---|---|
| Payload_for_static_chain() { | | |
| context_id | 8 or 16 | uimsbf |
| context_profile | 8 | uimsbf |
| static_chain_length | 8 | uimsbf |
| static_chain () | var | bslbf |
| dynamic_chain_incl | 1 | uimsbf |
| reserved | 7 | '111' |
| if( dynamic_chain_incl == 0x01) { | | |
| dynamic_chain_length | 8 | uimsbf |
| dynamic_chain () | var | bslbf |
| } | | |
| } | | |

【Figure 120】

| Syntax | No. Bits | Format |
|---|---|---|
| Payload_for_dynamic_chain() { | | |
| context_id | 8 or 16 | |
| context_profile | 8 | uimsbf |
| dynamic_chain_length | 8 | uimsbf |
| dynamic_chain () | var | bslbf |
| } | | |

【Figure 121】
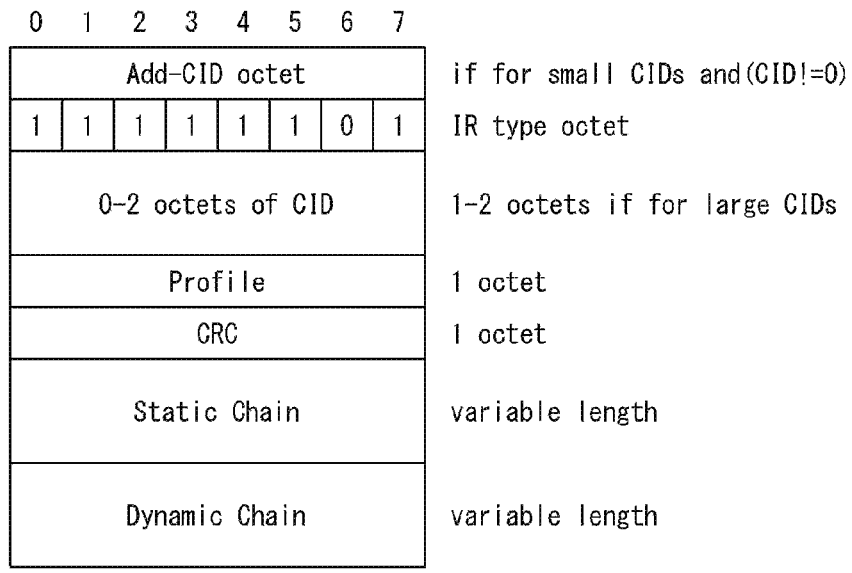
【Figure 122】
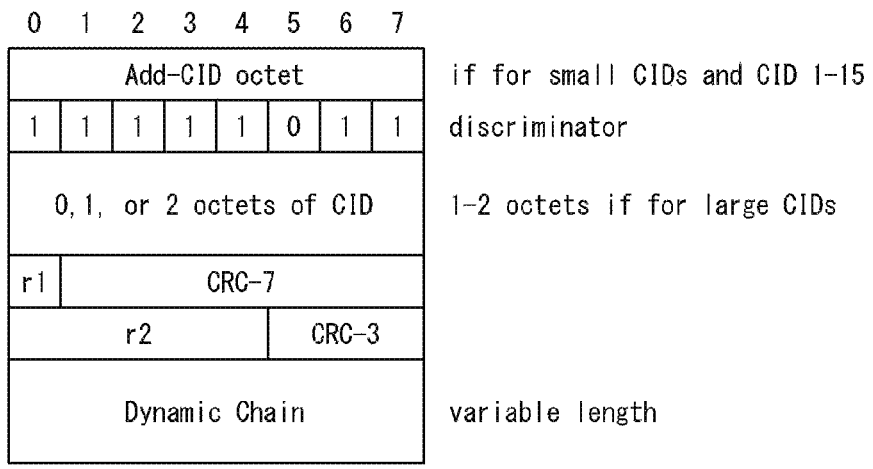

[Figure 123]
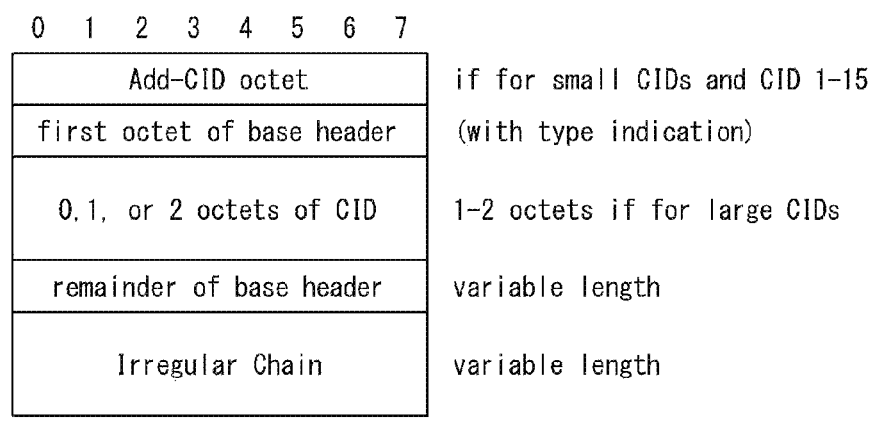

【Figure 124】
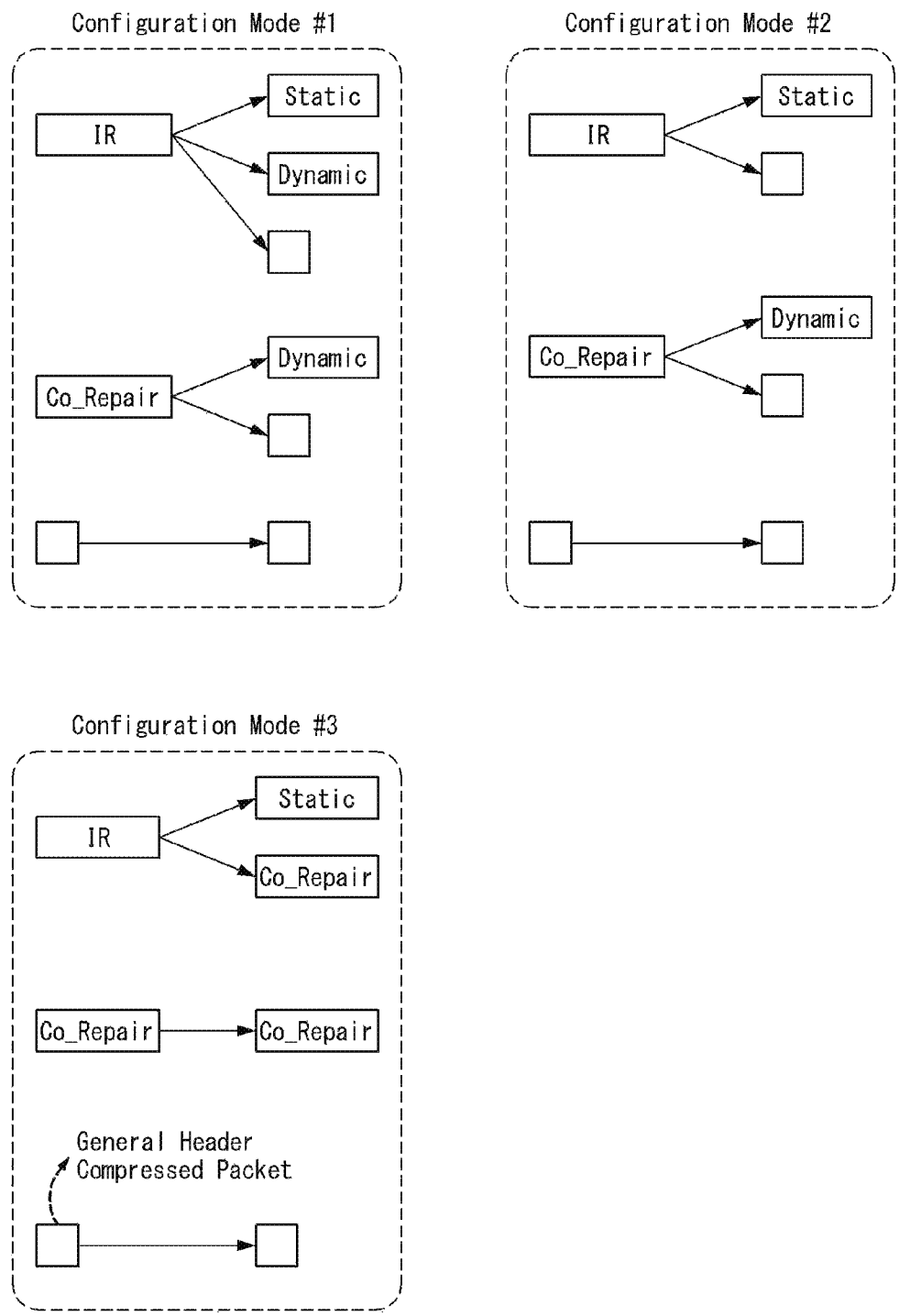

【Figure 125】
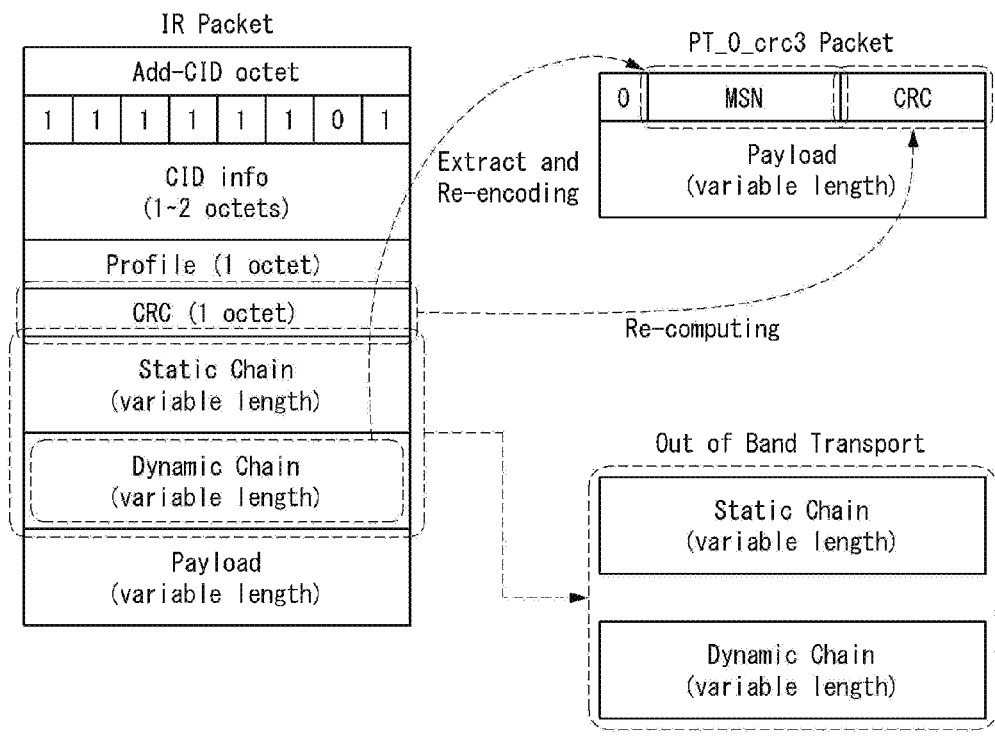
【Figure 126】
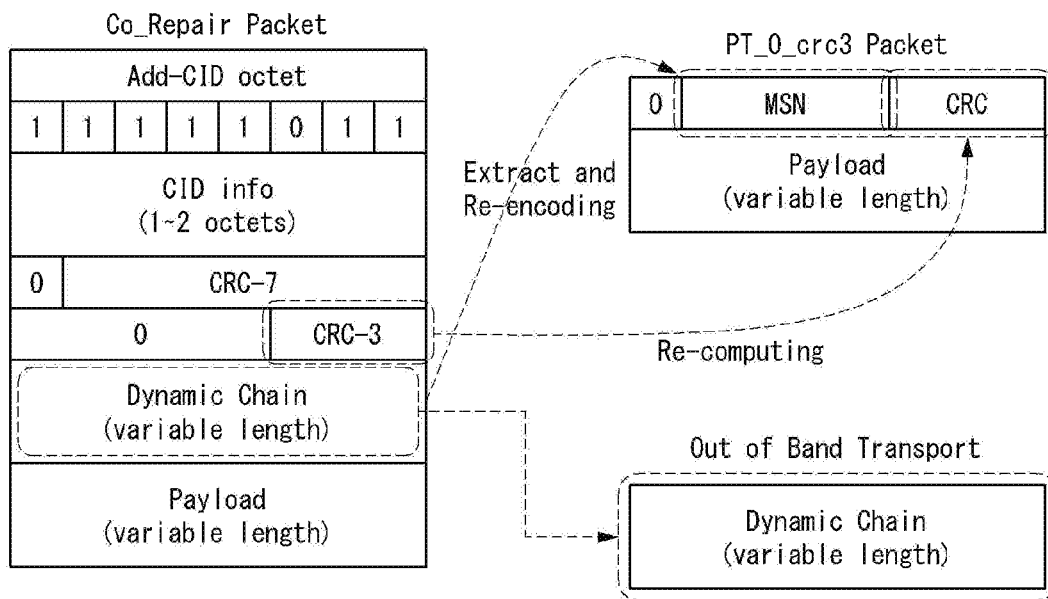

【Figure 127】
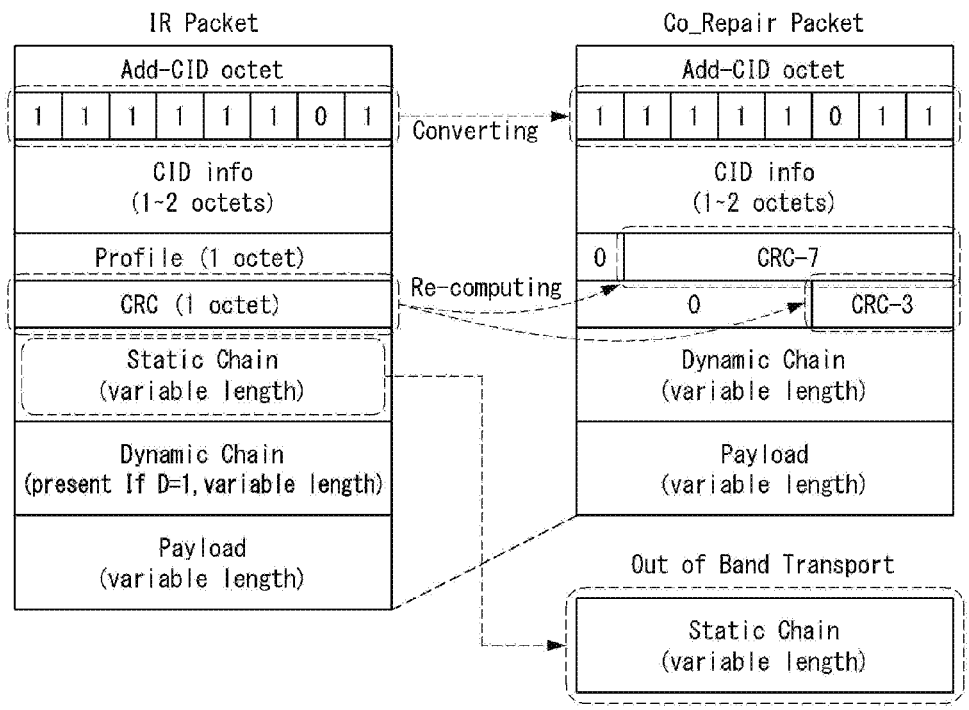
【Figure 128】
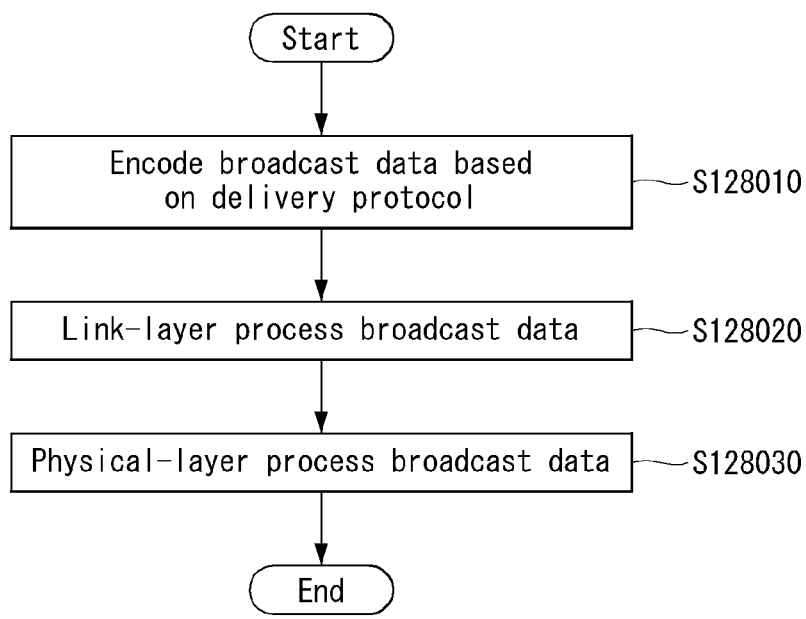

[Figure 129]
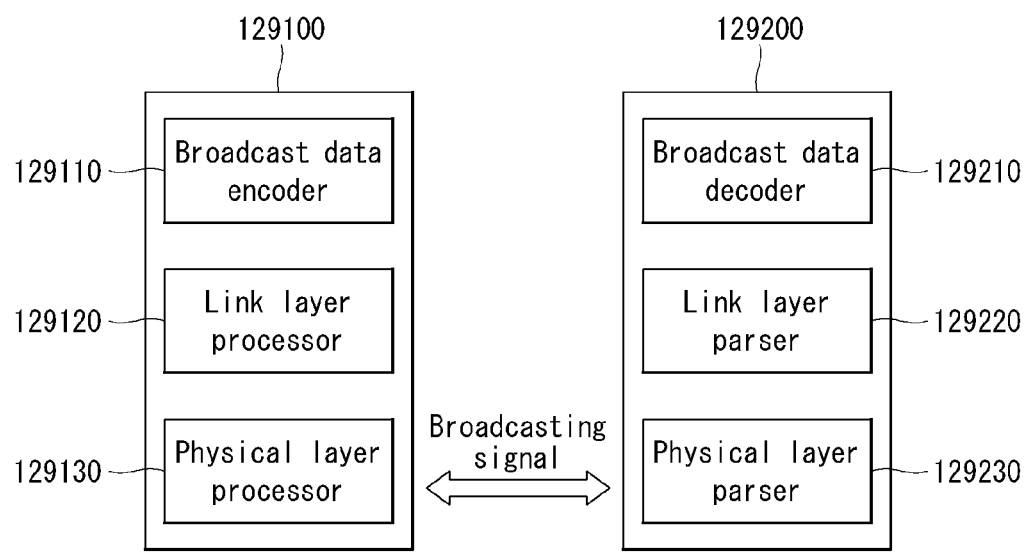

APPARATUS AND METHOD FOR TRANSMITTING AND RECEIVING BROADCAST SIGNAL

CROSS-REFERENCE TO RELATED APPLICATIONS

This application is the National Stage filing under 35 U.S.C. 371 of International Application No. PCT/KR2016/002411, filed on Mar. 10, 2016, which claims the benefit of U.S. Provisional Application No. 62/131,818, filed on Mar. 11, 2015 and 62/135,696, filed on Mar. 19, 2015, the contents of which are all hereby incorporated by reference herein in their entirety.

TECHNICAL FIELD

The present invention relates to an apparatus for transmitting a broadcast signal, an apparatus for receiving a broadcast signal, a method of transmitting a broadcast signal and a method of receiving a broadcast signal.

BACKGROUND ART

As analog broadcast signal transmission comes to the end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

A digital broadcast system can provide high definition (HD) images, multichannel audio and various additional services. However, for digital broadcast, data transmission efficiency for the transmission of a large amount of data, the robustness of transmission/reception networks and network flexibility in consideration of mobile reception equipment need to be improved.

Technical Solution

There are proposed a method of transmitting a broadcast signal and an apparatus for transmitting a broadcast signal according to embodiments of the present invention.

A method of transmitting a broadcast signal according to an embodiment of the present invention includes encoding broadcast data based on a delivery protocol, line-layer processing the broadcast data, and physical-layer processing the broadcast data. The link-layer processing the broadcast data may include compressing the header of at least one IP packet when the broadcast data includes the IP packet and encapsulating the IP packet into link layer packets.

In the method of transmitting a broadcast signal according to an embodiment of the present invention, the the IP packet header may include an RoHC processing step of reducing the size of each packet based on a robust header compression (RoHC) scheme and an adaptation processing step of extracting context information from the RoHC-processed packets.

Furthermore, in the method of transmitting a broadcast signal according to an embodiment of the present invention, the context information may be transmitted as link layer signaling information.

Furthermore, in the method of transmitting a broadcast signal according to an embodiment of the present invention, the RoHC-processed IP packet may include a first packet including a static chain and a dynamic chain, a second packet including the dynamic chain, and a compressed third packet. The static chain may include static subheader information. The dynamic chain may include dynamic subheader information.

Furthermore, in the method of transmitting a broadcast signal according to an embodiment of the present invention, the adaptation processing step may include converting the first packet into the third packet by extracting the static chain and the dynamic chain from the first packet and converting the second packet into the third packet by extracting the dynamic chain from the second packet. The context information may include at least one of the extracted static chain information and the extracted dynamic chain information.

Furthermore, in the method of transmitting a broadcast signal according to an embodiment of the present invention, the adaptation processing step may include converting the first packet into the second packet by extracting the static chain from the first packet. The context information may include the extracted static chain information.

Furthermore, in the method of transmitting a broadcast signal according to an embodiment of the present invention, the first packet may correspond to an initiation and refresh state (IR) packet, and the second packet may correspond to a co-repair packet.

An apparatus for transmitting a broadcast signal according to an embodiment of the present invention includes a broadcast data encoder configured to encode broadcast data based on a delivery protocol, a link layer processor configured to line-layer process the broadcast data, and a physical layer processor configured to physical-layer process the broadcast data. The link layer processor may include an IP packet header compression unit configured to compress the header of at least one IP packet when the broadcast data includes the IP packet and an encapsulation unit configured to encapsulate the IP packet into link layer packets.

Furthermore, in the apparatus for transmitting a broadcast signal according to an embodiment of the present invention, the IP packet header compression unit may include an RoHC unit configured to reduce the size of each packet based on a robust header compression (RoHC) scheme and an adaptation unit configured to extract context information from the RoHC-processed packets.

Furthermore, in the apparatus for transmitting a broadcast signal according to an embodiment of the present invention, the context information may be transmitted as link layer signaling information.

Furthermore, in the apparatus for transmitting a broadcast signal according to an embodiment of the present invention, the RoHC-processed IP packet may include a first packet including a static chain and a dynamic chain, a second packet including the dynamic chain, and a compressed third packet. The static chain may include static subheader information. The dynamic chain may include dynamic subheader information.

Furthermore, in the apparatus for transmitting a broadcast signal according to an embodiment of the present invention, the adaptation unit may convert the first packet into the third packet by extracting the static chain and the dynamic chain from the first packet and convert the second packet into the third packet by extracting the dynamic chain from the second packet. The context information may include at least one of the extracted static chain information and the extracted dynamic chain information.

Furthermore, in the apparatus for transmitting a broadcast signal according to an embodiment of the present invention, the adaptation unit may convert the first packet into the second packet by extracting the static chain from the first packet, and the context information may include the extracted static chain information.

Furthermore, in the apparatus for transmitting a broadcast signal according to an embodiment of the present invention, the first packet may correspond to an initiation and refresh state (IR) packet, and the second packet may correspond to a co-repair packet.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

Hereinafter, additional effects of the present invention will be described along with the configuration of the present invention.

DESCRIPTION OF DRAWINGS

FIG. 1 illustrates a receiver protocol stack according to an embodiment of the present invention;

FIG. 2 illustrates a relation between an SLT and service layer signaling (SLS) according to an embodiment of the present invention;

FIG. 3 illustrates an SLT according to an embodiment of the present invention;

FIG. 4 illustrates SLS bootstrapping and a service discovery process according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 8 illustrates a link layer protocol architecture according to an embodiment of the present invention;

FIG. 9 illustrates a structure of a base header of a link layer packet according to an embodiment of the present invention;

FIG. 10 illustrates a structure of an additional header of a link layer packet according to an embodiment of the present invention;

FIG. 11 illustrates a structure of an additional header of a link layer packet according to another embodiment of the present invention;

FIG. 12 illustrates a header structure of a link layer packet for an MPEG-2 TS packet and an encapsulation process thereof according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 15 illustrates a structure of a link layer on a transmitter side according to an embodiment of the present invention;

FIG. 16 illustrates a structure of a link layer on a receiver side according to an embodiment of the present invention;

FIG. 17 illustrates a configuration of signaling transmission through a link layer according to an embodiment of the present invention (transmitting/receiving sides);

FIG. 18 is a block diagram illustrating a configuration of a broadcast signal transmission apparatus for future broadcast services according to an embodiment of the present invention;

FIG. 19 is a block diagram illustrating a bit interleaved coding & modulation (BICM) block according to an embodiment of the present invention;

FIG. 20 is a block diagram illustrating a BICM block according to another embodiment of the present invention;

FIG. 21 illustrates a bit interleaving process of physical layer signaling (PLS) according to an embodiment of the present invention;

FIG. 22 is a block diagram illustrating a configuration of a broadcast signal reception apparatus for future broadcast services according to an embodiment of the present invention;

FIG. 23 illustrates a signaling hierarchy structure of a frame according to an embodiment of the present invention;

FIG. 24 is a table illustrating PLS1 data according to an embodiment of the present invention;

FIG. 25 is a table illustrating PLS2 data according to an embodiment of the present invention;

FIG. 26 is a table illustrating PLS2 data according to another embodiment of the present invention;

FIG. 27 illustrates a logical structure of a frame according to an embodiment of the present invention;

FIG. 28 illustrates PLS mapping according to an embodiment of the present invention;

FIG. 29 illustrates time interleaving according to an embodiment of the present invention;

FIG. 30 illustrates a basic operation of a twisted row-column block interleaver according to an embodiment of the present invention;

FIG. 31 illustrates an operation of a twisted row-column block interleaver according to another embodiment of the present invention;

FIG. 32 is a block diagram illustrating an interleaving address generator including a main pseudo-random binary sequence (PRBS) generator and a sub-PRBS generator according to each FFT mode according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 39 is a block diagram including a first example of a structure of a hybrid time deinterleaver;

FIG. 40 is a block diagram including a second example of the structure of the hybrid time deinterleaver;

FIG. 41 is a view showing a protocol stack for a next generation broadcasting system according to an embodiment of the present invention.

FIG. 42 is a conceptual diagram illustrating an interface of a link layer according to an embodiment of the present invention.

FIG. 43 illustrates an operation in a normal mode corresponding to one of operation modes of a link layer according to an embodiment of the present invention.

FIG. 44 illustrates an operation in a transparent mode corresponding to one of operation modes of a link layer according to an embodiment of the present invention.

FIG. 45 illustrates a configuration of a link layer at a transmitter according to an embodiment of the present invention (normal mode).

FIG. 46 illustrates a configuration of a link layer at a receiver according to an embodiment of the present invention (normal mode).

FIG. 47 is a diagram illustrating definition according to link layer organization type according to an embodiment of the present invention.

FIG. 48 is a diagram illustrating processing of a broadcast signal when a logical data path includes only a normal data pipe according to an embodiment of the present invention.

FIG. 49 is a diagram illustrating processing of a broadcast signal when a logical data path includes a normal data pipe and a base data pipe according to an embodiment of the present invention.

FIG. 50 is a diagram illustrating processing of a broadcast signal when a logical data path includes a normal data pipe and a dedicated channel according to an embodiment of the present invention.

FIG. 51 is a diagram illustrating processing of a broadcast signal when a logical data path includes a normal data pipe, a base data pipe, and a dedicated channel according to an embodiment of the present invention.

FIG. 52 is a diagram illustrating a detailed processing operation of a signal and/or data in a link layer of a receiver when a logical data path includes a normal data pipe, a base data pipe, and a dedicated channel according to an embodiment of the present invention.

FIG. 53 is a diagram illustrating syntax of a fast information channel (FIC) according to an embodiment of the present invention.

FIG. 54 is a diagram illustrating syntax of an emergency alert table (EAT) according to an embodiment of the present invention.

FIG. 55 is a diagram illustrating a packet transmitted to a data pipe according to an embodiment of the present invention.

FIG. 56 is a diagram illustrating a detailed processing operation of a signal and/or data in each protocol stack of a transmitter when a logical data path of a physical layer includes a dedicated channel, a base DP, and a normal data DP, according to another embodiment of the present invention.

FIG. 57 is a diagram illustrating a detailed processing operation of a signal and/or data in each protocol stack of a receiver when a logical data path of a physical layer includes a dedicated channel, a base DP, and a normal data DP, according to another embodiment of the present invention.

FIG. 58 is a diagram illustrating the syntax of an FIC according to another embodiment of the present invention.

FIG. 59 is a diagram illustrating signaling_Information_Part( ) according to an embodiment of the present invention.

FIG. 60 is a diagram illustrating a procedure for controlling an operation mode of a transmitter and/or a receiver in a link layer according to an embodiment of the present invention.

FIG. 61 is a diagram illustrating an operation in a link layer according to a value of a flag and a type of a packet transmitted to a physical layer according to an embodiment of the present invention.

FIG. 62 is a diagram a descriptor for signaling a mode control parameter according to an embodiment of the present invention.

FIG. 63 is a diagram illustrating an operation of a transmitter for controlling a operation mode according to an embodiment of the present invention.

FIG. 64 is a diagram illustrating an operation of a receiver for processing a broadcast signal according to an operation mode according to an embodiment of the present invention.

FIG. 65 is a diagram illustrating information for identifying an encapsulation mode according to an embodiment of the present invention.

FIG. 66 is a diagram illustrating information for identifying a header compression mode according to an embodiment of the present invention.

FIG. 67 is a diagram illustrating information for identifying a packet reconfiguration mode according to an embodiment of the present invention.

FIG. 68 is a diagram illustrating a context transmission mode according to an embodiment of the present invention.

FIG. 69 is a diagram illustrating initialization information when RoHC is applied by a header compression scheme according to an embodiment of the present invention.

FIG. 70 is a diagram illustrating information for identifying link layer signaling path configuration according to an embodiment of the present invention.

FIG. 71 is a diagram illustrating information about signaling path configuration by a bit mapping scheme according to an embodiment of the present invention.

FIG. 72 is a flowchart illustrating a link layer initialization procedure according to an embodiment of the present invention.

FIG. 73 is a flowchart illustrating a link layer initialization procedure according to another embodiment of the present invention.

FIG. 74 is a diagram illustrating a signaling format for transmitting an initialization parameter according to an embodiment of the present invention.

FIG. 75 is a diagram illustrating a signaling format for transmitting an initialization parameter according to another embodiment of the present invention.

FIG. 76 is a diagram illustrating a signaling format for transmitting an initialization parameter according to another embodiment of the present invention.

FIG. 77 is a diagram illustrating a receiver according to an embodiment of the present invention.

FIG. 78 is a diagram illustrating a layer structure when a dedicated channel is present according to an embodiment of the present invention.

FIG. 79 is a diagram illustrating a layer structure when a dedicated channel is present according to another embodiment of the present invention.

FIG. 80 is a diagram illustrating a layer structure when a dedicated channel is independently present according to an embodiment of the present invention.

FIG. 81 is a diagram illustrating a layer structure when a dedicated channel is independently present according to another embodiment of the present invention.

FIG. 82 is a diagram illustrating a layer structure when a dedicated channel transmits specific data according to an embodiment of the present invention.

FIG. 83 is a diagram illustrating a format of (or a dedicated format) of data transmitted through a dedicated channel according to an embodiment of the present invention.

FIG. 84 is a diagram illustrating configuration information of a dedicated channel for signaling information about a dedicated channel according to an embodiment of the present invention.

FIG. 85 shows a transmitter-side link layer structure and a method of transmitting signaling information according to an embodiment of the present invention.

FIG. 86 shows a receiver-side link layer structure and a method of receiving signaling information according to an embodiment of the present invention.

FIG. 87 shows the transmission path of signaling information according to an embodiment of the present invention.

FIG. 88 shows the transmission path of an FIT according to an embodiment of the present invention.

FIG. 89 shows the syntax of an FIT according to an embodiment of the present invention.

FIG. 90 shows FIT information according to an embodiment of the present invention.

FIG. 91 shows service category information according to an embodiment of the present invention.

FIG. 92 shows a broadcast signaling location descriptor according to an embodiment of the present invention.

FIG. 93 is a view showing the structure of a Robust Header Compression (RoHC) packet and an uncompressed Internet Protocol (IP) packet according to an embodiment of the present invention.

FIG. 94 is a view showing a concept of an RoHC packet stream according to an embodiment of the present invention.

FIG. 95 is a view showing a context information propagation procedure during transport of an RoHC packet stream according to an embodiment of the present invention.

FIG. 96 is a view showing a transmitting and receiving system of an IP stream, to which an IP header compression scheme according to an embodiment of the present invention is applied.

FIG. 97 is a view showing an IP overhead reduction procedure in a transmitter/receiver according to an embodiment of the present invention.

FIG. 98 is a view showing a procedure of reconfiguring an RoHC packet to configure a new packet stream according to an embodiment of the present invention.

FIG. 99 is a view showing a procedure of converting an IR packet into a general header compressed packet in a procedure of reconfiguring an RoHC packet to configure a new packet stream according to an embodiment of the present invention.

FIG. 100 is a view showing a procedure of converting an IR-DYN packet into a general header compressed packet in a procedure of reconfiguring an RoHC packet to configure a new packet stream according to an embodiment of the present invention.

FIG. 101 is a view showing a procedure of converting an IR packet into an IR-DYN packet in a procedure of reconfiguring an RoHC packet to configure a new packet stream according to an embodiment of the present invention.

FIG. 102 is a view showing a configuration and recovery procedure of an RoHC packet stream in a first configuration mode (Configuration Mode #1) according to an embodiment of the present invention.

FIG. 103 is a view showing a configuration and recovery procedure of an RoHC packet stream in a second configuration mode (Configuration Mode #2) according to an embodiment of the present invention.

FIG. 104 is a view showing a configuration and recovery procedure of an RoHC packet stream in a third configuration mode (Configuration Mode #3) according to an embodiment of the present invention.

FIG. 105 is a view showing a combination of information that can be delivered through Out of Band according to an embodiment of the present invention.

FIG. 106 is a view showing configuration of a descriptor including a static chain according to an embodiment of the present invention.

FIG. 107 is a view showing configuration of a descriptor including a dynamic chain according to an embodiment of the present invention.

FIG. 108 is a view showing configuration of a packet format including a static chain and a packet format including a dynamic chain according to an embodiment of the present invention.

FIG. 109 is a diagram illustrating configuration of ROHC_init_descriptor( ) according to an embodiment of the present invention.

FIG. 110 is a diagram illustrating configuration of Fast_Information_Chunk( ) including ROHC_init_descriptor( ) according to an embodiment of the present invention.

FIG. 111 is a diagram illustrating configuration of Fast_Information_Chunk( ) including a parameter required for a RoHC initial procedure according to an embodiment of the present invention.

FIG. 112 is a diagram illustrating configuration of Fast_Information_Chunk( ) including ROHC_init_descriptor( ) according to another embodiment of the present invention.

FIG. 113 is a diagram illustrating configuration of Fast_Information_Chunk( ) including a parameter required for a RoHC initial procedure according to another embodiment of the present invention.

FIG. 114 illustrates a configuration of a header of a packet for signaling according to an embodiment of the present invention FIG. 115 is a chart that defines the signaling class field according to the present embodiment.

FIG. 116 is a chart that defines an information type.

FIG. 117 is a diagram illustrating a structure of Payload_for_Initialization( ) according to an embodiment of the present invention when an information type for header compression has a value of "000."

FIG. 118 is a diagram illustrating a structure of Payload_for_ROHC_configuration( ) when the information type for header compression has a value of "001."

FIG. 119 is a diagram illustrating a structure of Payload_for_static_chain( ) when the information type for header compression has a value of "010."

FIG. 120 is a diagram illustrating a structure of Payload_for_dynamic_chain( ) when the information type for header compression has a value of "011."

FIG. 121 shows the header format of an IR packet of an RoHCv2 profile according to an embodiment of the present invention.

FIG. 122 shows the header format of a CO-repair packet of the RoHCv2 profile according to an embodiment of the present invention.

FIG. 123 shows a compressed header format of the RoHCv2 profile according to an embodiment of the present invention.

FIG. 124 shows a method of generating a new packet stream by reconfiguring an RoHC packet according to an embodiment of the present invention.

FIG. 125 shows a process of transforming an IR packet into a general header-compressed packet or PT_0_crc3_Packet in the process of configuring a new packet stream by reconfiguring an RoHC packet according to an embodiment of the present invention.

FIG. 126 is a diagram showing a process of transforming a Co_Repair packet into a general header-compressed packet PT_0_crc3_Packet in the process of configuring a new packet stream by reconfiguring an RoHC packet according to an embodiment of the present invention.

FIG. 127 is a diagram showing a process of transforming an IR packet into a Co_Repair packet in the process of configuring a new packet stream by reconfiguring an RoHC packet according to an embodiment of the present invention.

FIG. 128 shows a method of transmitting a broadcast signal according to an embodiment of the present invention.

FIG. 129 shows the broadcast signal transmitter and broadcast signal receiver of a broadcast system according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be Boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltlnetSigUri and/or @sltlnetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

The LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @slpAddr, @dlpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@slpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dlpAddr can indicate destination IP address. Here, a destination IP address may be a destination IP address of a ROUTE session that delivers a service component included in a service. For a similar case to the above description of @slpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @slpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010." Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1." The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0." Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1."

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be an 8-bit field that can indicate the length of the Header Extension ( ) in bytes counting from the next byte to the last byte of the Header_Extension ( ).

Extension_Byte can be a byte representing the value of the Header_Extension ( ).

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100."

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02."

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0." If the static_chain( ) or dynamic_chain( ) byte is included in this table, this field may be set to "0x01" or "0x02" respectively. If both of the static_chain( ) and dynamic_chain( ) byte are included in this table, this field may be set to "0x03."

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, ... ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of $N_{cells}$ cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_i$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,i and g2,i) is transmitted by the same carrier k and OFDM symbol l of respective TX antennas thereof.

The above-described blocks may be omitted or replaced by blocks having similar or identical functions.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc} = [I_{ldpc} P_{ldpc}] = [i_0, i_1, \ldots i_{K\_ldpc-1}, p_0, p_1, \ldots, p_{N\_ldpc-K\_ldpc-1}] \quad \text{[Equation 1]}$$

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

FIG. 21 illustrates a bit interleaving process of PLS according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FEC}$ addition with cyclic shifting value floor($N_{FEC}/2$), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(*a*). As shown in FIG. 23(*a*), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast futurecast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|-------|----------|
| 00    | 8K FFT   |
| 01    | 16K FFT  |

TABLE 1-continued

| Value | FFT size |
|---|---|
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
| --- | --- |
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
| --- | --- |
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
| --- | --- |
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
| --- | --- |
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
| --- | --- |
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}=1$). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_I=1$). Allowed values of $P_I$ with the 2-bit field are defined in the following Table 12.

TABLE 12

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
| --- | --- |
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAY-LOAD_TYPE is TS | If DP_PAY-LOAD_TYPE is IP | If DP_PAY-LOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY profile | DP_START field size | |
|---|---|---|
| | 64K | 16K |
| Base | 13 bits | 15 bits |
| Handheld | — | 13 bits |
| Advanced | 13 bits | its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE.

If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for further use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch}$ - $K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch}$ - $K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |

TABLE 23-continued

| LDPC rate | $N_{ldpc}$ | $K_{ldpc}$ | $K_{bch}$ | BCH error correction capability | $N_{bch} - K_{bch}$ |
|---|---|---|---|---|---|
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc}=[I_{ldpc}P_{ldpc}]=[i_0,i_1,\ldots,i_{K\_ldpc-1},p_0,p_1,\ldots,p_{N_{ldpc}-K_{ldpc}-1}]$$ [Equation 2]

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

Initialize the parity bits $$p_0=p_1=p_2=\ldots=p_{N_{ldpc}-K_{ldpc}-1}=0$$ [Equation 3]

2) Accumulate a first information bit—$i_0$, at a parity bit address specified in a first row of addresses of a parity check matrix. Details of the addresses of the parity check matrix will be described later. For example, for the rate of 13/15, $$p_{983} = p_{983} \oplus i_0 \quad p_{2815} = p_{2815} \oplus i_0$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

[Equation 4]

3) For the next 359 information bits, $i_s$, s=1, 2, ..., 359, accumulate $i_s$ at parity bit addresses using following Equation.

$$\{x+(s \bmod 360) \times Q_{ldpc}\} \bmod (N_{ldpc}-K_{ldpc})$$ [Equation 5]

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}=24$ for the rate of 13/15, so for an information bit $i_1$, the following operations are performed.

$$p_{1007} = p_{1007} \oplus i_1 \quad p_{2839} = p_{2839} \oplus i_1$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

[Equation 6]

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, ..., 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i=p_i \oplus p_{i-1}, i=1,2,\ldots,N_{ldpc}-K_{ldpc}-1$$ [Equation 7]

Here, final content of $p_i, i=0, 1, \ldots, N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}$ (i=0, . . . $N_rN_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

[Equation 8]
$$\text{GENERATE}(R_{n,s,i}, C_{n,s,i}) = \{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{1}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

$$\text{for} \begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases} \quad \text{[Equation 9]}$$

$$S_{shift} = \frac{N'_{xBLOCK\_TI\_MAX} - 1}{2}$$

As a result, cell positions to be read are calculated by coordinates $z_{n,s,i}=N_r C_{n,s,i}+R_{n\ s,i}$.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]
```
p = 0;
for i = 0; i < N_cells N_xBLOCK_TI_MAX; i = i + 1
{GENERATE (R_n,s,i, C_n,s,i);
V_i = N_r C_n,s,i + R_n,s,i
    if V_i < N_cells N_xBLOCK_TI(n,s)
    {
        Z_n,s,p = V_i; p = p + 1;
    }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

FIG. 32 illustrates an interleaving address generator including a main pseudo-random binary sequence (PRBS) generator and a sub-PRBS generator according to each FFT mode according to an embodiment of the present invention.

shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,N_{data}-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,N_{data}-1}]$ for $l=0, \ldots, N_{sym}-1$.

For the OFDM symbol pair, the interleaved OFDM symbol pair is given by $v_{m,l,H_i(p)}=x_{m,l,p}$, $p=0, \ldots N_{data}-1$, for the first OFDM symbol of each pair $v_{m,l,p}=x_{m,l,H_i(p)}$, $p=0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

FIG. 33(a) illustrates the main PRBS, and FIG. 33(b) illustrates a parameter Nmax for each FFT mode.

FIG. 34 illustrates a sub-PRBS used for FFT modes and an interleaving address for frequency interleaving according to an embodiment of the present invention.

FIG. 34(a) illustrates a sub-PRBS generator, and FIG. 34(b) illustrates an interleaving address for frequency interleaving. A cyclic shift value according to an embodiment of the present invention may be referred to as a symbol offset.

Figure 35:
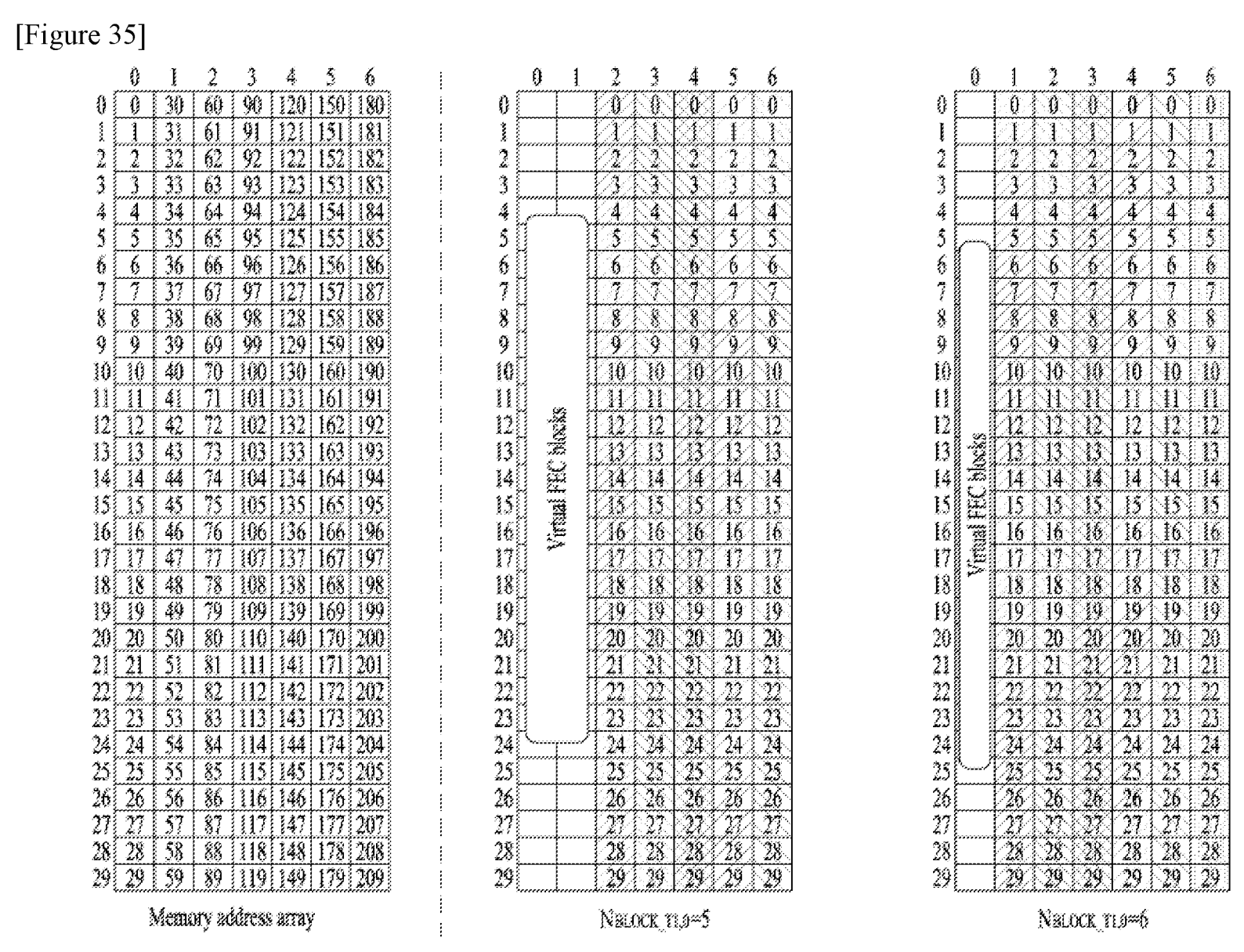

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

In the following specification, a method of transmitting/receiving content data and a signaling method in a broadcast system are described. Specifically, processing of a signal prior to the processing of a physical layer signal is described in more detail.

In this specification, a fast information table (FIT) may also be called link layer signaling (LLS) or low level signaling (LLS). In this specification, all of the field/elements included in each table may not be included and may be selectively included.

FIG. 41 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based A/V and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for NV, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for NV, etc.

Transport through a broadband network may be divided into transport of a content and transport of signaling data.

Transport of the content includes transport of a linear content (NV and data (closed caption, emergency alert message, etc.)), transport of a non-linear content (ESG, non-timed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

In a hybrid-based broadcast system of a TS and an IP stream, a link layer may be used to transmit data having a TS or IP stream type. When various types of data are to be transmitted through a physical layer, the link layer may convert the data into a format supported by the physical layer and deliver the converted data to the physical layer. In this way, the various types of data may be transmitted through the same physical layer. Here, the physical layer may correspond to a step of transmitting data using an MIMO/MISO scheme or the like by interleaving, multiplexing, and/or modulating the data.

The link layer needs to be designed such that an influence on an operation of the link layer is minimized even when a configuration of the physical layer is changed. In other words, the operation of the link layer needs to be configured such that the operation may be compatible with various physical layers.

The present invention proposes a link layer capable of independently operating irrespective of types of an upper layer and a lower layer. In this way, it is possible to support various upper layers and lower layers. Here, the upper layer may refer to a layer of a data stream such as a TS stream, an IP stream, or the like. Here, the lower layer may refer to the physical layer. In addition, the present invention proposes a link layer having a correctable structure in which a function supportable by the link layer may be extended/added/deleted. Moreover, the present invention proposes a scheme of including an overhead reduction function in the link layer such that radio resources may be efficiently used.

In this figure, protocols and layers such as IP, UDP, TCP, ALC/LCT, RCP/RTCP, HTTP, FLUTE, and the like are as described above.

In this figure, a link layer t88010 may be another example of the above-described data link (encapsulation) part. The present invention proposes a configuration and/or an operation of the link layer t88010. The link layer t88010 proposed by the present invention may process signaling necessary for operations of the link layer and/or the physical layer. In addition, the link layer t88010 proposed by the present invention may encapsulate TS and IP packets and the like, and perform overhead reduction in this process.

The link layer t88010 proposed by the present invention may be referred to by several terms such as data link layer, encapsulation layer, layer 2, and the like. According to a given embodiment, a new term may be applied to the link layer and used.

FIG. 42 is a conceptual diagram illustrating an interface of a link layer according to an embodiment of the present invention.

Referring to FIG. 42, the transmitter may consider an exemplary case in which IP packets and/or MPEG-2 TS packets mainly used in the digital broadcasting are used as input signals. The transmitter may also support a packet structure of a new protocol capable of being used in the next generation broadcast system. The encapsulated data of the link layer and signaling information may be transmitted to a physical layer. The transmitter may process the transmitted data (including signaling data) according to the protocol of a physical layer supported by the broadcast system, such that the transmitter may transmit a signal including the corresponding data.

On the other hand, the receiver may recover data and signaling information received from the physical layer into other data capable of being processed in a upper layer. The receiver may read a header of the packet, and may determine whether a packet received from the physical layer indicates signaling information (or signaling data) or recognition data (or content data).

The signaling information (i.e., signaling data) received from the link layer of the transmitter may include first signaling information that is received from an upper layer and needs to be transmitted to an upper layer of the receiver; second signaling information that is generated from the link layer and provides information regarding data processing in the link layer of the receiver; and/or third signaling information that is generated from the upper layer or the link layer and is transferred to quickly detect specific data (e.g., service, content, and/or signaling data) in a physical layer.

FIG. 43 illustrates an operation in a normal mode corresponding to one of operation modes of a link layer according to an embodiment of the present invention.

The link layer proposed by the present invention may have various operation modes for compatibility between an upper layer and a lower layer. The present invention proposes a normal mode and a transparent mode of the link layer. Both the operation modes may coexist in the link layer, and an operation mode to be used may be designated using signaling or a system parameter. According to a given embodiment, one of the two operation modes may be implemented. Different modes may be applied according to an IP layer, a TS layer, and the like input to the link layer. In addition, different modes may be applied for each stream of the IP layer and for each stream of the TS layer.

According to a given embodiment, a new operation mode may be added to the link layer. The new operation mode may be added based on configurations of the upper layer and the lower layer. The new operation mode may include different interfaces based on the configurations of the upper layer and the lower layer. Whether to use the new operation mode may be designated using signaling or a system parameter.

In the normal mode, data may be processed through all functions supported by the link layer, and then delivered to a physical layer.

First, each packet may be delivered to the link layer from an IP layer, an MPEG-2 TS layer, or another particular layer t89010. In other words, an IP packet may be delivered to the link layer from an IP layer. Similarly, an MPEG-2 TS packet may be delivered to the link layer from the MPEG-2 TS layer, and a particular packet may be delivered to the link layer from a particular protocol layer.

Each of the delivered packets may go through or not go through an overhead reduction process t89020, and then go through an encapsulation process t89030.

First, the IP packet may go through or not go through the overhead reduction process t89020, and then go through the encapsulation process t89030. Whether the overhead reduction process t89020 is performed may be designated by signaling or a system parameter. According to a given embodiment, the overhead reduction process t89020 may be performed or not performed for each IP stream. An encapsulated IP packet may be delivered to the physical layer.

Second, the MPEG-2 TS packet may go through the overhead reduction process t89020, and go through the encapsulation process t89030. The MPEG-2 TS packet may not be subjected to the overhead reduction process t89020 according to a given embodiment. However, in general, a TS packet has sync bytes (0x47) and the like at the front and thus it may be efficient to eliminate such fixed overhead. The encapsulated TS packet may be delivered to the physical layer.

Third, a packet other than the IP or TS packet may or may not go through the overhead reduction process t89020, and then go through the encapsulation process t89030. Whether or not the overhead reduction process t89020 is performed may be determined according to characteristics of the corresponding packet. Whether the overhead reduction process t89020 is performed may be designated by signaling or a system parameter. The encapsulated packet may be delivered to the physical layer.

In the overhead reduction process t89020, a size of an input packet may be reduced through an appropriate scheme. In the overhead reduction process t89020, particular information may be extracted from the input packet or generated. The particular information is information related to signaling, and may be transmitted through a signaling region. The signaling information enables a receiver to restore an original packet by restoring changes due to the overhead reduction process t89020. The signaling information may be delivered to a link layer signaling process t89050.

The link layer signaling process t89050 may transmit and manage the signaling information extracted/generated in the overhead reduction process t89020. The physical layer may have physically/logically divided transmission paths for signaling, and the link layer signaling process t89050 may deliver the signaling information to the physical layer according to the divided transmission paths. Here, the above-described FIC signaling process t89060, EAS signaling process t89070, or the like may be included in the divided transmission paths. Signaling information not transmitted through the divided transmission paths may be delivered to the physical layer through the encapsulation process t89030.

Signaling information managed by the link layer signaling process t89050 may include signaling information delivered from the upper layer, signaling information generated in the link layer, a system parameter, and the like. Specifically, the signaling information may include signaling information delivered from the upper layer to be subsequently delivered to an upper layer of the receiver, signaling information generated in the link layer to be used for an operation of a link layer of the receiver, signaling information generated in the upper layer or the link layer to be used for rapid detection in a physical layer of the receiver, and the like.

Data going through the encapsulation process t89030 and delivered to the physical layer may be transmitted through a data pipe (DP) t89040. Here, the DP may be a physical layer pipe (PLP). Signaling information delivered through the above-described divided transmission paths may be delivered through respective transmission paths. For example, an FIC signal may be transmitted through an FIC t89080 designated in a physical frame. In addition, an EAS signal may be transmitted through an EAC t89090 designated in a physical frame. Information about presence of a dedicated channel such as the FIC, the EAC, or the like may be transmitted to a preamble area of the physical layer through signaling, or signaled by scrambling a preamble using a particular scrambling sequence. According to a given embodiment, FIC signaling/EAS signaling information may be transmitted through a general DP area, PLS area, or preamble rather than a designated dedicated channel.

The receiver may receive data and signaling information through the physical layer. The receiver may restore the received data and signaling information into a form processable in the upper layer, and deliver the restored data and signaling information to the upper layer. This process may be performed in the link layer of the receiver. The receiver may verify whether a received packet is related to the signaling information or the data by reading a header of the packet and the like. In addition, when overhead reduction is performed at a transmitter, the receiver may restore a packet, overhead of which has been reduced through the overhead reduction process, to an original packet. In this process, the received signaling information may be used.

FIG. 44 illustrates an operation in a transparent mode corresponding to one of operation modes of a link layer according to an embodiment of the present invention.

In the transparent mode, data may not be subjected to functions supported by the link layer or may be subjected to some of the functions, and then delivered to a physical layer. In other words, in the transparent mode, a packet delivered to an upper layer may be delivered to a physical layer without going through a separate overhead reduction and/or encapsulation process. Other packets may go through the overhead reduction and/or encapsulation process as necessary. The transparent mode may be referred to as a bypass mode, and another term may be applied to the transparent mode.

According to a given embodiment, some packets may be processed in the normal mode and some packets may be processed in the transparent mode based on characteristics of the packets and a system operation.

A packet to which the transparent mode may be applied may be a packet having a type well known to a system. When the packet may be processed in the physical layer, the transparent mode may be used. For example, a well-known TS or IP packet may go through separate overhead reduction and input formatting processes in the physical layer and thus the transparent mode may be used in a link layer step. When the transparent mode is applied and a packet is processed through input formatting and the like in the physical layer, an operation such as the above-described TS header compression may be performed in the physical layer. On the other hand, when the normal mode is applied, a processed link layer packet may be treated as a GS packet and processed in the physical layer.

In the transparent mode, a link layer signaling module may be included when signal transmission needs to be supported. As described above, the link layer signaling module may transmit and manage signaling information. The signaling information may be encapsulated and transmitted through a DP, and FIC signaling information and EAS signaling information having divided transmission paths may be transmitted through an FIC and an EAC, respectively.

In the transparent mode, whether information corresponds to signaling information may be displayed using a fixed IP address and port number. In this case, the signaling information may be filtered to configure a link layer packet, and then transmitted through the physical layer.

FIG. 45 illustrates a configuration of a link layer at a transmitter according to an embodiment of the present invention (normal mode).

The present embodiment is an embodiment presuming that an IP packet is processed. The link layer at the transmitter may largely include a link layer signaling part for processing signaling information, an overhead reduction part, and/or an encapsulation part from a functional perspective. The link layer at the transmitter may further include a scheduler t91020 for a control of the entire operation of the link layer and scheduling, input and output parts of the link layer, and/or the like.

First, upper layer signaling information and/or system parameter t91010 may be delivered to the link layer. In addition, an IP stream including IP packets may be delivered to the link layer from an IP layer t91110.

As described above, the scheduler t91020 may determine and control operations of several modules included in the link layer. The delivered signaling information and/or system parameter t91010 may be filtered or used by the scheduler t91020. Information corresponding to a part of the delivered signaling information and/or system parameter t91010 and necessary for a receiver may be delivered to the link layer signaling part. In addition, information corresponding to a part of the signaling information and necessary for an operation of the link layer may be delivered to an overhead reduction control block t91120 or an encapsulation control block t91180.

The link layer signaling part may collect information to be transmitted as signaling in the physical layer, and transform/configure the information in a form suitable for transmission. The link layer signaling part may include a signaling manager t91030, a signaling formatter t91040, and/or a buffer for channels t91050.

The signaling manager t91030 may receive signaling information delivered from the scheduler t91020, signaling delivered from the overhead reduction part, and/or context information. The signaling manager t91030 may determine paths for transmission of the signaling information with respect to delivered data. The signaling information may be delivered through the paths determined by the signaling manager t91030. As described in the foregoing, signaling information to be transmitted through divided channels such as an FIC, an EAS, and the like may be delivered to the signaling formatter t91040, and other signaling information may be delivered to an encapsulation buffer t91070.

The signaling formatter t91040 may format associated signaling information in forms suitable for respective divided channels so that the signaling information may be transmitted through separately divided channels. As described in the foregoing, the physical layer may include physically/logically divided separate channels. The divided channels may be used to transmit FIC signaling information or EAS-related information. The FIC or EAS-related information may be divided by the signaling manager t91030 and input to the signaling formatter t91040. The signaling formatter t91040 may format information such that the information is suitable for respective separate channels. Besides the FIC and the EAS, when the physical layer is designed to transmit particular signaling information through separately divided channels, a signaling formatter for the particular signaling information may be added. Through this scheme, the link layer may be compatible with various physical layers.

The buffer for channels t91050 may deliver signaling information delivered from the signaling formatter t91040 to designated dedicated channels t91060. The number and content of the dedicated channels t91060 may vary depending on an embodiment.

As described in the foregoing, the signaling manager t91030 may deliver signaling information which is not delivered to a dedicated channel to the encapsulation buffer t91070. The encapsulation buffer t91070 may function as a buffer that receives the signaling information not delivered to the dedicated channel.

An encapsulation for signaling information t91080 may encapsulate the signaling information not delivered to the dedicated channel. A transmission buffer t91090 may function as a buffer that delivers the encapsulated signaling information to a DP for signaling information t91100. Here, the DP for signaling information t91100 may refer to the above-described PLS area.

The overhead reduction part may allow efficient transmission by eliminating overhead of packets delivered to the link layer. It is possible to configure overhead reduction parts, the number of which is the same as the number of IP streams input to the link layer.

An overhead reduction buffer t91130 may receive an IP packet delivered from an upper layer. The delivered IP packet may be input to the overhead reduction part through the overhead reduction buffer t91130.

An overhead reduction control block t91120 may determine whether to perform overhead reduction on a packet stream input to the overhead reduction buffer t91130. The overhead reduction control block t91120 may determine whether to perform overhead reduction for each packet stream. When overhead reduction is performed on the packet stream, packets may be delivered to an RoHC compressor t91140 and overhead reduction may be performed. When overhead reduction is not performed on the packet stream, packets may be delivered to the encapsulation part and encapsulation may be performed without overhead reduction. Whether to perform overhead reduction on packets may be determined by signaling information t91010 delivered to the link layer. The signaling information t91010 may be delivered to the encapsulation control block t91180 by the scheduler t91020.

The RoHC compressor t91140 may perform overhead reduction on a packet stream. The RoHC compressor t91140 may compress headers of packets. Various schemes may be used for overhead reduction. Overhead reduction may be performed by schemes proposed in the present invention. The present embodiment presumes an IP stream and thus the compressor is expressed as the RoHC compressor. However, the term may be changed according to a given embodiment. In addition, an operation is not restricted to compression of an IP stream, and overhead reduction may be performed on all types of packets by the RoHC compressor t91140.

A packet stream configuration block t91150 may divide IP packets having compressed headers into information to be transmitted to a signaling region and information to be transmitted to a packet stream. The information to be transmitted to the packet stream may refer to information to be transmitted to a DP area. The information to be transmitted to the signaling region may be delivered to a signaling and/or context control block t91160. The information to be transmitted to the packet stream may be transmitted to the encapsulation part.

The signaling and/or context control block t91160 may collect signaling and/or context information and deliver the collected information to the signaling manager t91030. In this way, the signaling and/or context information may be transmitted to the signaling region.

The encapsulation part may encapsulate packets in suitable forms such that the packets may be delivered to the physical layer. The number of configured encapsulation parts may be the same as the number of IP streams.

An encapsulation buffer t91170 may receive a packet stream for encapsulation. Packets subjected to overhead reduction may be received when overhead reduction is performed, and an input IP packet may be received without change when overhead reduction is not performed.

An encapsulation control block t91180 may determine whether to perform encapsulation on an input packet stream. When encapsulation is performed, the packet stream may be delivered to segmentation/concatenation t91190. When encapsulation is not performed, the packet stream may be delivered to a transmission buffer t91230. Whether to perform encapsulation of packets may be determined based on the signaling information t91010 delivered to the link layer. The signaling information t91010 may be delivered to the encapsulation control block t91180 by the scheduler t91020.

In the segmentation/concatenation t91190, the above-descried segmentation or concatenation operation may be performed on packets. In other words, when an input IP packet is longer than a link layer packet corresponding to an output of the link layer, one IP packet may be divided into several segments to configure a plurality of link layer packet payloads. In addition, when the input IP packet is shorter than the link layer packet corresponding to the output of the link layer, several IP packets may be combined to configure one link layer packet payload.

A packet configuration table t91200 may have information about a configuration of segmented and/or concatenated link layer packets. A transmitter and a receiver may have the same information of the packet configuration table t91200. The transmitter and the receiver may refer to the information of the packet configuration table t91200. An index value of the information of the packet configuration table t91200 may be included in headers of the link layer packets.

A link layer header information block t91210 may collect header information generated in an encapsulation process. In addition, the link layer header information block t91210 may collect information included in the packet configuration table t91200. The link layer header information block t91210 may configure header information according to a header configuration of a link layer packet.

A header attachment block t91220 may add headers to payloads of the segmented and/or concatenated link layer packets. The transmission buffer t91230 may function as a buffer for delivering a link layer packet to a DP t91240 of the physical layer.

Each block or module and parts may be configured as one module/protocol or a plurality of modules/protocols in the link layer.

FIG. 46 illustrates a configuration of a link layer at a receiver according to an embodiment of the present invention (normal mode).

The present embodiment is an embodiment presuming that an IP packet is processed. The link layer at the receiver may largely include a link layer signaling part for processing signaling information, an overhead processing part, and/or a decapsulation part from a functional perspective. The link layer at the receiver may further include a scheduler for a control of the entire operation of the link layer and scheduling, input and output parts of the link layer, and/or the like.

First, information received through a physical layer may be delivered to the link layer. The link layer may process the information to restore the information to an original state in which the information is not yet processed by a transmitter, and deliver the information to an upper layer. In the present embodiment, the upper layer may be an IP layer.

Information delivered through dedicated channels t92030 separated from the physical layer may be delivered to the link layer signaling part. The link layer signaling part may distinguish signaling information received from the physical layer, and deliver the distinguished signaling information to each part of the link layer.

A buffer for channels t92040 may function as a buffer that receives signaling information transmitted through the dedicated channels. As described above, when physically/logically divided separate channels are present in the physical layer, it is possible to receive signaling information transmitted through the channels. When the information received from the separate channels is in a divided state, the divided information may be stored until the information is in a complete form.

A signaling decoder/parser t92050 may check a format of signaling information received through a dedicated channel, and extract information to be used in the link layer. When the signaling information received through the dedicated channel is encoded, decoding may be performed. In addition, according to a given embodiment, it is possible to check integrity of the signaling information.

A signaling manager t92060 may integrate signaling information received through several paths. Signaling information received through a DP for signaling t92070 to be described below may be integrated by the signaling manager t92060. The signaling manager t92060 may deliver signaling information necessary for each part in the link layer. For example, context information for recovery of a packet and the like may be delivered to the overhead processing part. In addition, signaling information for control may be delivered to a scheduler t92020.

General signaling information not received through a separate dedicated channel may be received through the DP for signaling t92070. Here, the DP for signaling may refer to a PLS or the like. A reception buffer t92080 may function as a buffer for receiving the signaling information received from the DP for signaling t92070. The received signaling information may be decapsulated in a decapsulation for signaling information block t92090. The decapsulated signaling information may be delivered to the signaling manager t92060 through a decapsulation buffer t92100. As described in the foregoing, the signaling manager t92060 may collect signaling information and deliver the collected signaling information to a desired part in the link layer.

The scheduler t92020 may determine and control operations of several modules included in the link layer. The scheduler t92020 may control each part of the link layer using receiver information t92010 and/or information delivered from the signaling manager t92060. In addition, the scheduler t92020 may determine an operation mode and the like of each part. Here, the receiver information t92010 may refer to information previously stored by the receiver. The scheduler t92020 may use information changed by a user such as a channel change and the like for control.

The decapsulation part may filter a packet received from a DP t92110 of the physical layer, and separate the packet based on a type of the packet. The number of configured decapsulation parts may be the same as the number of DPs that may be simultaneously decoded in the physical layer.

A decapsulation buffer t92120 may function as a buffer that receives a packet stream from the physical layer to perform decapsulation. A decapsulation control block t92130 may determine whether to decapsulate the received packet stream. When decapsulation is performed, the packet stream may be delivered to a link layer header parser t92140. When decapsulation is not performed, the packet stream may be delivered to an output buffer t92220. The signaling information delivered from the scheduler t92020 may be used to determine whether to perform decapsulation.

The link layer header parser t92140 may identify a header of a received link layer packet. When the header is identified, it is possible to identify a configuration of an IP packet included in a payload of the link layer packet. For example, the IP packet may be segmented or concatenated.

A packet configuration table t92150 may include payload information of link layer packets configured through segmentation and/or concatenation. The transmitter and the receiver may have the same information as information of the packet configuration table t92150. The transmitter and the receiver may refer to the information of the packet configuration table t92150. A value necessary for reassembly may be found based on index information included in the link layer packets.

A reassembly block t92160 may configure payloads of the link layer packets configured through segmentation and/or concatenation as packets of an original IP stream. The reassembly block t92160 may reconfigure one IP packet by collecting segments, or reconfigure a plurality of IP packet streams by separating concatenated packets. The reassembled IP packets may be delivered to the overhead processing part.

The overhead processing part may perform a reverse process of overhead reduction performed by the transmitter. In the reverse process, an operation of returning packets experiencing overhead reduction to original packets is performed. This operation may be referred to as overhead processing. The number of configured overhead processing parts may be the same as the number of DPs that may be simultaneously decoded in the physical layer.

A packet recovery buffer t92170 may function as a buffer that receives an RoHC packet or an IP packet decapsulated for overhead processing.

An overhead control block t92180 may determine whether to perform packet recovery and/or decompression of decapsulated packets. When the packet recovery and/or decompression are performed, the packets may be delivered to a packet stream recovery t92190. When the packet recovery and/or decompression are not performed, the packets may be delivered to the output buffer t92220. Whether to perform the packet recovery and/or decompression may be determined based on the signaling information delivered by the scheduler t92020.

The packet stream recovery t92190 may perform an operation of integrating a packet stream separated from the transmitter and context information of the packet stream. The operation may correspond to a process of restoring the packet stream such that the packet stream may be processed by an RoHC decompressor t92210. In this process, signaling information and/or context information may be delivered from a signaling and/or context control block t92200. The signaling and/or context control block t92200 may distinguish signaling information delivered from the transmitter and deliver the signaling information to the packet stream recovery t92190 such that the signaling information may be mapped to a stream suitable for a context ID.

The RoHC decompressor t92210 may recover headers of packets of a packet stream. When the headers are recovered, the packets of the packet stream may be restored to original IP packets. In other words, the RoHC decompressor t92210 may perform overhead processing.

The output buffer t92220 may function as a buffer before delivering an output stream to an IP layer t92230.

The link layer of the transmitter and the receiver proposed in the present invention may include the blocks or modules described above. In this way, the link layer may independently operate irrespective of the upper layer and the lower layer, and efficiently perform overhead reduction. In addition, a function which is supportable depending on the upper and lower layers may be easily extended/added/deleted.

FIG. 47 is a diagram illustrating definition according to link layer organization type according to an embodiment of the present invention.

When a link layer is actually embodied as a protocol layer, a broadcast service can be transmitted and received through one frequency slot. Here, an example of one frequency slot may be a broadcast channel that mainly has a specific bandwidth. As described above, according to the present invention, in a broadcast system in which a configuration of a physical layer is changed or in a plurality of broadcast systems with different physical layer configurations, a compatible link layer may be defined.

The physical layer may have a logical data path for an interface of a link layer. The link layer may access the logical data path of the physical layer and transmit information associated with the corresponding data path to the logical data path. The following types may be considered as the data path of the physical layer interfaced with the link layer.

In a broadcast system, a normal data pipe (Normal DP) may exist as a type of data path. The normal data pipe may be a data pipe for transmission of normal data and may include one or more data pipes according to a configuration of a physical layer.

In a broadcast system, a base data pipe (Base DP) may exist as a type of data path. The base data pipe may be a data pipe used for specific purpose and may transmit signaling information (entire or partial signaling information described in the present invention) and/or common data in a corresponding frequency slot. As necessary, in order to effectively manage a bandwidth, data that is generally transmitted through a normal data pipe may be transmitted through a base data pipe. When the amount of information to be transmitted when a dedicated channel is present exceeds processing capacity of a corresponding channel, the base data pipe may perform a complementary function. That is, data that exceeds the processing capacity of the corresponding channel may be transmitted through the base data pipe.

In general, the base data pipe continuously uses one designated data pipe. However, one or more data pipes may be dynamically selected for the base data pipe among a plurality of data pipes using a method such as physical layer signaling, link layer signaling, or the like in order to effectively manage a data pipe.

In a broadcast system, a dedicated channel may exist as a type of data path. The dedicated channel may be a channel used for signaling in a physical layer or a similar specific purpose and may include a fast information channel (FIC) for rapidly acquiring matters that are mainly served on a current frequency slot and/or an emergency alert channel (EAC) for immediately transmitting notification of emergency alert to a user.

In general, a logical data path is embodied in a physical layer in order to transmit the normal data pipe. A logical data path for the base data pipe and/or the dedicated channel may not be embodied in a physical layer.

A configuration of data to be transmitted in the link layer may be defined as illustrated in the drawing.

Organization Type 1 may refer to the case in which a logical data path includes only a normal data pipe.

Organization Type 2 may refer to the case in which a logical data path includes a normal data pipe and a base data pipe.

Organization Type 3 may refer to the case in which a logical data path includes a normal data pipe and a dedicated channel.

Organization Type 4 may refer to the case in which a logical data path includes a normal data pipe, a data base pipe, and a dedicated channel.

As necessary, the logical data path may include a base data pipe and/or a dedicated channel.

According to an embodiment of the present invention, a transmission procedure of signaling information may be determined according to configuration of a logical data path. Detailed information of signaling transmitted through a specific logical data path may be determined according to a protocol of a upper layer of a link layer defined in the present invention. Regarding a procedure described in the present invention, signaling information parsed through a upper layer may also be used and corresponding signaling may be transmitted in the form of an IP packet from the upper layer and transmitted again after being encapsulated in the form of a link layer packet.

When such signaling information is transmitted, a receiver may extract detailed signaling information from session information included in an IP packet stream according to protocol configuration. When signaling information of a upper layer is used, a database (DB) may be used or a shared memory may be used. For example, in the case of extracting the signaling information from the session information included in the IP packet stream, the extracted signaling information may be stored in a DB, a buffer, and/or a shared memory of the receiver. Next, when the signaling information is needed in a procedure of processing data in a broadcast signal, the signaling information may be obtained from the above storage device.

FIG. 48 is a diagram illustrating processing of a broadcast signal when a logical data path includes only a normal data pipe according to an embodiment of the present invention.

The diagram illustrates a structure of a link layer when the logical of the physical layer includes only a normal data pipe. As described above, the link layer may include a link layer signaling processor, an overhead reduction processor, and an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, and/or signaling transmitted in a upper layer and collect information to be transmitted via signaling. Since only a normal data pipe is configured in a physical layer, corresponding signaling needs to be transmitted in the form of packet. Accordingly, signaling may be indicated using a header, etc. of a packet during link layer packet configuration. In this case, a header of a packet including signaling may include information for identifying whether signaling data is contained in a payload of the packet.

In the case of service signaling transmitted in the form of IP packet in a upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change. The receiver may parse an IP packet transmitted to a predetermined IP address and acquire data for signaling in a link layer.

When a plurality of broadcast services are transmitted through one frequency band, the receiver does not have to decode all DPs, and it is efficient to pre-check signaling information and to decode only a DP associated with a required service. Accordingly, with regard to an operation for a link layer of the receiver, the following procedures may be performed.

When a user selects or changes a service to be received, the receiver tunes a corresponding frequency and reads information of the receiver, stored in a DB, etc. with regard to a corresponding channel.

The receiver checks information about a DP that transmits link layer signaling and decodes the corresponding DP to acquire a link layer signaling packet.

The receiver parses the link layer signaling packet and acquires information about a DP that transmits data associated with a service selected by the user among one or more DPs transmitted through a current channel and overhead reduction information about a packet stream of the corresponding DP. The receiver may acquire information for identification of a DP that transmits the data associated with the service selected by the user from a link layer signaling packet and obtain a corresponding DP based on the information. In addition, the link layer signaling packet may include information indicating overhead reduction applied to the corresponding DP, and the receiver may restore a DP to which overhead reduction is applied, using the information.

The receiver transmits DP information to be received, to a physical layer processor that processes a signal or data in a physical layer and receives a packet stream from a corresponding DP.

The receiver performs encapsulation and header recovery on the packet stream decoded by the physical layer processor.

Then the receiver performs processing according to a protocol of a upper layer and provides a broadcast service to the user.

FIG. 49 is a diagram illustrating processing of a broadcast signal when a logical data path includes a normal data pipe and a base data pipe according to an embodiment of the present invention.

The diagram illustrates a structure of a link layer when the logical data path of the physical layer includes a base data pipe and a normal data pipe. As described above, the link layer may include a link layer signaling part, an overhead reduction part, and an encapsulation (decapsulation) part. In this case, a link layer processor for processing a signal and/or data in a link layer may include a link layer signaling processor, an overhead reduction processor, and an encapsulation (decapsulation) processor.

Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream.

A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a broadcast signal of the physical layer includes a base DP and a normal DP, signaling may be transmitted to the base DP and signaling data may be transmitted in the form of packet appropriate for transmission of the base DP in consideration of a data rate. In this case, signaling may be indicated using a header, etc. of a packet during link layer packet configuration. For example, a header of a link layer packet may include information indicating that data contained in a payload of the packet is signaling data.

In a physical layer structure in which a logical data path such as a base DP exists, it may be efficient to transmit data that is not audio/video content, such as signaling information to the base DP in consideration of a data rate. Accordingly, service signaling that is transmitted in the form of IP packet in a upper layer may be transmitted to the base DP using a method such as IP address filtering, etc. For example, IANA designates an IP address of 224.0.23.60 as ATSC service signaling, an IP packet stream with the corresponding IP address may be transmitted to the base DP.

When a plurality of IP packet streams about corresponding service signaling is present, the IP packet streams may be transmitted to one base DP using a method such as multiplexing, etc. However, a packet about different service signaling may be divided into field values such as a source address and/or a port. In this case, information required for configuration of link layer signaling can also be read from the corresponding service signaling packet.

When a plurality of broadcast services are transmitted through one frequency band, the receiver may not have to decode all DPs, may pre-check signaling information, and may decode only a DP that transmits data and/or a signal about a corresponding service. Accordingly, the receiver may perform the following operation with regard to data and/or processing in a link layer.

When a user selects or changes a service to be received, the receiver tunes a corresponding frequency and reads information of the receiver, stored in a DB, etc. with regard to a corresponding channel. Here, the information stored in the DB, etc. may include information for identification of the base DP.

The receiver decodes the base DP and acquires a link layer signaling packet included in the base DP.

The receiver parses the link layer signaling packet to acquire DP information for reception of the service selected by the user and overhead reduction information about a packet stream of the corresponding DP among a plurality of DPs transmitted through a current channel and overhead reduction information about a packet stream of the corresponding DP. The link layer signaling packet may include information for identification of a DP that transmits a signal and/or data associated with a specific service, and/or information for identification of a type of overhead reduction applied to a packet stream transmitted to the corresponding DP. The receiver may access one or more DPs or restore the packet included in the corresponding DP using the above information.

The receiver is a physical layer processor that processes a signal and/or data according to a protocol of a physical layer, transmits information about a DP to be received for a corresponding service, and receives a packet stream from the corresponding DP.

The receiver performs decapsulation and header recovery on the packet stream decoded in the physical layer and transmits the packet stream to a upper layer of the receiver in the form of IP packet stream.

Then, the receiver performs processing according to a upper layer protocol and provides a broadcast service to the user.

In the above-described process of acquiring the link layer packet by decoding the base DP, information about the base DP (e.g., an identifier (ID) information of the base DP, location information of the base DP, or signaling information included in the base DP) may be acquired during previous channel scan and then stored in a DB and the receiver may use the stored base DP. Alternatively, the receiver may acquire the base DP by first seeking a DP that the receiver has pre-accessed.

In the above-described process of acquiring the DP information for a service selected by the user and the overhead reduction information about a DP packet stream transmitting the corresponding service, by parsing the link layer packet, if the information about the DP transmitting the service selected by the user is transmitted through upper layer signaling (e.g., a layer higher than a link layer, or an IP layer), the receiver may acquire corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only a DP of one type is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using interior command words of the system.

FIG. 50 is a diagram illustrating processing of a broadcast signal when a logical data path includes a normal data pipe and a dedicated channel according to an embodiment of the present invention.

The diagram illustrates a structure of a link layer when the logical data path of the physical layer includes a dedicated channel and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. In a physical layer structure in which a logical data path such as a dedicate channel exists, it may be efficient to mainly transmit signaling information through a dedicated channel in consideration of a data rate. However, when a large amount of data needs to be transmitted through a dedicated channel, a bandwidth for the dedicated channel corresponding to the amount of the dedicated channel needs to be occupied, and thus it is general to set a high data rate of the dedicated channel. In addition, since a dedicated channel is generally received and decoded at higher speed than a DP, it is more efficient to signaling data in terms of information that needs to be rapidly acquired from the receiver. As necessary, when sufficient signaling data cannot be transmitted through the dedicated channel, signaling data such as the aforementioned link layer signaling packet may be transmitted through the normal DP, and signaling data transmitted through the dedicated channel may include information for identification of the corresponding link layer signaling packet.

A plurality of dedicated channels may exist as necessary and a channel may be enable/disable according to a physical layer.

In the case of service signaling transmitted in the form of IP packet in a upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change.

When a plurality of IP packet streams about service signaling is present, the IP packet streams may be transmitted to one DP together with audio/video data using a method such as multiplexing, etc. However, a packet about service signaling and audio/video data may be divided into field values of an IP address, a port, etc.

When a plurality of broadcast services are transmitted through one frequency band, the receiver does not have to decode all DPs, and it is efficient to pre-check signaling information and to decode only a DP that transmit signal and/or data associated with a required service. Thus, the receiver may perform processing according to a protocol of a link layer as the following procedure.

When a user selects or changes a service to be received, the receiver tunes a corresponding frequency and reads information stored in a DB, etc. with regard to a corresponding channel. The information stored in the DB may include information for identification of a dedicated channel and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of DP to be decoded using information transmitted to the dedicated channel. As necessary, when link layer signaling is transmitted through a DP, the receiver may pre-decode a DP that transmits signaling and transmit the DP to a dedicated channel in order to pre-acquire signaling information. In addition, a packet for link layer signaling may be transmitted through a normal DP, and in this case, the signaling data transmitted through the dedicated channel may include information for identification of a DP including a packet for link layer signaling.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to a upper layer of the receiver in the form of IP packet stream.

Then the receiver performs processing according to a protocol of a upper layer and provides a broadcast service to the user.

FIG. 51 is a diagram illustrating processing of a broadcast signal when a logical data path includes a normal data pipe, a base data pipe, and a dedicated channel according to an embodiment of the present invention.

The diagram illustrates a structure of a link layer when the logical data path of the physical layer includes a dedicated channel, a base data pipe, and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a signal of the physical layer includes a base DP and a normal DP, it may be efficient to transmit signaling to the base DP in consideration of a data rate. In this case, the signaling data needs to be transmitted in the form of packet appropriate for transmission through the base DP. Signaling may be indicated using a header, etc. of a packet during link layer packet configuration. That is, a header of a link layer signaling packet including signaling data may include information indicating that signaling data is contained in a payload of the corresponding packet.

In a physical layer structure in which a dedicate channel and a base DP exist simultaneously, signaling information may be divided and transmitted to the dedicated channel and the base DP. In general, since a high data rate of the dedicated channel is not set, signaling information that has a small amount of signaling and needs to be rapidly acquired may be transmitted to the dedicated channel and signaling with a high amount of signaling to the base DP. As necessary, a plurality of dedicated channels may exist and a channel may be enable/disable according to a physical layer. In addition, the base DP may be configured with a separate structure from a normal DP. In addition, it is possible to designate one of normal DPs and use the normal DP as a base DP.

Service signaling that is transmitted in the form of IP packet in a upper layer may be transmitted to the base DP using a method such as IP address filtering, etc. An IP packet stream with a specific IP address and including signaling information may be transmitted to the base DP. When a plurality of IP packet streams about corresponding service signaling is present, the IP packet streams may be transmitted to one base DP using a method such as multiplexing, etc. A packet about different service signaling may be divided into field values such as a source address and/or a port. The receiver may read information required for configuration of the link layer signaling in the corresponding service signaling packet.

When a plurality of broadcast services are transmitted through one frequency band, the receiver may not have to decode all DPs, and it may be efficient to pre-check the signaling information and to decode only a DP that transmits a signal and/or data associated with a required service. Thus, the receiver may perform the following processors as processing according to a protocol of a link layer.

When a user selects or changes a service to be received, the receiver tunes a corresponding frequency and reads information stored in a database DB, etc. with regard to a corresponding channel. The information stored in the DB may include information for identification of a dedicated channel, information for identification of a base data pipe, and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of the base DP using information transmitted to the dedicated channel. The information transmitted to the dedicated channel may include information for identification of the base DP (e.g., an identifier of the base DP and/or an IP address of the base DP). As necessary, the receiver may update signaling information pre-stored in a DB of the receiver and related parameters to information transmitted in the dedicated channel.

The receiver may decode the base DP and acquire a link layer signaling packet. As necessary, the link layer signaling packet may be combined with signaling information received from the dedicated channel. The receiver may find the base DP using the dedicate channel and the signaling information pre-stored in the receiver.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to a upper layer of the receiver in the form of IP packet stream.

Then the receiver performs processing according to a protocol of a upper layer and provides a broadcast service to the user.

According to an embodiment of the present invention, when information for service signaling is transmitted by one or more IP packet streams, the IP packet streams may be multiplexed and transmitted as one base DP. The receiver may distinguish between packets for different service signaling through a field of a source address and/or a port. The receiver may read out information for acquiring/configuring link layer signaling from a service signaling packet.

In the process of processing signaling information transmitted through the dedicated channel, the receiver may obtain version information of the dedicated channel or information identifying whether update has been performed and, if it is judged that there is no change in the signaling information in the dedicated channel, the receiver may omit processing (decoding or parsing) of the signaling information transmitted through the dedicated channel. If it is confirmed that the dedicated channel has not been updated, the receiver may acquire information of a base DP using prestored information.

In the above-described process of acquiring the DP information for a service selected by the user and the overhead reduction information about the DP packet stream transmitting the corresponding service, if the information about the DP transmitting the service selected by the user is transmitted through upper layer signaling (e.g., a layer higher than a link layer, or an IP layer), the receiver may acquire the corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only type of DP is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using system interior command words.

FIG. 52 is a diagram illustrating a detailed processing operation of a signal and/or data in a link layer of a receiver when a logical data path includes a normal data pipe, a base data pipe, and a dedicated channel according to an embodiment of the present invention.

The present embodiment considers a situation in which one or more services provided by one or more broadcasters are transmitted in one frequency band. It may be considered that one broadcaster transmits one or more broadcast services, one service includes one or more components and a user receives content in units of broadcast services. In addition, some of one or more components included in one broadcast service may be replaced with other components according to user selection.

A fast information channel (FIC) and/or emergency alert channel (EAC) may be transmitted to a dedicated channel. A base DP and a normal DP may be differentiated in a broadcast signal and transmitted or managed. Configuration information of the FIC and/or the EAC may be transmitted through physical layer signaling so as to notify the receiver of the FIC and/or the EAC, and the link layer may format signaling according to the characteristic of the corresponding channel. Transmission of data to a specific channel of a physical layer is performed from a logical point of view and an actual operation may be performed according to the characteristic of a physical layer.

Information about a service of each broadcaster, transmitted in a corresponding frequency, and information about a path for reception of the service may be transmitted through the FIC. To this end, the following information may be provided (signaled) via link layer signaling.

System Parameter: Transmitter related parameter, and/or parameter related to a broadcaster that provides a service in a corresponding channel.

Link layer: which includes context information associated with IP header compression and/or ID of a DP to which corresponding context is applied.

Upper layer: IP address and/or UDP port number, service and/or component information, emergency alert information, and mapping relation information between a DP and an IP address of a packet stream transmitted in an IP layer.

When a plurality of broadcast services is transmitted through one frequency band, a receiver may not have to decode all DPs, and it may be efficient to pre-check signaling information and to decode only a DP about a required service. In a broadcast system, a transmitter may transmit information for identification of only a required DP through an FIC, and the receiver may check a DP to be accessed for a specific serviced, using the FIC. In this case, an operation associated with the link layer of the receiver may be performed as follows.

When a user selects or changes a service to be received by a user, the receiver tunes a corresponding frequency and reads information of a receiver, stored in a DB, etc. in regard to a corresponding channel. The information stored in the DB of the receiver may be configured by acquiring an FIC during initial channel scan and using information included in the FIC.

The receiver may receive an FIC and update a pre-stored DB or acquire information about a component about a service selected by the user and information about a mapping relation for DPs that transmit components from the FIC. In addition, the information about a base DP that transmits signaling may be acquired from the FIC.

When initialization information related to robust header compression (RoHC) is present in signaling transmitted through the FIC, the receiver may acquire the initialization information and prepare header recovery.

The receiver decodes a base DP and/or a DP that transmits a service selected by a user based on information transmitted through the FIC.

The receiver acquires overhead reduction information about a DP that is being received, included in the base DP, performs decapsulation and/or header recovery on a packet stream received in a normal DP using the acquired overhead information, and transmits the packet stream to a upper layer of the receiver in the form of IP packet stream.

The receiver may receive service signaling transmitted in the form of IP packet with a specific address through a base DP and transmit the packet stream to the upper layer with regard to a received service.

When emergency alert occurs, in order to rapidly transmit an emergency alert message to a user, the receiver receives signaling information included in a CAP message through signaling, parses the signaling information, and immediately transmits the signaling information to a user, and finds a path for reception of a corresponding service and receives service data when information of a path through which an audio/video service can be received via signaling can be confirmed. In addition, when information transmitted through a broadband and so on is present, an NRT service and additional information are received using corresponding uniform resource identifier (URI) information and so on. Signaling information associated with emergency alert will be described below in detail.

The receiver processes the emergency alert as follows.

The receiver recognizes a situation in which an emergency alert message is transmitted through a preamble and so on of a physical layer. The preamble of the physical layer may be a signaling signal included in a broadcast signal and may correspond to signaling in the physical layer. The preamble of the physical layer may mainly include information for acquisition of data, a broadcast frame, a data pipe, and/or a transmission parameter that are included in a broadcast signal.

The receiver checks configuration of an emergency alert channel (EAC) through physical layer signaling of the receiver and decodes the EAC to acquire EAT. Here, the EAC may correspond to the aforementioned dedicated channel.

The receiver checks the received EAT, extracts a CAP message, and transmits the CAP message to a CAP parser.

The receiver decodes a corresponding DP and receives service data when service information associated with the emergency alert is present in the EAT. The EAT may include information for identification of a DP for transmitting a service associated with the emergency alert.

When information associated with NRT service data is present in the EAT or the CAP message, the receiver receives the information through a broadband.

FIG. 53 is a diagram illustrating syntax of a fast information channel (FIC) according to an embodiment of the present invention.

Information included in the FIC may be transmitted in the form of fast information table (FIT).

Information included in the FIT may be transmitted in the form of XML and/or section table.

The FIT may include table_id information, FIT_data_version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information, context_id information, RoHC_init_descriptor, context profile information, max_cid information, and/or large_cid information.

The table_id information indicates that a corresponding table section refers to fast information table.

The FIT_data_version information may indicate version information about syntax and semantics contained in the fast information table. The receiver may determine whether signaling contained in the corresponding fast information table is processed, using the FIT_data_version information. The receiver may determine whether information of pre-stored FIC is updated, using the information.

The num_broadcast information may indicate the number of broadcasters that transmit a broadcast service and/or content through a corresponding frequency or a transmitted transport frame.

The broadcast_id information may indicate a unique identifier of a broadcaster that transmits a broadcast service and/or content through a corresponding frequency or a transmitted transport frame. In the case of a broadcaster that transmits MPEG-2 TS-based data, broadcast_id may have a value such as transport_stream_id of MPEG-2 TS.

The delivery_system_id information may indicate an identifier for a broadcast transmission system that applies and processes the same transmission parameter on a broadcast network that performs transmission.

The base_DP_id information is information for identification of a base DP in a broadcast signal. The base DP may refer to a DP that transmits service signaling including overhead reduction and/or program specific information/system information (PSI/SI) of a broadcaster corresponding to broadcast_id. Alternatively, the base_DP_id information may refer to a representative DP that can decode a component included in a broadcast service in the corresponding broadcaster.

The base_DP_version information may refer to version information about data transmitted through a base DP. For example, when service signaling such as PSI/SI and so on is transmitted through the base DP, if service signaling is changed, a value of the base_DP_version information may be increased one by one.

The num_service information may refer to the number of broadcast services transmitted from a broadcaster corresponding to the broadcast_id in a corresponding frequency or a transport frame.

The service_id information may be used as an identifier for identification of a broadcast service.

The service_category information may refer to a category of a broadcast service. According to a value of a corresponding field, the service_category information may have the following meaning. When a value of the service_category information is 0x01, the service_category information may refer to a basic TV, when the value of the service_category information is 0x02, the service_category information may refer to a basic radio, when the value of the service_category information is 0x03, the service_category information may refer to an RI service, when the value of the service_category information is 0x08, the service_category information may refer to a service guide, and when the value of the service_category information is 0x09, the service_category information may refer to emergency alerting.

The service_hidden_flag information may indicate whether a corresponding broadcast service is hidden. When the service is hidden, the broadcast service may be a test service or a self-used service and may be processed to be disregarded or hidden from a service list by a broadcast receiver.

The SP_indicator information may indicate whether service protection is applied to one or more components in a corresponding broadcast service.

The num_component information may indicate the number of components included in a corresponding broadcast service.

The component_id information may be used as an identifier for identification of a corresponding component in a broadcast service.

The DP_id information may be used as an identifier indicating a DP that transmits a corresponding component.

The RoHC_init_descriptor may include information associated with overhead reduction and/or header recovery. The RoHC_init_descriptor may include information for identification of a header compression method used in a transmission terminal.

The context_id information may represent a context corresponding to a following RoHC related field. The context_id information may correspond to a context identifier (CID).

The context_profile information may represent a range of a protocol for compression of a header in RoHC. When a compressor and a decompressor have the same profile, it is possible to compress and restore a stream in the RoHC.

The max_cid information is used for indicating a maximum value of a CID to a decompressor.

The large_cid information has a boolean value and indicates whether a short CID (0 to 15) or an embedded CID (0 to 16383) is used for CID configuration. Accordingly, the sized of byte for representing the CID is determined together.

FIG. 54 is a diagram illustrating syntax of an emergency alert table (EAT) according to an embodiment of the present invention.

Information associated with emergency alert may be transmitted through the EAC. The EAC may correspond to the aforementioned dedicated channel.

The EAT according to an embodiment of the present invention may include EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information, and/or EAS_NRT_service_id information.

The EAT_protocol_version information indicates a protocol version of received EAT.

The automatic_tuning_flag information indicates whether a receiver automatically performs channel conversion.

The num_EAS_messages information indicates the number of messages contained in the EAT.

The EAS_message_id information is information for identification of each EAS message.

The EAS_IP_version_flag information indicates IPv4 when a value of the EAS_IP_version_flag information is 0, and indicates IPv6 when a value of the EAS_IP_version_flag information is 1.

The EAS_message_transfer_type information indicates the form in which an EAS message is transmitted. When a value of the EAS_message_transfer_type information is 000, the EAS_message_transfer_type information indicates a not specified state, when a value of the EAS_message_transfer_type information is 001, the EAS_message_transfer_type information indicates a no alert message (only AV content), and when a value of the EAS_message_transfer_type information is 010, the EAS_message_transfer_type information indicates that an EAS message is contained in corresponding EAT. To this end, a length field and a field about the corresponding EAS message are added. When a value of the EAS_message_transfer_type information is 011, the EAS_message_transfer_type information indicates that the EAS message is transmitted through a data pipe. The EAS may be transmitted in the form of IP datagram in a data pipe. To this end, IP address, UDP port information, and DP information of a transmitted physical layer may be added.

The EAS_message_encoding_type information indicates information about an encoding type of an emergence alert message. For example, when a value of the EAS_message_encoding_type information is 000, the EAS_message_encoding_type information indicates a not specific state, when a value of the EAS_message_encoding_type information is 001, the EAS_message_encoding_type information indicates No Encoding, when a value of the EAS_message_encoding_type information is 010, the EAS_message_encoding_type information indicates DEFLATE algorithm (RFC1951), and 001 to 111 among values of the EAS_message_encoding_type information may be reserved for other encoding types.

The EAS_NRT_flag information indicates whether NRT contents and/or NRT data associated with a received message is present. When a value of the EAS_NRT_flag information is 0, the EAS_NRT_flag information indicates that NRT contents and/or NRT data associated with a received emergency message is not present, and when a value of the EAS_NRT_flag information is 1, the EAS_NRT_flag information indicates that NRT contents and/or NRT data associated with a received emergency message is present.

The EAS_message_length information indicates a length of an EAS message.

The EAS_message_byte information includes content of an EAS message.

The IP_address information indicates an IP address of an IP address for transmission of an EAS message.

The UDP_port_num information indicates a UDP port number for transmission of an EAS message.

The DP_id information identifies a data pipe that transmits an EAS message.

The automatic_tuning_channel_number information includes information about a number of a channel to be converted.

The automatic_tuning_DP_id information is information for identification of a data pipe that transmits corresponding content.

The automatic_tuning_service_id information is information for identification of a service to which corresponding content belongs.

The EAS_NRT_service_id information is information for identification of an NRT service corresponding to the case in which NRT contents and data associated with a received emergency alert message and transmitted, that is, the case in which an EAS_NRT_flag is enabled.

FIG. 55 is a diagram illustrating a packet transmitted to a data pipe according to an embodiment of the present invention.

According to an embodiment of the present invention, configuration of a packet in a link layer is newly defined so as to generate a compatible link layer packet irrespective of change in protocol of a upper layer or the link layer or a lower layer of the link layer.

The link layer packet according to an embodiment of the present invention may be transmitted to a normal DP and/or a base DP.

The link layer packet may include a fixed header, an expansion header, and/or a payload.

The fixed header is a header with a fixed size and the expansion header is a header, the size of which can be changed according to configuration of the packet of the upper layer. The payload is a region in which data of the upper layer is transmitted.

A header (the fixed header or the expansion header) of a packet may include a field indicating a type of the payload of the packet. In the case of the fixed header, first 3 bits (packet type) of 1 byte may include data for identification of a packet type of the upper layer, and the remaining 5 bits may be used as an indicator part. The indicator part may include data for identification of a configuring method of a payload and/or configuration information of the expansion header and may be changed according to a packet type.

A table shown in the diagram represents a type of a upper layer included in a payload according to a value of a packet type.

According to system configuration, an IP packet and/or an RoHC packet of the payload may be transmitted through a DP, and a signaling packet may be transmitted through a base DP. Accordingly, when a plurality of packets are mixed and transmitted, packet type values may also be applied so as to differentiate a data packet and a signaling packet.

When a packet type value is 000, an IP packet of IPv4 is included in a payload.

When a packet type value is 001, an IP packet of IPv6 is included in a payload.

When a packet type value is 010, a compressed IP packet is included in a payload. The compressed IP packet may include an IP packet to which header compression is applied.

When a packet type value is 110, a packet including signaling data is included in a payload.

When a packet type value is 111, a framed packet type is included in a payload.

FIG. 56 is a diagram illustrating a detailed processing operation of a signal and/or data in each protocol stack of a transmitter when a logical data path of a physical layer includes a dedicated channel, a base DP, and a normal data DP, according to another embodiment of the present invention.

In one frequency band, one or more broadcasters may provide broadcast services. A broadcaster transmits multiple broadcast services and one broadcast service may include one or more components. A user may receive content in units of broadcast services.

In a broadcast system, a session-based transmission protocol may be used to support IP hybrid broadcast and the contents of signaling delivered to each signaling path may be determined according to the structure of the corresponding transmission protocol.

As described above, data related to the FIC and/or the EAC may be transmitted/received over the dedicated channel. In the broadcast system, a base DP and a normal DP may be used to distinguish therebetween.

Configuration information of the FIC and/or EAC may be included in physical layer signaling (or a transmission parameter). A link layer may format signaling according to characteristics of a corresponding channel. Transmission of data to a specific channel of a physical layer may be performed from a logical point of view and actual operation may be performed according to characteristics of a physical layer.

The FIC may include information about services of each broadcaster, transmitted in a corresponding frequency and information about paths for receiving the services. The FIC may include information for service acquisition and may be referred to as service acquisition information.

The FIC and/or the EAC may be included in link layer signaling.

Link layer signaling may include the following information.

System Parameter—A parameter related to a transmitter or a parameter related to a broadcaster that provides a service in a corresponding channel.

Link layer: Context information associated with IP header compression and an ID of a DP to which a corresponding context is applied.

Upper layer: IP address and UDP port number, service and component information, emergency alert information, and a mapping relationship between an ID address, a UDP port number, a session ID, and a DP of a packet stream and signaling transmitted in an IP layer.

As described above, one or more broadcast services are transmitted in one frequency band, the receiver does not need to decode all DPs and it is efficient to pre-check signaling information and to decode only a DP related to a necessary service.

In this case, referring to the drawing, the broadcast system may provide and acquire information for mapping a DP and a service, using the FIC and/or the base DP.

A process of processing a broadcast signal or broadcast data in a transmitter of the drawing will now be described. One or more broadcasters (broadcasters #1 to # N) may process component signaling and/or data for one or more broadcast services so as to be transmitted through one or more sessions. One broadcast service may be transmitted through one or more sessions. The broadcast service may include one or more components included in the broadcast service and/or signaling information for the broadcast service. Component signaling may include information used to acquire components included in the broadcast service in a receiver. Service signaling, component signaling, and/or data for one or more broadcast services may be transmitted to a link layer through processing in an IP layer.

In the link layer, the transmitter performs overhead reduction when overhead reduction for an IP packet is needed and generates related information as link layer signaling. Link layer signaling may include a system parameter specifying the broadcast system, in addition to the above-described information. The transmitter may process an IP packet in a link layer processing procedure and transmit the processed IP packet to a physical layer in the form of one or more DPs.

The transmitter may transmit link layer signaling to the receiver in the form or configuration of an FIC and/or an EAC. Meanwhile, the transmitter may also transmit link layer signaling to the base DP through an encapsulation procedure of the link layer.

FIG. 57 is a diagram illustrating a detailed processing operation of a signal and/or data in each protocol stack of a receiver when a logical data path of a physical layer includes a dedicated channel, a base DP, and a normal data DP, according to another embodiment of the present invention.

If a user selects or changes a service desired to be received, a receiver tunes to a corresponding frequency. The receiver reads information stored in a DB etc. in association with a corresponding channel. The information stored in the DB etc. of the receiver may be information included upon acquiring an FIC and/or an EAC during initial channel scan. Alternatively, the receiver may extract transmitted information as described above in this specification.

The receiver may receive the FIC and/or the EAC, receive information about a channel that the receiver desires to access, and then update information pre-stored in the DB. The receiver may acquire components for a service selected by a user and information about a mapping relationship of a DP transmitted by each component or acquire a base DP and/or a normal DP through which signaling necessary to obtain such information is transmitted. Meanwhile, when it is judged that there is no change in corresponding information using version information of the FIC or information identifying whether to require additional update of a dedicated channel, the receiver may omit a procedure of decoding or parsing the received FIC and/or EAC.

The receiver may acquire a link layer signaling packet including link layer signaling information by decoding a base DP and/or a DP through which signaling information is transmitted, based on information transmitted through the FIC. The receiver may use, when necessary, the received link layer signaling information by a combination with signaling information (e.g., receiver information in the drawing) received through the dedicated channel.

The receiver may acquire information about a DP for receiving a service selected by the user among multiple DPs that are being transmitted over a current channel and overhead reduction information about a packet stream of the corresponding DP, using the FIC and/or the link layer signaling information.

When the information about the DP for receiving the selected service is transmitted through upper layer signaling, the receiver may acquire signaling information stored in the DB and/or the shared memory as described above and then acquire information about a DP to be decoded, indicated by the corresponding signaling information.

When the link layer signaling information and normal data (e.g., data included in broadcast content) are transmitted through the same DP or only one DP is used for transmission of the link layer signaling information and normal data, the receiver may temporarily store the normal data transmitted through the DP in a device such as a buffer while the signaling information is decoded and/or parsed.

The receiver may acquire the base DP and/or the DP through which the signaling information is transmitted, acquire overhead reduction information about a DP to be received, perform decapsulation and/or header recovery for a packet stream received in a normal DP, using the acquired overhead information, process the packet stream in the form of an IP packet stream, and transmit the IP packet stream to a upper layer of the receiver.

FIG. 58 is a diagram illustrating a syntax of an FIC according to another embodiment of the present invention.

Information included in the FIC described in this drawing may be selectively combined with other information included in the FIC and may configure the FIC.

The receiver may rapidly acquire information about a channel, using the information included in the FIC. The receiver may acquire bootstrap related information using the information included in the FIC. The FIC may include information for fast channel scan and/or fast service acquisition. The FIC may be referred to by other names, for example, a service list table or service acquisition information. The FIC may be transmitted by being included in an IP packet in an IP layer according to a broadcast system. In this case, an IP address and/or a UDP port number, transmitting the FIC, may be fixed to specific values and the receiver may recognize that the IP packet transmitted with the corresponding IP address and/or UDP port number includes the FIC, without an additional processing procedure.

The FIC may include FIC_protocol_version information, transport_stream_id information, num_partitions information, partition_id information, partition_protocol_version information, num_services information, service_id information, service_data_version information, service_channel_number information, service_category information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition_level_descriptors information, partition_level_descriptor( ) information, num_FIC_level_descriptors information, and/or FIC_level_descriptor( ) information.

FIC_protocol_version information represents a version of a protocol of an FIC.

transport_stream_id information identifies a broadcast stream. transport_stream_id information may be used as information for identifying a broadcaster.

num_partitions information represents the number of partitions in a broadcast stream. The broadcast stream may be transmitted after being divided into one or more partitions. Each partition may include one or more DPs. The DPs included in each partition may be used by one broadcaster. In this case, the partition may be defined as a data transmission unit allocated to each broadcaster.

partition_id information identifies a partition. partition_id information may identify a broadcaster.

partition_protocol_version information represents a version of a protocol of a partition.

num_services information represents the number of services included in a partition. A service may include one or more components.

service_id information identifies a service.

service_data_version information represents change when a signaling table (signaling information) for a service is changed or a service entry for a service signaled by an FIC is changed. service_data_version information may increment a value thereof whenever such change is present.

service_channel_number information represents a channel number of a service.

service_category information represents a category of a service. The category of a service includes A/V content, audio content, an electronic service guide (ESG), and/or content on demand (CoD).

service_status information represents a state of a service. A state of a service may include an active or suspended state and a hidden or shown state. The state of a service may include an inactive state. In the inactive state, broadcast content is not currently provided but may be provided later. Accordingly, when a viewer scans a channel in a receiver, the receiver may not show a scan result for a corresponding service to the viewer.

service_distribution information represents a distribution state of data for a service. For example, service_distribution information may represent that entire data of a service is included in one partition, partial data of a service is not included in a current partition but content is presentable only by data in this partition, another partition is needed to present content, or another broadcast stream is needed to present content.

sp_indicator information identifies whether service protection has been applied. sp_indicator information may identify, for example, for meaningful presentation, whether one or more necessary components are protected (e.g., a state in which a component is encrypted).

IP_version_flag information identifies whether an IP address indicated by SSC_source_IP_address information and/or SSC destination IP address information is an IPv4 address or an IPv6 address.

SSC_source_IP_address flag information identifies whether SSC_source_IP_address information is present.

SSC_source_IP_address information represents a source IP address of an IP datagram that transmits signaling information for a service. The signaling information for a service may be referred to as service layer signaling. Service layer signaling includes information specifying a broadcast service. For example, service layer signaling may include information identifying a data unit (a session, a DP, or a packet) that transmits components constituting a broadcast service.

SSC_destination_IP_address information represents a destination IP address of an IP datagram (or channel) that transmits signaling information for a service.

SSC_destination_UDP_port information represents a destination UDP port number for a UDP/IP stream that transmits signaling information for a service.

SSC_TSI information represents a transport session identifier (TSI) of an LCT channel (or session) that transmits signaling information (or a signaling table) for a service.

SSC_DP_ID information represents an ID for identifying a DP including signaling information (or a signaling table) for a service. As a DP including the signaling information, the most robust DP in a broadcast transmission process may be allocated.

num_partition_level_descriptors information identifies the number of descriptors of a partition level for a partition.

partition_level_descriptor( ) information includes zero or more descriptors that provide additional information for a partition.

num_FIC_level_descriptors information represents the number of descriptors of an FIC level for an FIC.

FIC_level_descriptor( ) information includes zero or more descriptors that provide additional information for an FIC.

FIG. 59 is a diagram illustrating signaling_Information_Part( ) according to an embodiment of the present invention.

A broadcast system may add additional information to an extended header part in the case of a packet for transmitting signaling information in a structure of a packet transmitted through the above-described DP. Such additional information will be referred to as Signaling_Information_Part( ).

Signaling_Information_Part( ) may include information used to determine a processing module (or processor) for received signaling information. In a system configuration procedure, the broadcast system may adjust the number of fields indicating information and the number of bits allocated to each field, in a byte allocated to Signaling_Information_Part( ). When signaling information is transmitted through multiplexing, a receiver may use information included in Signaling_Information_Part( ) to determine whether corresponding signaling information is processed and determine to which signaling processing module signaling information should be transmitted.

Signaling_Information_Part( ) may include Signaling_Class information, Information_Type information, and/or signaling format information.

Signaling_Class information may represent a class of transmitted signaling information. Signaling information may correspond to an FIC, an EAC, link layer signaling information, service signaling information, and/or upper layer signaling information. Mapping for a class of signaling information indicated by each value of configuration of the number of bits of a field of Signaling Class information may be determined according to system design.

Information_Type information may be used to indicate details of signaling information identified by signaling class information. Meaning of a value indicated by Information_Type information may be additionally defined according to class of signaling information indicated by Signaling_Class information.

Signaling format information represents a form (or format) of signaling information configured in a payload. The signaling format information may identify formats of different types of signaling information illustrated in the drawing and identify a format of additionally designated signaling information.

Signaling_Information_Part( ) of (a) and (b) illustrated in the drawing is one embodiment and the number of bits allocated to each field thereof may be adjusted according to characteristics of the broadcast system.

Signaling_Information_Part( ) as in (a) of the drawing may include signaling class information and/or signaling format information. Signaling_Information_Part( ) may be used when a type of signaling information need not be designated or an information type can be judged in signaling information. Alternatively, when only one signaling format is used or when an additional protocol for signaling is present so that signaling formats are always equal, only a 4-bit signaling class field may be used without configuring a signaling field and the other fields may be reserved for later use or an 8-bit signaling class maybe configured to support various types of signaling.

Signaling_Information_Part( ) as in (b) of the drawing may further include information type information for indicating a type or characteristic of more detailed information in a signaling class when the signaling class is designated and may also include signaling format information. Signaling class information and information type information may be used to determine decapsulation of signaling information or a processing procedure of corresponding signaling. A detailed structure or processing of link layer signaling may refer to the above description and a description which will be given below.

FIG. 60 is a diagram illustrating a procedure for controlling an operation mode of a transmitter and/or a receiver in a link layer according to an embodiment of the present invention.

When the operation mode of the transmitter or the receiver of the link layer is determined, a broadcast system can be more efficiently used and can be flexibly designed. The method of controlling the link layer mode proposed according to the present invention can dynamically convert a mode of a link layer in order to efficiently manage a system bandwidth and processing time. In addition, the method of controlling the link layer mode according to the present invention may easily cope with the case in which a specific mode needs to be supported due to change in a physical layer or on the other hand, the specific mode does not have to be changed any more. In addition, the method of controlling the link layer mode according to the present invention may also allow a broadcast system to easily satisfy requirements of a corresponding broadcaster when a broadcaster providing a broadcast service intends to designate a method of transmitting a corresponding service.

The method of controlling the mode of the link layer may be configured to be performed only in a link layer or to be performed via change in data configuration in the link layer. In this case, it is possible to perform an independent operation of each layer in a network layer and/or a physical layer without embodiment of a separate function. In the mode of the link layer proposed according to the present invention, it is possible to control the mode with signaling or parameters in a system without changing a system in order to satisfy configuration of a physical layer. A specific mode may be performed only when processing of corresponding input is supported in a physical layer.

The diagram is a flowchart illustrating processing of signal and/or data in an IP layer, a link layer, and a physical layer by a transmitter and/or a receiver.

A function block (which may be embodied as hardware and/or software) for mode control may be added to the link layer and may manage parameter and/or signaling information for determination of whether a packet is processed. The link layer may determine whether a corresponding function is performed during processing of a packet stream using information of a mode control functional block.

First, an operation of the transmitter will be described.

When an IP is input to a link layer, the transmitter determines whether overhead reduction (j16020) is performed using a mode control parameter (j16005). The mode control parameter may be generated by a service provider in the transmitter. The mode control parameter will be described below in detail.

When the overhead reduction (j16020) is performed, information about overhead reduction is generated and is added to link layer signaling (j16060) information. The link layer signaling (j16060) information may include all or some of mode control parameters. The link layer signaling (j16060) information may be transmitted in the form of link layer signaling packet. The link layer signaling packet may be mapped to a DP and transmitted to the receiver, but may not be mapped to the DP and may be transmitted to the receiver in the form of link layer signaling packet through a predetermined region of a broadcast signal.

A packet stream on which the overhead reduction (j16020) is performed is encapsulated (j16030) and input to a DP of a physical layer (j16040). When overhead reduction is not performed, whether encapsulation is performed is re-determined (j16050).

A packet stream on which the encapsulation (j16030) is performed is input to a DP (j16040) of a physical layer. In this case, the physical layer performs an operation for processing a general packet (a link layer packet). When overhead reduction and encapsulation are not performed, an IP packet is transmitted directly to a physical layer. In this case, the physical layer performs an operation for processing the IP packet. When the IP packet is directly transmitted, a parameter may be applied to perform the operation only when the physical layer support IP packet input. That is, a value of a mode control parameter may be configured to be adjusted such that a process of transmitting an IP packet directly to a physical layer is not performed when the physical layer does not support processing of an IP packet.

The transmitter transmits a broadcast signal on which this process is performed, to the receiver.

An operation of the receiver will be described below.

When a specific DP is selected for the reason such channel change and so on according to user manipulation and a corresponding DP receives a packet stream (j16110), the receiver may check a mode in which a packet is generated, using a header and/or signaling information of the packet stream (j16120). When the operation mode during transmission of the corresponding DP is checked, decapsulation (j16130) and overhead reduction (j16140) processes are performed through a receiving operating process of a link layer and then an IP packet is transmitted to a upper layer. The overhead reduction (j16140) process may include an overhead recovery process.

FIG. 61 is a diagram illustrating an operation in a link layer according to a value of a flag and a type of a packet transmitted to a physical layer according to an embodiment of the present invention.

In order to determine an operation mode of the link layer, the aforementioned signaling method may be used. Signaling information associated with the method may be transmitted directly to a receiver. In this case, the aforementioned signaling data or link layer signaling packet may include mode control that will be described below and related information.

In consideration of the complexity of the receiver, an operation mode of the link layer may be indirectly indicated to the receiver.

The following two flags may be configured with regard to control of an operation mode.

Header compression flag (HCF): This may be a flag for determination of whether header compression is applied to a corresponding link layer and may have a value indicating enable or disable.

Encapsulation flag (EF): This may be a flag for determination of whether encapsulation is applied in a corresponding link layer and may have a value indicating enable or disable. However, when encapsulation needs to be performed according to a header compression scheme, the EF may be defined to be dependent upon a HCF.

A value mapped to each flag may be applied according to system configuration as long as the value represents Enable and Disable, and a bit number allocated to each flag can be changed. According to an embodiment of the present invention, an enable value may be mapped to 1 and a disable value may be mapped to 0.

The diagram shows whether header compression and encapsulation included in a link layer are performed according to values of HCF and EF and in this case, a packet format transmitted to a physical layer. That is, according to an embodiment of the present invention, the receiver can know a type of a packet input to the physical layer as information about the HCF and the EF.

FIG. 62 is a diagram a descriptor for signaling a mode control parameter according to an embodiment of the present invention.

Flags as information about mode control in a link layer may be signaling information, generated by the transmitter in the form of descriptor, and transmitted to the receiver. Signaling including a flag as information about mode control may be used to control an operation mode in a transmitter of a headend terminal, and whether a flag as information about mode control is included in signaling transmitted to the receiver may be optionally selected.

When signaling including a flag as information about mode control is transmitted to the receiver, the receiver may directly select an operation mode about a corresponding DP and perform a packet decapsulation operation. When signaling including a flag as information about mode control is not transmitted to the receiver, the receiver can determine a mode in which the signaling is transmitted, using physical layer signaling or field information of a packet header, which is transmitted to the receiver.

The link layer mode control description according to an embodiment of the present invention may include DP_id information, HCF information, and/or EF information. The link layer mode control description may be included in a transmission parameter in the aforementioned FIC, link layer signaling packet, signaling via a dedicated channel, PSI/SI, and/or physical layer.

The DP_id information identifies a DP to which a mode in a link layer is applied.

The HCF information identifies whether header compression is applied in the DP identified by the DP_id information.

The EF information identifies whether encapsulation is performed on the DP identified by the DP_id information.

FIG. 63 is a diagram illustrating an operation of a transmitter for controlling a operation mode according to an embodiment of the present invention.

Although not illustrated in the diagram, prior to a processing process of al ink layer, a transmitter may perform processing in a upper layer (e.g., an IP layer). The transmitter may generate an IP packet including broadcast data for a broadcast service.

The transmitter parses or generates a system parameter (JS19010). Here, the system parameter may correspond to the aforementioned signaling data and signaling information.

The transmitter may receive or set mode control related parameter or signaling information during a broadcast data processing process in a link layer and sets a flag value associated with operation mode control (JS19020). The transmitter may perform this operation after the header compression operation or the encapsulation operation. That is, the transmitter may perform the header compression or encapsulation operation and generate information associated with this operation.

The transmitter acquires a packet of a upper layer that needs to be transmitted through a broadcast signal (JS19030). Here, the packet of the upper layer may correspond to an IP packet.

The transmitter checks HCF in order to determine whether header compression is applied to the packet of the upper layer (JS19040).

When the HCF is enabled, the transmitter applies the header compression to the packet of the upper layer (JS19050). After header compression is performed, the transmitter may generate the HCF. The HCF may be used to signal whether header compression is applied, to the receiver.

The transmitter performs encapsulation on the packet of the upper layer to which header compression is applied to generate a link layer packet (JS19060). After the encapsulation process is performed, the transmitter may generate an EF. The EF may be used to signal whether encapsulation is applied to the upper layer packet, to the receiver.

The transmitter transmits the link layer packet to a physical layer processor (JS19070). Then the physical layer processor generates a broadcast signal including the link layer packet and transmits the broadcast signal to the receiver.

When the HCF is disabled, the transmitter checks the EF in order to determine whether encapsulation is applied (JS19080).

When the EF is enabled, the transmitter performs encapsulation on the upper layer packet (JS19090). When the EF is disabled, the transmitter does not perform separate processing on the corresponding packet stream. The transmitter transmits the packet stream (link layer packet) on which processing is completed in the link layer, to a physical layer (JS19070). Header compression, encapsulation, and/or generation of link layer may be performed by a link layer packet generator (i.e. link layer processor) in the transmitter.

The transmitter may generate service signaling channel (SCC) data. The service signaling channel data may be generated by a service signaling data encoder. The service signaling data encoder may be included in a link layer processor and may present separately from the link layer processor. The service signaling channel data may include the aforementioned FIC and/or EAT. The service signaling channel data may be transmitted to the aforementioned dedicated channel.

FIG. 64 is a diagram illustrating an operation of a receiver for processing a broadcast signal according to an operation mode according to an embodiment of the present invention.

A receiver may receive information associated with an operation mode in a link layer together with a packet stream.

The receiver receives signaling information and/or channel information (JS20010). Here, a description of the signaling information and/or the channel information is replaced with the above description.

The receiver selects a DP for receiving and processing according to the signaling information and/or the channel information (JS20020).

The receiver performs decoding of a physical layer on the selected DP and receives a packet stream of a link layer (JS20030).

The receiver checks whether link layer mode control related signaling is included in the received signaling (JS20040).

When the receiver receives the link layer mode related information, the receiver checks an EF (JS20050).

When the EF is enabled, the receiver performs a decapsulation process on a link layer packet (JS20060).

The receiver checks an HCF after decapsulation of the packet, and performs a header decompression process when the HCF is enabled (JS20080).

The receiver transmits the packet on which header decompression is performed, to a upper layer (e.g., an IP layer) (JS20090). During the aforementioned process, when the HCF and the EF are disabled, the receiver recognizes the processed packet stream as an IP packet and transmits the corresponding packet to the IP layer.

When the receiver does not receive link layer mode related information or a corresponding system does not transmit the link layer mode related information to the receiver, the following operation is performed.

The receiver receives signaling information and/or channel information (JS20010) and selects a DP for reception and processing according to corresponding information (JS20020). The receiver performs decoding of the physical layer on the selected DP to acquire a packet stream (JS20030).

The receiver checks whether the received signaling includes link layer mode control related signaling (JS20040).

Since the receiver does not receive link layer mode related signaling, the receiver checks a format of the packet transmitted using physical layer signaling, etc. (JS20100). Here, the physical layer signaling information may include information for identification of a type of the packet included in a payload of the DP. When the packet transmitted from the physical layer is an IP packet, the receiver transmits the packet to the IP layer without a separate process in a link layer.

When a packet transmitted from a physical layer is a packet on which encapsulation is performed, the receiver performs a decapsulation process on the corresponding packet (JS20110).

The receiver checks the form of a packet included in a payload using information such as a header, etc. of the link layer packet during the decapsulation process (JS20120), and the receiver transmits the corresponding packet to the IP layer processor when the payload is an IP packet.

When the payload of the link layer packet is a compressed IP, the receiver performs a decompression process on the corresponding packet (JS20130).

The receiver transmits the IP packet to an IP layer processor (JS20140).

FIG. 65 is a diagram illustrating information for identifying an encapsulation mode according to an embodiment of the present invention.

In a broadcast system, when processing in a link layer operates in one or more modes, a procedure for determining as which mode processing in the link layer operates (in a transmitter and/or a receiver) may be needed. In a procedure of establishing a transmission link between the transmitter and the receiver, the transmitter and/or the receiver may confirm configuration information of the link layer. This case may correspond to the case in which the receiver is initially set up or performs a scan procedure for a service or a mobile receiver newly enters an area within a transmission radius of the transmitter. This procedure may be referred to as an initialization procedure or a bootstrapping procedure. This procedure may be configured as a partial process of a procedure supported by the system without being configured by an additional procedure. In this specification, this procedure will be referred to as an initialization procedure.

Parameters needed in the initialization procedure may be determined according to functions supported by a corresponding link layer and types of operating modes possessed by each function. A description will be given hereinafter of the parameters capable of determining functions constituting the link layer and operation modes according to the functions.

The above-described drawing illustrates parameters for identifying an encapsulation mode.

When a procedure for encapsulating a packet in a link layer or a upper layer (e.g., an IP layer) can be configured, indexes are assigned to respective encapsulation modes and a proper field value may be allocated to each index. The drawing illustrates an embodiment of a field value mapped to each encapsulation mode. While it is assumed that a 2-bit field value is assigned in this embodiment, the field value may be expanded within a range permitted by the system in actual implementation, when more supportable encapsulation modes are present.

In this embodiment, if a field of information indicating an encapsulation mode is set to '00', the corresponding information may represent that encapsulation in a link layer is bypasses and not performed. If a field of information indicating an encapsulation mode is set to '01', the corresponding information may represent that data is processed by a first encapsulation scheme in the link layer. If a field of information indicating an encapsulation mode is set to '10', the corresponding information may represent that data is processed by a second encapsulation scheme in the link layer. If a field of information indicating an encapsulation mode is set to '11', the corresponding information may represent that data is processed by a third encapsulation scheme in the link layer.

FIG. 66 is a diagram illustrating information for identifying a header compression mode according to an embodiment of the present invention.

Processing in a link layer may include a function of header compression of an IP packet. If a few IP header compression schemes are capable of being supported in the link layer, a transmitter may determine which scheme the transmitter is to use.

Determination of a header compression mode generally accompanies an encapsulation function. Therefore, when the encapsulation mode is disabled, the header compression mode may also be disabled. The above-described drawing illustrates an embodiment of a field value mapped to each header compression mode. While it is assumed that a 3-bit field value is assigned in this embodiment, the field value may be expanded or shortened within a range permitted by the system in actual implementation according to a supportable header compression mode.

In this embodiment, if a field of information indicating the header compression mode is set to '000', the corresponding information may indicate that header compression processing for data is not performed in a link layer. If a field of information indicating the header compression mode is set to '001', the corresponding information may indicate that header compression processing for data in the link layer uses an RoHC scheme. If a field of information indicating the header compression mode is set to '010', the corresponding information may indicate that header compression processing for data in the link layer uses a second RoHC scheme. If a field of information indicating the header compression mode is set to '011', the corresponding information may indicate that header compression processing for data in the link layer uses a third RoHC scheme. If a field of information indicating the header compression mode is set to '100' to '111', the corresponding information may indicate that header compressing for data is reserved as a region for identifying a new header compression processing scheme for data in the link layer.

FIG. 67 is a diagram illustrating information for identifying a packet reconfiguration mode according to an embodiment of the present invention.

To apply a header compression scheme to a unidirectional link such as a broadcast system, the broadcast system (transmitter and/or receiver) needs to rapidly acquire context information. The broadcast system may transmit/receive a packet stream after a header compression procedure in an out-of-band form through reconfiguration of partial compressed packets and/or extraction of context information. In the present invention, a mode for reconfiguring a packet or performing processing such as addition of information capable of identifying the structure of the packet may be referred to as a packet reconfiguration mode.

The packet reconfiguration mode may use a few schemes and the broadcast system may designate a corresponding scheme in an initialization procedure of a link layer. The above-described drawing illustrates an embodiment of an index and a field value mapped to the packet reconfiguration mode. While it is assumed that a 2-bit field value is assigned in this embodiment, the field value may be expanded or shortened within a range permitted by the system in actual implementation according to a supportable packet reconfiguration mode.

In this embodiment, if a field of information indicating the packet reconfiguration mode is set to '00', corresponding information may represent that reconfiguration for a packet transmitting data is not performed in a link layer. If a field of information indicating the packet reconfiguration mode is set to '01', corresponding information may represent that a first reconfiguration scheme is performed for a packet transmitting data in the link layer. If a field of information indicating the packet reconfiguration mode is set to '10', corresponding information may represent that a second reconfiguration scheme is performed for a packet transmitting data in the link layer. If a field of information indicating the packet reconfiguration mode is set to '11', corresponding information may represent that a third reconfiguration scheme is performed for a packet transmitting data in the link layer.

FIG. 68 is a diagram illustrating a context transmission mode according to an embodiment of the present invention.

A transmission scheme of the above-described context information may include one or more transmission modes. That is, the broadcast system may transmit the context information in many ways. In the broadcast system, a context transmission mode may be determined according to the system and/or a transmission path of a logical physical layer and information for identifying the context transmission scheme may be signaled. The above-described drawing illustrates an embodiment of an index and a field value mapped to the context transmission mode. While it is assumed that a 3-bit field value is assigned in this embodiment, the field value may be expanded or shortened within a range permitted by the system in actual implementation according to a supportable context transmission mode.

In this embodiment, if a field of information indicating the context transmission mode is set to '000', corresponding field information may represent that context information is transmitted as a first transmission mode. If a field of information indicating the context transmission mode is set to '001', corresponding information may represent that context information is transmitted as a second transmission mode. If a field of information indicating the context transmission mode is set to '010', corresponding information may represent that context information is transmitted as a third transmission mode. If a field of information indicating the context transmission mode is set to '011', corresponding information may represent that context information is transmitted as a fourth transmission mode. If a field of information indicating the context transmission mode is set to '100', corresponding information may represent that context information is transmitted as a fifth transmission mode. If a field of information indicating a context transmission mode is set to '101' to '111', corresponding information may represent that context information is reserved to identify a new transmission mode.

FIG. 69 is a diagram illustrating initialization information when RoHC is applied by a header compression scheme according to an embodiment of the present invention.

While the case in which RoHC is used for header compression has been described by way of example in the present invention, similar initialization information may be used in the broadcast system even when a header compression scheme of other types is used.

In the broadcast system, transmission of initialization information suitable for a corresponding compression scheme according to a header compression mode may be needed. In this embodiment, an initialization parameter for the case in which a header compression mode is set to RoHC is described. Initialization information for RoHC may be used to transmit information about configuration of an RoHC channel which is a link between a compressor and a decompressor.

One RoHC channel may include one or more context information and information commonly applied to all contexts in the RoHC channel may be transmitted/received by being included in the initialization information. A path through which related information is transmitted by applying RoHC may be referred to as an RoHC channel and, generally, the RoHC channel may be mapped to a link. In addition, the RoHC channel may be generally transmitted through one DP and, in this case, the RoHC channel may be expressed using information related to the DP.

The initialization information may include link_id information, max_cid information, large_cids information, num_profiles information, profiles( ) information, num_IP_stream information, and/or IP_address( ) information.

link_id information represents an ID of a link (RoHC channel) to which corresponding information is applied.

When the link or the RoHC channel is transmitted through one DP, link_id information may be replaced with DP id.

max_cid information represents a maximum value of a CID. max_cid information may be used to inform a decompressor of the maximum value of the CID.

large_cids information has a Boolean value and identifies whether a short CID (0 to 15) is used or an embedded CID (0 to 16383) is used in configuring a CID. Therefore, a byte size expressing the CID may also be determined.

num_profiles information represents the number of profiles supported in an identified RoHC channel.

profiles( ) information represents a range of a protocol header-compressed in RoHC. Since a compressor and a decompressor should have the same profile in RoHC to compress and recover a stream, a receiver may acquire a parameter of RoHC used in a transmitter from profiles( ) information.

num_IP_stream information represents the number of IP streams transmitted through a channel (e.g., an RoHC channel).

IP_address information represents an address of an IP stream. IP_address information may represent a destination address of a filtered IP stream which is input to an RoHC compressor (transmitter).

FIG. 70 is a diagram illustrating information for identifying link layer signaling path configuration according to an embodiment of the present invention.

In the broadcast system, generally, a path through which signaling information is delivered is designed not to be changed. However, when the system is changed or while replacement between different standards occurs, information about configuration of a physical layer in which link layer signaling information rather than an IP packet is transmitted needs to be signaled. In addition, when a mobile receiver moves between regions covered by transmitters having different configurations, since paths through which link layer signaling information is transmitted may differ, the case in which link layer signaling path information should be transmitted may occur. The above-described drawing illustrates information for identifying a signaling path which is a path through which the link layer signaling information is transmitted/received. Indexes may be expanded or shortened with respect to the link layer signaling information according to a signaling transmission path configured in a physical layer. Separately from configuration in a link layer, operation of a corresponding channel may conform to a procedure of the physical layer.

The above-described drawing illustrates an embodiment in which information about signaling path configuration is allocated to a field value. In this specification, when multiple signaling paths are supported, indexes may be mapped to signaling paths having great importance in order of small values. Signaling paths having priority prioritized according to an index value may also be identified.

Alternatively, the broadcast system may use all signaling paths having higher priority than signaling paths indicated by the information about signaling path configuration. For example, when a signaling path configuration index value is 3, a corresponding field value may be '011' indicating that all of a dedicated data path, a specific signaling channel (FIC), and a specific signaling channel (EAC), priorities of which are 1, 2, and 3, are being used.

Signaling of the above scheme can reduce the amount of data that transmits signaling information.

FIG. 71 is a diagram illustrating information about signaling path configuration by a bit mapping scheme according to an embodiment of the present invention.

The above-described information about signaling path configuration may be transmitted/received through definition of a bit mapping scheme. In this embodiment, allocation of 4 bits to the information about signaling path configuration is considered and signaling paths corresponding to respective bits b1, b2, b3, and b4 may be mapped. If a bit value of each position is 0, this may indicate that a corresponding path is disabled and, if a bit value of each position is 1, this may indicate that a corresponding path is enabled. For example, if a 4-bit signaling path configuration field value is '1100', this may indicate that the broadcast system is using a dedicated DP and a specific signaling channel (FIC) in a link layer.

FIG. 72 is a flowchart illustrating a link layer initialization procedure according to an embodiment of the present invention.

If a receiver is powered on or a mobile receiver enters a transmission region of a new transmitter, the receiver may perform an initialization procedure for all or some system configurations. In this case, an initialization procedure for a link layer may also be performed. Initial setup of the link layer in the receiver, using the above-described initialization parameters may be performed as illustrated in the drawing.

The receiver enters an initialization procedure of a link layer (JS32010).

Upon entering the initialization procedure of the link layer, the receiver selects an encapsulation mode (JS32020). The receiver may select the encapsulation mode using the above-described initialization parameters in this procedure.

The receiver determines whether encapsulation is enabled (JS32030). The receiver may determine whether encapsulation is enabled using the above-described initialization parameters in this procedure.

Generally, since a header compression scheme is applied after the encapsulation procedure, if an encapsulation mode is disabled, the receiver may determine that a header compression mode is disabled (JS32080). In this case, since it is not necessary for the receiver to proceed to the initialization procedure any more, the receiver may immediately transmit data to another layer or transition to a data processing procedure.

The receiver selects a header compression mode (JS32040) when the encapsulation mode is enabled. Upon selecting the header compression mode, the receiver may determine a header compression scheme applied to a packet, using the above-described initialization parameter.

The receiver determines whether header compression is enabled (JS32050). If header compression is disabled, the receiver may immediately transmit data or transition to a data processing procedure.

If header compression is enabled, the receiver selects a packet stream reconfiguration mode and/or a context transmission mode (JS32060 and JS32070) with respect to a corresponding header compression scheme. The receiver may select respective modes using the above-described information in this procedure.

Next, the receiver may transmit data for another processing procedure or perform the data processing procedure.

FIG. 73 is a flowchart illustrating a link layer initialization procedure according to another embodiment of the present invention.

The receiver enters an initialization procedure of a link layer (JS33010).

The receiver identifies link layer signaling path configuration (JS33020). The receiver may identify a path through which link layer signaling information is transmitted, using the above-described information.

The receiver selects an encapsulation mode (JS33030). The receiver may select the encapsulation mode using the above-described initialization parameter.

The receiver determines whether encapsulation is enabled (JS33040). The receiver may determine whether encapsulation is enabled, using the above-described initialization parameter in this procedure.

Generally, since a header compression scheme is applied after the encapsulation procedure, if an encapsulation mode is disabled, the receiver may determine that a header compression mode is disabled (JS34100). In this case, since it is not necessary for the receiver to proceed to the initialization procedure any more, the receiver may immediately transmit data to another layer or transition to a data processing procedure.

The receiver selects a header compression mode (JS33050) when the encapsulation mode is enabled. Upon selecting the header compression mode, the receiver may determine a header compression scheme applied to a packet, using the above-described initialization parameter.

The receiver determines whether header compression is enabled (JS33060). If header compression is disabled, the receiver may immediately transmit data or transition to the data processing procedure.

If header compression is enabled, the receiver selects a packet stream reconfiguration mode and/or a context transmission mode (JS33070 and JS32080) with respect to a corresponding header compression scheme. The receiver may select respective modes using the above-described information in this procedure.

The receiver performs header compression initialization (JS33090). The receiver may use the above-described information in a procedure of performing header compression initialization. Next, the receiver may transmit data for another processing procedure or perform the data processing procedure.

FIG. 74 is a diagram illustrating a signaling format for transmitting an initialization parameter according to an embodiment of the present invention.

To actually transmit the above-described initialization parameter to a receiver, the broadcast system may transmit/receive corresponding information in the form of a descriptor. When multiple links operated in a link layer configured in the system are present, link_id information capable of identifying the respective links may be assigned and different parameters may be applied according to link_id information. For example, if a type of data transmitted to the link layer is an IP stream, when an IP address is not changed in the corresponding IP stream, configuration information may designate n IP address transmitted by a upper layer.

The link layer initialization descriptor for transmitting the initialization parameter according to an embodiment of the present invention may include descriptor_tag information, descriptor_length information, num_link information, link_id information, encapsulation_mode information, header_compression mode information, packet_reconfiguration_mode information, context_transmission_mode information, max_cid information, large_cids information, num_profiles information, and/or profiles( ) information. A description of the above information is replaced with a description of the above-described information having a similar or identical name.

FIG. 75 is a diagram illustrating a signaling format for transmitting an initialization parameter according to another embodiment of the present invention.

The drawing illustrates a descriptor of another form to actually transmit the above-described initialization parameter to a receiver. In this embodiment, the above-described initial configuration information of header compression is excluded. When an additional header compression initialization procedure is performed in data processing of each link layer or an additional header compression parameter is given to a packet of each link layer, the descriptor configured in the same form as in this embodiment may be transmitted and received.

The link layer initialization descriptor for transmitting the initialization parameter according to another embodiment of the present invention may include descriptor_tag information, descriptor_length information, num_link information, link_id information, encapsulation_mode information, header_compression_mode information, packet_reconfiguration_mode information, and/or context_transmission_mode information. A description of the above information is replaced with a description of the above-described information having a similar or identical name.

FIG. 76 is a diagram illustrating a signaling format for transmitting an initialization parameter according to another embodiment of the present invention.

The drawing illustrates a descriptor of another form to actually transmit the above-described initialization parameter to a receiver. In this embodiment, a descriptor for transmitting the initialization parameter includes configuration information about a signaling transmission path without including initial configuration information of header compression.

The configuration parameter about the signaling transmission path may use a 4-bit mapping scheme as described above. When a broadcast system (or transmitter or a receiver) for processing a broadcast signal is changed, a link layer signaling transmission scheme or the contents of link layer signaling may differ. In this case, if the initialization parameter is transmitted in the same form as in this embodiment, the initialization parameter may be used even in the case of change of link layer signaling.

The link layer initialization descriptor for transmitting the initialization parameter according to another embodiment of the present invention may include descriptor_tag information, descriptor_length information, num_link information, signaling_path_configuration information, dedicated_DP_id information, link_id information, encapsulation_mode information, header_compression_mode information, packet_reconfiguration_mode information, and/or context_transmission_mode information.

When the link layer signaling information is transmitted through a dedicated DP, dedicated_DP_id information is information identifying the corresponding DP. When the dedicated DP is determined as a path for transmitting the signaling information in signaling path configuration, DP_id may be designated to include DP_id information in the descriptor for transmitting the initialization parameter.

A description of the above information contained in the descriptor is replaced with a description of the above-described information having a similar or identical name.

FIG. 77 is a diagram illustrating a receiver according to an embodiment of the present invention.

The receiver according to an embodiment of the present invention may include a tuner JS21010, an ADC JS21020, a demodulator JS21030, a channel synchronizer & equalizer JS21040, a channel decoder JS21050, an L1 signaling parser JS21060, a signaling controller JS21070, a baseband controller JS21080, a link layer interface JS21090, an L2 signaling parser JS21100, packet header recovery JS21110, an IP packet filter JS21120, a common protocol stack processor JS21130, an SSC processing buffer and parser JS21140, a service map database (DB) JS21150, a service guide (SG) processor JS21160, a SG DB JS21170, an AV service controller JS21180, a demultiplexer JS21190, a video decoder JS21200, a video renderer JS21210, an audio decoder JS21220, an audio renderer JS21230, a network switch JS21240, an IP packet filter JS21250, a TCP/IP stack processor JS21260, a data service controller JS21270, and/or a system processor JS21280.

The tuner JS21010 receives a broadcast signal.

When a broadcast signal is an analog signal, the ADC JS21020 converts the broadcast signal to a digital signal.

The demodulator JS21030 demodulates the broadcast signal.

The channel synchronizer & equalizer JS21040 performs channel synchronization and/or equalization.

The channel decoder JS21050 decodes a channel in the broadcast signal.

The L1 signaling parser JS21060 parses L1 signaling information from the broadcast signal. The L1 signaling information may correspond to physical layer signaling information. The L1 signaling information may include a transmission parameter.

The signaling controller JS21070 processes the signaling information or the broadcast receiver transmits the signaling information to an apparatus that requires the corresponding signaling information.

The baseband controller JS21080 controls processing of the broadcast signal in a baseband. The baseband controller JS21080 may perform processing in the physical layer on the broadcast signal using the L1 signaling information. When a connection relation between the baseband controller JS21080 and other apparatuses is not indicated, the baseband controller JS21080 may transmit the processed broadcast signal or broadcast data to another apparatus in the receiver.

The link layer interface JS21090 accesses the link layer packet and acquires the link layer packet.

The L2 signaling parser JS21100 parses L2 signaling information. The L2 signaling information may correspond to information included in the aforementioned link layer signaling packet.

When header compression is applied to a packet of a upper layer (e.g., an IP packet) than a link layer, the packet header recovery JS21110 performs header decompression on the packet. Here, the packet header recovery JS21110 may restore a header of the packet of the upper layer using information for identification of whether the aforementioned header compression is applied.

The IP packet filter JS21120 filters the IP packet transmitted to a specific IP address and/or UDP number. The IP packet transmitted to the specific IP address and/or UDP number may include signaling information transmitted through the aforementioned dedicated channel. The IP packet transmitted to the specific IP address and/or UDP number may include the aforementioned FIC, FIT, EAT, and/or emergency alert message (EAM).

The common protocol stack processor JS21130 processes data according to a protocol of each layer. For example, the common protocol stack processor JS21130 decodes or parses the corresponding IP packet according to a protocol of an IP layer and/or a upper layer than the IP layer.

The SSC processing buffer and parser JS21140 stores or parses signaling information transmitted to a service signaling channel (SSC). The specific IP packet may be designated as an SSC and the SSC may include information for acquisition of a service, attribute information included in the service, DVB-SI information, and/or PSI/PSIP information.

The service map DB JS21150 stores a service map table. The service map table includes attribute information about a broadcast service. The service map table may be included in the SSC and transmitted.

The SG processor JS21160 parses or decodes a service guide.

The SG DB JS21170 stores the service guide.

The AV service controller JS21180 performs overall control for acquisition of broadcast AV data.

The demultiplexer JS21190 divides broadcast data into video data and audio data.

The video decoder JS21200 decodes video data.

The video renderer JS21210 generates video provided to a user using the decoded video data.

The audio decoder JS21220 decodes audio data.

The audio renderer JS21230 generates audio provided to the user using the decoded audio data.

The network switch JS21240 controls an interface with other networks except for a broadcast network. For example, the network switch JS21240 may access an IP network and may directly receive an IP packet.

The IP packet filter JS21250 filters an IP packet having a specific IP address and/or a UDP number.

TCP/IP stack processor JS21260 decapsulates an IP packet according to a protocol of TCP/IP.

The data service controller JS21270 controls processing of a data service.

The system processor JS21280 performs overall control on the receiver.

FIG. 78 is a diagram illustrating a layer structure when a dedicated channel is present according to an embodiment of the present invention.

Data transmitted to a dedicated channel may not be an IP packet stream. Accordingly, a separate protocol structure from an existing IP-based protocol needs to be applied. Data transmitted to a dedicated channel may be data for a specific purpose. In the dedicated channel, various types of data may not coexist. In this case, the meaning of corresponding data may frequently become clear immediately after a receiver decodes the corresponding data in a physical layer.

In the above situation, it may not be required to process the data transmitted to the dedicated channel according to all of the aforementioned protocol structures (for normal broadcast data). That is, in a physical layer and/or a link layer, the data transmitted to the dedicated channel may be completely processed and information contained in the corresponding data can be used.

In a broadcast system, data transmitted to the dedicated channel may be data (signaling) for signaling and the data (signaling data) for signaling may be transmitted directly to a dedicated channel, but not in an IP stream. In this case, a receiver may more rapidly acquire the data transmitted to the dedicated channel than data transmitted in the IP stream.

With reference to the illustrated protocol structure, a dedicated channel may be configured in a physical layer, and a protocol structure related to processing of broadcast data of this case is illustrated.

In the present invention, a part that is conformable to a general protocol structure may be referred to as a generic part and a protocol part for processing a dedicated channel may be referred to as a dedicated part, but the present invention is not limited thereto. A description of processing of broadcast data through a protocol structure in the generic part may be supplemented by the above description of the specification.

On or more information items (dedicated information A, dedicated information B, and/or dedicated information C)

may be transmitted through a dedicated part, and corresponding information may be transmitted from outside of a link layer or generated in the link layer. The dedicated part may include one or more dedicated channels. In the dedicated part, the data transmitted to the dedicated channel may be processed using various methods.

Dedicated information transmitted from outside to a link layer may be collected through a signaling generation and control module in the link layer and processed in the form appropriate for each dedicated channel. A processing form of the dedicated information transmitted to the dedicated channel may be referred to as a dedicated format in the present invention. Each dedicated format may include each dedicated information item.

As necessary, data (signaling data) transmitted through the generic part may be processed in the form of a packet of a protocol of a corresponding link layer. In this process, signaling data transmitted to the generic part and signaling data transmitted to the dedicated part may be multiplexed. That is, the signaling generation and control module may include a function for performing the aforementioned multiplexing.

When the dedicated channel is a structure that can directly process dedicated information, data in a link layer may be processed by a transparent mode; bypass mode, as described above. An operation may be performed on some or all of dedicated channels in a transport mode, data in a dedicated part may be processed in a transparent mode, and data in a generic part may be processed in a normal mode. Alternatively, general data in the generic part may be processed in a transparent mode and only signaling data transmitted to the generic part and data in the dedicated part can be processed in a normal mode.

According to an embodiment of the present invention, when a dedicated channel is configured and dedicated information is transmitted, processing is not required according to each protocol defined in a broadcast system, and thus information (dedicated information) required in a receiving side can be rapidly accessed.

A description of data processing in a generic part and/or higher layers in a link layer illustrated in the drawing may be substituted with the above description.

FIG. 79 is a diagram illustrating a layer structure when a dedicated channel is present according to another embodiment of the present invention.

According to another embodiment of the present invention, with respect to some dedicated channels among dedicated channels, a link layer may be processed in a transparent mode. That is, processing of data transmitted to some dedicated channels may be omitted in the link layer. For example, dedicated information A may not be configured in a separate dedicated format and may be transmitted directly to a dedicated channel. This transmitting structure may be used when the dedicated information A is conformable to a structure that is known in a broadcast system. Examples of the structure that is known in the broadcast system may include a section table and/or a descriptor.

In the embodiment of the present invention, as a wider meaning, when dedicated information corresponds to dedicated information, up to a portion in which the corresponding signaling data is generated may be considered as a region of a link layer. That is, dedicated information may be generated in the link layer.

FIG. 80 is a diagram illustrating a layer structure when a dedicated channel is independently present according to an embodiment of the present invention.

The drawing illustrates a protocol structure for processing broadcast data when a separate signaling generation and control module is not configured in a link layer. Each dedicated information item may be processed in the form of dedicated format and transmitted to a dedicated channel.

Signaling information that is not transmitted to a dedicated channel may be processed in the form of a link layer packet and transmitted to a data pipe.

A dedicated part may have one or more protocol structure appropriate for each dedicated channel. When the dedicated part has this structure, a separate control module is not required in the link layer, and thus it may be possible to configure a relatively simple system.

In the present embodiment, dedicated information A, dedicated information B, and dedicated information C may be processed according to different protocols or the same protocol. For example, the dedicated format A, the dedicated format B, and the dedicated format C may have different forms.

According to the present invention, an entity for generating dedicated information can transmit data anytime without consideration of scheduling of a physical layer and a link layer. As necessary, in the link layer, data may be processed on some or all of dedicated channels in a transparent mode or a bypass mode.

A description of data processing in a generic part and/or higher layers in a link layer illustrated in the drawing may be substituted with the above description.

FIG. 81 is a diagram illustrating a layer structure when a dedicated channel is independently present according to another embodiment of the present invention.

When the aforementioned dedicated channel is independently present, processing in a link layer may be performed on some dedicated channels in a transparent mode in an embodiment corresponding to a layer structure. With reference to the drawing, dedicated information A may be transmitted directly to a dedicated channel rather than being processed in a separate format. This transmitting structure may be used when the dedicated information A is conformable to a structure that is known in a broadcast system. Examples of the structure that is known in the broadcast system may include a section table and/or a descriptor.

In the embodiment of the present invention, as a wider meaning, when dedicated information corresponds to dedicated information, up to a portion in which the corresponding signaling data is generated may be considered as a region of a link layer. That is, dedicated information may be generated in the link layer.

FIG. 82 is a diagram illustrating a layer structure when a dedicated channel transmits specific data according to an embodiment of the present invention.

Service level signaling may be bootstrapped to a dedicated channel, or a fast information channel (FIC) as information for scanning a service and/or an emergency alert channel (EAC) including information for emergency alert may be transmitted. Data transmitted through the FIC may be referred to as a fast information table (FIT) or a service list table (SLT) and data transmitted through the EAC may be referred to as an emergency alert table (EAT).

A description of information to be contained in a FIT and the FIT may be substituted with the above description. The FIT may be generated and transmitted directly by a broadcaster or a plurality of information items may be collected and generated in the link layer. When the FIT is generated and transmitted by a broadcaster, information for identifying a corresponding broadcaster may be contained in the FIT. When a plurality of information items are collected to generate an FIT in the link layer, information for scanning services provided by all broadcasters may be collected to generate the FIT.

When the FIT is generated and transmitted by a broadcaster, the link layer may be operated in a transparent mode to directly transmit the FIT to an FIC. When the FIT as a combination of a plurality of information items owned by a transmitter is generated, generation of the FIT and configuration of corresponding information in the form of a table may be within an operating range of the link layer.

A description of information to be contained in an EAT and the EAT may be substituted with the above description. In the case of the EAC, when an entity (e.g., IPAWS) for managing an emergency alert message transmits a corresponding message to a broadcaster, an EAT related to the corresponding message may be generated and the EAT may be transmitted through the EAC. In this case, generation of a signaling table based on an emergency alert message may be within an operating range of the link layer.

The aforementioned signaling information generated in order to process IP header compression may be transmitted to a data pipe rather than being transmitted through a dedicated channel. In this case, processing for transmission of corresponding signaling information may be conformable to a protocol of a generic part and may be transmitted in the form of a general packet (e.g., a link layer packet).

FIG. 83 is a diagram illustrating a format of (or a dedicated format) of data transmitted through a dedicated channel according to an embodiment of the present invention.

When dedicated information transmitted to a dedicated channel is not appropriate for transmission to a corresponding channel or requires an additional function, the dedicated information may be encapsulated as data, which can be processed in a physical layer, in a link layer. In this case, as described above, a packet structure that is conformable to a protocol of a generic part supported in a link layer may be used. In many cases, a function supported by a structure of a packet transmitted through a generic part may not be required in a dedicated channel. In this case, the corresponding dedicated information may be processed in the format of the dedicated channel.

For example, in the following cases, the dedicated information may be processed in a dedicated format and transmitted to a dedicated channel.
1) When the size of data transmitted to a dedicated channel is not matched with a size of dedicated information to be transmitted.
2) When dedicated information is configured in the form of data (e.g., XML) that requires a separate parser instead of a form of a table.
3) When a version of corresponding information needs to be pre-checked to determine whether corresponding information is processed before corresponding data is parsed.
4) When error needs to be detected from dedicated information.

As described above, when dedicated information needs to be processed in a dedicated format, the dedicated format may have the illustrated form. Within a range appropriate to a purpose of each dedicated channel, a header including some of listed fields may be separately configured and a bit number allocated to a field may be changed.

According to an embodiment of the present invention, a dedicated format may include a length field, a data_version field, a payload_format field (or a data_format field), a stuffing_flag field, a CRC field, a payload_data_bytes( ) element, a stuffing length field, and/or a stuffing_bytes field.

The length field may indicate a length of data contained in a payload. The length field may indicate the length of data in units of bytes.

The data_version field may indicate a version of information of corresponding data. A receiver may check whether the corresponding data is already received information or new information using the version information and determine whether the corresponding information is used using the version information.

The data_format field may indicate a format of information contained in the dedicated information. For example, when the data_format field has a value of '000', the value may indicate that dedicated information is transmitted in the form of a table. When the data_format field has a value of '001', the value may indicate that the dedicated information is transmitted in form of a descriptor. When the data_format field has a value of '010', the value may indicate that the dedicated information is transmitted in form of a binary format instead of a table format or a descriptor form. When the data_format field has a value of '011', the value may indicate that the dedicated information is transmitted in form of XML.

When a dedicated channel is larger than dedicated information, a stuffing byte may be added in order to match the lengths of required data. In this regard, the stuffing_flag field may identify whether the stuffing byte is contained.

The stuffing length field may indicate the length of the stuffing_bytes field.

The stuffing_bytes field may be filled with a stuffing byte by as much as the size indicated by the stuffing length field. The stuffing_bytes field may indicate the size of a stuffing byte.

The CRC field may include information for checking error of data to be transmitted to a dedicated channel. The CRC field may be calculated using information (or a field) contained in dedicated information. Upon determining that the error is detected using the CRC field, a receiver may disregard received information.

FIG. 84 is a diagram illustrating configuration information of a dedicated channel for signaling information about a dedicated channel according to an embodiment of the present invention.

In general, determination of an operation in a transparent mode or a normal mode with respect to the aforementioned dedicated channel may be predetermined during design of a dedicated channel and may not be changed during management of a system. However, since a plurality of transmitting systems and a plurality of receiving systems are present in a broadcast system, there may be a need to flexibly adjust a processing mode for a dedicated channel. In order to change or reconfigure an operating mode of a flexible system and provide information about the operating mode to a receiving side, signaling information may be used. The signaling information may be contained in a physical layer signaling; L1 signaling; transmitting parameter and transmitted, and may be transmitted to one specific dedicated channel. Alternatively, the signaling information may be contained in a portion of a descriptor or a table used in a broadcast system. That is, the information may be contained as a portion of one or more signaling information items described in the specification.

The dedicated channel configuration information may include a num_dedicated_channel field, a dedicated_channel_id field, and/or an operation_mode field.

The num_dedicated_channel field may indicate the number of dedicated channels contained in a physical layer.

The dedicated_channel_id field may correspond to an identifier for identifying a dedicated channel. As necessary, an arbitrary identifier (ID) may be applied to a dedicated channel.

The operation_mode field may indicate a processing mode for a dedicated channel. For example, when the operation_mode field has a value of '0000', the value may indicate that the dedicated channel is processed in a normal mode. When the operation_mode field has a value of '1111', the value may indicate that the dedicated channel is processed in a transparent mode or a bypass mode. '0001' to '1110' among values of the operation_mode field may be reserved for future use.

Hereinafter, a method of transmitting signaling information through the link layer according to another embodiment of the present invention is described.

FIG. 85 shows a transmitter-side link layer structure and a method of transmitting signaling information according to an embodiment of the present invention.

FIG. 86 shows a receiver-side link layer structure and a method of receiving signaling information according to an embodiment of the present invention.

In the embodiments of FIGS. 85 and 86, a plurality of broadcasters may provide services within one frequency band. Furthermore, the broadcasters may transmit a plurality of broadcast services, and one service may include at least one component. On the reception side, a user may receive content in a service unit.

In order to support IP hybrid broadcasting, a session-based transport protocol may be used. In an embodiment, the session-based transport protocol may be the ROUTE protocol. The contents of signaling information transferred to each signaling path may be determined depending on the transport structure of a corresponding protocol. Furthermore, a plurality of session-based transport protocols may be operated.

In an embodiment, a fast information channel (FIC) and an emergency alert channel (EAC) may be used as dedicated channels. Furthermore, a base data pipe (DP) and normal DP for transferring signaling information may be used. Signaling information transferred through an FIC maybe called a fast information table (FIT), and signaling information transferred through an EAC maybe called an emergency alert table (EAT). If a dedicated channel has not been configured, the FIT and the EAT may be transmitted using a common link layer signaling transmission method. In an embodiment, information about the configuration of the FIC and EAC may be transmitted through physical layer signaling. The link layer may format signaling information based on the characteristics of a corresponding channel. To transfer data to a specific channel of the physical layer is performed from a logical viewpoint, and an actual operation may comply with the characteristics of the physical layer.

An FIC or an FIT transmitted as link layer signaling information may provide information about the service of each broadcasting company transmitted in a corresponding frequency and a path for receiving the service. To this end, the link layer signaling information may include the following information.

System parameter information: a transmitter-related parameter, a broadcasting company-related parameter that provides a service in a corresponding channel A link layer: context information related to IP header compression and ID information of a DP to which corresponding context is applied A higher layer: an IP address and UDP port number, service and component information, emergency alert information, the IP address for a packet stream and signaling information transferred in the IP layer, an UDP port number, a session ID, and information about a mapping relation between DPs That is, the signaling information of the link layer may include an IP address, an UDP port number, and information about a mapping relation between PLPs.

If a plurality of broadcast services is transmitted through one frequency band as described above, it is more efficient for a receiver to decode only a DP for a required service after checking signaling information without a need to decode all of DPs. Accordingly, in a system including the transmitter configuration of FIG. 85 and the receiver configuration of FIG. 86, such information may be obtained using an FIC and a base DP. The base DP may denote a DP including the signaling information of a service layer. An operation related to the link layer of a receiver may be performed as follows.

(1) When a user selects or changes a service to be received, the receiver may be tuned to a corresponding frequency and may read information stored in a DB in relation to a corresponding channel. The information stored in the DB of the receiver may be information configured by reading an FIT when a channel is first scanned.

(2) After receiving the FIT and receiving information of the corresponding channel, the receiver may update previously stored information. Furthermore, the receiver may obtain the transmission path and component information of the service selected by the user or may obtain information necessary to obtain such information. In an embodiment, if it is determined that there is no change in corresponding information using the version information of the FIT or a separate update indication method for a corresponding dedicated channel, the receiver may omit an additional decoding or parsing operation. Information about the transmission path of the service may include information, such as an IP address, an UDP port number, a session ID and a DP ID through which a service or service component is transmitted.

(3) The receiver may obtain link layer signaling information by decoding a DP included in signaling based on the information of the FIT, and may combine the obtained link layer signaling information with signaling information received through a dedicated channel, if necessary. Such a process may be omitted if it is not necessary to receive additional link layer signaling other than the FIT. In an embodiment, the FIT may be transmitted through a DP like a base DP other than a dedicated channel. In this case, when the base DP is decoded to receive the FIT, the receiver may receive another piece of link layer signaling information at the same time, may combine the received link layer signaling information with the FIT if necessary, and may use the combined information for reception processing.

(4) The receiver may obtain transmission path information for receiving higher layer signaling information that belongs to several packet streams and DPs now being transmitted in a channel and that is necessary to receive a user selection service using the FIT and the link layer signaling information. The transmission path information may include at least one of IP address information, UDP port information, session ID information and DP ID information. An addressor or port number previously stored in an IANA or reception system may be used as the IP address and UDP port number.

(5) The receiver may obtain overhead reduction information for the packet stream of a DP corresponding to the service. The receiver may obtain the overhead reduction information using previously stored link layer signaling information. If DP information for receiving the selected service is received as the signaling information of a higher layer, the receiver may obtain the DP information to be decoded by obtaining the corresponding signaling information using the same method as DB and shared memory access. If link layer signaling and data are transmitted through the same DP or only one DP is managed, the data transmitted through the DP may be temporarily buffered while signaling information is decoded and parsed.

(6) The receiver may obtain path information on which a service is actually transmitted using higher layer signaling information for a received service and thus may receive service data. Furthermore, the receiver may perform decapsulation and header recovery on a packet stream received using the overhead reduction information of a DP to be received and may transmit an IP packet stream to the higher layer of the receiver.

FIG. 87 shows the transmission path of signaling information according to an embodiment of the present invention.

In FIG. 87, the signaling information has been classified into link layer signaling A, link layer signaling B, signaling A, signaling B and signaling C according to their transmission paths. Link layer signaling A may be transmitted to a dedicated channel. Signaling A-C may be transmitted in an IP packet format from a viewpoint of the link layer and may be called upper layer signaling or service layer signaling. Each of the pieces of classified signaling information is additionally described below.

1) Link layer signaling A: it indicates signaling information transmitted to a dedicated channel.

2) Link layer signaling B: it may be transmitted through a DP in the format of a link layer packet. In this case, the DP may be a base DP for signaling transmission.

3) Signaling A: it corresponds to a case where signaling data becomes the payload of an IP/UDP packet. Values designated in the IANA or system may be used for an IP address and UDP port number. Signaling A is signaling information obtained using an IP address and a port number.

4) Signaling B: Signaling data is transmitted through a transport session-based protocol and may be transmitted through a session designated in the transport session. Several transport sessions may be transmitted using the same IP addressor and port number. Accordingly, the receiver may obtain signaling information using a dedicated session ID. In order to obtain a specific session transmitted in the same session, the header of a packet included in a transport session-based protocol may be used.

5) Signaling C: it indicates a case where a separate session is not assigned to signaling data or signaling C may be transmitted along with broadcast data. Signaling C has the same transport structure as a common session-based protocol. In order to obtain signaling information transmitted in the same session, the header of a packet included in a transport session-based protocol may be used.

FIG. 88 shows the transmission path of an FIT according to an embodiment of the present invention.

FIG. 89 shows the syntax of an FIT according to an embodiment of the present invention.

FIG. 88 shows an embodiment of a path through which an FIT may be transmitted in the methods of transmitting signaling information, which have been described in relation to FIG. 87. In an embodiment, the transmission path of an FIT may be determined based on a channel configured in the physical layer and a protocol for transmitting a DP or FIT. An embodiment of each transmission path of FIG. 88 is described below.

(1) If an FIT is transmitted through a dedicated channel

If a dedicated channel (e.g., an FIC) for FIT transmission has been configured in the physical layer, the FIT may be transmitted through the corresponding dedicated channel. In this case, an embodiment of the syntax of the FIT may be defined as in a syntax A of FIG. 89. The FIT may include transmission information about the signaling of a higher layer which is transmitted using each protocol.

(2) If an FIT is transmitted to a base DP

If a base DP is a dedicated DP that may be directly decoded without separate signaling or indication, a receiver may obtain an FIT by directly entering or extracting the base DP when obtaining the frame of the physical layer. If a base DP is a DP previously not determined in a system and has no separate signaling or indication, such information may be transmitted as the signaling information of the physical layer. A receiver may identify the base DP using the physical layer signaling information. In an embodiment, an FIT transmitted to a base DP may be defined as in the syntax A of FIG. 89. If an FIT is transmitted through a base DP, the FIT may be encapsulated in a link layer packet form having a structure capable of being processed in the physical layer. If both an FIT and another LLS are transmitted using a base DP, a broadcast system may use a separate scheme indicating that which link layer packet is a packet including an FIT through the link layer packet.

(3) If an FIT is transmitted through a normal DP

An FIT may be included in a normal DP and transmitted. In this case, a broadcast system may notify a receiver that it is a DP through which signaling information is transmitted using signaling information, such as physical layer signaling (PLS). In an embodiment, an FIT transmitted to a normal DP may be defined as in the syntax A of FIG. 89. If an FIT is transmitted through a normal DP, the FIT may be encapsulated in a link layer packet form having a structure capable of being processed in the physical layer. If both an FIT and another signaling are transmitted through a normal DP, a broadcast system may use a separate scheme indicating that which link layer packet is a packet including an FIT through the link layer packet.

(4) If an FIT is transmitted through a base DP in the form of an IP/UDP packet

As in the case of (2), if a base DP is used, a link layer packet may be transmitted through the base DP, and the payload of the link layer packet may include an IP/UDP packet. Furthermore, an FIT may be included in the IP/UDP packet. The IP/UDP packet including the FIT may have a predefined dedicated IP address and port number. Alternatively, an IP address and a port number by which the FIT is transmitted may be transmitted through separate signaling. If an FIT and another signaling information have the same IP address and port number, table ID information capable of distinguishing the FIT from another signaling needs to be included in the FIT. In this case, the FIT may be defined as in a syntax B of FIG. 89. An embodiment of the syntax of the FIT of FIG. 89 includes table ID information corresponding to an FIT.

(5) If an FIT is transmitted in the form of an IP/UDP packet transmitted through a normal DP As in the case of (3), an FIT may be included in an IP/UDP packet included in a DP through which signaling information is transmitted. A receiver may check that a DP is a DP through which signaling is transmitted as described in (3), and an IP/UDP packet included in the payload of a transmitted link layer packet may include the FIT. Information about the IP/UDP packet including the FIT may be determined as described in the case of (4). The FIT may be defined as in the syntax B of FIG. 89.

(6) If an FIT is transmitted through an EAC

An EAC is defined as a separate dedicated channel through which emergency alert (EA) information is transmitted, but an FIT may be transmitted through an EAC for the fast reception of the FIT. Furthermore, if an additional dedicated channel is configured, the FIT may be transmitted through the dedicated channel. In such an embodiment, the FIT may be defined as in the syntax A of FIG. 89.

(7) If an FIT is transmitted in a transport session-based packet form

Signaling data may be transmitted using a transport session-based protocol. Furthermore, an FIT may be transmitted in the form of a packet for the transport session-based protocol. In this case, a value, such as a session ID, may be used for the classification of a transport session-based packet including an FIT. In this case, the FIT may be defined as in the syntax B of FIG. 89.

FIG. 90 shows FIT information according to an embodiment of the present invention.

An FIT includes information about each service included in a broadcast stream and supports fast channel scan and service acquisition. An FIT provides enough information to allow the presentation of a service list that is meaningful to a user, and supports a service selection via the up/down zapping of a channel number. An FIT includes information about a location from which the service layer signaling of a service may be obtained. The service layer signaling may be obtained in broadcast and/or broadband. Fields included in the FIT are described below.

FIT_protocol_version: this field is an 8-bit unsigned integer and indicates the version of the structure of an FIT.

broadcast_stream_id: this field is a 16-bit unsigned integer and identifies the entire broadcast stream.

FIT_section_number: this field is a 4-bit field and assigns a section number. An FIT may include a plurality of FIT sections.

total_FIT_section_number: this field is a 4-bit field and indicates a total number of FIT sections including an FIT section (i.e., the greatest value of the FIT_section_number may become total FIT_section_number).

FIT_section_version: this field is a 4-bit field and indicates the version number of an FIT section. The version number may be increased by 1 when information carried by an FIT section is changed. When a maximum value is reached, FIT_section_version may return to 0.

FIT_section_length: this field is a 12-bit field and indicates the number of bytes of an FIT section. This field indicates the number of bytes of the FIT, starting immediately following the FIT_section_length field.

num_services: this field is an 8-bit unsigned integer and indicates the number of services described in an FIT instance. This field may include services having at least one component in each broadcast stream.

service_id: this field is a 16-bit unsigned integer and indicates an ID uniquely identifying a service within a corresponding broadcast area.

SLS_data_version: this field is an 8-bit unsigned integer that increases when a service entry for the service of an FIT or a signaling table for a service carried through service layer signaling is changed. A receiver may be aware that there is a change in signaling for a specific service by monitoring only an FIT.

service_category: this field is a 5-bit unsigned integer and may indicate the category of a service. The service category may be coded as in FIG. 91 below. The table of FIG. 91 may be expressed as in Table 27. FIG. 91 shows service category information according to an embodiment of the present invention.

TABLE 27

| SERVICE CATEGORY | MEANING |
|---|---|
| 0x00 | Service category not described in a service category field |
| 0x01 | A/V service |
| 0x02 | Audio service |
| 0x03 | App-based service |
| 0x04~0x07 | Reserved for future use |
| 0x08 | Service guide-service guide announcement |
| 0x09~0x1F | Reserved for future use | provider_id: this field is an 8-bit unsigned integer and identifies a provider that broadcasts a service.

short_service_name_length: this field is a 3-bit unsigned integer and indicates the number of byte pairs within the short_service_name field. If there is no short name provided for this service, the value of this field may be 0.

short_service_name: this field indicates the short name of a service. Each character may be encoded in UTF-8 (per UTF-8). If an odd number of bytes are present in the short name, the second byte of the last byte pair per pair count indicated by the short_service_name_length field may include 0x00.

service_status: this field is a 3-bit unsigned integer field and may indicate the state (active/inactive, hidden/shown) of a service. The MSB may indicate whether a service is active (set to 1) or inactive (set to 0), and the LSB may indicate whether a service is hidden (set to 1) or is not hidden (set to 0).

sp_indicator: if this field is set as a 1-bit flag, it indicates whether at least one component for meaningful presentation has been protected. If this field is set to 0, it indicates that a component necessary for the meaningful presentation of a service is not protected.

num_service_level_descriptors: this field is a 4-bit unsigned integer field and indicates the number of service level descriptors for a corresponding service.

service_level_descriptor( ) this field is 0 or at least one descriptor providing additional information for a corresponding service.

num_FIT_level_descriptors: this field is a 4-bit field and indicates the number of the FIT-level descriptors for an FIT.

FIT_level_descriptor( ) this field is 0 or at least one descriptor providing additional information for an FIT.

As a method for adding information necessary for an FIT, a descriptor may be added to the contents of a table. The descriptor may be defined as a service level descriptor or an FIT level descriptor depending on the character of information included in the descriptor. The service level descriptor includes additional information for a specific service. The FIT level descriptor may include additional information about all of services described by the FIT.

FIG. 92 shows a broadcast signaling location descriptor according to an embodiment of the present invention.

A broadcast signaling location descriptor may be included as a service level descriptor. The broadcast signaling location descriptor may also be called a service layer signaling (SLS) location descriptor. The SLS location descriptor may include a bootstrap address for SLS for each service. A receiver may obtain SLS delivered using a broadcast method based on information included in an SLS location descriptor.

descriptor_tag: this field is an 8-bit unsigned integer and may identify a corresponding descriptor.

descriptor_length: this field is an 8-bit unsigned integer and indicates a length from a field subsequent to this field to the end of a corresponding descriptor.

IP_version_flag: this field is a 1-bit indicator. This field indicates that an SLS_source_IP_address field and an SLS_destination_IP_address field have an IPv4 address if the value of this field is 0 and indicates that an SLS_source_IP_address field and an SLS_destination_IP_address field have an IPv6 address if the value of this field is 1.

SLS_source_IP_address flag: this field is a 1-bit flag and indicates that there is a service signaling channel source IP address for a corresponding service if the value of this field is 1 and that there is no service signaling channel source IP address for a corresponding service if the value of this field is 0.

SLS_source_IP_address: if this field is present, it includes the source IP address of an SLS LCT channel for a service. If IP_version_flag information is set to 0, it has a 32-bit IPv4 address. If IP_version_flag information is set to 1, it has a 128-bit IPv6 address.

SLS_destination_IP_address: This field includes the destination IP address of an SLS LCT channel for a service. If IP_version_flag information is set to 0, this field has a 32-bit IPv4 address. If the IP_version_flag information is set to 1, this field has a 128-bit IPv6 address.

SLS_destination_UDP_port: this field is a 16-bit unsigned integer field and indicates the destination UDP port number of an SLS LCT channel for a corresponding service.

SLS_TSI: it is a 16-bit unsigned integer field and indicates the transport session identifier (TSI) of an SLS LCT channel for a corresponding service.

SLS_PLP_ID: this field is an 8-bit unsigned integer field and indicates the identifier of a PLP including an SLS LCT channel for a corresponding service. The PLP may be more robust than another PLP used by the service.

In addition, protocol type information may be included. The protocol type information indicates a protocol type in which SLS information is transmitted. In an embodiment, a protocol may be at least one of the ROUTE and the MMT.

A base DP is a data pipe used for a specific purpose, and may include signaling information or data common to a corresponding frequency slot. For efficient bandwidth management, a base DP may include data to be delivered to a normal data pipe. If a dedicated channel is present, if the size of information to be transmitted deviates from the accommodation ability of a corresponding channel, a base DP may function to supplement such a problem. In general, one designated DP continues to be used as a base DP, but for efficient DP management, one or more of several data pipes may be dynamically selected using a signaling method, such as physical layer signaling or link layer signaling. A base DP may also be called a common DP or signaling DP.

An IP packet processing method in the link layer according to an embodiment of the present invention is described below. That is, an IP compression method for supporting the efficient transmission of an IP packet is described.

FIG. 93 is a view showing the structure of a Robust Header Compression (RoHC) packet and an uncompressed Internet Protocol (IP) packet according to an embodiment of the present invention.

An IP packet L1010 according to an embodiment of the present invention may include an IP Header, a User Datagram Protocol Header (UDP header), a Real time Transport Protocol Header (RTP Header), and/or a Payload.

An IP Header, a UDP Header, and an RTP Header according to an embodiment of the present invention may have a total length of about 40 bytes.

An RoHC Packet L1020 according to an embodiment of the present invention may include an RoHC Header and/or a Payload.

An RoHC Header according to an embodiment of the present invention is one obtained by compressing the headers of the IP packet. The RoHC Header may have a length of about 1 byte.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport.

According to an embodiment of the present invention, IP version, IP source address, IP destination address, IP fragment flag, UDP source port, UDP destination port, etc. may be almost unchanged at the time of IP streaming. Almost unchanged fields during streaming like the above-described fields may be named static fields. RoHC according to an embodiment of the present invention may not further transport such static fields for a while after transporting the static fields once. An embodiment of the present invention may name a state in which the static fields are not further transported for a while after transporting the static fields once an Initialization Refresh (IR) state and name a packet transporting the static fields an IR packet. In addition, according to an embodiment of the present invention, fields which are changed at any time but are maintained for a predetermined time may be named dynamic fields. An embodiment of the present invention may further transport the above-described dynamic fields. According to an embodiment of the present invention, a packet transporting the dynamic fields may be named an IR-DYN packet. According to an embodiment of the present invention, the IR packet and the IR-DYN packet may have a similar size to a conventional header since the IR packet and the IR-DYN packet contain all information of the conventional header.

According to an embodiment of the present invention, a method of compressing a header portion of the IP packet to reduce overhead of transported Internet Protocol (IP) packet data may be used. According to an embodiment of the present invention, an RoHC scheme, which is one of the IP packet header compression schemes, may be used and the RoHC scheme may secure reliability in a wireless section. The RoHC scheme may be used in a broadcasting system, such as Digital Video Broadcasting—Next Generation Handheld (DVB-NGH) and a mobile communication system, such as Long Term Evolution (LTE). The RoHC scheme may be used for a UDP and/or RTP packet although the RoHC scheme is a scheme for compressing and transporting the header of the IP packet.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport. In a case in which the above-described RoHC scheme is applied to a broadcasting system, a broadcast receiver may not know when to receive an IP stream and a general receiver which does not know all header information may not recognize a corresponding IP packet. An embodiment of the present invention may solve the above-described problem using signaling used in the broadcasting system.

An embodiment of the present invention may provide an IP header compression method for supporting sufficient transport of an IP packet in a next generation digital broadcasting system.

According to another embodiment of the present invention, the RoHC scheme may be applied to a packet of a FLUTE-based protocol. In order to apply the RoHC scheme to a FLUTE/ALC/LCT packet according to an embodiment of the present invention, a packet header may be classified into static fields, dynamic fields, and inferable fields. In the FLUTE/ALC/LCT packet according to an embodiment of the present invention, the static fields may include LCT Version Number (V), Congestion Control flag (C), Transport Session Identifier flag (S), Half-word flag(H), Congestion Control Information (CCI), Transport Session Identification (TSI), and/or Expected Residual Transmission time (ERT). LCT Version Number (V) may be a 4-bit field indicating version number of an LCT protocol. This field may be fixed to 1. Congestion Control flag (C) may be a 2-bit field indicating the size of Congestion Control. This field may have a size of 32, 64, 96, or 128 bits according to a value. Transport Session Identifier flag (S) may be a 1-bit field, which may be a variable indicating the size of TSI. This field may have a size of $32*S+16*H$. Half-word flag (H) may be a 1-bit field, which may be a common variable indicating the size of TSI and TOI. Congestion Control Information (CCI) may have a size of 32, 64, 96, or 128 bits. This field may be a value used for a receiver to Congestion Control a packet in a transported session. This field may include the number of layers, the number of logical channels, and sequence numbers. This field may be used to refer to throughput of an available bandwidth in a path between a transmitter and the receiver. Transport Session Identification (TSI) may have a size of 16, 32, or 48 bits. This field may indicate an identifier identifying a session from a specific transmitter. Expected Residual Transmission time (ERT) is a 0 or 32-bit field indicating a time during which reception is effective. In the FLUTE/ALC/LCT packet according to an embodiment of the present invention, the dynamic fields may include Transport Object Identifier flag (O), Close Session flag (A), Close Object flag (B), LCT header length (HDR_LEN), CodePoint (CP), Sender Current Time (SCT), and/or Source Block Number(SBN). Transport Object Identifier flag (O) may be a 2-bit field, which may be a variable indicating the size of TOI. This field may have a size of $32*O+16*H$. Close Session flag (A) may be a 1-bit field. This field may be generally set to 0. This field may be set to 1 when transport of a session packet is completed. Close Object flag (B) may be a 1-bit field. This field may be generally set to 0. This field may be set to 1 when transport of a data (Object) packet is completed. LCT header length (HDR_LEN) may be an 8-bit field. This field may express a header of LCT as 32 bits. CodePoint (CP) may be an 8-bit field indicating data type. Sender Current Time (SCT) may be a 0 or 32-bit field indicating a time during which the transmitter transports data to the receiver. Source Block Number (SBN) may be a 32-bit field. This field may identify a Source block of an Encoding Symbol in a generated Payload. In the FLUTE/ALC/LCT packet according to an embodiment of the present invention, the inferable fields may include Transport Object Identification (TOI), FEC Payload ID, Encoding Symbol ID (ESI), and/or Encoding Symbol(s). Transport Object Identification (TOI) may be a field having 16, 32, 48, 64, 80, 96, or 112 bits indicating an identifier identifying data (Object) from the receiver. The length and format of FEC Payload ID may be set by FEC Encoding ID. This field may be included in an FEC building block. Encoding Symbol ID (ESI) may be a 32-bit field identifying a special Encoding Symbol generated from a Source Block in a Payload. Encoding Symbol(s) may be divided data from which the receiver reforms data and have a variable size based on a divided size.

FIG. 94 is a view showing a concept of an RoHC packet stream according to an embodiment of the present invention.

As shown in this figure, static fields transported while being included in an IR packet and dynamic fields transported while being included in an IR-DYN packet may be transported only when needed. Other packets may be transported in the form of a header compressed packet including only about 1 to 2 bytes information.

According to an embodiment of the present invention, it is possible to reduce a header of 30 bytes or more per packet through the above-described concept of the RoHC packet stream. The header compressed packet may be classified into type 0, type 1, and type 2 according to the form of a compressed header. Use of an RoHC packet according to an embodiment of the present invention may conform to a conventional standard document.

FIG. 95 is a view showing a context information propagation procedure during transport of an RoHC packet stream according to an embodiment of the present invention.

As shown in this figure, full context info may be included in an IR packet and updated context info may be included in an IR-DYN packet. In addition, a header compressed packet excluding the IR packet and the IR-DYN packet may not include context info.

According to an embodiment of the present invention, a receiver having no IR information may not decode an RoHC stream until receiving the next IR packet to configure full context for unidirectional transport having no feedback channel. That is, in this figure, in a case in which the receiver receives an RoHC stream from a part denoted by Turn On, the receiver may not decode the RoHC stream until receiving the next IR packet. An embodiment of the present invention may transport IR information through a separate signaling channel so as to solve the above-described problem.

According to an embodiment of the present invention, RoHC configuration information, initial parameter, and/or IR packet information (full context information) may be needed so as to normally decode a transported RoHC packet.

According to an embodiment of the present invention, a header compressed packet compressed using an IP header compression method may be in-band transported and an IR packet including a static chain containing unchanged header information and a dynamic chain for context update may be out-of-band transported so as to reduce overhead of IP transport and to achieve efficient transport. At this time, packets received by the receiver may be recovered in order before transport.

FIG. 96 is a view showing a transmitting and receiving system of an IP stream, to which an IP header compression scheme according to an embodiment of the present invention is applied.

According to an embodiment of the present invention, IP streams may be configured to enter different Data Pipes (DPs). At this time, Header Compression Info may be transported to a receiver through an L2 signaling transport procedure and Header Compression Info may be used to recover the IP stream, to which the IP header compression scheme is applied, received by the receiver to an original IP stream. Header Compression Info may be encapsulated and transported to a DP. At this time, Header Compression Info may be transported to a normal DP or a DP for signaling transport (Base DP) according to the structure of a physical layer. In addition, Header Compression Info may be transported through a separate signaling channel in a case in which it is supported by the physical layer.

According to an embodiment of the present invention, IP-DP mapping info may be transported to the receiver through the L2 signaling transport procedure and IP-DP mapping info may be used to recover the IP stream from the DP received by the receiver. IP-DP mapping info may be encapsulated and transported to a DP. At this time, IP-DP mapping info may be transported to a normal DP or a DP for signaling transport (Base DP) according to the structure of a physical layer. In addition, IP-DP mapping info may be transported through a separate signaling channel in a case in which it is supported by the physical layer.

As shown in this figure, an IP Stream multiplexed by a compressor may be divided into one or more IP streams by an IP Filter L4010. Each IP stream may be compressed by an IP header compression scheme L4020 and may be transported to each DP through an encapsulation procedure L4030. At this time, an L2 Signaling Generator L4040 may generate signaling information including Header Compression Info and/or IP-DP mapping info. The generated signaling information may be encapsulated and transported to a decompressor through a Base DP or may pass through a Signaling Formatting procedure L4050 and transported to the decompressor through a signaling channel L4060.

As shown in this figure, the DPs received by the decompressor may be recovered into respective IP streams by IP-DP mapping info parsed by a Signaling Parser L4070. The IP streams, having passed through a Decapsulation procedure L4080, may be recovered into the IP stream before the IP header compression scheme is applied by Header Compression Info parsed by an L2 Signaling Parser L4090.

FIG. 97 is a view showing an IP overhead reduction procedure in a transmitter/receiver according to an embodiment of the present invention.

According to an embodiment of the present invention, when an IP stream enters an overhead reduction procedure, an RoHC Compressor L5010 may perform header compression for the corresponding stream. An embodiment of the present invention may use an RoHC method as a header compression algorithm. In a Packet Stream Configuration procedure L5020, a packet stream having passed through an RoHC procedure may be reconfigured according to the form of an RoHC packet. The reconfigured RoHC packet stream may be delivered to an encapsulation layer L5040 and then transported to the receiver through a physical layer. RoHC context information and/or signaling information generated in a procedure of reconfiguring the packet stream may be made into a transportable form through a signaling generator L5030 and delivered to a encapsulation layer or a signaling module L5050 according to the form of transport.

According to an embodiment of the present invention, the receiver may receive a stream for service data and signaling data delivered through a signaling channel or a separate DP. A Signaling Parser L5060 may receive signaling data to parse RoHC context information and/or signaling information and deliver the parsed information to a Packet Stream Recovery procedure L5070. In the Packet Stream Recovery procedure L5070, the receiver may recover the packet stream reconfigured by the compressor into a form in which an RoHC decompressor L5080 can decompress the packet stream using RoHC context information and/or signaling information included in the signaling data. The RoHC Decompressor L5080 may convert the recovered RoHC packet stream into an IP stream. The converted IP stream may be delivered to an upper layer through an IP layer.

FIG. 98 is a view showing a procedure of reconfiguring an RoHC packet to configure a new packet stream according to an embodiment of the present invention.

The present invention may include three configuration modes.

According to a first configuration mode (Configuration Mode #1) L6010, which is an embodiment of the present invention, the first configuration mode may extract a static chain and a dynamic chain from an IR packet and convert the remainder of the corresponding packet into a general header compressed packet. The first configuration mode may extract a dynamic chain from an IR-DYN packet and convert the remainder of the corresponding packet into a general header compressed packet. The first configuration mode may transport the general header compressed packet without any change.

According to a second configuration mode (Configuration Mode #2) L6020, which is another embodiment of the present invention, the second configuration mode may extract only a static chain from an IR packet and convert the remainder of the corresponding packet into a general header compressed packet. The second configuration mode may extract a dynamic chain from an IR-DYN packet and convert the remainder of the corresponding packet into a general header compressed packet. The second configuration mode may transport the general header compressed packet without any change.

According to a third configuration mode (Configuration Mode #3) L6030, which is another embodiment of the present invention, the third configuration mode may extract a static chain from an IR packet and convert the remainder of the corresponding packet into an IR-DYN packet. The third configuration mode may transport the IR-DYN packet without any change and transport a general header compressed packet without any change.

FIG. 99 is a view showing a procedure of converting an IR packet into a general header compressed packet in a procedure of reconfiguring an RoHC packet to configure a new packet stream according to an embodiment of the present invention.

An IR packet L7010 according to an embodiment of the present invention may include packet type, context ID, Profile, CRC, Static Chain, Dynamic Chain, and/or Payload. Packet type may indicate type of the corresponding IR packet. For example, in this figure, the packet type of the IR packet may indicate 1111110D and the last D may indicate whether a dynamic chain is included in the corresponding packet. Context ID may use 8 bits or more bits. Context ID may identify a channel through which the corresponding packet is transported. Context ID may be named a context identifier (CID). When a compressor sends a packet having an uncompressed full header while a specific CID is added thereto first and sends subsequent packets while omitting header fields having static, dynamic, or inferred properties as the same CID, a decompressor may recover all RTP headers by adding the omitted field to the compression header received after the second packet with reference to initially stored header field information based on the CID. Profile may indicate a profile of the IR packet identified by the packet type. CRC may indicate a CRC code for error check. Static Chain may indicate information which is not almost changed during streaming. For example, IP version, IP source address, IP destination address, IP fragment flag, UDP source port, UDP destination port, etc. may be included in the static chain during IP streaming. Dynamic Chain may indicate information which is changed at any time but is maintained for a predetermined time. Payload may include data to be transported.

A general header compressed packet L7020 according to an embodiment of the present invention may include Time Stamp (TS), Sequence Number (SN), CRC, and/or Payload. A general header compressed packet according to an embodiment of the present invention may correspond to a UO-1 packet corresponding to packet type 1. Time Stamp (TS) may indicate time stamp information for time synchronization. Sequence Number (SN) may indicate information indicating sequence of packets. CRC may indicate a CRC code for error check. Payload may include data to be transported.

According to an embodiment of the present invention, a static chain and a dynamic chain may be extracted from the IR packet L7010 and the extracted static chain and dynamic chain may be transported through Out of Band L7030. The Time Stamp (TS) and the Sequence Number (SN) included in the general header compressed packet L7020 may be re-encoded using information of the dynamic chain included in the IR packet L7010. The CRC included in the general header compressed packet L7020 may be re-calculated separately from the CRC included in the IR packet L7010.

FIG. 100 is a view showing a procedure of converting an IR-DYN packet into a general header compressed packet in a procedure of reconfiguring an RoHC packet to configure a new packet stream according to an embodiment of the present invention.

An IR-DYN packet L8010 according to an embodiment of the present invention may include packet type, context ID, Profile, CRC, Dynamic Chain, and/or Payload. Packet type may indicate type of the corresponding IR-DYN packet. For example, in this figure, the packet type of the IR-DYN packet may indicate 11111000. Context ID may use 8 bits or more bits. Context ID may identify a channel through which the corresponding IR-DYN packet is transported. Profile may indicate a profile of the IR-DYN packet identified by the packet type. CRC may indicate a CRC code for error check. Dynamic Chain may indicate information which is changed at any time but is maintained for a predetermined time. Payload may include data to be transported.

A general header compressed packet L8020 according to an embodiment of the present invention may include Time Stamp (TS), Sequence Number (SN), CRC, and/or Payload, which were previously described.

According to an embodiment of the present invention, a dynamic chain may be extracted from the IR-DYN packet L8010 and the extracted dynamic chain may be transported through Out of Band L8030. The Time Stamp (TS) and the Sequence Number (SN) included in the general header compressed packet L8020 may be re-encoded using information of the dynamic chain included in the IR-DYN packet L8010. The CRC included in the general header compressed packet L8020 may be re-calculated separately from the CRC included in the IR-DYN packet L8010.

FIG. 101 is a view showing a procedure of converting an IR packet into an IR-DYN packet in a procedure of reconfiguring an RoHC packet to configure a new packet stream according to an embodiment of the present invention.

An IR packet L9010 and an IR-DYN packet L9020 according to an embodiment of the present invention were previously described in detail.

According to an embodiment of the present invention, packet type of the IR packet L9010 may be changed into a packet type value corresponding to the IR-DYN packet L9020. A static chain may be extracted from the IR packet L9010 and the extracted static chain may be transported through Out of Band L9030. The remaining fields included in the IR packet L9010 excluding the packet type and the static chain may be identically used in the IR-DYN packet L9020.

According to an embodiment of the present invention, encoding and calculation methods related to fields used in a procedure of reconfiguring an RoHC packet to configure a new packet stream may conform to a related standard document or other methods may be applied.

FIG. 102 is a view showing a configuration and recovery procedure of an RoHC packet stream in a first configuration mode (Configuration Mode #1) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L10010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain and a dynamic chain from the IR packet and extract a dynamic chain from the IR-DYN packet. The extracted static chain and dynamic chain may be transported through Out of Band L10030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L10020 may be transported through a data pipe and the extracted static chain and dynamic chain may be transported through Out of Band L10030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L10040), and detect a static chain and a dynamic chain corresponding to the packet stream to be received. The static chain and/or the dynamic chain may be received through Out of Band (Out of Band Reception, L10050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L10060 including an IR packet, an IR-DYN packet, and/or a general header compressed packet.

The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

FIG. 103 is a view showing a configuration and recovery procedure of an RoHC packet stream in a second configuration mode (Configuration Mode #2) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L11010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain from the IR packet and extract a dynamic chain from the IR-DYN packet. The extracted static chain and dynamic chain may be transported through Out of Band L11030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L11020 may be transported through a data pipe and the extracted static chain and dynamic chain may be transported through Out of Band L11030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L11040), and detect a static chain and a dynamic chain corresponding to the packet stream to be received. The static chain and/or the dynamic chain may be received through Out of Band (Out of Band Reception, L11050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L11060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

FIG. 104 is a view showing a configuration and recovery procedure of an RoHC packet stream in a third configuration mode (Configuration Mode #3) according to an embodiment of the present invention.

A configuration procedure of an RoHC packet stream in a transmitter according to an embodiment of the present invention is as follows.

A transmitter according to an embodiment of the present invention may detect an IR packet from an RoHC packet stream L12010 based on RoHC header information. Next, the transmitter may extract a static chain from the IR packet and convert the IR packet into an IR-DYN packet using the remainder of the IR packet excluding the extracted static chain. For all RoHC packet streams, the transmitter may replace a header of the IR packet with a header of the IR-DYN packet through the same procedure as the above-described procedure and extract a static chain. A reconfigured packet stream L12020 may be transported through a data pipe and the extracted static chain may be transported through Out of Band L12030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L12040), and detect a static chain corresponding to the packet stream to be received. The static chain may be received through Out of Band (Out of Band Reception, L12050). Next, the receiver may detect an IR-DYN packet from the pack stream transported through the data pipe. Next, the receiver may combine the detected IR-DYN packet with the static chain to configure an IR packet. The configured IR packet may be transported to an RoHC decompressor. In addition, the receiver may configure an RoHC packet stream L12060 including an IR packet, an IR-DYN packet, and/or a general header compressed packet. The configured RoHC packet stream may be transported to the RoHC decompressor. A receiver according to an embodiment of the present invention may use static chain and SN and/or Context ID of an IR-DYN packet to recover an RoHC packet stream.

FIG. 105 is a view showing a combination of information that can be delivered through Out of Band according to an embodiment of the present invention.

According to an embodiment of the present invention, a method of delivering a static chain and/or a dynamic chain extracted in a configuration procedure of an RoHC packet stream through Out of Band may mainly include a delivering method through signaling and a delivering method through a data pipe, through which a parameter necessary for system decoding is delivered. According to an embodiment of the present invention, the data pipe, through which the parameter necessary for the system decoding is delivered, may be named Base Data Pipe (DP).

As shown in this figure, a static chain and/or a dynamic chain may be delivered through signaling or Base DP. According to an embodiment of the present invention, a first transport mode (Transport Mode #1) to a third transport mode (Transport Mode #3) may be used in the first configuration mode (Configuration Mode #1) or the second configuration mode (Configuration Mode #2), and a fourth transport mode (Transport Mode #4) and a fifth third transport mode (Transport Mode #5) may be used in the third configuration mode (Configuration Mode #3)

According to an embodiment of the present invention, each configuration mode and transport mode may be switched and used through separate signaling based on a situation of the system, and only one configuration mode and one transport mode may be fixed and used according to a design procedure of the system.

As shown in this figure, in the first transport mode (Transport Mode #1), a static chain may be transported through signaling, a dynamic chain may be transported through signaling, and a general header compressed packet may be transported through Normal Data Pipe.

As shown in this figure, in the second transport mode (Transport Mode #2), a static chain may be transported through signaling, a dynamic chain may be transported through Base Data Pipe, and a general header compressed packet may be transported through Normal Data Pipe.

As shown in this figure, in the third transport mode (Transport Mode #3), a static chain may be transported through Base Data Pipe, a dynamic chain may be transported through Base Data Pipe, and a general header compressed packet may be transported through Normal Data Pipe.

As shown in this figure, in the fourth transport mode (Transport Mode #4), a static chain may be transported through signaling, a dynamic chain may be transported through Normal Data Pipe, and a general header compressed packet may be transported through Normal Data Pipe. At this time, the dynamic chain may be transported by an IR-DYN packet.

As shown in this figure, in the fifth transport mode (Transport Mode #5), a static chain may be transported through Base Data Pipe, a dynamic chain may be transported through Normal Data Pipe, and a general header compressed packet may be transported through Normal Data Pipe. At this time, the dynamic chain may be transported by an IR-DYN packet.

FIG. 106 is a view showing configuration of a descriptor including a static chain according to an embodiment of the present invention.

According to an embodiment of the present invention, a transport format for transport through signaling may be needed to transport a static chain through signaling, to which a descriptor form may correspond.

A descriptor including a static chain according to an embodiment of the present invention may include a descriptor_tag field, a descriptor_length field, a context_id field, a context_profile field, a static_chain_length field, and/or a static_chain( ) field.

The descriptor_tag field may indicate that this descriptor is a descriptor including a static chain.

The descriptor_length field may indicate a length of this descriptor.

The context_id field may indicate context ID for a corresponding RoHC packet stream. The length of context ID may be decided in an initial configuration procedure of the system. This field may be named context identifier information and identify a corresponding RoHC packet stream based on a static field or a dynamic field.

The context_profile field may indicate compression protocol information of a corresponding RoHC packet stream. That is, this field may indicate up to which protocol a header of an RoHC packet included in the corresponding RoHC packet stream has been compressed.

The static_chain_length field may indicate the length of following static chain( ) in unit of byte. In a case in which this descriptor includes only one static chain, this field may be replaced by the above-described descriptor length field.

The static_chain( ) field may include information for the static chain.

FIG. 107 is a view showing configuration of a descriptor including a dynamic chain according to an embodiment of the present invention.

According to an embodiment of the present invention, a transport format for transport through signaling may be needed to transport a dynamic chain through signaling, to which a descriptor form may correspond.

A descriptor including a dynamic chain according to an embodiment of the present invention may include a descriptor_tag field, a descriptor_length field, a context_id field, a context_profile field, a dynamic_chain_length field, and/or a dynamic_chain( ) field.

The descriptor_tag field may indicate that this descriptor is a descriptor including a dynamic chain.

The descriptor_length field may indicate a length of this descriptor.

The context_id field may indicate context ID for a corresponding RoHC packet stream. The length of context ID may be decided in an initial configuration procedure of the system.

The context_profile field may indicate compression protocol information of a corresponding RoHC packet stream.

The dynamic_chain_length field may indicate the length of following dynamic chain( ) in unit of byte. In a case in which this descriptor includes only one dynamic chain, this field may be replaced by the above-described descriptor length field The dynamic_chain( ) field may include information for the dynamic chain.

FIG. 108 is a view showing configuration of a packet format including a static chain and a packet format including a dynamic chain according to an embodiment of the present invention.

According to an embodiment of the present invention, a transport format for transport in a packet form may be needed to transport a static chain and/or a dynamic chain through Base DP, to which a packet format form shown in this figure may correspond.

In order to configure a static chain and/or a dynamic chain according to an embodiment of the present invention in a packet format, a header for informing of information about the corresponding static chain and/or dynamic chain may be added. The added header may include a Packet Type field, a Static/Dynamic chain Indicator field, and a Payload Length field. In a case in which a packet according to an embodiment of the present invention has a structure in which it is difficult to indicate a static chain and/or a dynamic chain in detail, the information of the above-described descriptor including the static chain or the dynamic chain may be included in a payload of this packet A packet format including a static chain according to an embodiment of the present invention may include a Packet Type field, a Static chain Indicator field, a Payload Length field, and/or a Static Chain Byte field.

The Packet Type field may indicate type information of this packet.

The Static chain Indicator field may indicate whether information constituting a payload is a static chain or a dynamic chain.

The Payload Length field may indicate the length of a payload including a static chain.

The Static Chain Byte field may indicate information of the static chain included in the payload of this packet.

A packet format including a dynamic chain according to an embodiment of the present invention may include a Packet Type field, a Dynamic chain Indicator field, a Payload Length field, and/or a Dynamic Chain Byte field.

The Packet Type field may indicate type information of this packet.

The Dynamic chain Indicator field may indicate whether information constituting a payload is a static chain or a dynamic chain.

The Payload Length field may indicate the length of a payload including a dynamic chain.

The Dynamic Chain Byte field may indicate information of the dynamic chain included in the payload of this packet.

FIG. 109 is a diagram illustrating configuration of ROHC_init_descriptor( ) according to an embodiment of the present invention.

Robust header compression (RoHC) according to an embodiment of the present invention may be configured for a bidirectional transmission system. In the bidirectional transmission system, a RoHC compressor and a RoHC decompressor according to an embodiment of the present invention may perform an initial set up procedure and in this procedure, transmit and receive a parameter required for the initial procedure. According to an embodiment of the present invention, the procedure for transmitting and receiving the parameter required for aforementioned initial procedure can be referred as a negotiation procedure or an initialization procedure. However, according to an embodiment of the present invention, a unidirectional system such as a broadcast system cannot perform the aforementioned negotiation procedure and can replace the aforementioned initialization procedure with a separate method.

According to an embodiment of the present invention, during the initialization procedure, the RoHC compressor and the RoHC decompressor may transmit and receive the following parameters. The parameter required for the initial procedure according to an embodiment of the present invention may include MAX_CID, LARGE_CIDS, PROFILES, FEEDBACK_FOR, and/or MRRU.

MAX_CID may be used to notify the decompressor of a maximum value of a context ID (CID).

LARGE_CIDS may indicate whether a short CID (0 to 15 (decimal number)) and an embedded CID (0 to 16383 (decimal number)) are used for configuration of the CID. Thus, a size of a byte for representation of the CID may also be determined.

PROFILES may indicate a range of a protocol for header compression via RoHC. According to an embodiment of the present invention, RoHC can compress and restore a stream when the compressor and the decompressor have the same profile.

FEEDBACK_FOR may correspond to an optionally used field and indicate whether a backward channel for transmission of feedback information is present in a corresponding RoHC channel.

A maximum reconstructed reception unit (MRRU) may indicate a maximum size of a segment when segmentation is used in the RoHC compressor.

According to an embodiment of the present invention, a descriptor including parameters may be transmitted in order to transmit a parameter required for the aforementioned RoHC initial procedure.

According to an embodiment of the present invention, ROHC_init_descriptor( ) may include a descriptor_tag field, a descriptor_length field, a context_id field, a context_profile field, a max_cid field, and/or a large_cid field.

The descriptor_tag field may identify whether the descriptor is a descriptor including a parameter required for a RoHC initial procedure.

The descriptor_length field may indicate a length of the descriptor.

The context_id field may indicate a CID of a corresponding RoHC packet stream.

The context_profile field may be a field including the aforementioned PROFILES parameter and indicate a range of a protocol for header compression via RoHC.

The max_cid field may be a field including the aforementioned MAX_CID parameter and may indicate a maximum value of a CID.

The large_cid field may be a field including the aforementioned LARGE_CIDS parameter and may indicate whether a short CID (0 to 15 (decimal number)) and an embedded CID (0 to 16383 (decimal number)) are used for configuration of the CID.

According to an embodiment of the present invention, ROHC_init_descriptor( ) may include the aforementioned FEEDBACK_FOR parameter and/or MRRU parameter.

FIG. 110 is a diagram illustrating configuration of Fast_Information_Chunk( ) including ROHC_init_descriptor( ) according to an embodiment of the present invention.

ROHC_init_descriptor( ) according to an embodiment of the present invention may be transmitted through a fast information channel (FIC). In this case, ROHC_init_descriptor( ) may be included in Fast_Information_Chunk( ) and transmitted. According to an embodiment of the present invention, ROHC_init_descriptor( ) may be included in a service level of Fast_Information_Chunk( ) and transmitted.

A field included in Fast_Information_Chunk( ) including ROHC_init_descriptor( ) according to an embodiment of the present invention has been described above.

ROHC_init_descriptor( ) according to an embodiment of the present invention may be changed in its term according to system configuration and changed in its size according to a system optimization situation.

Fast_Information_Chunk( ) according to an embodiment of the present invention may be referred to as fast information chunk.

FIG. 111 is a diagram illustrating configuration of Fast_Information_Chunk( ) including a parameter required for a RoHC initial procedure according to an embodiment of the present invention.

The parameter required for the RoHC initial procedure according to an embodiment of the present invention may be transmitted through a fast information channel (FIC). In this case, the parameter required for the RoHC initial procedure may be included in Fast_Information_Chunk( ) and transmitted. According to an embodiment of the present invention, the parameter required for the RoHC initial procedure may be included in a service level of Fast_Information_Chunk( ) and transmitted.

A field included in Fast_Information_Chunk( ) including the parameter required for the RoHC initial procedure according to an embodiment of the present invention has been described above.

The parameter required for the RoHC initial procedure according to an embodiment of the present invention may be changed in its term according to system configuration and changed in its size according to a system optimization situation.

FIG. 112 is a diagram illustrating configuration of Fast_Information_Chunk( ) including ROHC_init_descriptor( ) according to another embodiment of the present invention.

According to an embodiment of the present invention, when important information about a component included in a broadcast service is included in Fast_Information_Chunk( ) and transmitted, ROHC_init_descriptor( ) may be included in a component level of Fast_Information_Chunk( ) and transmitted. That is, ROHC_init_descriptor( ) may be transmitted for each respective component included in Fast_Information_Chunk( ).

A field included in Fast_Information_Chunk( ) including ROHC_init_descriptor( ) according to another embodiment of the present invention has been described above.

ROHC_init_descriptor( ) according to an embodiment of the present invention may be changed in its term according to system configuration and changed in its size according to a system optimization situation.

FIG. 113 is a diagram illustrating configuration of Fast_Information_Chunk( ) including a parameter required for a RoHC initial procedure according to another embodiment of the present invention.

According to an embodiment of the present invention, when important information about a component included in a broadcast service is included in Fast_Information_Chunk( ) and transmitted, a parameter required for the RoHC initial procedure may be included in a component level of Fast_Information_Chunk( ) and transmitted. That is, the parameter required for the RoHC initial procedure may be transmitted or each respective component included in Fast_Information_Chunk( ).

A field included in Fast_Information_Chunk( ) including a parameter required for the RoHC initial procedure according to another embodiment of the present invention has been described above.

The parameter required for the RoHC initial procedure according to an embodiment of the present invention may be changed in its term according to system configuration and changed in its size according to a system optimization situation.

FIG. 114 illustrates a configuration of a header of a packet for signaling according to an embodiment of the present invention. The packet for signaling according to the present embodiment may be referred to as a link layer packet or a signaling packet. The link layer packet according to the present embodiment may include a link layer packet header and a link layer packet payload. In addition, as illustrated in FIG. 114, a packet header of the link layer packet according to the present embodiment may include a fixed header and an extended header. A length of the fixed header may be restricted to 1 byte. Therefore, in an embodiment of the present invention, additional signaling information may be transmitted through the extended header. The fixed header may include a 3-bit packet type field and a 1-bit packet configuration (PC) field. FIG. 114 illustrates a relation between fields and signaling fields transmitted through the fixed header and the extended header included in the link layer packet when the packet type field is set to "110." Hereinafter, a description will be given of the signaling fields included in FIG. 114.

The fixed header and/or the extended header according to the present embodiment may have a configuration varying with a value of the PC field.

The PC field is a field that indicates a packet configuration. In particular, the PC field may indicate processing of signaling information (or data) which is included in the link layer packet payload and/or the length of the extended header information according to the processing of signaling information (or data).

When the PC field has a value "0", the fixed header may include a 4-bit concatenation count field.

The concatenation count field is a field that is present when only a descriptor other than a section table is transmitted as a signal. The concatenation count (count) field indicates the number of descriptors included in the link layer packet payload. According to the present embodiment, descriptors, the number of which equals a value obtained by adding 1 to a value of the concatenation count (count) field, may be included in one link layer packet payload. Therefore, since the number of bits allocated to the concatenation count (count) field corresponds to 3 bits, signaling may be performed such that a maximum of eight descriptors are configured as one link layer packet.

When the PC field has a value of "1", the fixed header may include a 1-bit last segment indicator (LI) field and a 3-bit segment ID field.

The LI field may indicate whether the link layer packet includes last segmentation signaling data. In other words, signaling data may be segmented and transmitted. When the LI field has a value of "0", the value indicates that signaling data included in a current link layer packet does not correspond to a last segment. When the LI field has a value of "1", the value indicates that the signaling data included in the current link layer packet corresponds to the last segment.

The segment ID field may indicate an ID for identification of a segment when signaling data is segmented.

The extended header according to the present embodiment may have a configuration varying with the configuration of the fixed header.

However, as illustrated in the figure, the extended header according to the present embodiment may include a signaling class field, an information type field, and a signaling format field irrespective of the configuration of the fixed header. The field that is included in the extended header according to an embodiment of the present invention may be applied other layers. This may be changed by a designer.

The signaling class field according to the present embodiment may indicate a class of signaling included in the link layer packet payload. Specifically, the packet header according to the present embodiment may be used for one of signaling for channel scan and service acquisition, signaling for emergency alert, and signaling for header compression. When each of the signaling instances is used, the link layer packet payload according to the present embodiment may transmit associated signaling information. In addition, the signaling class field according to the present embodiment may have a length of 3 bits, which may be changed by a designer. Details will be described below.

The information type field according to the present embodiment may have a length of 2 bits or 3 bits, and indicate a type of signaling information included in the link layer packet payload. This may be changed by a designer. Details will be described below.

The signaling format field according to the present embodiment may have a length of 3 bits, which may be changed by a designer.

As described in the foregoing, when the PC field has a value of "0", the extended header according to the present embodiment may include the signaling class field, the information type field, and the signaling format field. In this case, the extended header according to the present embodiment may include a payload length part field according to a value of the signaling format field.

A value that indicates a whole length of the link layer packet or a value that indicates a length of the payload of the link layer packet may be allocated to the above-described payload length part field depending on system configuration.

In addition, when the PC field has a value of "1", the extended header according to the present embodiment may include a 4-bit segment sequence number (Seg_SN) field.

When the LI field has a value of "0", the extended header according to the present embodiment may include a 4-bit Seg_SN field, a 4-bit segment length ID field, the signaling class field, the information type field, and the signaling format field.

When the signaling data is segmented, the segment sequence number field indicates an order of respective segments. A head of the signaling data includes an index of a corresponding data table, and thus the respective segments segmented when a receiver receives the packet need to be aligned in order. Link layer packets having payloads segmented from one piece of signaling data have the same segment ID and may have different segment sequence numbers.

The segment length ID field may indicate a length of a corresponding segment.

When the LI field has a value of "1", the extended header according to the present embodiment may include a 4-bit Seg_SN field and a 12-bit last segment length field. The Seg_SN field may indicate an order of a segment corresponding to a last segment ID, and the last segment length field may indicate a length of the corresponding segment.

FIG. 115 is a chart that defines the signaling class field according to the present embodiment.

A left column of the chart indicates a value of a 3-bit signaling class field, and a right column of the chart indicates a description of a type of signaling of a packet header indicated by a value of each signaling class field.

Hereinafter, a description will be given of the value of each signaling class field.

When the signaling class field has a value of "000", signaling of the packet payload corresponds to the signaling for channel scan and service acquisition. As illustrated in the figure, the description may correspond to "Signaling for Channel Scan and Service Acquisition." In this case, the link layer packet payload may transmit signaling information related to channel scan and service acquisition.

When the signaling class field has a value of "001", signaling of the packet header corresponds to the signaling for emergency alert. As illustrated in the figure, the description may correspond to "Signaling for Emergency Alert." In this case, the link layer packet payload may transmit signaling information related to emergency alert.

When the signaling class field has a value of "010", signaling of the packet header corresponds to the signaling for header compression. As illustrated in the figure, the description may correspond to "Signaling for Header Compression." In this case, the link layer packet payload may transmit signaling information related to header compression.

When the signaling class field has values of "011" to "110", the packet header may be used for another type of signaling in the future. In this case, the description may correspond to "Reserved." In this case, the link layer packet payload according to the present embodiment may transmit information corresponding to signaling other than a signaling class proposed by the present invention in the future. A value corresponding to one of "011" to "110" may be allocated to the signaling class field.

When the signaling class field has a value of "111", the packet header may be used for two or more types of the above-described signaling. In this case, the description may correspond to "Various." Therefore, the link layer packet payload according to the present embodiment may transmit information corresponding to signaling which corresponds to two or more signaling classes.

FIG. 114 corresponds to a case used for the signaling for header compression. Here, the signaling class field corresponds to a value of "010."

FIG. 116 is a chart that defines an information type.

A left column of the chart indicates a value of a 3-bit information type field, and a right column of the chart indicates a description of a type of information transmitted by the packet payload indicated by a value of each information type field.

Specifically, FIG. 116 is a chart that defines an information type when the signaling class field according to the present embodiment has a value of "010." The information type may be indicated by a length of 3 bits. In addition, the information type may indicate a type of signaling information included in the link layer packet payload.

The description of each information type is as shown in the chart. Hereinafter, a value of the information type field will be described.

When the information type field has a value of "000", the description may correspond to "Initialization Information." In this case, the link layer packet payload may include signaling information related to initialization information.

When the information type field has a value of "001", the description may correspond to "Configuration Parameters." In this case, the link layer packet payload may include signaling information related to configuration parameters.

When the information type field has a value of "010", the description may correspond to "Static Chain." In this case, the link layer packet payload may include signaling information related to a static chain.

When the information type field has a value of "011", the description may correspond to "Dynamic Chain."

FIG. 117 is a diagram illustrating a structure of Payload_for_Initialization( ) according to an embodiment of the present invention when an information type for header compression has a value of "000."

The initialization information may include information about a configuration of an RoHC channel between a compressor and a decompressor. The RoHC channel may transmit one or more context information items. All contexts transmitted by the RoHC channel may include common information. The RoHC channel may include one or a plurality of DPs.

Payload_for_Initialization( ) according to the present embodiment may include a num_RoHC_channels field, an RoHC_channel_id field, a max_cid field, a large_cids field, a num_profiles field, a profiles( ) field, a num_IP_stream field, and an IP_address( ) field.

The num_RoHC_channels field may indicate the number of RoHC channels for transmission of packets to which RoHC is applied. An RoHC channel may include one or a plurality of DPs. When the RoHC channel includes one DP, RoHC channel information may be replaced based on information of the DP. In this case, the num_RoHC_channels field may be replaced by a num_DP field.

The RoHC_channel_id field may indicate an ID of an RoHC channel for transmission of packets to which RoHC is applied. When the RoHC channel includes one DP, the RoHC_channel_id field may be replaced by a DP_id field.

The max_cid field may indicate a maximum value of a CID. A value of the max_cid field may be input to the decompressor.

The large_cids field includes the above-described large_cids field, and may indicate whether a short CID (0 to 15 (decimal number)) is used or an embedded CID (0 to 16383 (decimal number)) is used in a configuration of the CID.

The num_profiles field may include the number of profiles supportable by the RoHC channel.

The profiles( ) field may indicate a range of a header compression protocol in an RoHC process according to an embodiment of the present invention. In the RoHC process according to the present embodiment, the compressor may compress RoHC packets having the same profile into a stream, and the decompressor may restore the RoHC packets.

The num_IP_stream field may indicate the number of IP streams transmitted through the RoHC channel.

The IP_address field may indicate a destination address of a filtered IP stream which is input to an RoHC compressor.

FIG. 118 is a diagram illustrating a structure of Payload_for_ROHC_configuration( ) when the information type for header compression has a value of "001."

Payload_for_ROHC_configuration( ) according to the present embodiment may include a configuration parameter. The configuration parameter may indicate a configuration of each packet and a transmission mode of a context.

The configuration parameter according to the present embodiment may correspond to a field included in Payload_for_ROHC_configuration( ) The configuration parameter may indicate a packet configuration of each context and/or a transmission mode (transport mode) of the context. In this case, RoHC_channel_id may be used to identify the same context_ids transmitted through different RoHC channels.

Payload_for_ROHC_configuration( ) according to the present embodiment may include an RoHC_channel_id field, a context_id field, a packet_configuration_mode field, a context_transmission_mode field, and a context_profile field.

The context_id field may indicate a context ID of a corresponding RoHC packet stream. A length of the context ID may be determined in an initial process of configuring a system. Therefore, the length may be determined based on a structure of Payload_for_Initialization( ) according to the present embodiment.

The packet_configuration_mode field may indicate a configuration mode of a packet stream including a corresponding context.

The context_transmission_mode field indicates a transmission mode of a corresponding context, which is identical to the above-described transmission mode (or transport mode).

Description of the RoHC_channel_id field and the context profile field included in Payload_for_ROHC_configuration( ) according to the present embodiment is similar to the above description.

FIG. 119 is a diagram illustrating a structure of Payload_for_static_chain( ) when the information type for header compression has a value of "010."

Payload_for_static_chain( ) according to the present embodiment may include a context_id field, a context profile field, a static_chain_length field, a static_chain( ) field, a dynamic_chain_incl field, a dynamic_chain_length field, and a dynamic_chain_byte field.

The dynamic_chain_incl field may indicate whether information about a dynamic chain is transmitted together with information about a static chain. Description of the context_id field, the context_profile field, the static_chain_length field, the static_chain( ) field, the dynamic_chain_length field, and the dynamic_chain_byte field included in Payload_for_static_chain( ) according to the present embodiment is similar to the above description.

FIG. 120 is a diagram illustrating a structure of Payload_for_dynamic_chain( ) when the information type for header compression has a value of "011."

Payload_for_dynamic_chain( ) according to the present embodiment may include a context_id field, a context profile field, a dynamic_chain_length field, and a dynamic_chain_byte field.

The description of the fields included in Payload_for_dynamic_chain( ) according to the present embodiment is similar to the above description.

An IP overhead reduction method according to another embodiment of the present invention is described. The IP overhead reduction methods using robust header compression (RoHC)-U mode (RFC3905) compression have been described with reference to FIGS. 93 to 120. IP overhead reduction methods using an RoHC v2 (RFC5225) mode are described below. A packet structure according to RoHC v2 and a method of extracting context information are described, and the aforementioned descriptions of FIGS. 93 to 120 may be applied to other descriptions.

The RoHCv2 profile has more excellent compression efficiency and robustness than the RFC3095 profile. The RoHCv2 profile does not define the IR-DYN packet format defined in the RFC3095 profile. Instead, the RoHCv2 profile defines a compressed header capable of performing more robust context repairing. In the case of the RoHCv2 mode, a transmitter may process an IP packet as an IR packet, a Co_Repair packet and a compressed packet.

FIG. 121 shows the header format of an IR packet of the RoHCv2 profile according to an embodiment of the present invention.

FIG. 121 shows the header format of an IR packet which transfers information about the entire header that has not been compressed. The IR packet header includes a static chain and a dynamic chain.

FIG. 122 shows the header format of a CO-repair packet of the RoHCv2 profile according to an embodiment of the present invention.

The CO-repair packet header may be used to transmit a dynamic chain and to update context. The CO-repair format may be used to update the context of all of dynamic fields by conveying an uncompressed value. The format may be protected by 7-bit CRC.

FIG. 123 shows a compressed header format of the RoHCv2 profile according to an embodiment of the present invention.

A different type may be applied depending on the configuration of a compressed header. In general, a pt_0_crc3_packet having the smallest size may be used in a broadcast system.

In a broadcast system, a link layer processor may include an RoHC module and an adaptation module. As described above, the RoHC module may perform IP header compression. The adaptation module may extract context information from a compressed RoHC packet and may generate signaling information. In this specification, if the RoHCv2 profile is used as in FIGS. 121 to 123, the operation of the adaptation module is additionally described.

FIG. 124 shows a method of generating a new packet stream by reconfiguring an RoHC packet according to an embodiment of the present invention.

An embodiment of the present invention may include at least one of three configuration modes.

If a transmitter operates in the first configuration mode "Configuration Mode #1", the adaptation module may extract a static chain and a dynamic chain from an IR packet and transform the remaining portion of the IR packet into a general header-compressed packet. Furthermore, the adaptation module may extract a dynamic chain from a Co_Repair packet and transform the remaining portion of the packet into a general header-compressed packet. The general header-compressed packet may be transmitted without a change in the configuration.

If a transmitter operates in the second configuration mode "Configuration Mode #2", the adaptation module may extract a static chain from an IR packet and transform the remaining portion of the IR packet into a general header-compressed packet. Furthermore, the adaptation module may extract a dynamic chain from a Co_Repair packet and transform the remaining portion of the packet into a general header-compressed packet. The general header-compressed packet may be transmitted without a change in the configuration.

If a transmitter operates in the third configuration mode "Configuration Mode #3", the adaptation module may extract a static chain from an IR packet and transform the remaining portion of the IR packet into a Co_Repair packet. Furthermore, the adaptation module may transmit the Co_Repair packet without a change in the configuration. The general header-compressed packet may be transmitted without a change in the configuration.

FIG. 125 shows a process of transforming an IR packet into a general header-compressed packet or PT_0_crc3_Packet in the process of configuring a new packet stream by reconfiguring an RoHC packet according to an embodiment of the present invention.

An IR packet according to an embodiment of the present invention may include a packet type, a context ID, a profile, CRC, a static chain, a dynamic chain and/or payload. The packet type may indicate the type of IR packet. For example, in FIG. 125, the packet type of the IR packet may indicate 11111101. The context ID may use 8 bits and may use more bits. The context ID may identify a channel through which a corresponding packet is transmitted. The profile may indicate the profile of an IR packet identified by a packet type. The CRC may indicate CRC code for an error check. The static chain may indicate information rarely changed during streaming. For example, upon performing IP streaming, an IP version, an IP source address, an IP destination address, an IP fragment flag, an UDP source port, an UDP destination port, etc. may be included in the static chain. The dynamic chain may indicate information that is frequently changed, but remains intact for a specific time. The payload may include data to be transmitted.

A general header-compressed packet PT_0_crc3_Packet according to an embodiment of the present invention may include a master sequence number (MSB), CRC and/or payload. The general header-compressed packet according to an embodiment of the present invention may correspond to a PT_0_crc3_Packet. The CRC may indicate CRC code for an error check. The payload may include data to be transmitted.

In accordance with an embodiment of the present invention, a static chain and a dynamic chain may be extracted from an IR packet, and the extracted static chain and dynamic chain may be transmitted out of band transport. The MSN included in the general header-compressed packet PT_0_crc3_Packet may re-encoded using information of the dynamic chain included in the IR packet. The CRC included in the general header-compressed packet PT_0_crc3_Packet may be calculated again separately from the CRC included in the IR packet.

FIG. 126 is a diagram showing a process of transforming a Co_Repair packet into a general header-compressed packet PT_0_crc3_Packet in the process of configuring a new packet stream by reconfiguring an RoHC packet according to an embodiment of the present invention.

A Co_Repair packet according to an embodiment of the present invention may include a packet type, a context ID, a profile, CRC, a dynamic chain and/or payload. The packet type may indicate the type of Co_Repair packet. For example, in FIG. 126, the packet type of the Co_Repair packet may indicate 11111011. The context ID may use 8 bits and may use more bits. The context ID may identify a channel through which a corresponding Co_Repair packet is transmitted. The profile may indicate the profile of a Co_Repair packet identified by a packet type. The CRC may indicate CRC code for an error check. The dynamic chain may indicate information that is frequently changed, but remains intact for a specific time. The payload may include data to be transmitted.

The general header-compressed packet "PT_0_crc3_Packet" according to an embodiment of the present invention may include an MSN, CRC and payload and have been described above.

In accordance with an embodiment of the present invention, a dynamic chain may be extracted from a Co_Repair packet. The extracted dynamic chain may be transmitted out of band transport. An MSN included in a general header-compressed packet PT_0_crc3_Packet may be re-encoded using information of a dynamic chain included in an IR packet. CRC included in the general header-compressed packet PT_0_crc3_Packet may be calculated again separately from the CRC included in the IR packet.

FIG. 127 is a diagram showing a process of transforming an IR packet into a Co_Repair packet in the process of configuring a new packet stream by reconfiguring an RoHC packet according to an embodiment of the present invention.

The IR packet and the Co_Repair packet according to an embodiment of the present invention have been described above.

In accordance with an embodiment of the present invention, the packet type value "11111101" of an IR packet may be changed to a packet type value "11111011" corresponding to a Co_Repair packet, and a static chain may be extracted from the IR packet. The extracted static chain may be transmitted out of band transport. The remaining fields that belong to the fields included in the IR packet and that exclude the packet type, the static chain and the CRC may be identically used in the Co_Repair packet. The CRC of the IR packet may be calculated again into the two CRCs "CRC-7" and "CRC-3" of the Co_Repair packet and transformed.

In this specification, in general, the header-compressed packet has been illustrated as being PT_0_crc3_Packet, but PT_0_crc7_Packet may be used. The Co_Repair format may be used to update the context of all of the dynamic fields by conveying an uncompressed value thereof.

In accordance with an embodiment of the present invention, an encoding and calculation method related to a field used in the process of configuring a new packet stream by reconfiguring an RoHC packet may comply with contents included in a related standard and other methods may be applied thereto.

FIG. 128 shows a method of transmitting a broadcast signal according to an embodiment of the present invention.

A broadcast signal transmitter may encode the broadcast data of a broadcast service based on a delivery protocol (S128010). At least one of the ROUTE protocol or the MMT protocol may be used as the delivery protocol.

The broadcast signal transmitter may link-layer process the broadcast data (S128020). The link-layer processing of the broadcast signal transmitter may include the steps of compressing the header of at least one IP packet and encapsulating the IP packet into link layer packets if the broadcast data includes the IP packet.

The broadcast signal transmitter may physical-layer process the broadcast data (S128030). The broadcast signal transmitter may generate a signal frame by physical-layer processing the link layer packets. The signal frame may include physical layer signaling information and at least one PLP. The physical layer processing of the broadcast signal transmitter has been described with reference to FIGS. 18 to 40.

In the link-layer processing of the broadcast signal transmitter, the compression of an IP packet header has been described in detail with reference to FIGS. 93 to 127.

The step of compressing the IP packet header of the broadcast signal transmitter may further include an RoHC processing step of reducing the size of the IP packet header of each packet based on a robust header compression (RoHC) scheme and an adaptation processing step of extracting context information from RoHC-processed packets. The context information may be transmitted as link layer signaling information. A case where the RoHC scheme is RoHCv2 has been described in detail with reference to FIGS. 121 to 127.

If only the RoHC processing is performed, when the broadcast signal receiver is turned on or a channel is changed, the broadcast signal transmitter cannot decode an ROHC packet until the IR packet is decoded. Accordingly, the broadcast signal transmitter may extract the context information and transmit it out of an IP stream in order to reduce such delay depending on the characteristics of a broadcast system. The transmission of such a stream may be called "out of band transport" as described above. The broadcast signal receiver may directly decode a link layer packet with reference to the context information if it decodes the link layer packet at a specific point of time by decoding the context information transmitted as signaling information.

The RoHC-processed IP packet includes a the first packet including a static chain and a dynamic chain, a second packet including a dynamic chain, and a compressed third packet. The static chain includes static subheader information, and the dynamic chain includes dynamic subheader information. In an embodiment of the present invention, the first packet and the second packet may correspond to an IR packet and an IR-DYN packet, respectively, or may correspond to an IR packet and a Co_Repair Packet, respectively, depending on an applied RoHC scheme. Specifically, in the case of the RoHCv2 scheme, the first packet and the second packet may correspond to an IR packet and a Co_Repair Packet, respectively.

The adaptation processing may operate in a plurality of modes. In one embodiment, the adaptation processing step may include converting the first packet into the third packet by extracting the static chain and the dynamic chain from the first packet, and converting the second packet into the third packet by extracting the dynamic chain from the second packet. In this case, context information may include at least one of the extracted static chain information and the extracted dynamic chain information. In another embodiment, the adaptation processing step may include converting the first packet into the second packet by extracting the static chain from the first packet. In this case, context information may include the extracted static chain information.

FIG. 129 shows the broadcast signal transmitter and broadcast signal receiver of a broadcast system according to an embodiment of the present invention.

The broadcast signal transmitter 129100 includes a broadcast data encoder 129110, a link layer processor 129120 and a physical layer processor 129130. The description of the aforementioned transmission method is applied to the operation of the broadcast signal transmitter.

The broadcast data encoder 129110 may encode broadcast data based on a delivery protocol. At least one of the ROUTE protocol and the MMT protocol may be used as the delivery protocol.

The link layer processor 129120 may link-layer process the broadcast data. If the broadcast data includes at least one IP packet, the link layer processor 129120 may include an IP packet header compression unit for compressing the header of the IP packet and an encapsulation unit for encapsulating the IP packet into link layer packets.

The physical layer processor 129130 may physical-layer process the broadcast data. The physical layer processor 129130 may generate a signal frame by physical-layer processing the link layer packets. The signal frame may include physical layer signaling information and at least one PLP. The physical layer processing of the broadcast signal transmitter has been described above with reference to FIGS. 18 to 40.

In the link-layer processing of the broadcast signal transmitter, the compression of the IP packet header has been described above in detail with reference to FIGS. 93 to 127.

The IP packet header compression unit of the broadcast signal transmitter may further include an RoHC unit for reducing the size of the IP packet header of each packet based on a robust header compression (RoHC) scheme and an adaptation unit for extracting context information from RoHC-processed packets. The context information may be transmitted as link layer signaling information. A case where the RoHC scheme is RoHCv2 has been described above in detail with reference to FIGS. 121 to 127.

The RoHC-processed IP packet includes a first packet including a static chain and a dynamic chain, a second packet including a dynamic chain, and a compressed third packet. The static chain includes static subheader information, and the dynamic chain includes dynamic subheader information. In an embodiment of the present invention, the first packet and the second packet may correspond to an IR packet and an IR-DYN packet, respectively, or may correspond to an IR packet and a Co_Repair Packet, respectively, depending on an applied RoHC scheme. Specifically, in the case of the RoHCv2 scheme, the first packet and the second packet may correspond to an IR packet and a Co_Repair Packet, respectively The adaptation unit may operate in a plurality of modes. In an embodiment, the adaptation unit may convert the first packet into the third packet by extracting the static chain and the dynamic chain from the first packet and may convert the second packet into the third packet by extracting the dynamic chain from the second packet. In this case, context information may include at least one of the extracted static chain information and the extracted dynamic chain information. In another embodiment, the adaptation processing step may include converting the first packet into the second packet by extracting the static chain from the first packet. In this case, context information may include the extracted static chain information.

The broadcast signal receiver 129200 may include a physical layer parser 129230, a link layer parser 129220 and a broadcast data decoder 129210. The broadcast signal receiver may perform the inverse processing of the aforementioned method of transmitting a broadcast signal by the broadcast signal transmitter.

The physical layer parser 129230 may extract broadcast data and signaling information by physical-layer processing a received broadcast signal frame.

The link layer parser 129220 may recover the broadcast data of a link layer packet format to an IP packet. The link layer parser 129220 may recover a compressed IP packet header based on context information.

The broadcast data decoder 129210 may decode the broadcast data based on a transport protocol and output/provide a service/service content.

The module or unit may correspond to processors for executing continuous execution processes stored in memory (or a storage unit). Each of the steps described in the aforementioned embodiment may be performed by hardware/processors. Each of the modules/blocks/units described in the aforementioned embodiment may operate as hardware/processor. Furthermore, the methods proposed by the present invention may be executed in the form of code. The code may be written in a processor-readable storage medium and thus may be read by a processor provided by an apparatus.

Although the drawings have been divided and described for convenience of description, the embodiments described with reference to the drawings may be merged to implement a new embodiment. Furthermore, to design a computer-readable recoding medium on which a program for executing the aforementioned embodiments has been recorded according to the needs of a person having ordinary skill in the art falls within the scope of the present invention.

An apparatus and method according to embodiments of the present invention are not limited and applied to the apparatuses and methods according to the embodiments described above, and some or all of the aforementioned embodiments may be selectively combined and configured so that the embodiments are modified in various manners.

The method proposed by the present invention may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although some embodiments of the present invention have been illustrated and described above, the present invention is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of the present invention.

Furthermore, in this specification, both the apparatus invention and the method invention have been described, but the descriptions of both the inventions may be complementary applied, if necessary.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and method inventions have been described, and the descriptions of both the apparatus and method inventions may be complementarily applied.

MODE FOR INVENTION

Various embodiments have been described in the best form for implementing the present invention.

INDUSTRIAL APPLICABILITY

The present invention is used for a series of the fields for providing a broadcast signal.

It is evident to those skilled in the art will understand that the present invention may be changed and modified in various ways without departing from the spirit or range of the present invention. Accordingly, the present invention is intended to include all the changes and modifications provided by the appended claims and equivalents thereof.

The invention claimed is:

1. A method of transmitting a broadcast signal by a device in a wireless network, the method comprising:
    link layer processing Internet Protocol (IP) packets to generate a plurality of link layer packets, the plurality of link layer packets including:
        link layer packets generated by compressing headers of one or more IP packets of the IP packets and encapsulating the IP packets; and
        one or more link layer packets for link layer signaling information, the one or more link layer packets generated by encapsulating the link layer signaling information;
    physical layer processing the plurality of link layer packets to generate the broadcast signal including a signal frame, the plurality of link layer packets carried in multiple physical layer pipes (PLPs) of the signal frame,
    wherein the link layer signaling information includes:
        a PLP identifier corresponding to the link layer signaling information, and
        mode information representing a mode of context extraction of IP packets with compressed headers in a PLP identified by the PLP identifier,
    wherein the mode of context extraction is a first mode, a second mode or a third mode, and
    wherein the first mode represents no context extraction, the second mode represents that context information is extracted from an IR packet in IP packets of which headers are compressed, and the third mode represents that context information are extracted from an IR packet and an IR-dynamic packet in IP packets of which headers are compressed; and
    transmitting the broadcast signal.

2. The method of claim 1, wherein context extraction for a first PLP of the multiple PLPs is different from context extraction for a second PLP of the multiple PLPs.

3. The method of claim 1, wherein the link layer signaling information further includes the context information for a PLP to which the context extraction applied.

4. The method of claim 1, wherein the context information extracted from the IR packet for the second mode is static chain so that the IR packet is converted to an IR-dynamic packet.

5. The method of claim 3, wherein the link layer signaling information further includes at least one of context id information for identifying an IP stream including IP packets of which headers are compressed, max CID information for indicating maximum value of the context id or context profile information for indicating a range of protocols used to compress the IP packets.

6. The method of claim 5, wherein the link mapping information is encapsulated into the link layer packets of the second group.

7. The method of claim 1,
wherein the context information extracted from the IR packet for the third mode is static chain and dynamic chain so that the IR packet is converted into a compressed packet, and
wherein the context information extracted from the IR-dynamic packet for the third mode is dynamic chain so that the IR-dynamic packet is converted into a compressed packet.

8. The method of claim 1, wherein the method further comprises:
generating a link mapping information providing a list of upper layer sessions carried in a PLP of the multiple PLPs.

9. The method of claim 1,
wherein a link layer packet includes a header, the header part includes packet type information indicating a type of packet encapsulated into the link layer packet, and
wherein the type is at least one of an IPv4 packet, a compressed IP packet or a link layer packet of the second group including the link layer signaling information.

10. The method of claim 9, wherein a header of the link layer packet of the second group further includes signaling type information indicating a type of the link layer signaling information.

11. The method of claim 1, wherein the IP packets includes broadcast service data encoded by using a delivery protocol, the delivery protocol including at least one of a real-time object delivery over unidirectional transport (ROUTE) protocol or an MPEG media transport (MNIT) protocol based on a delivery protocol.

12. The method of claim 1, wherein a link layer packet of the first group is carried in a PLP different from a PLP carrying a link layer packet of the second group.

13. An apparatus for transmitting a broadcast signal in a wireless network, the apparatus comprising:
a link layer processor configured to link layer process Internet Protocol (IP) packets to generate a plurality of link layer packets,
wherein the plurality of link layer packets includes:
link layer packets generated by compressing headers of one or more IP packets of the IP packets and encapsulating the IP packets; and
one or more link layer packets for link layer signaling information, the one or more link layer packets generated by encapsulating the link layer signaling information;
a physical layer processor configured to physical layer process the plurality of link layer packets to generate the broadcast signal including a signal frame, the plurality of link layer packets carried in multiple physical layer pipes (PLPs) of the signal frame,
wherein the link layer signaling information includes:
a PLP identifier corresponding to the link layer signaling information, and
mode information representing a mode of context extraction of IP packets with compressed headers in a PLP identified by the PLP identifier,
wherein the mode of context extraction is a first mode, a second mode or a third mode, and
wherein the first mode represents no context extraction, the second mode represents that context information is extracted from an IR packet in IP packets of which headers are compressed, and the third mode represents that context information are extracted from an IR packet and an IR-dynamic packet in IP packets of which headers are compressed; and
a transmitter configured to transmit the broadcast signal.

14. The apparatus of claim 13, wherein context extraction for a first PLP of the multiple PLPs is different from context extraction for a second PLP of the multiple PLPs.

15. The apparatus of claim 13, wherein the link layer signaling information further includes the context information for a PLP to which the context extraction applied.

16. The apparatus of claim 13, wherein the context information extracted from the IR packet for the second mode is static chain so that the IR packet is converted to an IR-dynamic packet.

17. The apparatus of claim 13,
wherein the context information extracted from the IR packet for the third mode is static chain and dynamic chain so that the IR packet is converted into a compressed packet, and
wherein the context information extracted from the IR-dynamic packet for the third mode is dynamic chain so that the IR-dynamic packet is converted into a compressed packet.

18. The apparatus of claim 8, wherein the link layer processor is further configured to:
generate a link mapping information providing a list of upper layer sessions carried in a PLP of the multiple PLPs.

* * * * *